(12) United States Patent
Kimura et al.

(10) Patent No.: US 12,456,041 B2
(45) Date of Patent: Oct. 28, 2025

(54) AI SYSTEM AND OPERATION METHOD OF AI SYSTEM

(71) Applicant: SEMICONDUCTOR ENERGY LABORATORY CO., LTD., Atsugi (JP)

(72) Inventors: Hajime Kimura, Kanagawa (JP); Rihito Wada, Kanagawa (JP); Masayuki Kimura, Kanagawa (JP); Yoshiyuki Kurokawa, Kanagawa (JP); Takeshi Aoki, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 955 days.

(21) Appl. No.: 17/436,467

(22) PCT Filed: Feb. 24, 2020

(86) PCT No.: PCT/IB2020/051516
§ 371 (c)(1),
(2) Date: Sep. 3, 2021

(87) PCT Pub. No.: WO2020/183263
PCT Pub. Date: Sep. 17, 2020

(65) Prior Publication Data
US 2022/0180159 A1 Jun. 9, 2022

(30) Foreign Application Priority Data

Mar. 8, 2019 (JP) .................................. 2019-042594
May 8, 2019 (JP) .................................. 2019-088049
Oct. 25, 2019 (JP) .................................. 2019-194669

(51) Int. Cl.
G06N 3/063 (2023.01)
G06F 16/93 (2019.01)
G06F 30/327 (2020.01)

(52) U.S. Cl.
CPC ............. *G06N 3/063* (2013.01); *G06F 16/93* (2019.01); *G06F 30/327* (2020.01)

(58) Field of Classification Search
CPC ........ G06N 3/063; G06F 16/93; G06F 30/327
(Continued)

(56) References Cited

U.S. PATENT DOCUMENTS 9,384,419 B2 7/2016 Konishi
9,813,694 B2 11/2017 Zhong et al.
(Continued)

FOREIGN PATENT DOCUMENTS

CN 101063987 A 10/2007
JP 07-200643 A 8/1995
(Continued)

OTHER PUBLICATIONS

Chinese Office Action (Application No. 202080018555.2) Dated Aug. 29, 2024.
(Continued)

*Primary Examiner* — Jack Chiang
*Assistant Examiner* — Suchin Parihar
(74) *Attorney, Agent, or Firm* — Fish & Richardson P.C.

(57) ABSTRACT

A system that creates a net list from a circuit diagram or a document showing a circuit structure is provided. The system is an AI system including a first electronic device. The first electronic device includes an input/output interface, a control portion, and a first conversion portion. The input/output interface is electrically connected to the control portion, and the first conversion portion is electrically connected to the control portion. The input/output interface has a function of transmitting input data generated by a user's operation to the control portion, and the control portion has a function of transmitting the input data to the first conversion portion. Note that the input data is a circuit diagram
(Continued)

illustrating a circuit structure or a document file showing the circuit structure. The first conversion portion includes a circuit where a neural network is formed, and the input data is converted to a net list with the use of the neural network of the first conversion portion.

3 Claims, 41 Drawing Sheets

(58) Field of Classification Search
USPC .......................................................... 716/103
See application file for complete search history.

(56) References Cited

U.S. PATENT DOCUMENTS

| | | | |
|---|---|---|---|
| 10,061,881 | B2 | 8/2018 | Li et al. |
| 10,102,320 | B2* | 10/2018 | Pataky .................. G06F 30/327 |
| 10,949,595 | B2 | 3/2021 | Tsutsui et al. |
| 11,907,927 | B2* | 2/2024 | Takasu ................. G07G 1/0045 |
| 2007/0256037 | A1 | 11/2007 | Zavadsky et al. |
| 2009/0313596 | A1* | 12/2009 | Lippmann ............. G06F 30/327 |
| | | | 716/126 |
| 2014/0355886 | A1 | 12/2014 | Konishi |
| 2015/0296202 | A1 | 10/2015 | Zhong et al. |
| 2016/0253445 | A1* | 9/2016 | Pataky .................. G06F 30/327 |
| | | | 716/104 |
| 2017/0317085 | A1 | 11/2017 | Kurokawa |
| 2018/0004881 | A1 | 1/2018 | Li et al. |
| 2018/0005588 | A1 | 1/2018 | Kurokawa |
| 2020/0151289 | A1* | 5/2020 | Sikka ..................... G06N 3/063 |
| 2022/0215146 | A1* | 7/2022 | Lin ........................ G06N 20/00 |
| 2024/0086606 | A1* | 3/2024 | Hsu ........................ G06F 30/27 |
| 2024/0265181 | A1* | 8/2024 | Cao ........................ G06F 30/27 |

FOREIGN PATENT DOCUMENTS

| | | | |
|---|---|---|---|
| JP | 2015-007972 | A | 1/2015 |
| JP | 2015-176193 | A | 10/2015 |
| JP | 2015-207278 | A | 11/2015 |
| JP | 2018-005436 | A | 1/2018 |
| JP | 2018-049430 | A | 3/2018 |
| WO | WO-2017/017808 | | 2/2017 |
| WO | WO-2018/221625 | | 12/2018 |
| WO | WO-2018/234945 | | 12/2018 |
| WO | WO-2019/021095 | | 1/2019 |

OTHER PUBLICATIONS

International Search Report (Application No. PCT/IB2020/051516) Dated May 26, 2020.
Written Opinion (Application No. PCT/IB2020/051516) Dated May 26, 2020.
Jiao.L, Application and Implementation of Neural Network, Jun. 1, 1993, pp. 548-551, Xidian University Press.
Chinese Office Action (Application No. 202080018555.2) Dated Mar. 19, 2025.

* cited by examiner

100

MAC1

FIG. 28A
Intermediate state
New crystalline phase
| Amorphous | Crystalline | Crystal |
|---|---|---|
| completely amorphous | ·CAAC<br>·nc<br>·CAC<br>excluding single crystal and poly crystal | ·single crystal<br>·poly crystal |
FIG. 28B
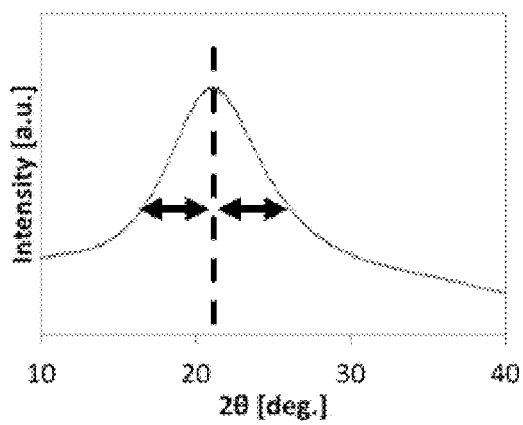
FIG. 28C
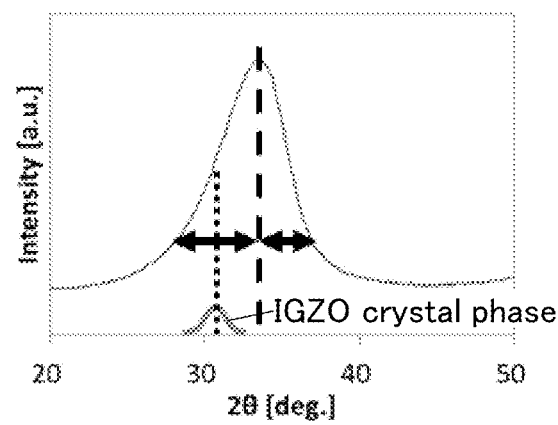
FIG. 28D
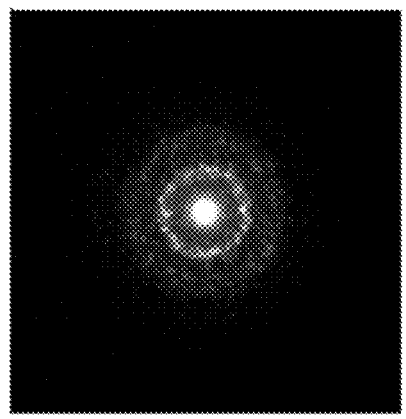

AI SYSTEM AND OPERATION METHOD OF AI SYSTEM

CROSS REFERENCE TO RELATED APPLICATIONS

This application is a U.S. National Phase Application under 35 U.S.C. § 371 of International Application PCT/IB2020/051516, filed on Feb. 24, 2020, which is incorporated by reference and claims the benefit of foreign priority applications filed in Japan on Mar. 8, 2019, as Application No. 2019-042594, on May 8, 2019, as Application No. 2019-088049, and on Oct. 25, 2019, as Application No. 2019-194669.

TECHNICAL FIELD

One embodiment of the present invention relates to an AI system and an operation method of the AI system.

Note that one embodiment of the present invention is not limited to the above technical field. The technical field of the invention disclosed in this specification and the like relates to an object, a method, or a manufacturing method. Alternatively, one embodiment of the present invention relates to a process, a machine, manufacture, or a composition of matter. Therefore, specific examples of the technical field of one embodiment of the present invention disclosed in this specification include a semiconductor device, a display device, a liquid crystal display device, a light-emitting device, a power storage device, an imaging device, a memory device, a signal processing device, a processor, an electronic device, a system, a driving method thereof, a manufacturing method thereof, and a testing method thereof.

BACKGROUND ART

An artificial neural network (hereinafter, referred to as a neural network) is an information processing system modeled on a biological neural network. A computer having a higher performance than a conventional Neumann computer is expected to be achieved by utilizing the neural network, and in these years, a variety of researches on a neural network formed over an electronic circuit have been carried out.

For example, Patent Document 1 discloses a control system which converts charge characteristics of a secondary battery to data for images and discriminates between normal characteristics and abnormal characteristics of the secondary battery from the data for images with the use of a convolutional neural network (CNN). Furthermore, Patent Document 2 discloses a system which analyzes document data with the use of a neural network or the like, for example.

REFERENCES

Patent Documents

[Patent Document 1] PCT International Publication No. 2019/021095
[Patent Document 2] Japanese Published Patent Application No. 2018-49430

SUMMARY OF THE INVENTION

Problems to be Solved by the Invention

In manufacturing an electronic device, a semiconductor device, a semiconductor wafer, or the like, the specifications thereof are determined in advance and a circuit diagram is created on the basis of the specifications, for example. However, even within the same specifications, the direction, position, and the like of a wiring, a circuit element, and the like might be designed differently depending on the creator of the circuit diagram. Thus, circuit diagrams sometimes look different from each other even though they are based on the same specifications and indicate the same circuit structure.

In other words, even when the specifications and circuit structures are the same, many patterns of circuit diagrams can exist depending on how the circuit is illustrated. Therefore, for example, in image search in a database for a circuit diagram, which is an input image, by using image recognition processing by AI (Artificial Intelligence) or the like, even when a circuit having the same specifications and circuit structure as the input circuit diagram exists in the database, the circuit in the database sometimes looks different from the input image and cannot be output as the result of the image search in some cases.

An object of one embodiment of the present invention is to provide an AI system which converts an image or a document showing a circuit structure to a net list. Alternatively, an object of one embodiment of the present invention is to provide an AI system capable of search for a circuit structure. Alternatively, an object of one embodiment of the present invention is to provide a novel AI system. Alternatively, an object of one embodiment of the present invention is to provide a novel operation method of an AI system.

Note that the objects of one embodiment of the present invention are not limited to the objects listed above. The objects listed above do not preclude the existence of other objects. Note that the other objects are objects that are not described in this section and will be described below. The objects that are not described in this section will be derived from the descriptions of the specification, the drawings, and the like and can be extracted from these descriptions by those skilled in the art. Note that one embodiment of the present invention is to solve at least one of the objects listed above and the other objects. Note that one embodiment of the present invention does not necessarily solve all the objects listed above and the other objects.

Means for Solving the Problems (1)
One embodiment of the present invention is an AI system including a first electronic device, where the first electronic device includes an input/output interface, a control portion, and a first conversion portion. The input/output interface is electrically connected to the control portion, and the first conversion portion is electrically connected to the control portion. The input/output interface has a function of transmitting input data generated by a user's operation to the control portion, and the control portion has a function of transmitting the input data to the first conversion portion. The first conversion portion includes a circuit where a neural network is formed, and the first conversion portion has a function of converting the input data to a first net list with the use of the neural network. Note that the input data is a circuit diagram illustrating a circuit structure or a document file showing the circuit structure.

(2)
In the structure of the above (1) of one embodiment of the present invention, the first electronic device may include a first database and a second database. The first database is electrically connected to the control portion, and the second database is electrically connected to the control portion. A second net list is stored in the first database, and document data linked with the second net list is stored in the second database. The control portion has a function of searching the first database for a circuit structure of the first net list and a function of reading the document data from the second database and outputting the document data to the input/output interface in the case where the second net list is found in searching for the circuit structure of the first net list.

(3)

One embodiment of the present invention in the structure of the above (1) may include a second electronic device, the first electronic device may include an external interface, and the second electronic device may include a third database and a fourth database. The third database is electrically connected to the external interface, the fourth database is electrically connected to the external interface, a second net list is stored in the third database, and document data linked with the second net list is stored in the fourth database. The control portion communicates with the second electronic device through the external interface and has a function of searching the third database for a circuit structure of the first net list and a function of reading the document data from the fourth database and outputting the document data to the input/output interface in the case where the second net list is found in the third database in searching for the circuit structure of the first net list.

(4)

Another embodiment of the present invention is an AI system including a first electronic device and a second electronic device, where the first electronic device includes an input/output interface, a control portion, and an external interface, and the second electronic device includes a second conversion portion. The input/output interface is electrically connected to the control portion, and the external interface is electrically connected to the control portion and the second conversion portion of the second electronic device. The input/output interface has a function of transmitting input data generated by a user's operation to the control portion, and the control portion has a function of transmitting the input data to the second conversion portion of the second electronic device through the external interface. The second conversion portion includes a circuit where a neural network is formed, the second conversion portion has a function of converting the input data to a first net list with the use of the neural network, and the control portion has a function of obtaining the first net list from the second electronic device through the external interface. Note that the input data is a circuit diagram illustrating a circuit structure or a document file showing the circuit structure.

(5)

In the structure of the above (4) of one embodiment of the present invention, the second electronic device may include a third database and a fourth database. The third database is electrically connected to the external interface, and the fourth database is electrically connected to the external interface. A second net list is stored in the third database, and document data linked with the second net list is stored in the fourth database. The control portion communicates with the second electronic device through the external interface and has a function of searching the third database for a circuit structure of the first net list and a function of reading the document data from the fourth database and outputting the document data to the input/output interface in the case where the second net list is found in the third database in searching for the circuit structure of the first net list.

(6)

Another embodiment of the present invention is an operation method of an AI system including an input/output interface, a control portion, and a first conversion portion. The first conversion portion includes a circuit where a neural network is formed, the input/output interface is electrically connected to the control portion, and the first conversion portion is electrically connected to the control portion. The operation method of the AI system includes a first to third steps. The first step includes a step of inputting input data created by a user to the control portion, the second step includes a step of converting the input data to a first net list by the neural network of the first conversion portion, and the third step includes a step of performing output to the input/output interface through the control portion.

(7)

The operation method of the above (6), which is one embodiment of the present invention, may include a fourth to sixth steps. The AI system includes a first database and a second database, the first database is electrically connected to the control portion, and the second database is electrically connected to the control portion. A second net list is stored in the first database, and document data linked with the second net list is stored in the second database. The fourth step includes a step of searching the first database for a circuit structure of the first net list, the fifth step includes a step of reading the document data from the second database and outputting the document data to the input/output interface in the case where the second net list is found in the first database in the fourth step, and the sixth step includes a step where the control portion outputs information that the first net list is not found in the first database to the input/output interface in the case where the second net list is not found in the first database in the fourth step.

Note that in this specification and the like, a semiconductor device refers to a device that utilizes semiconductor characteristics, and means a circuit including a semiconductor element (a transistor, a diode, a photodiode, and the like), a device including the circuit, and the like. The semiconductor device also means all devices that can function by utilizing semiconductor characteristics. For example, an integrated circuit, a chip including an integrated circuit, and an electronic component including a chip in a package are examples of the semiconductor device. Moreover, a memory device, a display device, a light-emitting device, a lighting device, an electronic device, and the like themselves might be semiconductor devices, or might include semiconductor devices.

In the case where there is a description "X and Y are connected" in this specification and the like, the case where X and Y are electrically connected, the case where X and Y are functionally connected, and the case where X and Y are directly connected are regarded as being disclosed in this specification and the like. Accordingly, without being limited to a predetermined connection relation, for example, a connection relation shown in drawings or texts, a connection relation other than one shown in drawings or texts is disclosed in the drawings or the texts. Each of X and Y denotes an object (e.g., a device, an element, a circuit, a wiring, an electrode, a terminal, a conductive film, or a layer).

For example, in the case where X and Y are electrically connected, one or more elements that allow electrical connection between X and Y (e.g., a switch, a transistor, a capacitor, an inductor, a resistor, a diode, a display device, a light-emitting device, and a load) can be connected between X and Y. Note that a switch has a function of being controlled to be turned on or off. That is, the switch has a function of being in a conduction state (on state) or a non-conduction state (off state) to determine whether a current flows or not.

For example, in the case where X and Y are functionally connected, at least one circuit that enables functional connection between X and Y (e.g., a logic circuit (an inverter, a NAND circuit, a NOR circuit, or the like); a signal converter circuit (a digital-analog converter circuit, an analog-digital converter circuit, a gamma correction circuit, or the like); a potential level converter circuit (a power supply circuit (a step-up circuit, a step-down circuit, or the like), a level shifter circuit for changing the potential level of a signal, or the like); a voltage source; a current source; a switching circuit; an amplifier circuit (a circuit that can increase signal amplitude, the amount of current, or the like, an operational amplifier, a differential amplifier circuit, a source follower circuit, a buffer circuit, or the like); a signal generation circuit; a memory circuit; or a control circuit) can be connected between X and Y. For example, even when another circuit is provided between X and Y, X and Y are regarded as being functionally connected when a signal output from X is transmitted to Y.

Note that an explicit description, X and Y are electrically connected, includes the case where X and Y are electrically connected (i.e., the case where X and Y are connected with another element or another circuit provided therebetween), the case where X and Y are functionally connected (i.e., the case where X and Y are functionally connected with another circuit provided therebetween), and the case where X and Y are directly connected (i.e., the case where X and Y are connected without another element or another circuit provided therebetween). That is, the explicit expression "X and Y are electrically connected" is the same as the explicit simple expression "X and Y are connected".

It can be expressed as, for example, "X, Y, a source (or a first terminal or the like) of a transistor, and a drain (or a second terminal or the like) of the transistor are electrically connected to each other, and X, the source (or the first terminal or the like) of the transistor, the drain (or the second terminal or the like) of the transistor, and Y are electrically connected to each other in this order". Alternatively, it can be expressed as "a source (or a first terminal or the like) of a transistor is electrically connected to X; a drain (or a second terminal or the like) of the transistor is electrically connected to Y; and X, the source (or the first terminal or the like) of the transistor, the drain (or the second terminal or the like) of the transistor, and Y are electrically connected to each other in this order". Alternatively, it can be expressed as "X is electrically connected to Y through a source (or a first terminal or the like) and a drain (or a second terminal or the like) of a transistor, and X, the source (or the first terminal or the like) of the transistor, the drain (or the second terminal or the like) of the transistor, and Y are provided in this connection order". When the connection order in a circuit structure is defined by an expression similar to the above examples, a source (or a first terminal or the like) and a drain (or a second terminal or the like) of a transistor can be distinguished from each other to specify the technical scope. Note that these expressions are examples, and the expression is not limited to these expressions. Here, X and Y each denote an object (e.g., a device, an element, a circuit, a wiring, an electrode, a terminal, a conductive film, or a layer).

Even when independent components are electrically connected to each other in a circuit diagram, one component has functions of a plurality of components in some cases. For example, when part of a wiring also functions as an electrode, one conductive film has functions of both components: a function of the wiring and a function of the electrode. Thus, "electrical connection" in this specification includes in its category such a case where one conductive film has functions of a plurality of components.

In this specification and the like, a "resistor" can be, for example, a circuit element or a wiring having a resistance value. Therefore, in this specification and the like, a "resistor" sometimes includes a wiring having a resistance value, a transistor in which a current flows between the source and the drain, a diode, and a coil. Thus, the term "resistor" can be replaced with the terms "resistance", "load", "a region having a resistance", and the like; inversely, the terms "resistance", "load", and a "region having a resistance" can be replaced with the term "resistor" and the like. The resistance value can be, for example, preferably greater than or equal to 1 m$\Omega$ and less than or equal to 10$\Omega$, further preferably greater than or equal to 5 m$\Omega$ and less than or equal to 5$\Omega$, still further preferably greater than or equal to 10 m$\Omega$ and less than or equal to 1$\Omega$. As another example, the resistance value may be greater than or equal to 1$\Omega$ and less than or equal to $1\times10^9\Omega$.

In this specification and the like, a "capacitor" is, for example, a circuit element having an electrostatic capacitance value, a region of a wiring having an electrostatic capacitance value, parasitic capacitance, or gate capacitance of a transistor. Therefore, in this specification and the like, a "capacitor" includes not only a circuit element that has a pair of electrodes and a dielectric between the electrodes, but also parasitic capacitance generated between wirings, gate capacitance generated between a gate and one of a source and a drain of a transistor, and the like. The terms "capacitor", "parasitic capacitance", "gate capacitance", and the like can be replaced with the term "capacitance" and the like; inversely, the term "capacitance" can be replaced with the terms "capacitor", "parasitic capacitance", "gate capacitance", and the like. The term "pair of electrodes" of a "capacitor" can be replaced with "pair of conductors", "pair of conductive regions", "pair of regions", and the like. Note that the electrostatic capacitance value can be greater than or equal to 0.05 fF and less than or equal to 10 pF, for example. Alternatively, the electrostatic capacitance value may be greater than or equal to 1 pF and less than or equal to 10 µF, for example.

In this specification and the like, a transistor includes three terminals called a gate, a source, and a drain. The gate functions as a control terminal for controlling the conduction state of the transistor. Two terminals functioning as the source and the drain are input/output terminals of the transistor. One of the two input/output terminals serves as the source and the other serves as the drain on the basis of the conductivity type (n-channel type or p-channel type) of the transistor and the levels of potentials applied to the three terminals of the transistor. Thus, the terms "source" and "drain" are interchangeable in this specification and the like. In this specification and the like, expressions "one of a source and a drain" (or a first electrode or a first terminal) and "the other of the source and the drain" (or a second electrode or a second terminal) are used in description of the connection relation of a transistor. Depending on the structure, a transistor may include a back gate in addition to the above three terminals. In that case, in this specification and the like, one of the gate and the back gate of the transistor may be referred to as a first gate and the other of the gate and the back gate of the transistor may be referred to as a second gate. Moreover, the terms "gate" and "back gate" can be replaced with each other in one transistor in some cases. In the case where a transistor includes three or more gates, the gates may be referred to as a first gate, a second gate, and a third gate, for example, in this specification and the like.

In this specification and the like, a node can be referred to as a terminal, a wiring, an electrode, a conductive layer, a conductor, an impurity region, or the like depending on the circuit structure, the device structure, or the like. Furthermore, a terminal, a wiring, or the like can be referred to as a node.

In this specification and the like, "voltage" and "potential" can be replaced with each other as appropriate. The "voltage" refers to a potential difference from a reference potential, and when the reference potential is a ground potential, for example, the "voltage" can be expressed as the "potential". The ground potential does not necessarily mean 0 V. Potentials are relative values, and the potential applied to a wiring or the like is sometimes changed depending on the reference potential.

In general, "current" is defined as a charge transfer (electrical conduction) accompanied by transfer of positively charged particles; the description "electrical conduction of positively charged particles occurs" can be rephrased as "electrical conduction of negatively charged particles occurs in the opposite direction". Therefore, unless otherwise specified, "current" in this specification and the like refers to a charge transfer (electrical conduction) accompanied by carrier movement. Examples of a carrier here include an electron, a hole, an anion, a cation, and a complex ion, and the type of carrier differs between current flow systems (e.g., a semiconductor, a metal, an electrolyte solution, and a vacuum). The direction of a current in a wiring or the like refers to the direction in which a positive carrier moves, and the amount of current is expressed as a positive value. In other words, the direction in which a negative carrier moves is opposite to the direction of a current, and the amount of current is expressed as a negative value. Thus, in the case where the polarity of a current (or the direction of a current) is not specified in this specification and the like, the description "a current flows from element A to element B" can be rephrased as "a current flows from element B to element A", for example. The description "a current is input to element A" can be rephrased as "a current is output from element A", for example.

Ordinal numbers such as "first", "second", and "third" in this specification and the like are used in order to avoid confusion among components. Thus, the terms do not limit the number of components. In addition, the terms do not limit the order of components. In this specification and the like, for example, a "first" component in one embodiment can be referred to as a "second" component in other embodiments or claims. Furthermore, in this specification and the like, for example, a "first" component in one embodiment can be omitted in other embodiments or claims.

In this specification and the like, terms for describing arrangement, such as "over" and "under", are sometimes used for convenience to describe the positional relation between components with reference to drawings. The positional relation between components is changed as appropriate in accordance with a direction in which the components are described. Thus, terms for the description are not limited to terms used in the specification and the like, and the description can be made appropriately according to circumstances. For example, the expression "an insulator positioned over (on) a top surface of a conductor" can be replaced with the expression "an insulator positioned under (on) a bottom surface of a conductor" when the direction of a drawing showing these components is rotated by 180 degrees.

Furthermore, the term "over" or "under" does not necessarily mean that a component is placed directly on or directly under and in direct contact with another component. For example, the expression "electrode B over insulating layer A" does not necessarily mean that the electrode B is formed on and in direct contact with the insulating layer A, and does not exclude the case where another component is provided between the insulating layer A and the electrode B.

In this specification and the like, the terms "film", "layer", and the like can be interchanged with each other according to circumstances. For example, the term "conductive layer" can be changed into the term "conductive film" in some cases. Moreover, the term "insulating film" can be changed into the term "insulating layer" in some cases. Alternatively, the term "film", "layer", or the like is not used and can be interchanged with another term depending on the case or according to circumstances. For example, the term "conductive layer" or "conductive film" can be changed into the term "conductor" in some cases. Furthermore, for example, the term "insulating layer" or "insulating film" can be changed into the term "insulator" in some cases.

In this specification and the like, a term such as an "electrode", a "wiring" or, a "terminal" does not limit the function of a component. For example, an "electrode" is used as part of a "wiring" in some cases, and vice versa. Furthermore, the term "electrode" or "wiring" can also mean the case where a plurality of "electrodes" or "wirings" are formed in an integrated manner. For example, a "terminal" is used as part of a "wiring" or an "electrode" in some cases, and vice versa. Furthermore, the term "terminal" can also mean the case where a plurality of "electrodes", "wirings", "terminals", or the like are formed in an integrated manner. Therefore, for example, an "electrode" can be part of a "wiring" or a "terminal", and a "terminal" can be part of a "wiring" or an "electrode". Moreover, the terms "electrode", "wiring", and "terminal" are sometimes replaced with the term "region", for example.

In this specification and the like, the terms "wiring", "signal line", "power supply line", and the like can be interchanged with each other depending on the case or according to circumstances. For example, the term "wiring" can be changed into the term "signal line" in some cases. As another example, the term "wiring" can be changed into the term "power supply line" in some cases. Inversely, the term "signal line", "power supply line", or the like can be changed into the term "wiring" in some cases. The term "power supply line" or the like can be changed into the term "signal line" or the like in some cases. Inversely, the term "signal line" or the like can be changed into the term "power supply line" or the like in some cases. The term "potential" that is applied to a wiring can be changed into the term "signal" or the like depending on the case or according to circumstances. Inversely, the term "signal" or the like can be changed into the term "potential" in some cases.

In this specification and the like, an impurity in a semiconductor refers to an element other than a main component of a semiconductor layer, for example. For example, an element with a concentration of lower than 0.1 atomic % is an impurity. If a semiconductor contains an impurity, formation of the DOS (Density of States) in the semiconductor, decrease in the carrier mobility, or decrease in the crystallinity may occur, for example. In the case where the semiconductor is an oxide semiconductor, examples of an impurity that changes characteristics of the semiconductor include Group 1 elements, Group 2 elements, Group 13 elements, Group 14 elements, Group 15 elements, and transition metals other than the main components; specific examples are hydrogen (contained also in water), lithium, sodium, silicon, boron, phosphorus, carbon, and nitrogen. When the semiconductor is a silicon layer, examples of an impurity that changes characteristics of the semiconductor include oxygen, Group 1 elements except hydrogen, Group 2 elements, Group 13 elements, and Group 15 elements.

In this specification and the like, a switch is in a conduction state (on state) or a non-conduction state (off state) to determine whether a current flows or not. Alternatively, a switch has a function of selecting and changing a current path. For example, an electrical switch or a mechanical switch can be used. That is, a switch can be any element capable of controlling a current, and is not limited to a certain element.

Examples of an electrical switch include a transistor (e.g., a bipolar transistor and a MOS transistor), a diode (e.g., a PN diode, a PIN diode, a Schottky diode, a MIM (Metal Insulator Metal) diode, a MIS (Metal Insulator Semiconductor) diode, and a diode-connected transistor), and a logic circuit in which such elements are combined. Note that in the case of using a transistor as a switch, a "conduction state" of the transistor refers to a state where a source electrode and a drain electrode of the transistor can be regarded as being electrically short-circuited. Furthermore, a "non-conduction state" of the transistor refers to a state where the source electrode and the drain electrode of the transistor can be regarded as being electrically disconnected. Note that in the case where a transistor operates just as a switch, there is no particular limitation on the polarity (conductivity type) of the transistor.

An example of a mechanical switch is a switch using a MEMS (micro electro mechanical system) technology. Such a switch includes an electrode that can be moved mechanically, and operates by controlling conduction and non-conduction with movement of the electrode.

In this specification, "parallel" indicates a state where the angle formed between two straight lines is greater than or equal to −10° and less than or equal to 10°. Thus, the case where the angle is greater than or equal to −5° and less than or equal to 5° is also included. In addition, "approximately parallel" or "substantially parallel" indicates a state where two straight lines are placed at an angle greater than or equal to −30° and less than or equal to 30°. Moreover, "perpendicular" indicates a state where two straight lines are placed at an angle greater than or equal to 80° and less than or equal to 100°. Thus, the case where the angle is greater than or equal to 85° and less than or equal to 95° is also included. Furthermore, "approximately perpendicular" or "substantially perpendicular" indicates a state where two straight lines are placed at an angle greater than or equal to 60° and less than or equal to 120°.

Effect of the Invention

With one embodiment of the present invention, an AI system which converts an image or a document showing a circuit structure to a net list can be provided. Alternatively, with one embodiment of the present invention, an AI system capable of search for a circuit structure can be provided. Alternatively, with one embodiment of the present invention, a novel AI system can be provided. Alternatively, with one embodiment of the present invention, a novel operation method of an AI system can be provided.

Note that the effects of one embodiment of the present invention are not limited to the effects listed above. The effects listed above do not preclude the existence of other effects. Note that the other effects are effects that are not described in this section and will be described below. The effects that are not described in this section will be derived from the descriptions of the specification, the drawings, and the like and can be extracted from these descriptions by those skilled in the art. Note that one embodiment of the present invention has at least one of the effects listed above and the other effects. Accordingly, depending on the case, one embodiment of the present invention does not have the effects listed above in some cases.

BRIEF DESCRIPTION OF THE DRAWINGS

FIG. 28A is a diagram illustrating the classification of the crystal structures of IGZO, FIG. 28B is a graph illustrating an XRD spectrum of quartz glass, FIG. 28C is a graph illustrating an XRD spectrum of crystalline IGZO, and FIG. 28D is a view illustrating a nanobeam electron diffraction pattern of crystalline IGZO.

MODE FOR CARRYING OUT THE INVENTION

Figure 1:
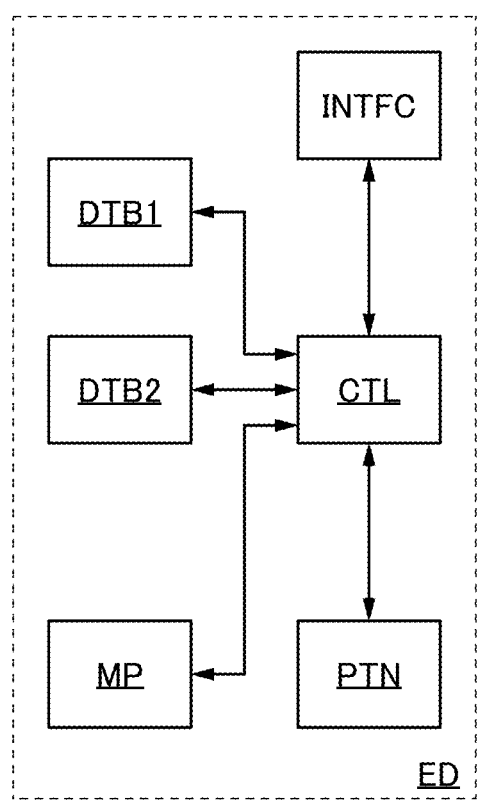
FIG. 1 is a block diagram illustrating a structure example of a system.

In an artificial neural network (hereinafter, referred to as a neural network), the connection strength between synapses can be changed when existing information is given to the neural network. The processing for determining a connection strength by providing a neural network with existing information in such a manner is called "learning" in some cases.

Furthermore, when a neural network in which "learning" has been performed (the connection strength has been determined) is provided with some type of information, new information can be output on the basis of the connection strength. The processing for outputting new information on the basis of provided information and the connection strength in a neural network in such a manner is called "inference" or "recognition" in some cases.

Examples of the model of a neural network include a Hopfield type and a hierarchical type. In particular, a neural network with a multilayer structure is called a "deep neural network" (DNN), and machine learning using a deep neural network is called "deep learning" in some cases.

In this specification and the like, a metal oxide is an oxide of metal in a broad sense. Metal oxides are classified into an oxide insulator, an oxide conductor (including a transparent oxide conductor), an oxide semiconductor (also simply referred to as an OS), and the like. For example, in the case where a metal oxide is used in an active layer of a transistor, the metal oxide is referred to as an oxide semiconductor in some cases. That is, when a metal oxide can form a channel formation region of a transistor that has at least one of an amplifying function, a rectifying function, and a switching function, the metal oxide can be referred to as a metal oxide semiconductor or shortly as an OS. Moreover, when an OS FET or an OS transistor is described, it can also be referred to as a transistor including a metal oxide or an oxide semiconductor.

Furthermore, in this specification and the like, a metal oxide containing nitrogen is also collectively referred to as a metal oxide in some cases. A metal oxide containing nitrogen may be referred to as a metal oxynitride.

In this specification and the like, one embodiment of the present invention can be constituted by appropriately combining the structure described in an embodiment (or an example) with any of the structures described in the other embodiments (or the other examples). In addition, in the case where a plurality of structure examples are described in one embodiment, the structure examples can be combined as appropriate.

Note that a content (or part thereof) described in one embodiment (or example) can be applied to, combined with, or replaced with at least one of another content (or part thereof) described in the embodiment (or the example) and a content (or part thereof) described in one or more of different embodiments (or one or more of different examples).

Note that in each embodiment (or example), a content described in the embodiment (or the example) is a content described with reference to a variety of diagrams or a content described with text in the specification.

Note that by combining a diagram (or part thereof) described in one embodiment (or example) with at least one of another part of the diagram, a different diagram (or part thereof) described in the embodiment (or the example), and a diagram (or part thereof) described in one or more of different embodiments (or one or more of different examples), much more diagrams can be formed.

Embodiments (or examples) in this specification are described with reference to drawings. However, the embodiments (or examples) can be implemented in various different modes. It is readily understood by those skilled in the art that modes and details can be changed in various ways without departing from the spirit and scope of the present invention. Thus, the present invention should not be interpreted as being limited to the description of the embodiments (or examples). Note that in the structures of the invention in the embodiments (or the structures in the examples), the same portions or portions having similar functions are denoted by the same reference numerals in different drawings, and a repetitive description of such portions is omitted in some cases. In perspective views and the like, some components might not be illustrated for clarity of the drawings.

In this specification and the like, when a plurality of components are denoted by the same reference signs, and in particular need to be distinguished from each other, an identification numeral such as "_1", "[n]", or "[m,n]" is sometimes added to the reference signs.

In the drawings in this specification, the size, the layer thickness, or the region is exaggerated for clarity in some cases. Therefore, they are not limited to the illustrated scale. The drawings are schematic views showing ideal examples, and embodiments of the present invention are not limited to shapes or values shown in the drawings. For example, variation in signal, voltage, or current due to noise, variation in signal, voltage, or current due to difference in timing, or the like can be included.

Note that in this specification and the like, In:Ga:Zn=4:2:3 or a neighborhood thereof refers to an atomic ratio where, when In is 4 with respect to the total number of atoms, Ga is greater than or equal to 1 and less than or equal to 3 ($1 \leq Ga \leq 3$) and Zn is greater than or equal to 2 and less than or equal to 4.1 ($2 \leq Zn \leq 4.1$). In:Ga:Zn=5:1:6 or a neighborhood thereof refers to an atomic ratio where, when In is 5 with respect to the total number of atoms, Ga is greater than 0.1 and less than or equal to 2 ($0.1 < Ga \leq 2$) and Zn is greater than or equal to 5 and less than or equal to 7 ($5 \leq Zn \leq 7$). In:Ga:Zn=1:1:1 or a neighborhood thereof refers to an atomic ratio where, when In is 1 with respect to the total number of atoms, Ga is greater than 0.1 and less than or equal to 2 ($0.1 < Ga \leq 2$) and Zn is greater than 0.1 and less than or equal to 2 ($0.1 < Zn \leq 2$). In:Ga:Zn=5:1:3 or a neighborhood thereof refers to an atomic ratio where, when In is 5 with respect to the total number of atoms, Ga is greater than or equal to 0.5 and less than or equal to 1.5 ($0.5 \leq Ga \leq 1.5$) and Zn is greater than or equal to 2 and less than or equal to 4.1 ($2 \leq Zn \leq 4.1$). In:Ga:Zn=10:1:3 or a neighborhood thereof refers to an atomic ratio where, when In is 10 with respect to the total number of atoms, Ga is greater than or equal to 0.5 and less than or equal to 1.5 ($0.5 \leq Ga \leq 1.5$) and Zn is greater than or equal to 2 and less than or equal to 4.1 ($2 \leq Zn \leq 4.1$). In:Zn=2:1 or a neighborhood thereof refers to an atomic ratio where, when In is 1 with respect to the total number of atoms, Zn is greater than 0.25 and less than or equal to 0.75 ($0.25 < Zn \leq 0.75$). In:Zn=5:1 or a neighborhood thereof refers to an atomic ratio where, when In is 1 with respect to the total number of atoms, Zn is greater than 0.12 and less than or equal to 0.25 ($0.12 < Zn \leq 0.25$). In:Zn=10:1 or a neighborhood thereof refers to an atomic ratio where, when In is 1 with respect to the total number of atoms, Zn is greater than 0.07 and less than or equal to 0.12 ($0.07 < Zn \leq 0.12$).

Embodiment 1

In this embodiment, a system of one embodiment of the present invention is described.

FIG. 1 illustrates a system (in some cases also referred to as an electronic device) concerning AI that utilizes a neural network, having a function of converting a "circuit diagram," a "circuit structure described in Scope of Claims," or the like to a net list. Furthermore, the system has a function of searching an existing database with the use of the net list obtained by conversion.

A net list refers to, in an electronic circuit or the like, data containing connection information of a circuit element, a logic circuit, a signal conversion circuit, a potential level conversion circuit, a voltage source, a current source, a switching circuit, an amplifier circuit, or the like included in the electronic circuit. Specifically, a net list is data where the connection destinations of terminals that a circuit element, a circuit, or the like included in an electronic circuit have are written, and is used in a circuit simulator, a circuit design software, or the like.

A system SIH illustrated in FIG. 1 includes an electronic device ED. The electronic device ED includes an input/output interface INTFC, a control portion CTL, a conversion portion PTN, a database DTB1, a database DTB2, and a memory portion MP.

The input/output interface INTFC is electrically connected to the control portion CTL. The input/output interface INTFC has, in the case where a user uses the system SIH, a function of inputting and outputting information between the user and the electronic device ED. As the input/output interface INTFC, a display device such as an organic EL (Electro Luminescence) display or a liquid crystal display and hardware such as a keyboard or a pointing device (for example, a mouse can be given) can be given, for example. Furthermore, the display device may include an input device such as a touch panel.

The memory portion MP is electrically connected to the control portion CTL. The memory portion MP includes a volatile memory device, a nonvolatile memory device, or the like.

As the volatile memory device, a DRAM (Dynamic Random Access Memory) or the like can be given, for example. The volatile memory device has a function of temporarily storing data necessary during an arithmetic process or software startup, for example.

As the nonvolatile memory device, an HDD (hard disk drive), an SSD (solid-state drive), an optical disc, a magnetic tape, or the like can be given, for example. In this specification and the like, when an optical disc, a magnetic tape, or the like is used, a device capable of reading and writing and an optical disc, a magnetic tape, or the like are collectively referred to as a nonvolatile memory device. The nonvolatile memory device has a function of storing a software execution program, a drawing where a circuit structure is illustrated, a netlist of a circuit structure, or the like, for example.

The conversion portion PTN is electrically connected to the control portion CTL. The conversion portion PTN has a function of converting a circuit diagram, a document file where a circuit is described with text (e.g., Scope of Claims of a patent specification), or the like to a net list. The conversion portion PTN may be an arithmetic circuit where a neural network is formed, for example. In the case where a neural network is formed in the conversion portion PTN, learning has already been performed in the neural network, and weight coefficients between neurons in the neural network has been determined.

The database DTB1 is electrically connected to the control portion CTL. The database DTB1 has a function of storing document data such as patent specifications, papers, or materials, for example.

The database DTB2 is electrically connected to the control portion CTL. The database DTB2 has a function of storing a net list or the like of a circuit that is described in the document data stored in the database DTB1, for example. The net list may contain a management number, a management symbol, or the like that links the net list with a circuit structure of the document data.

Note that the database DTB1 and the database DTB2 may be combined into one.

Since the database DTB1 and the database DTB2 store document data, a net list, and the like as described above, the database DTB1 and the database DTB2 may be included in the memory portion MP. The database DTB1 and the database DTB2 are particularly preferably nonvolatile memory devices in the memory portion MP.

Figure 2:
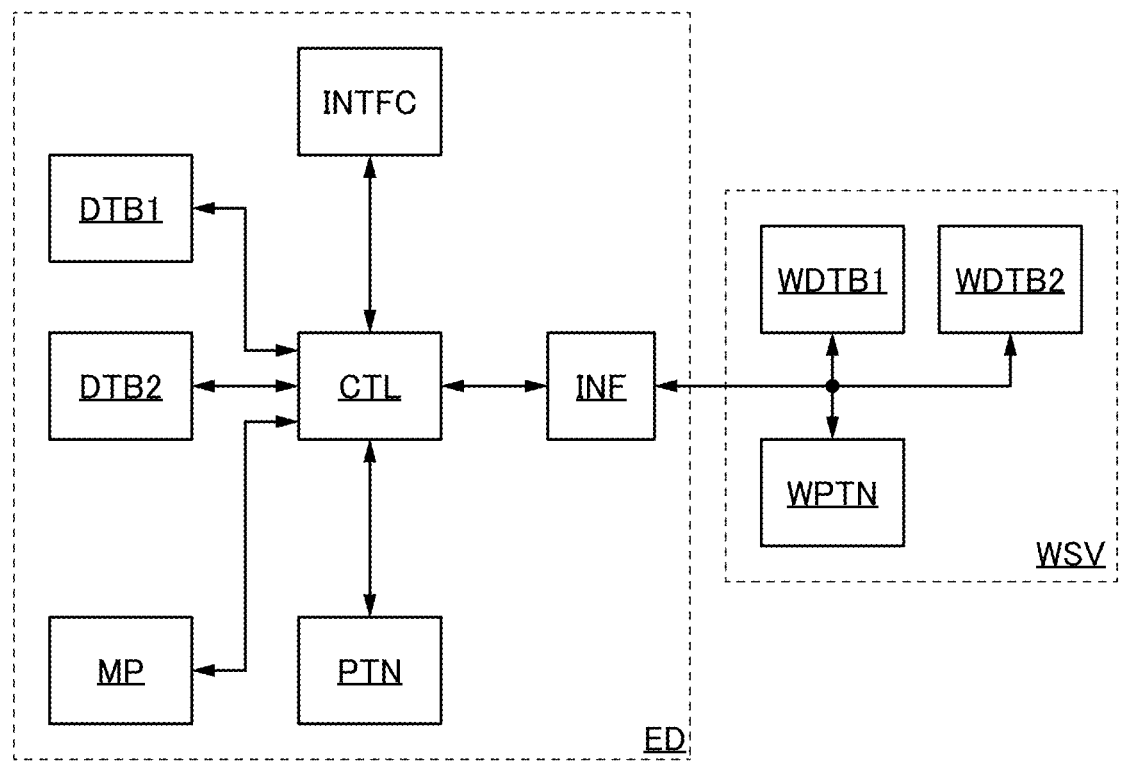
FIG. 2 is a block diagram illustrating a structure example of a system.

As illustrated in FIG. 2, the electronic device ED may include an external interface INF. The external interface INF has a function of communicating with an electronic device WSV provided outside the electronic device ED. Therefore, the external interface INF is electrically connected to the control portion CTL and the electronic device WSV.

The electronic device WSV can be an external server, for example. Therefore, the external interface INF is preferably connected to the electronic device WSV via the Internet connection or the like.

The electronic device WSV includes a database WDTB1, a database WDTB2, and a conversion portion WPTN, for example. As in the database DTB1, document data is stored in the database WDTB1. As in the database DTB2, a net list or the like of a circuit that is described in the document data in the database WDTB1 is stored in the database WDTB2. Like the conversion portion PTN, the conversion portion WPTN has a function of converting a circuit diagram, a document file where a circuit is described with text, or the like to a net list.

At least one of the database WDTB1, the database WDTB2, and the conversion portion WPTN may function as an external server. Providing at least one of the database WDTB1, the database WDTB2, and the conversion portion WPTN as an external server can increase the scale, storage capacity, arithmetic capacity, or the like of the provided server in some cases. For example, when the database WDTB1 functions as an external server, the database WDTB1 can store more document data than the database DTB1, in some cases. Furthermore, for example, when the database WDTB2 functions as an external server, the database WDTB2 can store more information such as net lists than the database DTB2, in some cases. Furthermore, for example, the conversion portion WPTN can include a larger scale arithmetic circuit than the conversion portion PTN, in some cases.

Operation Example 1

Figure 3:
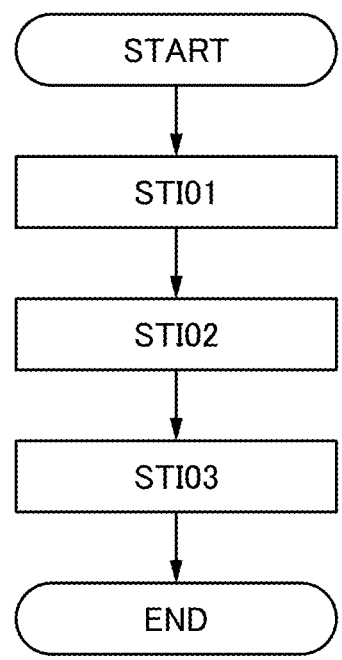
FIG. 3 is a flow chart illustrating an operation example of a system.

Here, an operation example in the system SIH illustrated in FIG. 1 is described. FIG. 3 is a flow chart illustrating an operation example of the system SIH, which includes a step STI01 to a step STI03. In FIG. 3, the start of the operation example is indicated by "START", and the end of the operation example is indicated by "END." In this operation example, an operation of converting a circuit diagram or a document file where a circuit is described with text to a net list is described.

The step STI01 includes a step where a user inputs a circuit diagram or a document file where a circuit is described with text to the control portion CTL of the electronic device ED with the use of the input/output interface INTFC. As a method for inputting the circuit diagram by a user, a method for creating a circuit diagram using circuit design software, a circuit simulator, painting software, CAD software, or the like can be given, for example. Furthermore, as a method for inputting the document file by a user, a method for creating a document file using document creation software, text editor, or the like can be given, for example. Moreover, a circuit diagram or a document file that is being created, a circuit diagram or document file that has been created, or the like may be temporarily stored in the memory portion MP. In this specification and the like, a circuit diagram or a document file created in the step STI01 is referred to as input data.

In the step STI01, as the input data, other than those created, a circuit diagram, a document file, or the like read from the database DTB1 may be used.

A step STI02 includes a step of converting the input data created in the step STI01 to a net list in the conversion portion PTN. Specifically, a user transmits, to the control portion CTL, the input data and a signal including an instruction to convert the input data to a net list with the use of the input/output interface INTFC, for example. Upon receipt of the input data and the signal, the control portion CTL transmits the input data to the conversion portion PTN. Upon receipt of the input data, the conversion portion PTN converts the input data to a net list.

In the case where the input data is a circuit diagram, a method using a convolutional neural network (CNN) or the like is preferable as a method for converting the input data to a net list, for example. Furthermore, in the case where the input data is a document file, a method using a recurrent neural network or the like is preferable as a method for converting the input data or the like to a net list, for example. Specific examples of the method for converting the input data to a net list is described later.

Note that the net list obtained by conversion may be temporarily stored in the memory portion MP.

The step STI03 includes a step of outputting the net list obtained by conversion in the step STI02 to a display device or the like included in the input/output interface INTFC. Specifically, the net list obtained by conversion in the step STI02 is transmitted through the control portion CTL to the display device or the like included in the input/output interface INTFC, for example. After that, the display device or the like displays the net list, so that the user can confirm the contents of the net list to which the input data has been converted.

After the step STI03, this operation ends.

Operation Example 2

Figure 4:
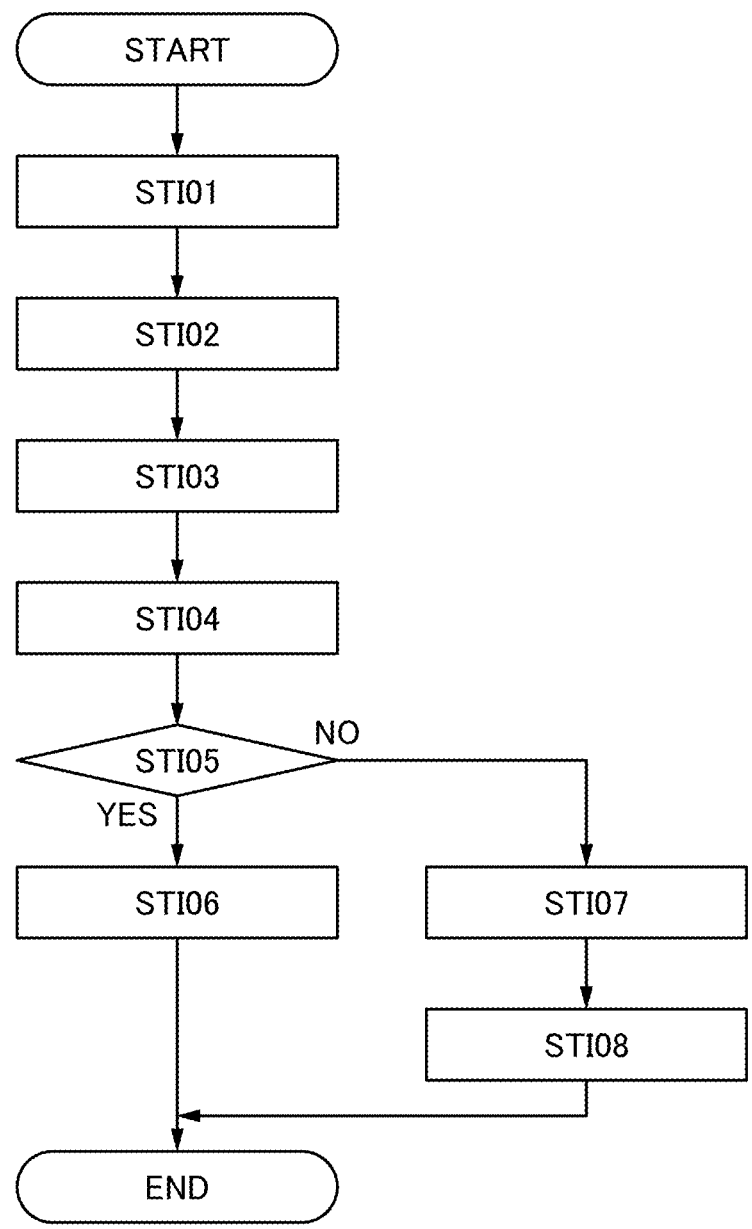
FIG. 4 is a flow chart illustrating an operation example of a system.

Next, an operation example in the system SIH illustrated in FIG. 1, which is different from that in the flow chart illustrated in FIG. 3, is described. FIG. 4 is a flow chart illustrating the operation example of the system SIH, including a step STI04 to a step STI08 in addition to the operation example of FIG. 3. In this operation example, a method for searching for a circuit using a net list obtained by conversion is described.

As for the step STI01 to the step STI03 illustrated in the flow chart of FIG. 4, the description of the step STI01 to the step STI03 in the flow chart of FIG. 3 is referred to.

The step STI04 includes a step of searching the database DTB2 for a circuit with the use of the net list obtained by conversion in the step STI02. Specifically, the control portion CTL transmits, to the database DTB2, a signal including an instruction to read a net list that is stored in the database DTB2 and linked with the document data, for example. Then, upon receipt of the signal, the database DTB2 reads the net list and transmits it to the control portion CTL. The control portion CTL compares the net list obtained by conversion in the step STI02 and the net lists included in the database DTB2.

Note that all the net lists stored in the database DTB2 may be targeted for reading of the net list linked with the document data from the database DTB2. Alternatively, the target may be conditionally narrowed down to part of the net lists stored in the database DTB2.

In the search in the step STI04, a net list that completely matches the net list obtained by conversion in the step STI02 may be extracted, or a net list that partly matches (that is similar to) the net list obtained by conversion in the step STI02 may be extracted.

The net list obtained by conversion, which is used for the search, may be temporarily stored in the memory portion MP.

Furthermore, an AI may also be used to search for a circuit in the step STI04. Specifically, using an AI, the description of the net list obtained by conversion in the step STI02 and the description of the net list that is stored in the database DTB2 and linked with the document data may be compared to each other to calculate the degree of similarity which represents how well the net lists match in terms of the kind, number, connection structure, and the like of circuit elements, and search results may be output in decreasing order of the degree of similarity, for example.

A step STI05 includes a step of judging whether the net list obtained by conversion in the step STI02 has been found in the database DTB2 in the search in the step STI04. Here, the net list found in the database DTB2 means the net list that completely or partly matches the net list for which searching was performed in the step STI04. In the case where it is judged that the net list for which searching was performed in the step STI04 has been found in the database DTB2, the operation goes to a step STI06. In the case where it is judged that the net list for which searching was performed in the step STI04 has not been found in the database DTB2, the operation goes to a step STI07.

The step STI06 includes a step of reading, from the database DTB1, document data corresponding to the net list found in the database DTB2 in the search in the step STI04. Specifically, the control portion CTL transmits, to the database DTB1, a signal including an instruction to read document data corresponding to the net list that was found in the search in the step STI04 and read from the database DTB2, for example. Upon receipt of the signal, the database DTB1 reads the document data and transmits it to the control portion CTL. The control portion CTL transmits the document data to a display device or the like included in the input/output interface INTFC. After that, the display device or the like displays the document data, so that the user can confirm the contents of the document data.

Note that the net list obtained by conversion, which is used for the search, and the document data read from the database DTB1 may be temporarily stored in the memory portion MP.

After the step STI06, this operation ends.

The step STI07 includes a step of outputting a result that the net list obtained by conversion in the step STI02 was not found in the database DTB2 in the search in the step STI04. Specifically, the control portion CTL transmits, to the input/output interface INTFC, information that the net list obtained by conversion in the step STI02 was not found in the database DTB2, for example. Thus, the display device or the like displays the information, so that the user can confirm a search result that the net list obtained by conversion in the step STI02 was not found in the database DTB2.

The step STI08 includes a step of storing the input data in the database DTB1 and storing the net list obtained by conversion in the step STI02 in the database DTB2. Specifically, the user transmits, to the control portion CTL, a signal including an instruction to store the input data and the net list obtained by conversion in the step STI02, using the input/output interface INTFC. Upon receipt of the signal, the control portion CTL transmits, to the database DTB1, the input data and a signal including an instruction to write the input data to the database DTB1 and also transmits, to the database DTB2, the net list obtained by conversion in the step STI02 and a signal including an instruction to write the net list to the database DTB2. At this time, the input data and the net list obtained by conversion may be transmitted from the memory portion MP, where they are temporarily stored, respectively to the database DTB1 and the database DTB2 through the control portion CTL.

After the step STI08, this operation ends.

Note that the operation method of one embodiment of the present invention is not limited to the above-described step STI01 to the step STI08. In this specification and the like, processing shown in the flow charts is classified according to functions and shown as independent steps. However, in actual processing or the like, it is difficult to separate processing shown in the flow charts on the function basis, and there are such a case where a plurality of steps are associated with one step and a case where one step is associated with a plurality of steps. Thus, the processing shown in the flow charts is not limited to each step described in the specification, and the steps can be exchanged as appropriate depending on circumstances. Specifically, depending on circumstances or conditions or as needed, a change of the order of the steps, addition and elimination of a step, or the like can be performed. For example, if not desired by the user, the step STI08 may be eliminated from the operation example not to be performed.

The operation method of one embodiment of the present invention is not limited to the operation example described in this embodiment. For example, although the operation example in which the conversion portion PTN of the electronic device ED is used to convert the input data to the net list is described above, the conversion portion WPTN of the electronic device WSV may be used instead of the conversion portion PTN. Furthermore, although the operation example in which the database DTB1 and the database DTB2 of the electronic device ED are used to search for a circuit of a net list is described above, the database WDTB1 and the database WDTB2 of the electronic device WSV may be used instead of the database DTB1 and the database DTB2.

With one embodiment of the present invention using the electronic device ED and the external electronic device WSV, a business model of fee-based service of converting the input data to a net list and/or fee-based service of searching for a circuit using a net list may be provided.

<<Example 1 of Method of Conversion to Net List>>

Next, assuming that the input data is a circuit diagram, a method of converting the circuit diagram to a net list in the step STI02 of the above-described operation example is described.

Figure 5:
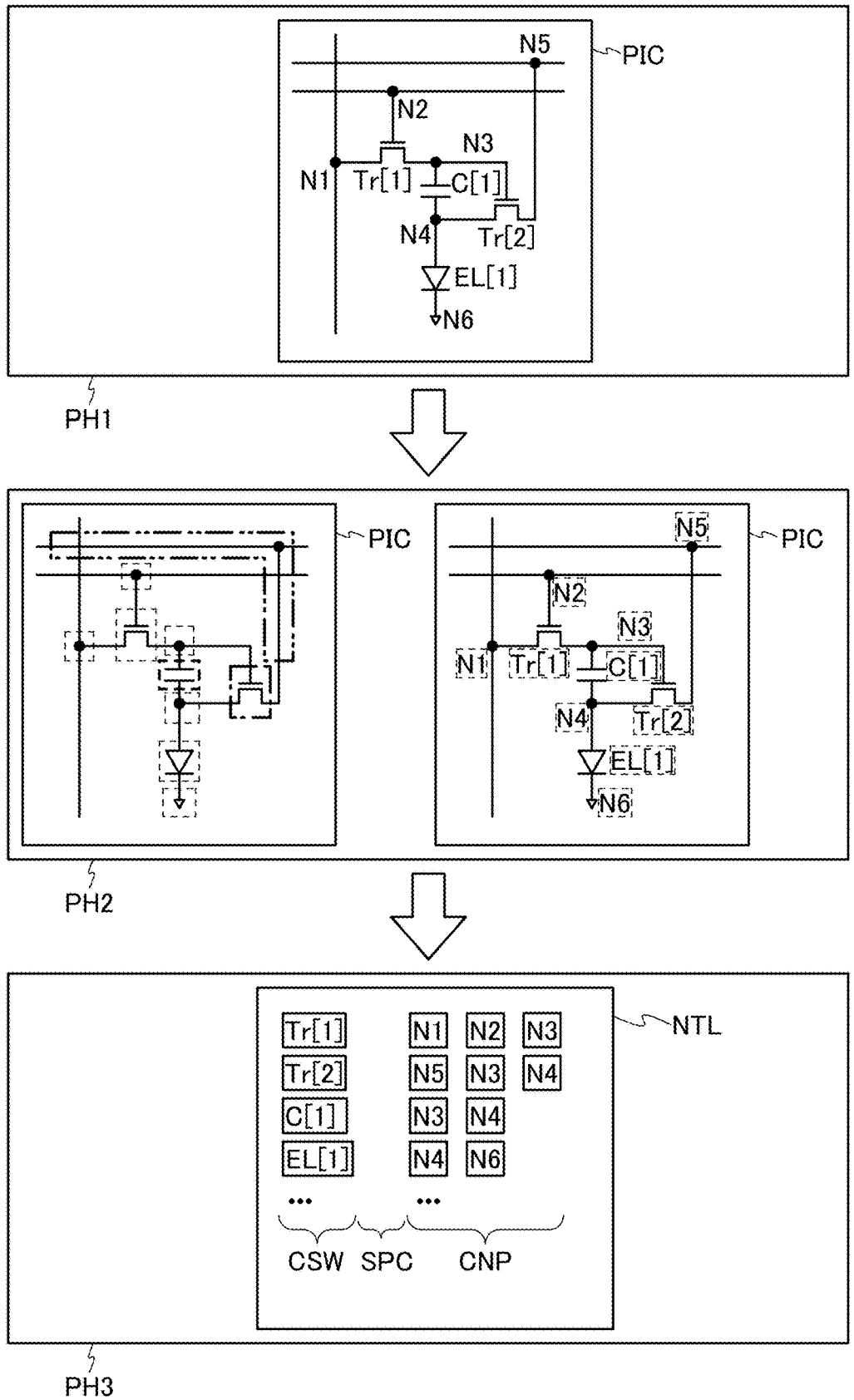
FIG. 5 is a diagram illustrating a procedure of creating a net list from a circuit diagram.

FIG. 5 is a schematic diagram illustrating a procedure of converting a circuit diagram to a net list.

A phase PH1 in FIG. 5 illustrates an example of an image which is the input data input to the conversion portion PTN in the step STI02. A circuit diagram is illustrated in an image PIC, and the circuit diagram shows circuit symbols, wirings, and a connection structure therebetween. Depending on the cases, as illustrated in the image PIC of FIG. 5, the image PIC may include letters, marks, and the like indicating the names of circuit symbols or the names of wirings; alternatively, the circuit diagram illustrated in the image PIC of FIG. 5 may not include letters, marks, and the like indicating the names of circuit symbols or the names of wirings.

A phase PH2 in FIG. 5 illustrates an example where the image PIC of the phase PH1 is input to the conversion portion PTN and the image PIC is subjected to recognition of object areas. In the left image PIC in the phase PH2 in FIG. 5, the circuit symbols and electrical connection portions (corresponding to black dots in the circuit diagram illustrated in the image PIC, for example) are recognized and each enclosed by dotted lines. Depending on circumstances, wirings may also be targeted for the recognition of object areas.

As the above-described method for recognizing object areas, Objectness, CPMC (Constrained Parametric Min-Cuts), and Object Proposals can be given, for example.

After the recognition of object areas is completed, image recognition is performed on each object area. Thus, the conversion portion PTN can recognize what kind of circuit elements the circuit symbols enclosed by the dotted lines are. For example, by the image recognition, the conversion portion PTN can recognize the circuit symbol enclosed by a thick broken line as a capacitor and a circuit symbol enclosed by a thick dashed-dotted line as a transistor, in the left image PIC in the phase PH2 in FIG. 5, for example. By recognizing what kind of circuit elements the circuit symbols represent, the conversion portion PTN can provide the circuit symbols with names (e.g., letters, abbreviations, marks, and words) for the description on the net list.

Similarly, by the image recognition, the conversion portion PTN can recognize the electrical connection portions (e.g., black dots) enclosed by the dotted lines. Thus, the conversion portion PTN can provide the electrical connection portions (e.g., black dots) with names (e.g., letters, abbreviations, marks, and words) for the description on the net list.

As an image recognition method, a method can be given for example, in which when the image PIC as the input data is provided to the conversion portion PTN, which has learned circuit symbols as teacher data in advance with an AI, the conversion portion PTN extracts a circuit symbol included in the image PIC on the basis of the learned circuit symbols.

As another image recognition method, a convolutional neural network (CNN) or the like can be used, for example. In the case of using a convolutional neural network, an image of a circuit symbol, an image of an electrical connection portion (e.g., a black dot), or part of the images may be used as a filter of a convolutional layer of the convolutional neural network in advance. In this way, the degree of similarity between the filter and the circuit symbols, the electrical connection portions (e.g., black dots), and the like included in the image PIC can be calculated by the convolutional neural network, and the circuit symbols, the electrical connection portions (e.g., black dots), and the like included in the image PIC can be identified using the degree of similarity.

In order for the conversion portion PTN to recognize the connection between an electrical connection portion (e.g., a black dot) and a circuit symbol, object area recognition and image recognition are preferably repeated. Specifically, object area recognition and image recognition are performed once to make the conversion portion PTN recognize an electrical connection portion (e.g., a black dot) and provide a symbol for the description on the net list for the electrical connection portion (e.g., the black dot). Next, by the first image recognition, the direction in which a wiring connected to the electrical connection portion (e.g., the black dot) extends is identified, and by the second object area recognition, the target area is broadened in the extending direction to make the wiring and the electrical connection portion (e.g., the black dot) recognized collectively as an object area. Then, the direction in which the wiring extends is identified again by the second image recognition, and object area recognition and image recognition repeat similarly in and after the third cycle. Thus, the conversion portion PTN can recognize the wiring connected to the electrical connection portion (e.g., the black dot) after object area recognition and image recognition are similarly repeated a certain number of times, and the conversion portion PTN can finally recognize an electrical connection between the circuit symbol and the electrical connection portion (e.g., the black dot). A region enclosed by a thick dashed double-dotted line in the left image PIC in the phase PH2 in FIG. 5 is an example of a wiring region obtained by repetition of object area recognition and image recognition.

In the case where the image PIC in the phase PH1 includes letters, marks, and the like indicating the names of circuit symbols or the names of wirings, the names, letters, marks, and the like may be recognized together with the circuit symbols and the electrical connection portions in the phase of object area recognition as illustrated in the right image PIC in the phase PH2 in FIG. 5. Thus, those names, letters, marks, and the like obtained by the object area recognition can be similarly linked with the circuit symbols and the electrical connection portions subjected to the object area recognition. Moreover, the names, letters, marks, and the like linked with the circuit symbols and the electrical connection portions can be handled as symbols, letters, and the like described on a net list.

Illustrated in a phase PH3 in FIG. 5 is an example of the description on a net list of the connection structure between the circuit symbols and the electrical connection portions (e.g., the black dots) recognized by the conversion portion PTN in the phase PH2 in FIG. 5.

Names CSW (e.g., letters, abbreviations, marks, and words) of the circuit elements for the circuit symbols recognized from the image PIC are written on the left side of a net list NTL. For example, Tr[1] and Tr[2] represent transistors in the circuit diagram drawn on the image PIC, C[1] represents a capacitor in the circuit diagram drawn on the image PIC, and EL[1] represents a light-emitting element in the circuit diagram drawn on the image PIC.

In the net list NTL, names CNP (e.g., letters, abbreviations, marks, and words) of the electrical connection portions (e.g., the black dots) are also written on the right side of the names CSW of the circuit elements with space SPC therebetween, as information showing the connection structure of the circuit symbols. In the case where there are a plurality of terminals in a circuit symbol, space is preferably provided between the names CNP. Furthermore, the writing order of the names CNP of the electrical connection portions (e.g., the black dots) is determined depending on terminals of the circuit symbol of the name CSW written in that row. For example, it is prescribed that electrical connections of the terminals of a transistor are written in the net list NTL in the order of one of a source and a drain, a gate, and the other of the source and the drain. Furthermore, for example, it is prescribed that electrical connections of the terminals of a light-emitting element are written in the net list NTL in the order of an input terminal and an output terminal.

As described above, a circuit diagram that is the input data can be converted to a net list through object area recognition and image recognition.

<<Example 2 of Method of Conversion to Net List>>

Next, assuming that the input data is a document file or the like, a method of converting the circuit diagram to a net list in the step STI02 of the above-described operation example is described.

Figure 6:
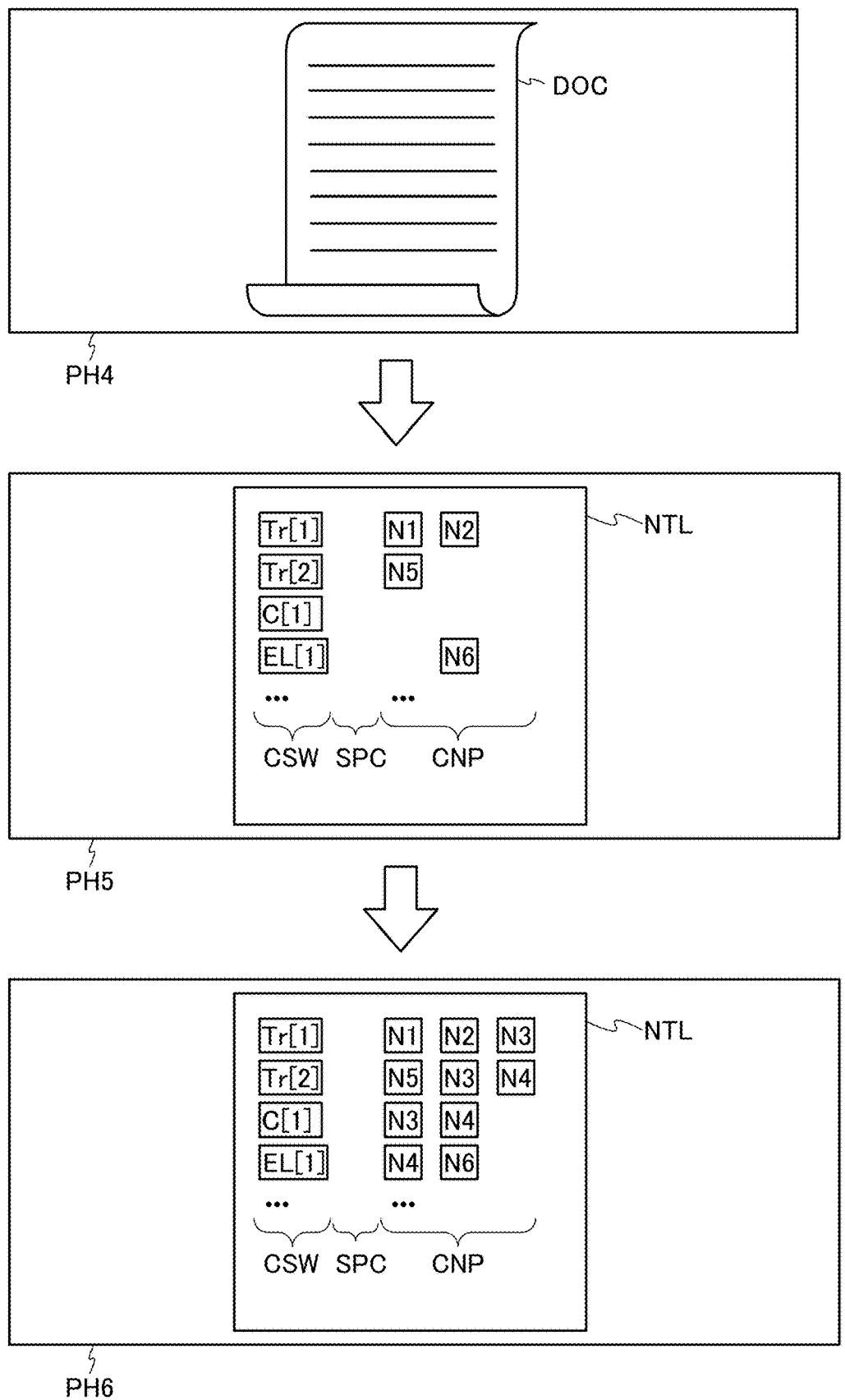
FIG. 6 is a diagram illustrating a procedure of creating a net list from a document file.

FIG. 6 is a schematic diagram illustrating a procedure of converting a document file to a net list.

A phase PH4 in FIG. 6 illustrates an example of a document file which is the input data input to the conversion portion PTN in the step STI02. In a document file DOC illustrated in the phase PH4 in FIG. 6, a circuit structure is described in text as information to perform conversion to a net list with the conversion portion PTN.

The document file DOC expressing the circuit structure in text can be a description of a circuit in a patent specification or Scope of Claims accompanying a patent specification, for example. In a conversion method example here, the following text shown in Table 1 written in the document file DOC is assumed.

TABLE 1

| | Contents of document |
|---|---|
| 1st paragraph | comprising a first transistor, a second transistor, a capacitor, and a light-emitting element, |
| 2nd paragraph | wherein a drain of the first transistor is electrically connected to a signal line, |
| 3rd paragraph | wherein a gate of the first transistor is electrically connected to a scan line, |
| 4th paragraph | wherein a source of the first transistor is electrically connected to a gate of the second transistor, |
| 5th paragraph | wherein a drain of the second transistor is electrically connected to a first power supply line, |
| 6th paragraph | wherein a source of the second transistor is electrically connected to an input terminal of the light-emitting element, |
| 7th paragraph | wherein an output terminal of the light-emitting element is electrically connected to a second power supply line, |
| 8th paragraph | wherein one of a pair of electrodes of the capacitor is electrically connected to the source of the first transistor, |
| 9th paragraph | wherein the other of the pair of electrodes of the capacitor is electrically connected to the input terminal of the light-emitting element, |

Upon receiving the above-described document file DOC as the input data, the conversion portion PTN performs text analysis on the document file DOC, for example.

As a text analysis method, the conversion portion PTN is preferably subjected to learning of document files (e.g., papers, and Scope of Claims described in publications of patent applications) and net lists corresponding to the document files as teacher data in advance with an AI, for example. Thus, when receiving a document file as the input data, the conversion portion PTN can convert the document file to a net list on the basis of the learning contents.

As a formation method of the teacher data, a method of producing a plurality of document files (e.g., a plurality of "Scopes of Claims" with the same contents but different descriptions) from one net list with software can be given, for example.

For the text analysis method, recurrent neural network (RNN) or the like can be used, for example.

By the text analysis on the document file DOC, the conversion portion PTN can recognize circuit elements, wirings, or electrical connection points from the circuit structure shown in the document file DOC. For example, the sentence in the first paragraph of the document file DOC is subjected to text analysis. The conversion portion PTN can recognize that a first transistor, a second transistor, a capacitor, and a light-emitting element are included in the circuit structure shown in the document file DOC. Then, the sentences in the second, third, fifth, and seventh paragraphs are each subjected to text analysis, for example, so that the conversion portion PTN can recognize that a signal line, a scan line, a first power supply line, and a second power supply line are electrically connected in the circuit structure shown in the document file DOC. Here, the conversion portion PTN gives names of Tr[1], Tr[2], C[1], and EL[1] to the first transistor, the second transistor, the capacitor, and the light-emitting element respectively, for example, as the names CSW (e.g., letters, abbreviations, marks, and words) of the circuit elements, and gives names of N1, N2, N5, and N6 to the signal line, the scan line, the first power supply line, and the second power supply line respectively, for example, as the names CNP (e.g., letters, abbreviations, marks, and words) of electrical connection points; thus, in this phase, the conversion portion PTN can describe the net list NTL in a phase PH5 in FIG. 6.

Note that the description rule for the net list NTL illustrated in the phase PH3 in FIG. 5 can apply to the net list NTL illustrated in the phase PH5 in FIG. 6. Thus, the space SPC is provided between the names CSW of the circuit elements and the names CNP of the electrical connection points.

Following the phase PH5, text analysis is performed on the document file DOC; thus, the conversion portion PTN can describe the net list NTL in more detail. For example, the sentences in the fourth and eighth paragraphs of the document file DOC are subjected to text analysis, and the conversion portion PTN can recognize that a source of the first transistor, a gate of the second transistor, and one of a pair of electrodes of the capacitor are connected to the same electrical connection point. Here, the conversion portion PTN gives a name N3 to the electrical connection point.

Furthermore, the sentences in the sixth and ninth paragraphs of the document file DOC are subjected to text analysis, and the conversion portion PTN can recognize that a source of the second transistor, an input terminal of the light-emitting element, and the other of the pair of electrodes of the capacitor are connected to the same electrical connection point. Here, the conversion portion PTN gives a name N4 to the electrical connection point.

As described above, text analysis is performed on the document file DOC to identify the circuit elements included in the circuit structure described in the document file DOC and extract electrical connections therebetween; thus, the conversion portion PTN can describe the net list NTL as illustrated in a phase PH6 in FIG. 6.

By using the system described in this embodiment, a circuit diagram or a document file can be converted into a net list, and searching a database for the net list obtained by conversion is possible. In the case where journals, science and engineering books, papers, materials for conferences, lectures, or the like, and technical documents such as publications of patent applications or patent publications are stored in a database (based on the premise that any infringement of an intellectual property right such as a copyright or any violation of the law on intellectual property rights is not conducted), a user can know whether a circuit diagram or a document file created by the user is a novel matter by using the system. Furthermore, the user can know whether a circuit diagram or a document file created by the user is a known matter by using the system. Thus, the user can more efficiently conduct prior art search for a circuit diagram or a document file created by the user by using the system.

Here, an example of searching for a net list using the system SIH in FIG. 1 is specifically described.

Figure 7:
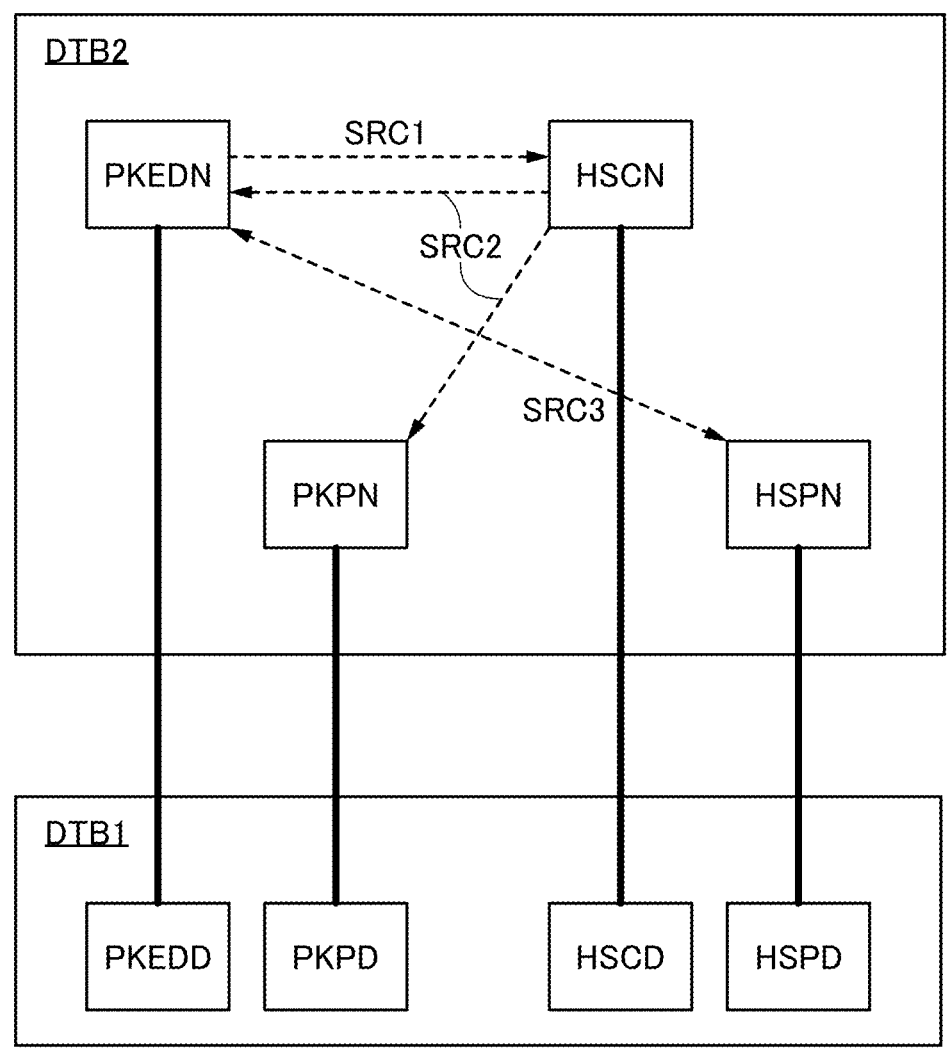
FIG. 7 is a block diagram illustrating an operation example of a system.

For example, as illustrated in FIG. 7, a case is assumed where in the system SIH in FIG. 1, information PKEDD, information PKPD, information HSCD, and information HSPD are stored in the database DTB1 and net lists PKEDN, net lists PKPN, net lists HSCN, and net lists HSPN are stored in the database DTB2 (the input/output interface INTFC, the control portion CTL, the conversion portion PTN, and the memory portion MP are not illustrated in FIG. 7).

The information PKEDD includes circuit diagrams, specifications, and the like of known electronic devices, for example. The information PKPD includes contents and the like (e.g., patent specifications; specifically, patent drawings and Scope of Claims. Papers and journals) of techniques which people other than the user were engaged in, for example. The information HSCD includes Scope of Claims and the like of patent specifications regarding circuits which the user was engaged in (regardless of whether the application was filed or not), for example. The information HSPD includes circuit drawings and the like of patent specifications which the user was engaged in (regardless of whether the application was filed or not), for example.

The net lists PKEDN include net lists corresponding to the circuit diagrams and the like included in the information PKEDD. The net lists PKPN include net lists corresponding to the patent drawings, Scope of Claims, and the like included in the information PKPD. The net lists HSCN include net lists corresponding to Scope of Claims and the like included in the information HSCD. The net lists HSPN include net lists corresponding to the patent drawings and the like included in the information HSPD. In FIG. 7, thick solid lines expressing the link between the net lists and the information are shown between the net lists PKEDN and the information PKEDD, between the net lists PKPN and the information PKPD, between the net lists HSCN and the information HSCD, and between the net lists HSPN and the information HSPD.

Here, as a first search SRC1, a case of searching the net lists HSCN of Scope of Claims and the like of the patent applications which the user was engaged in for one net list PKEDN corresponding to a circuit diagram of a known electronic device is considered. In this case, if the net list corresponding to the net list PKEDN is found from the net lists HSCN and the filing date of the patent corresponding to the found net list is before the date on which the electronic device became publicly known, a conflict of the electronic device with the user's patent can be found. That is, the first search SRC1 allows investigation of whether there is a conflict of a known electronic device with a user's patent.

As a second search SRC2, a case of searching the net lists PKEDN corresponding to the circuit diagrams and the like of known electronic device and the net lists PKPN corresponding to the contents and the like of techniques which people other than the user were engaged in for one net list HSCN of Scope of Claims before the patent application which the user is engaged in is filed is considered. In this case, if the net list corresponding to the net list HSCN is found from the net lists PKEDN and the net lists PKPN, it can be judged that the net list HSCN is known. That is, the second search SRC2 allows investigation of novelty for the invention which the user is engaged in before the patent application. This can increase the effectiveness of the patent of the patent application which the user is engaged in, in some cases.

Here, as a third search SRC3, a case of searching the net lists HSPN of the drawings and the like of the patent applications which the user was engaged in for one net list PKEDN corresponding to a circuit diagram of a known electronic device is considered. In this case, if the net list corresponding to the net list PKEDN is found from the net lists HSPN and the filing date of the patent corresponding to the found net list is before the date on which the electronic device became publicly known, the electronic device possibly utilized the contents of the patent application which the user was engaged in. That is, the third search SRC3 allows investigation of the degree of similarity between the circuit diagram of a known electronic device and a circuit diagram of the contents of the patent application which the user was engaged in.

Although the case where the net lists HSPN of the drawings and the like of the patent applications which the user was engaged in are searched for one net list PKEDN corresponding to a circuit diagram of a known electronic device is described above as the third search SRC3, the net lists PKEDN corresponding to the circuit diagrams of known electronic devices may be searched for one net list HSPN of the drawing or the like of a patent application which the user was engaged in as the third search SRC3. This search also allows investigation of the degree of similarity between a circuit diagram of a known electronic device and a circuit diagram of the contents of patent application which the user was engaged in.

Furthermore, the first search SRC1 and the third search SRC3 may be performed at the same time.

An AI can be used for each of the first search SRC1, the second search SRC2, and the third search SRC3. For example, using an AI, a description of a net list for which searching is performed and descriptions of net lists included in the searched range can be compared to each other to calculate the degree of similarity which represents how well the net lists match in terms of the kind, number, connection structure, and the like of circuit elements, and search results can be output in decreasing order of the degree of similarity.

As described above, in the system SIH in FIG. 1, the information PKEDD, the information PKPD, the information HSCD, and the information HSPD stored in the database DTB1 are each linked with the net lists stored in the database DTB2. Since conversion of a net list to a different file (e.g., a circuit diagram or a document file) is unnecessary at each of the first search SRC1, the second search SRC2, and the third search SRC3, searching can be performed easily at high speed.

Although a search example using the system SIH in FIG. 1 is described above, a search example similar to the above can be conducted using the system SIH in FIG. 2.

In the case where a neural network included in the conversion portion PTN or the conversion portion WPTN is made to perform learning, a large volume of data (also referred to as big data in some cases) is required. As a method of preparing the large volume of data, a program that automatically produces net lists at random is created, and then image data is created from the net lists with circuit design software, a circuit simulator, or the like, for example. At this time, a program configured to perform production of the net lists and creation of the image data in series is preferably set up. In this way, pairs of net lists and circuit image data can be prepared as learning data. As another method of preparing the large volume of data, a program that automatically produces net lists at random is created, and a program that creates document files from the automatically produced net lists is further created, for example. At this time, a program configured to perform production of the net lists and creation of the document files in series is preferably set up. In this way, pairs of net lists and document files can be prepared as learning data.

Note that this embodiment can be combined with the other embodiments in this specification as appropriate.

Embodiment 2

In this embodiment, examples of an arithmetic circuit that performs an arithmetic operation of a neural network and is used in a system of one embodiment of the present invention are described.

<Hierarchical Neural Network>

Figure 8A:
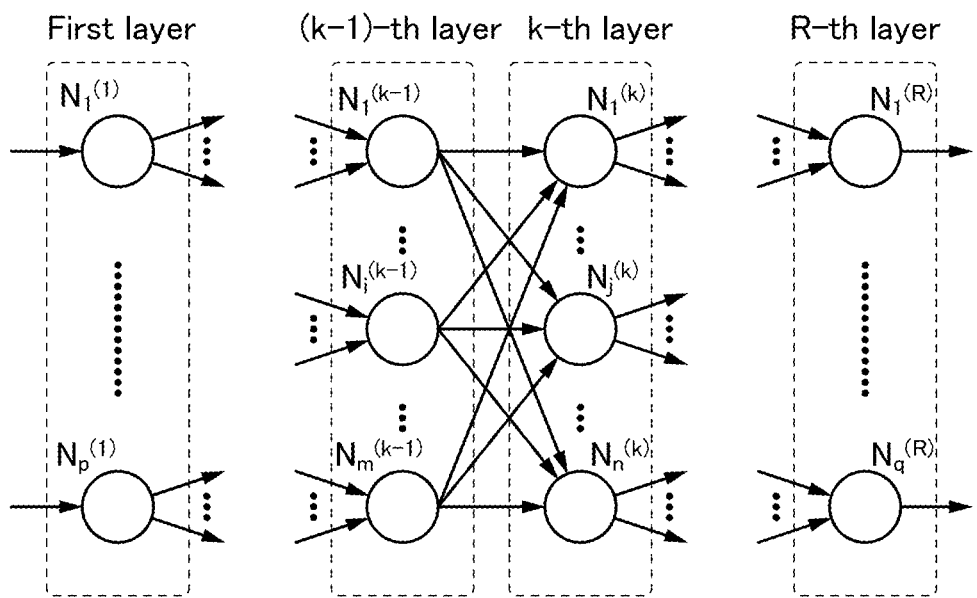
FIG. 8A and FIG. 8B are diagrams illustrating a hierarchical neural network.

First, a hierarchical neural network is described. A hierarchical neural network includes one input layer, one or a plurality of intermediate layers (hidden layers), and one output layer, for example, and is configured with a total of at least three layers. A hierarchical neural network 100 illustrated in FIG. 8A is one example, and the neural network 100 includes a first layer to an R-th layer (here, R can be an integer greater than or equal to 4). Specifically, the first layer corresponds to the input layer, the R-th layer corresponds to the output layer, and the other layers correspond to the intermediate layers. Note that FIG. 8A illustrates the (k−1)-th layer and the k-th layer (here, k is an integer greater than or equal to 3 and less than or equal to R−1) as the intermediate layers, and does not show the other intermediate layers.

Each of the layers of the neural network 100 includes one or a plurality of neurons. In FIG. 8A, the first layer includes a neuron $N_1^{(1)}$ to a neuron $N_p^{(1)}$ (here, p is an integer greater than or equal to 1); the (k−1)-th layer includes a neuron $N_1^{(k-1)}$ to a neuron $N_m^{(k-1)}$ (here, m is an integer greater than or equal to 1); the k-th layer includes a neuron $N_1^{(k)}$ to a neuron $N_n^{(k)}$ (here, n is an integer greater than or equal to 1); and the R-th layer includes a neuron $N_1^{(R)}$ to a neuron $N_q^{(R)}$ (here, q is an integer greater than or equal to 1).

FIG. 8A illustrates a neuron $N_i^{(k-1)}$ (here, i is an integer greater than or equal to 1 and less than or equal to m) in the (k−1)-th layer and a neuron $N_j^{(k)}$ (here, j is an integer greater than or equal to 1 and less than or equal to n) in the k-th layer, in addition to the neuron $N_1^{(1)}$, the neuron $N_p^{(1)}$, the neuron $N_1^{(k-1)}$, the neuron $N_m^{(k-1)}$, the neuron $N_1^{(k)}$, the neuron $N_n^{(k)}$, the neuron $N_1^{(R)}$, and the neuron $N_q^{(R)}$; the other neurons are not illustrated.

Next, signal transmission from a neuron in one layer to a neuron in the subsequent layer and signals input to and output from the neurons are described. Note that description here is made focusing on the neuron $N_j^{(k)}$ in the k-th layer.

Figure 8B:
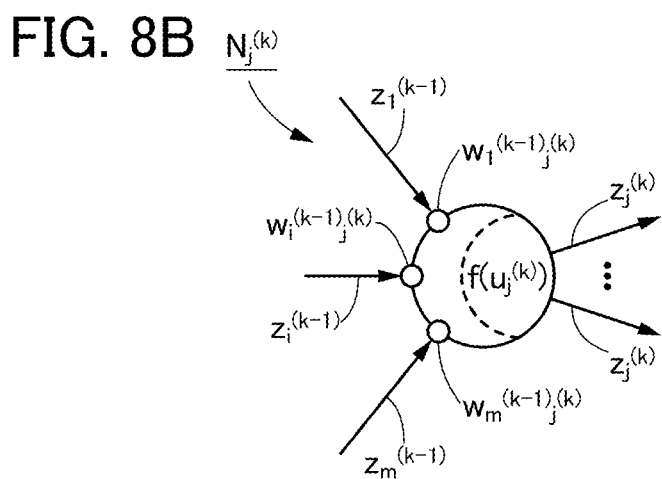

FIG. 8B illustrates the neuron $N_j^{(k)}$ in the k-th layer, signals input to the neuron $N_j^{(k)}$, and a signal output from the neuron $N_j^{(k)}$.

Specifically, $z_1^{(k-1)}$ to $z_m^{(k-1)}$ that are output signals from the neuron $N_1^{(k-1)}$ to the neuron $N_m^{(k-1)}$ in the (k−1)-th layer are output to the neuron $N_j^{(k)}$. Then, the neuron $N_j^{(k)}$ generates $z_j^{(k)}$ in accordance with $z_1^{(k-1)}$ to $z_m^{(k-1)}$, and outputs $z_j^{(k)}$ as the output signal to the neurons in the (k+1)-th layer (not illustrated).

The efficiency of transmitting a signal input from a neuron in one layer to a neuron in the subsequent layer depends on the connection strength (hereinafter, referred to as weight coefficient) of the synapse that connects the neurons to each other. In the neural network 100, a signal output from a neuron in one layer is multiplied by a corresponding weight coefficient and then is input to a neuron in the subsequent layer. When i is an integer greater than or equal to 1 and less than or equal to m and the weight coefficient of the synapse between the neuron $N_i^{(k-1)}$ in the (k−1)-th layer and the neuron $N_j^{(k)}$ in the k-th layer is $w_i^{(k-1)}{}_j^{(k)}$, a signal input to the neuron $N_j^{(k)}$ in the k-th layer can be expressed by Formula (D1).

$$w_i^{(k-1)}{}_j^{(k)} \cdot z_i^{(k-1)} \qquad \text{[Formula 1]}$$

That is, when the signals are transmitted from the neuron $N_1^{(k-1)}$ to the neuron $N_m^{(k-1)}$ in the (k−1)-th layer to the neuron $N_j^{(k)}$ in the k-th layer, the signals $z_1^{(k-1)}$ to $z_m^{(k-1)}$ are multiplied by respective weight coefficients $w_1^{(k-1)}{}_j^{(k)}$ to $w_m^{(k-1)}{}_j^{(k)}$. Then, $w_1^{(k-1)}{}_j^{(k)} \cdot z_1^{(k-1)}$ to $w_m^{(k-1)}{}_j^{(k)} \cdot z_m^{(k-1)}$ are input to the neuron $N_j^{(k)}$ in the k-th layer. At that time, the sum total $u_j^{(k)}$ of the signals input to the neuron $N_j^{(k)}$ in the k-th layer is expressed by Formula (D2).

[Formula 2]

$$u_j^{(k)} = \sum_{i=1}^{m} w_{ij}^{(k-1)(k)} \cdot z_i^{(k-1)} \qquad (D2)$$

Furthermore, bias may be applied to the result of the product-sum operation of the weight coefficients $w_1^{(k-1)}{}_j^{(k)}$ to $w_m^{(k-1)}{}_j^{(k)}$ and the signals $z_1^{(k-1)}$ to $z_m^{(k-1)}$ input to the neurons. When b represents bias, Formula (D2) can be rewritten to the following formula.

[Formula 3]

$$u_j^{(k)} = \sum_{i=1}^{m} w_{ij}^{(k-1)(k)} \cdot z_i^{(k-1)} + b \qquad (D3)$$

The neuron $N_j^{(k)}$ generates the output signal $z_j^{(k)}$ in accordance with $u_j^{(k)}$. Here, the output signal $z_j^{(k)}$ from the neuron $N_j^{(k)}$ is defined by the following formula.

$$z_j^{(k)} = f(u_j^{(k)}) \qquad \text{[Formula 4]}$$

A function $f(u_j^{(k)})$ is an activation function in a hierarchical neural network, and a step function, a linear ramp function, a sigmoid function, or the like can be used. Note that the activation function may be the same or different among all neurons. In addition, the neuron activation function may be the same or different between the layers.

Signals output from the neurons in the layers, weight coefficients w, or bias b may be an analog value or a digital value. For example, a binary or ternary digital value may be used. A further larger bit-number value may also be used. In the case of an analog value, for example, a linear ramp function or a sigmoid function is used as the activation function. In the case of a binary digital value, a step function with an output of −1 or 1 or an output of 0 or 1 is used. Alternatively, the neurons in the layers may each output a ternary or higher-level signal; in this case, a step function with an output of three or more values, for example, an output of −1, 0, or 1 or an output of 0, 1, or 2 is used as an activation function. Furthermore, as an activation function for outputting five values, a step function with an output of −2, −1, 0, 1, or 2 may be used, for example. Using a digital value as at least one of the signals output from the neurons in the layers, the weight coefficients w, and the bias b enables a reduction of the circuit scale, a reduction of power consumption, or an increase of operation speed, for example. Moreover, using an analog value as at least one of the signals output from the neurons in the layers, the weight coefficients w, and the bias b enables an increase of the operation accuracy.

The neural network 100 performs an operation in which by input of an input signal to the first layer (the input layer), output signals are sequentially generated in layers from the first layer (the input layer) to the last layer (the output layer) according to Formula (D1), Formula (D2) (or Formula (D3)), and Formula (D4) on the basis of the signals input from the previous layers, and the output signals are output to the subsequent layers. The signal output from the last layer (the output layer) corresponds to the calculation results of the neural network 100.

<Structure Example 1 of Arithmetic Circuit>

Next, an example of a circuit that performs a product-sum operation and an activation function operation in the above-described neural network 100 is described.

Figure 9:
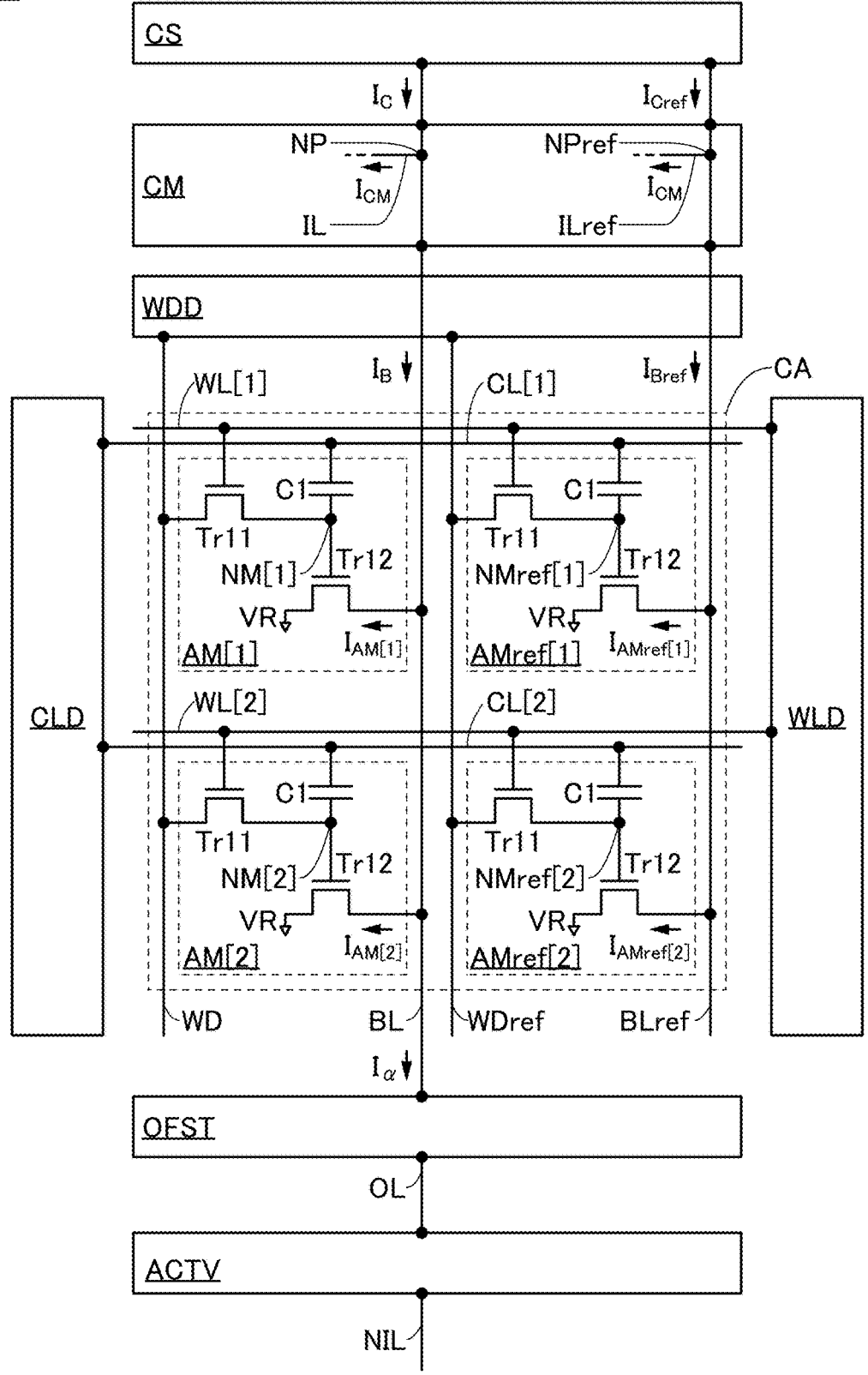
FIG. 9 is a block diagram illustrating a structure example of an arithmetic circuit.

FIG. 9 illustrates a structure example of an arithmetic circuit MAC1. The arithmetic circuit MAC1 illustrated in FIG. 9 is a circuit that performs a product-sum operation using first data retained in a memory cell described below and input second data and performs an activation function operation using the product-sum operation result. Note that the first data and the second data can be analog data or multilevel data (discrete data), for example.

The arithmetic circuit MAC1 includes a current supply circuit CS, a current mirror circuit CM, a circuit WDD, a circuit WLD, a circuit CLD, a circuit OFST, an activation function circuit ACTV, and the memory cell array CA.

The memory cell array CA includes a memory cell AM[1], a memory cell AM[2], a memory cell AMref[1], and a memory cell AMref[2]. The memory cell AM[1] and the memory cell AM[2] each have a function of retaining the first data, and the memory cell AMref[1] and the memory cell AMref[2] each have a function of retaining reference data that is needed to perform a product-sum operation. The reference data can be analog data or multilevel data (discrete data), like the first data and the second data.

In the memory cell array CA in FIG. 9, memory cells are arranged in a matrix of two rows and two columns; however, the memory cell array CA may have a structure in which memory cells are arranged in a matrix of three or more rows and three or more columns. In the case where multiplication is performed instead of the product-sum operation, the memory cell array CA may have a structure in which memory cells are arranged in a matrix of one row and two or more columns.

The memory cell AM[1], the memory cell AM[2], the memory cell AMref[1], and the memory cell AMref[2] each include a transistor Tr11, a transistor Tr12, and a capacitor C1.

Note that the transistor Tr11 is preferably an OS transistor. In addition, it is further preferable that a channel formation region of the transistor Tr11 be an oxide containing at least one of indium, the element M (as the element M, one or more kinds selected from aluminum, gallium, yttrium, copper, vanadium, beryllium, boron, titanium, iron, nickel, germanium, zirconium, molybdenum, lanthanum, cerium, neodymium, hafnium, tantalum, tungsten, magnesium, and the like can be given for example), and zinc. It is further preferable that the transistor Tr11 have a structure of the transistor described in Embodiment 3, in particular.

With the use of an OS transistor as the transistor Tr11, the leakage current of the transistor Tr11 can be suppressed, so that a product-sum operation circuit with high computation accuracy can be obtained in some cases. Furthermore, with the use of an OS transistor as the transistor Tr11, the amount of leakage current from a retention node to a writing word line can be extremely small when the transistor Tr11 is in a non-conduction state. In other words, the frequency of operation for refreshing the potential at the retention node can be reduced; thus, power consumption of the product-sum operation circuit can be reduced.

The use of an OS transistor also as the transistor Tr12 allows the transistor Tr12 to be formed concurrently with the transistor Tr11, leading to a reduction in the number of manufacturing steps for the product-sum operation circuit, in some cases. A channel formation region of the transistor Tr12 may include not an oxide but silicon. The silicon may be amorphous silicon (referred to as hydrogenated amorphous silicon in some cases), microcrystalline silicon, polycrystalline silicon, single crystal silicon, or the like, for example.

In each of the memory cell AM[1], the memory cell AM[2], the memory cell AMref[1], and the memory cell AMref[2], a first terminal of the transistor Tr11 is electrically connected to a gate of the transistor Tr12. A first terminal of the transistor Tr12 is electrically connected to a wiring VR. A first terminal of the capacitor C1 is electrically connected to the gate of the transistor Tr12.

In the memory cell AM[1], a second terminal of the transistor Tr11 is electrically connected to a wiring WD, and a gate of the transistor Tr11 is electrically connected to a wiring WL[1]. A second terminal of the transistor Tr12 is electrically connected to a wiring BL, and a second terminal of the capacitor C1 is electrically connected to a wiring CL[1]. In FIG. 9, in the memory cell AM[1], a connection portion of the first terminal of the transistor Tr11, the gate of the transistor Tr12, and the first terminal of the capacitor C1 is a node NM[1]. In addition, a current that flows from the wiring BL to the second terminal of the transistor Tr12 is $I_{AM[1]}$.

In the memory cell AM[2], a second terminal of the transistor Tr11 is electrically connected to the wiring WD, and a gate of the transistor Tr11 is electrically connected to a wiring WL[2]. A second terminal of the transistor Tr12 is electrically connected to the wiring BL, and a second terminal of the capacitor C1 is electrically connected to a wiring CL[2]. In FIG. 9, in the memory cell AM[2], a connection portion of the first terminal of the transistor Tr11, the gate of the transistor Tr12, and the first terminal of the capacitor C1 is a node NM[2]. In addition, a current that flows from the wiring BL to the second terminal of the transistor Tr12 is $I_{AM[2]}$.

In the memory cell AMref[1], a second terminal of the transistor Tr11 is electrically connected to a wiring WDref, and a gate of the transistor Tr11 is electrically connected to the wiring WL[1]. A second terminal of the transistor Tr12 is electrically connected to a wiring BLref, and a second terminal of the capacitor C1 is electrically connected to the wiring CL[1]. In FIG. 9, in the memory cell AMref[1], a connection portion of the first terminal of the transistor Tr11, the gate of the transistor Tr12, and the first terminal of the capacitor C1 is a node NMref[1]. In addition, a current that flows from the wiring BLref to the second terminal of the transistor Tr12 is $I_{AMref[1]}$.

In the memory cell AMref[2], a second terminal of the transistor Tr11 is electrically connected to the wiring WDref, and a gate of the transistor Tr11 is electrically connected to the wiring WL[2]. A second terminal of the transistor Tr12 is electrically connected to the wiring BLref, and a second terminal of the capacitor C1 is electrically connected to the wiring CL[2]. In FIG. 9, in the memory cell AMref[2], a connection portion of the first terminal of the transistor Tr11, the gate of the transistor Tr12, and the first terminal of the capacitor C1 is a node NMref[2]. In addition, a current that flows from the wiring BLref to the second terminal of the transistor Tr12 is $I_{AMref[2]}$.

The node NM[1], the node NM[2], the node NMref[1], and the node NMref[2] described above function as retention nodes of their respective memory cells.

The wiring VR is a wiring for supplying a current between the first terminal and the second terminal of the transistor Tr12 in each of the memory cell AM[1], the memory cell AM[2], the memory cell AMref[1], and the memory cell AMref[2]. Thus, the wiring VR functions as a wiring for supplying a predetermined potential. In this embodiment, a potential to be supplied from the wiring VR can be a reference potential or a potential lower than the reference potential.

The current supply circuit CS is electrically connected to the wiring BL and the wiring BLref. The current supply circuit CS has a function of supplying a current to the wiring BL and the wiring BLref. Note that the amounts of current supplied to the wiring BL and the wiring BLref may be different from each other. In this structure example, a current that is supplied from the current supply circuit CS to the wiring BL is $I_C$, and a current that is supplied from the current supply circuit CS to the wiring BLref is $I_{Cref}$.

The current mirror circuit CM includes a wiring IL and a wiring ILref. The wiring IL is electrically connected to the wiring BL, and in FIG. 9, a connection portion of the wiring IL and the wiring BL is shown as a node NP. The wiring ILref is electrically connected to the wiring BLref, and in FIG. 9, a connection portion of the wiring ILref and the wiring BLref is shown as a node NPref. The current mirror circuit CM has a function of letting out a current according to the potential of the node NPref from the node NPref of the wiring BLref to the wiring ILref, and letting out the same amount of current as the above current from the node NP of the wiring BL to the wiring IL. In FIG. 9, the current that is let out from the node NP to the wiring IL and the current that is let out from the node NPref to the wiring ILref are represented by $I_{CM}$. In addition, a current that flows from the current mirror circuit CM to the memory cell array CA in the wiring BL is represented by $I_B$, and a current that flows from the current mirror circuit CM to the memory cell array CA in the wiring BLref is represented by $I_{Bref}$.

The circuit WDD is electrically connected to the wiring WD and the wiring WDref. The circuit WDD has a function of transmitting data that is to be stored in each memory cell included in the memory cell array CA.

The circuit WLD is electrically connected to the wiring WL[1] and the wiring WL[2]. The circuit WLD has a function of selecting a memory cell to which data is written in data writing to the memory cell included in the memory cell array CA.

The circuit CLD is electrically connected to the wiring CL[1] and the wiring CL[2]. The circuit CLD has a function of applying a potential to the second terminal of the capacitor C1 of each memory cell included in the memory cell array CA.

The circuit OFST is electrically connected to the wiring BL and a wiring OL. The circuit OFST has a function of measuring the amount of current flowing from the wiring BL to the circuit OFST and/or the amount of change in current flowing from the wiring BL to the circuit OFST. In addition, the circuit OFST has a function of outputting the measurement result to the wiring OL. Note that the circuit OFST may have a structure in which the measurement result is output as it is in the form of current to the wiring OL or have a structure in which the measurement result is converted into voltage and then output to the wiring OL. In FIG. 9, a current flowing from the wiring BL to the circuit OFST is represented by $I_\alpha$.

Figure 10:
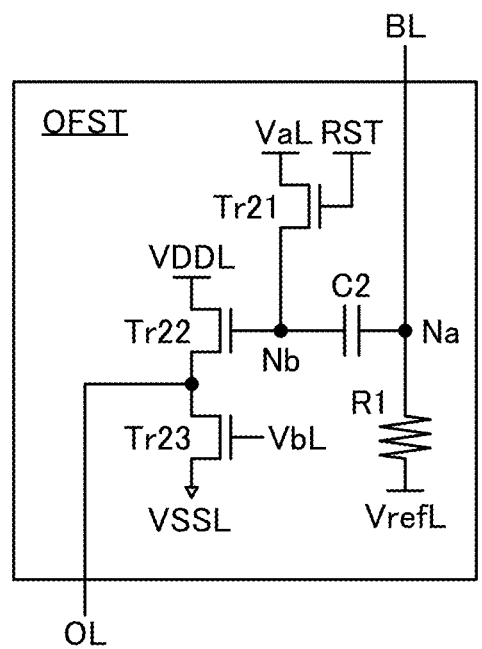
FIG. 10 is a circuit diagram illustrating a structure example of a circuit included in an arithmetic circuit.

The circuit OFST can have a structure illustrated in FIG. 10, for example. In FIG. 10, the circuit OFST includes a transistor Tr21, a transistor Tr22, a transistor Tr23, a capacitor C2, and a resistor R1.

A first terminal of the capacitor C2 is electrically connected to the wiring BL, and a first terminal of the resistor R1 is electrically connected to the wiring BL. A second terminal of the capacitor C2 is electrically connected to a first terminal of the transistor Tr21, and the first terminal of the transistor Tr21 is electrically connected to a gate of the transistor Tr22. A first terminal of the transistor Tr22 is electrically connected to a first terminal of the transistor Tr23, and the first terminal of the transistor Tr23 is electrically connected to the wiring OL. An electrical connection point of the first terminal of the capacitor C2 and the first terminal of the resistor R1 is a node Na, and an electrical connection point of the second terminal of the capacitor C2, the first terminal of the transistor Tr21, and the gate of the transistor Tr22 is a node Nb.

A second terminal of the resistor R1 is electrically connected to a wiring VrefL. A second terminal of the transistor Tr21 is electrically connected to a wiring VaL, and a gate of the transistor Tr21 is electrically connected to a wiring RST. A second terminal of the transistor Tr22 is electrically connected to a wiring VDDL. A second terminal of the transistor Tr23 is electrically connected to a wiring VSSL, and a gate of the transistor Tr23 is electrically connected to a wiring VbL.

The wiring VrefL is a wiring for supplying a potential Vref, the wiring VaL is a wiring for supplying a potential Va, and the wiring VbL is a wiring for supplying a potential Vb. The wiring VDDL is a wiring for supplying a potential VDD, and the wiring VSSL is a wiring for supplying a potential VSS. Particularly in this structure example of the circuit OFST, the potential VDD is a high-level potential and the potential VSS is a low-level potential. The wiring RST is a wiring for supplying a potential for switching between the conduction state and the non-conduction state of the transistor Tr21.

In the circuit OFST illustrated in FIG. 10, a source follower circuit is composed of the transistor Tr22, the transistor Tr23, the wiring VDDL, the wiring VSSL, and the wiring VbL.

In the circuit OFST illustrated in FIG. 10, owing to the resistor R1 and the wiring VrefL, a potential according to the current flowing through the wiring BL and the resistance of the resistor R1 is supplied to the node Na.

An operation example of the circuit OFST illustrated in FIG. 10 is described. When a first-time current (hereinafter referred to as first current) flows through the wiring BL, a potential according to the first current and the resistance of the resistor R1 is supplied to the node Na owing to the resistor R1 and the wiring VrefL. At this time, the transistor Tr21 is brought into a conduction state so that the potential Va is supplied to the node Nb. After that, the transistor Tr21 is brought into a non-conduction state.

Next, when a second-time current (hereinafter referred to as second current) flows through the wiring BL, a potential according to the second current and the resistance of the resistor R1 is supplied to the node Na owing to the resistor R1 and the wiring VrefL as in the case where the first current flows. At this time, the node Nb is in a floating state; thus, a change in the potential of the node Na changes the potential of the node Nb because of capacitive coupling. When the change in the potential of the node Na is $\Delta V_{Na}$ and the capacitive coupling coefficient is 1, the potential of the node Nb is $Va+\Delta V_{Na}$. When the threshold voltage of the transistor Tr22 is $V_{th}$, a potential $Va+\Delta V_{Na}-V_{th}$ is output through the wiring OL. When the potential Va is the threshold voltage $V_{th}$ here, a potential $\Delta V_{Na}$ can be output through the wiring OL.

The potential $\Delta V_{Na}$ is determined by the amount of change from the first current to the second current, the resistance value of the resistor R1, and the potential Vref. The resistance value of the resistor R1 and the potential Vref can be regarded as known; therefore, the use of the circuit OFST illustrated in FIG. 10 allows the amount of change in current flowing through the wiring BL to be obtained from the potential $\Delta V_{Na}$.

The activation function circuit ACTV is electrically connected to the wiring OL and a wiring NIL. The result of the amount of change in current measured by the circuit OFST is input to the activation function circuit ACTV through the wiring OL. The activation function circuit ACTV is a circuit that performs an arithmetic operation according to a function system defined in advance, on the result. As the function system, for example, a sigmoid function, a tan h function, a softmax function, a ReLU function, a threshold function, or the like can be used, and these functions are used as activation functions in a neural network.

<Operation Example 1 of Arithmetic Circuit>

Next, an operation example of the arithmetic circuit MAC1 is described.

Figure 11:
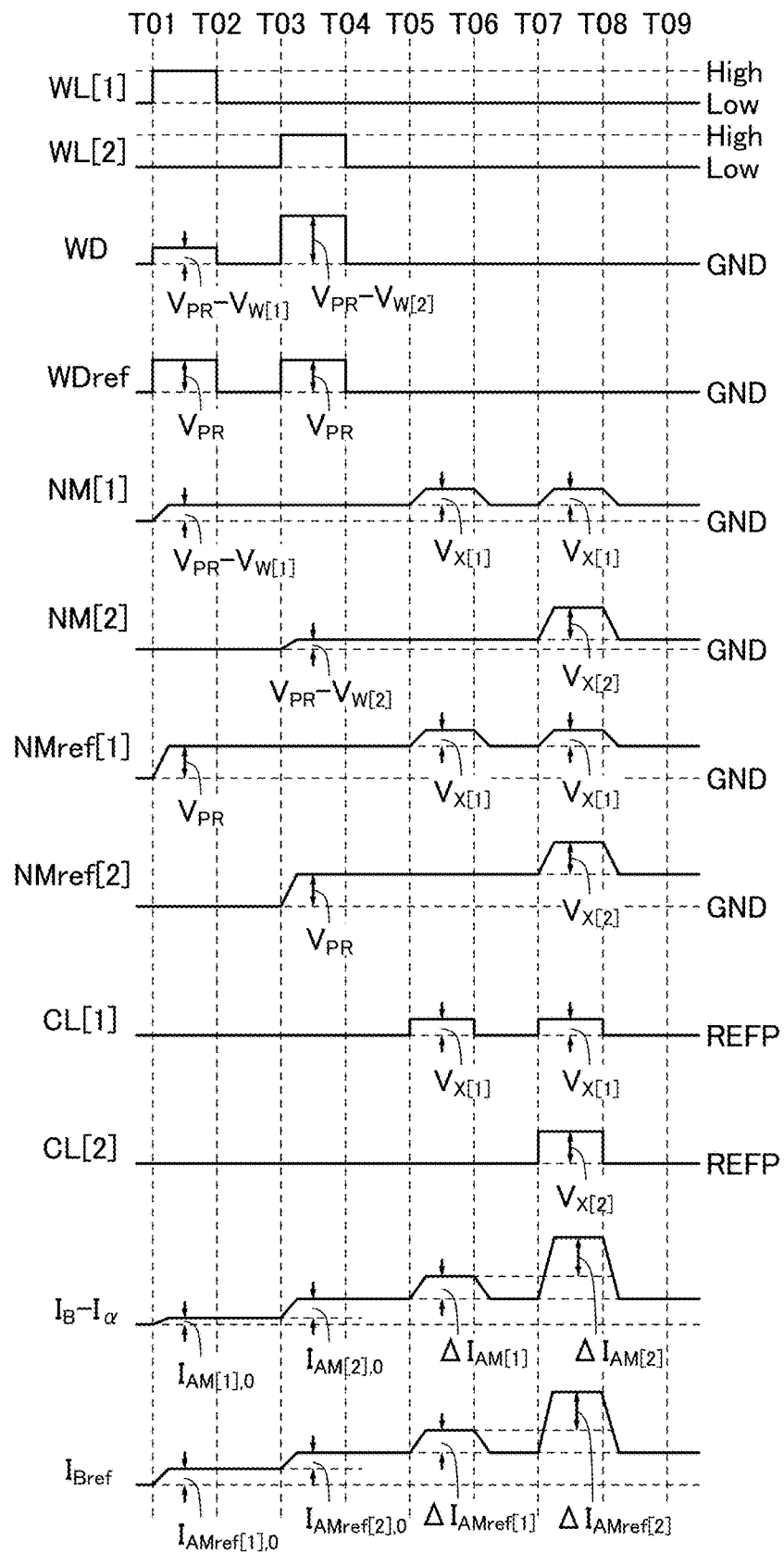
FIG. 11 is a timing chart illustrating an operation example of an arithmetic circuit.

FIG. 11 shows a timing chart of the operation example of the arithmetic circuit MAC1. The timing chart of FIG. 11 shows changes in the potentials of the wiring WL[1], the wiring WL[2], the wiring WD, the wiring WDref, the node NM[1], the node NM[2], the node NMref[1], the node NMref[2], the wiring CL[1], and the wiring CL[2] and changes in the amounts of current $I_B-I_\alpha$ and current $I_{Bref}$ from Time T01 to Time T09. In particular, the current $I_B-I_\alpha$ represents the sum total of current that flows from the wiring BL to the memory cell AM[1] and the memory cell AM[2] in the memory cell array CA.

<<From Time T01 to Time T02>>

During a period from Time T01 to Time T02, a high-level potential (denoted by High in FIG. 11) is applied to the wiring WL[1], and a low-level potential (denoted by Low in FIG. 11) is applied to the wiring WL[2]. Furthermore, a potential higher than a ground potential (denoted by GND in FIG. 11) by $V_{PR}-V_{W[1]}$ is applied to the wiring WD, and a potential higher than the ground potential by $V_{PR}$ is applied to the wiring WDref. Moreover, a reference potential (denoted by REFP in FIG. 11) is applied to each of the wiring CL[1] and the wiring CL[2].

The potential $V_{W[1]}$ is a potential corresponding to one piece of the first data. The potential $V_{PR}$ is a potential corresponding to the reference data.

At this time, the high-level potential is applied to each of the gates of the transistors Tr11 in the memory cell AM[1] and the memory cell AMref[1]; accordingly, the transistors Tr11 in the memory cell AM[1] and the memory cell AMref[1] are each brought into on state. Thus, in the memory cell AM[1], the wiring WD and the node NM[1] are brought into a conduction state, and the potential of the node NM[1] becomes $V_{PR}-V_{W[1]}$. Similarly, in the memory cell AMref[1], the wiring WDref and the node NMref[1] are brought into a conduction state, and the potential of the node NMref[1] becomes $V_{PR}$.

Here, the current flowing from the second terminal to the first terminal of the transistor Tr12 in each of the memory cell AM[1] and the memory cell AMref[1] is considered. When the current flowing from the wiring BL to the first terminal of the transistor Tr12 in the memory cell AM[1] through its second terminal is $I_{AM[1],0}$, $I_{AM[1],0}$ can be expressed by the following formula.

[Formula 5]

$$I_{AM[1],0}=k(V_{PR}-V_{W[1]}-V_{th})^2 \quad (E1)$$

Note that k is a constant determined by the channel length, the channel width, the mobility, the capacitance of a gate insulating film, and the like of the transistor Tr12. Furthermore, $V_{th}$ is the threshold voltage of the transistor Tr12.

When the current flowing from the wiring BLref to the first terminal of the transistor Tr12 in the memory cell AMref[1] through its second terminal is $I_{AMref[1],0}$, $I_{AMref[1],0}$ can be expressed similarly by the following formula.

[Formula 6]

$$I_{AMref[1],0}=k(V_{PR}-V_{th})^2 \quad (E2)$$

Note that since the low-level potential is applied to each of the gates of the transistors Tr11 in the memory cell AM[2] and the memory cell AMref[2], the transistors Tr11 in the memory cell AM[2] and the memory cell AMref[2] are each brought into off state. Thus, the potentials are not written to the node NM[2] and the node NMref[2].

<<From Time T02 to Time T03>>

During a period from Time T02 to Time T03, the low-level potential is applied to the wiring WL[1]. At this time, the low-level potential is applied to each of the gates of the transistors Tr11 in the memory cell AM[1] and the memory cell AMref[1]; accordingly, the transistors Tr11 in the memory cell AM[1] and the memory cell AMref[1] are each brought into off state.

In addition, the low-level potential remains applied to the wiring WL[2] from before Time T02. Thus, the transistors Tr11 in the memory cell AM[2] and the memory cell AMref[2] each remain in off state since before Time T02.

Since the transistors Tr11 in the memory cell AM[1], the memory cell AM[2], the memory cell AMref[1], and the memory cell AMref[2] are each in off state as described above, the potentials of the node NM[1], the node NM[2], the node NMref[1], and the node NMref[2] are each retained during the period from Time T02 to Time T03.

In particular, when an OS transistor is used as each of the transistors Tr11 in the memory cell AM[1], the memory cell AM[2], the memory cell AMref[1], and the memory cell AMref[2] as mentioned in the description of the circuit structure of the arithmetic circuit MAC1, leakage current flowing between the first terminal and the second terminal of the transistor Tr11 can be made low, which makes it possible to retain the potential of each of the node NM[1], the node NM[2], the node NMref[1], and the node NMref[2] for a long time.

During the period from Time T02 to Time T03, the ground potential is applied to the wiring WD and the wiring WDref Since the transistors Tr11 in the memory cell AM[1], the memory cell AM[2], the memory cell AMref[1], and the memory cell AMref[2] are each in off state, the potentials retained at the node NM[1], the node NM[2], the node NMref[1], and the node NMref[2] are not rewritten by application of potentials from the wiring WD and the wiring WDref.

<<From Time T03 to Time T04>>

During a period from Time T03 to Time T04, the low-level potential is applied to the wiring WL[1], and the high-level potential is applied to the wiring WL[2]. Furthermore, a potential higher than the ground potential by $V_{PR}-V_{w[2]}$ is applied to the wiring WD, and a potential higher than the ground potential by $V_{PR}$ is applied to the wiring WDref. Moreover, the reference potential is continuously applied to each of the wiring CL[1] and the wiring CL[2] since before Time T02.

Note that the potential $V_{w[2]}$ is a potential corresponding to one piece of the first data.

At this time, the high-level potential is applied to each of the gates of the transistors Tr11 in the memory cell AM[2] and the memory cell AMref[2]; accordingly, the transistors Tr11 in the memory cell AM[2] and the memory cell AMref[2] are each brought into on state. Thus, in the memory cell AM[2], the wiring WD and the node NM[2] are brought into a conduction state, and the potential of the node NM[2] becomes $V_{PR}-V_{W[2]}$. Similarly, in the memory cell AMref[2], the wiring WDref and the node NMref[2] are brought into a conduction state, and the potential of the node NMref[2] becomes $V_{PR}$.

Here, the current flowing from the second terminal to the first terminal of the transistor Tr12 in each of the memory cell AM[2] and the memory cell AMref[2] is considered. When the current flowing from the wiring BL to the first terminal of the transistor Tr12 in the memory cell AM[2] through its second terminal is $I_{AM[2],0}$, $I_{AM[2],0}$ can be expressed by the following formula.

[Formula 7]

$$I_{AM[2],0}=k(V_{PR}-V_{W[2]}-V_{th})^2 \quad (E3)$$

When the current flowing from the wiring BLref to the first terminal of the transistor Tr12 in the memory cell AMref[2] through its second terminal is $I_{AMref[2],0}$, $I_{AMref[2],0}$ can be expressed similarly by the following formula.

[Formula 8]

$$I_{AMref[2],0}=k(V_{PR}-V_{th})^2 \quad (E4)$$

<<From Time T04 to Time T05>>

Here, currents that flow in the wiring BL and the wiring BLref during a period from Time T04 to Time T0S are described.

A current from the current supply circuit CS is supplied to the wiring BLref. In addition, a current is let out by the current mirror circuit CM, the memory cell AMref[1], and the memory cell AMref[2] to the wiring BLref. When the current supplied from the current supply circuit CS is $I_{Cref}$ and the current let out by the current mirror circuit CM is $I_{CM,0}$ in the wiring BLref, the following formula is satisfied according to Kirchhoff's law.

[Formula 9]

$$I_{Cref}-I_{CM,0}=I_{AMref[1],0}+I_{AMref[2],0} \quad (E5)$$

A current from the current supply circuit CS is supplied to the wiring BL. In addition, a current is let out to the wiring BL by the current mirror circuit CM, the memory cell AM[1], and the memory cell AM[2]. Moreover, a current flows from the wiring BL to the circuit OFST. When the current supplied from the current supply circuit CS is $I_C$ and the current that flows from the wiring BL to the circuit OFST is $I_{\alpha,0}$ in the wiring BL, the following formula is satisfied according to Kirchhoff's law.

[Formula 10]

$$I_C-I_{CM,0}=I_{AM[1],0}+I_{AM[2],0}+I_{\alpha,0} \quad (E6)$$

<<From Time T05 to Time T06>>

During a period from Time T05 to Time T06, a potential higher than the reference potential by $V_{X[1]}$ is applied to the wiring CL[1]. At this time, the potential $V_{X[1]}$ is applied to the second terminal of the capacitor C1 in each of the memory cell AM[1] and the memory cell AMref[1], so that the potentials of the gates of the transistors Tr12 increase.

The potential $V_{X[1]}$ is a potential corresponding to one piece of the second data.

Note that an increase in the potential of the gate of the transistor Tr12 corresponds to a potential obtained by multiplying a change in the potential of the wiring CL[1] by a capacitive coupling coefficient determined by the memory cell structure. The capacitive coupling coefficient is calculated using the capacitance of the capacitor C1, the gate capacitance of the transistor Tr12, the parasitic capacitance, and the like. In this operation example, to avoid complexity of description, description is made on the assumption that an increase in the potential of the wiring CL[1] is equal to the increase in the potential of the gate of the transistor Tr12. This corresponds to the case where the capacitive coupling coefficient in each of the memory cells AM[1] and AMref[1] is set to 1.

Since the capacitive coupling coefficient is set to 1, when the potential $V_{X[1]}$ is applied to the second terminal of the capacitor C1 in each of the memory cell AM[1] and the memory cell AMref[1], the potentials of the node NM[1] and the node NMref[1] each increase by $V_{X[1]}$.

Here, the current flowing from the second terminal to the first terminal of the transistor Tr12 in each of the memory cell AM[1] and the memory cell AMref[1] is considered. When the current flowing from the wiring BL to the first terminal of the transistor Tr12 in the memory cell AM[1] through its second terminal is $I_{AM[1],1}$, $I_{AM[1],1}$ can be expressed by the following formula.

[Formula 11]

$$I_{AM[1],1}=k(V_{PR}-V_{W[1]}+V_{X[1]}-V_{th})^2 \quad (E7)$$

In other words, by application of the potential $V_{X[1]}$ to the wiring CL[1], the current flowing from the wiring BL to the first terminal of the transistor Tr12 in the memory cell AM[1] through its second terminal increases by $I_{AM[1],1} - I_{AM[1],0}$, (denoted by $\Delta I_{AM[1]}$ in FIG. 11).

Similarly, when the current flowing from the wiring BLref to the first terminal of the transistor Tr12 in the memory cell AMref[1] through its second terminal is $I_{AMref[1],1}$, $I_{AMref[1],1}$ can be expressed by the following formula.

[Formula 12]

$$I_{AMref[1],1} = k(V_{PR} + V_{X[1]} - V_{th})^2 \quad (E8)$$

In other words, by application of the potential $V_{X[1]}$ to the wiring CL[1], the current flowing from the wiring BLref to the first terminal of the transistor Tr12 in the memory cell AMref[1] through its second terminal increases by $I_{AMref[1],1} - I_{AMref[1],0}$ (denoted by $\Delta I_{AMref[1]}$ in FIG. 11).

Here, currents that flow in the wiring BL and the wiring BLref are described.

As in the period from Time T04 to Time T05, the current $I_{Cref}$ from the current supply circuit CS is supplied to the wiring BLref. At the same time, a current is let out to the wiring BLref by the current mirror circuit CM, the memory cell AMref[1], and the memory cell AMref[2]. When the current let out by the current mirror circuit CM is $I_{CM,1}$ in the wiring BLref, the following formula is satisfied according to Kirchhoff's law.

$$I_{Cref} - I_{CM,1} = I_{AMref[1],1} + I_{AMref[2],0} \quad [\text{Formula 13}]$$

As in the period from Time T04 to Time T05, the current k from the current supply circuit CS is supplied to the wiring BL. At the same time, a current is let out to the wiring BL by the current mirror circuit CM, the memory cell AM[1], and the memory cell AM[2]. Moreover, a current flows from the wiring BL to the circuit OFST. When the current that flows from the wiring BL to the circuit OFST is $I_{\alpha,1}$ in the wiring BL, the following formula is satisfied according to Kirchhoff's law.

[Formula 14]

$$I_C - I_{CM,1} = I_{AM[1],1} + I_{AM[2],0} + I_{\alpha,1} \quad (E10)$$

Note that $\Delta I_{\alpha}$ represents the difference between the current $I_{\alpha,0}$ flowing from the wiring BL to the circuit OFST during the period from Time T04 to Time T05 and the current $I_{\alpha,1}$ flowing from the wiring BL to the circuit OFST during the period from Time T05 to Time T06. Hereinafter, $\Delta I_{\alpha}$ is referred to as a difference current in the arithmetic circuit MAC1. The difference current $\Delta I_{\alpha}$ can be expressed by the following formula, using Formula (E1) to Formula (E10).

[Formula 15]

$$\Delta I_{\alpha} = I_{\alpha,0} - I_{\alpha,1} = 2kV_{W[1]}V_{X[1]} \quad (E11)$$

<<From Time T06 to Time T07>>

During a period from Time T06 to Time T07, the reference potential is applied to the wiring CL[1]. At this time, the reference potential is applied to the second terminal of the capacitor C1 in each of the memory cell AM[1] and the memory cell AMref[1]; thus, the potentials of the node NM[1] and the node NMref[1] return to the potentials of the period from Time T04 to Time T05.

<<From Time T07 to Time T08>>

During a period from Time T07 to Time T08, a potential higher than the reference potential by $V_{X[1]}$ is applied to the wiring CL[1], and a potential higher than the reference potential by $V_{X[2]}$ is applied to the wiring CL[2]. At this time, the potential $V_{X[1]}$ is applied to the second terminal of the capacitor C1 in each of the memory cell AM[1] and the memory cell AMref[1], and the potential $V_{X[2]}$ is applied to the second terminal of the capacitor C1 in each of the memory cell AM[2] and the memory cell AMref[2]. Consequently, the potential of the gate of the transistor Tr12 in each of the memory cell AM[1], the memory cell AM[2], the memory cell AMref[1], and the memory cell AMref[2] increases.

For the potential change at the node in each of the memory cell AM[1] and the memory cell AMref[1], refer to the operation during the period from Time T05 to Time T06. Similarly, the memory cell AM[2] and the memory cell AMref[2] are described on the assumption that the capacitive coupling coefficient of each memory cell is 1.

Since the capacitive coupling coefficient is set to 1, when the potential $V_{X[2]}$ is applied to the second terminal of the capacitor C1 in each of the memory cell AM[2] and the memory cell AMref[2], the potentials of the node NM[2] and the node NMref[2] each increase by $V_{X[2]}$.

Here, the current flowing from the second terminal to the first terminal of the transistor Tr12 in each of the memory cell AM[2] and the memory cell AMref[2] is considered. When the current flowing from the wiring BL to the first terminal of the transistor Tr12 in the memory cell AM[1] through its second terminal is $I_{AM[2],1}$, $I_{AM[2],1}$ can be expressed by the following formula.

[Formula 16]

$$I_{AM[2],1} = k(V_{PR} - V_{W[2]} + V_{X[2]} - V_{th})^2 \quad (E12)$$

In other words, by application of the potential $V_{X[2]}$ to the wiring CL[2], the current flowing from the wiring BL to the first terminal of the transistor Tr12 in the memory cell AM[2] through its second terminal increases by $I_{AM[2],1} - I_{AM[2],0}$ (denoted by $\Delta I_{AM[2]}$ in FIG. 11).

Similarly, when the current flowing from the wiring BLref to the first terminal of the transistor Tr12 in the memory cell AMref[2] through its second terminal is $I_{AMref[2],1}$, $I_{AMref[2],1}$ can be expressed by the following formula.

[Formula 17]

$$I_{AMref[2],1} = k(V_{PR} + V_{X[2]} - V_{th})^2 \quad (E13)$$

In other words, by application of the potential $V_{X[2]}$ to the wiring CL[2], the current flowing from the wiring BLref to the first terminal of the transistor Tr12 in the memory cell AMref[2] through its second terminal increases by $I_{AMref[2],1} - I_{AMref[2],0}$ (denoted by $\Delta I_{AMref[2]}$ in FIG. 11).

Here, currents that flow in the wiring BL and the wiring BLref are described.

As in the period from Time T04 to Time T05, the current $I_{Cref}$ from the current supply circuit CS is supplied to the wiring BLref. At the same time, a current is let out to the wiring BLref by the current mirror circuit CM, the memory cell AMref[1], and the memory cell AMref[2]. When the current let out by the current mirror circuit CM is $I_{CM,2}$ in the wiring BLref, the following formula is satisfied according to Kirchhoff's law.

[Formula 18]

$$I_{Cref} - I_{CM,2} = I_{AMref[1],1} + I_{AMref[2],1} \quad (E14)$$

As in the period from Time T04 to Time T05, the current $I_C$ from the current supply circuit CS is supplied to the wiring BL. At the same time, a current is let out to the wiring BL by the current mirror circuit CM, the memory cell AM[1], and the memory cell AM[2]. Moreover, a current flows from the wiring BL to the circuit OFST. When the current that flows from the wiring BL to the circuit OFST is $I_{\alpha,3}$ in the wiring BL, the following formula is satisfied according to Kirchhoff's law.

[Formula 19]

$$I_C - I_{CM,2} = I_{AM[1],1} + I_{AM[2],1} + I_{\alpha,3} \quad (E15)$$

The difference current $\Delta I_\alpha$, the difference between the current $I_{\alpha,0}$ flowing from the wiring BL to the circuit OFST during the period from Time T04 to Time T05 and the current $I_{\alpha,3}$ flowing from the wiring BL to the circuit OFST during the period from Time T07 to Time T08, can be expressed by the following formula, using Formula (E1) to Formula (E8) and Formula (E12) to Formula (E15).

[Formula 20]

$$\Delta I_\alpha = I_{\alpha,0} - I_{\alpha,3} = 2k(V_{W[1]}V_{X[1]} + V_{W[2]}V_{X[2]}) \quad (E16)$$

As shown by Formula (E11) and Formula (E16), the difference current $\Delta I_\alpha$ input to the circuit OFST has a value corresponding to the sum of products of the potential $V_W$, which is a plurality of pieces of the first data, and the potential $V_X$, which is a plurality of pieces of the second data. In other words, when the difference current $\Delta I_\alpha$ is measured by the circuit OFST, the value of the sum of products of the first data and the second data can be obtained.

<<From Time T08 to Time T09>>

During a period from Time T08 to Time T09, the reference potential is applied to the wiring CL[1] and the wiring CL[2]. At this time, the reference potential is applied to the second terminal of the capacitor C1 in each of the memory cell AM[1], the memory cell AM[2], the memory cell AMref[1], and the memory cell AMref[2]; thus, the potentials of the node NM[1], the node NM[2], the node NMref[1], and the node NMref[2] return to the potentials of the period from Time T06 to Time T07.

Although $V_{X[1]}$ was applied to the wiring CL[1] during the period from Time T05 to Time T06 and $V_{X[1]}$ and $V_{X[2]}$ were applied to the wiring CL[1] and the wiring CL[2], respectively, during the period from Time T07 to Time T08, potentials that are applied to the wiring CL[1] and the wiring CL[2] may be lower than the reference potential REFP. In the case where a potential lower than the reference potential REFP is applied to the wiring CL[1] and/or the wiring CL[2], the potential of a retention node of a memory cell connected to the wiring CL[1] and/or the wiring CL[2] can be decreased by capacitive coupling. Thus, multiplication of the first data and one piece of the second data, which is a negative value, can be performed in the product-sum operation. For example, in the case where $-V_{X[2]}$, instead of $V_{X[2]}$, is applied to the wiring CL[2] during the period from Time T07 to Time T08, the difference current $\Delta I_\alpha$ can be expressed by the following formula.

[Formula 21]

$$\Delta I_\alpha = I_{\alpha,0} - I_{\alpha,3} = 2k(V_{W[1]}V_{X[1]} - V_{W[2]}V_{X[2]}) \quad (E17)$$

Although the memory cell array CA including memory cells arranged in a matrix of two rows and two columns is used in this operation example, a product-sum operation can be similarly performed in a memory cell array of one row and two or more columns and a memory cell array of three or more rows and three or more columns. In a product-sum operation circuit of such a case, memory cells in one of the plurality of columns are used for retaining reference data (potential $V_{PR}$), whereby product-sum operations, the number of which corresponds to the number of the rest of columns among the plurality of columns, can be executed concurrently. That is, when the number of columns in a memory cell array is increased, a semiconductor device that achieves a high-speed product-sum operation can be provided. Furthermore, increasing the number of rows allows an increase in the number of terms to be added to each other in the product-sum operation. The difference current $\Delta I_\alpha$ when the number of rows is increased can be expressed by the following formula.

[Formula 22]

$$\Delta I_\alpha = 2k \sum_i V_{W[i]} V_{X[i]} \quad (E18)$$

In the case where the product-sum operation circuit described in this embodiment is used as the above-described hidden layers, the weight coefficient $w_{s[k]s[k-1]}^{(k)}$ is stored as the first data in each of the memory cells AM in the same column and the output signal $z_{s[k-1]}^{(k-1)}$ from the s[k−1]-th neuron in the (k−1)-th layer is used as a potential (the second data) applied from the wiring CL in each row, so that the sum of products of the first data and the second data can be obtained from the difference current $\Delta I_\alpha$. In addition, the value of the activation function can be obtained using the value of the sum of products, so that the value of the activation function can be, as a signal, the output signal $z_{s[k]}^{(k)}$ of the s[k]-th neuron in the k-th layer.

In the case where the product-sum operation circuit described in this embodiment is used as the above-described output layer, the weight coefficient $w_{s[L]s[L-1]}^{(L)}$ is stored as the first data in each of the memory cells AM in the same column and the output signal $z_{s[L-1]}^{(L-1)}$ from the s[k−1]-th neuron in the (L−1)-th layer is used as a potential (the second data) applied from the wiring CL in each row, so that the sum of products of the first data and the second data can be obtained from the difference current $\Delta I_\alpha$. In addition, the value of the activation function can be obtained using the value of the sum of products, so that the value of the activation function can be, as a signal, the output signal $z_{s[L]}^{(L)}$ of the s[L]-th neuron in the L-th layer.

Note that the input layer described in this embodiment may function as a buffer circuit that outputs an input signal to the second layer.

By the way, in the arithmetic circuit described in this embodiment, the number of rows of the memory cells AM corresponds to the number of neurons in the previous layer. In other words, the number of rows of the memory cells AM corresponds to the number of output signals of the neurons in the previous layer that are input to one neuron in the next layer. The number of columns of the memory cells AM corresponds to the number of neurons in the next layer. In other words, the number of columns of the memory cells AM corresponds to the number of output signals that are output from the neurons in the next layer. That is to say, the number of rows and the number of columns of the memory cell array of the arithmetic circuit are determined depending on the number of neurons in each of the previous layer and the next layer; thus, a neural network is designed by determining the number of rows and the number of columns of the memory cell array depending on the desired structure.

The arithmetic circuit described in this embodiment may be changed in structure in accordance with the conditions.

Figure 12:
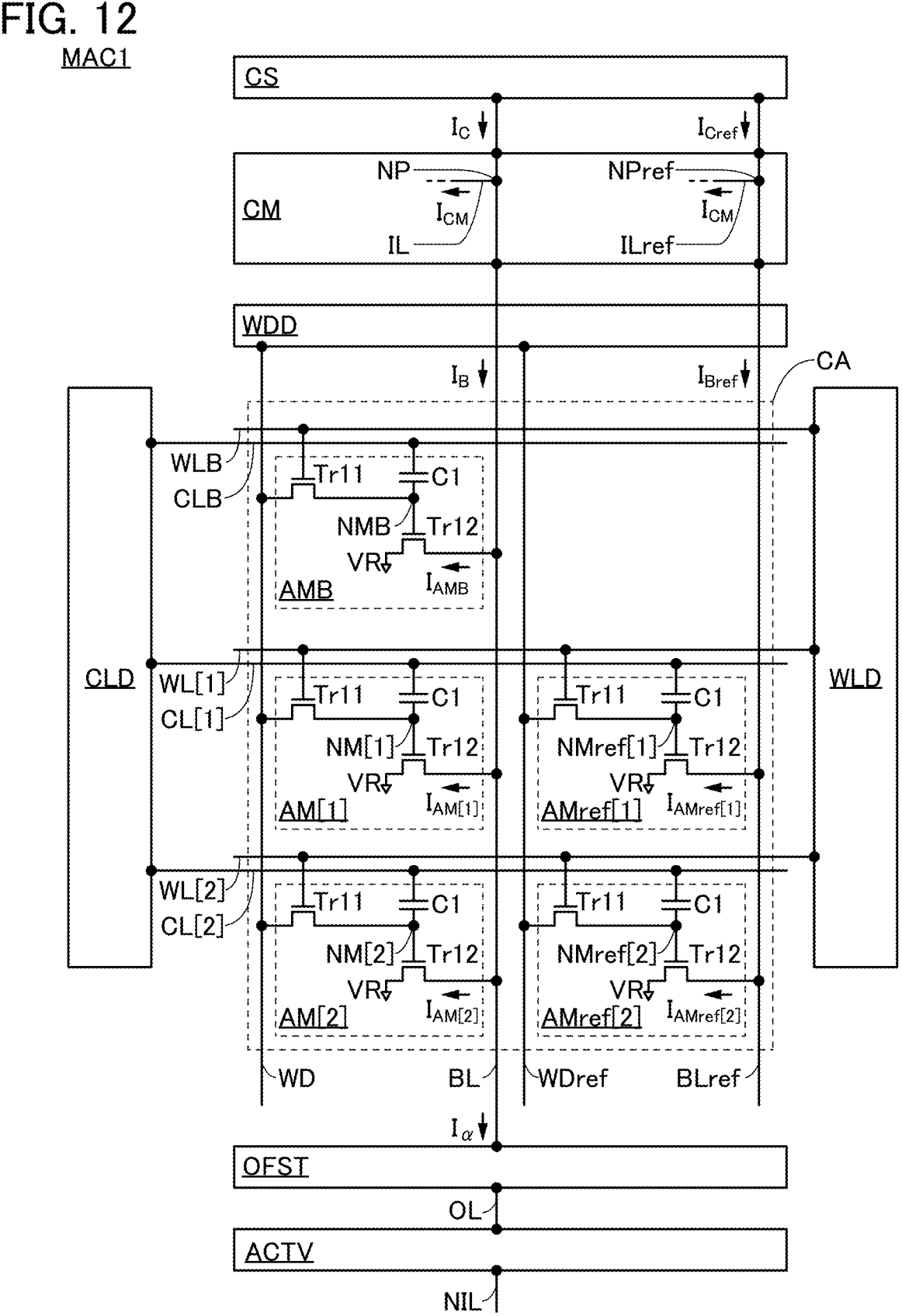
FIG. 12 is a block diagram illustrating a structure example of an arithmetic circuit.

For example, the arithmetic circuit MAC1 illustrated in FIG. 9 may be changed to the arithmetic circuit MAC1 illustrated in FIG. 12. The arithmetic circuit MAC1 in FIG. 12 has a structure where a memory cell AMB is added to the column including the memory cell AM[1] and the memory cell AM[1] in the memory cell array CA of the arithmetic circuit MAC1 in FIG. 9.

The memory cell AMB is electrically connected to the wiring WD, the wiring BL, a wiring WLB, and a wiring CLB. In addition, the wiring WLB is electrically connected to the circuit WLD, and the wiring CLB is electrically connected to the circuit CLD.

In the memory cell AMB, a connection portion of the first terminal of the transistor Tr11, the gate of the transistor Tr12, and the first terminal of the capacitor C1 is a node NMB.

The wiring WLB functions as a wiring which supplies a selection signal from the circuit WLD to the memory cell AMB when data is written to the memory cell AMB. The wiring CLB functions as a wiring which applies a constant potential to the second terminal of the capacitor C1 of the memory cell AMB. The constant potential is preferably a ground potential or a low-level potential.

In the operation example of the arithmetic circuit MAC1 in FIG. 12, during the period from Time T01 to Time T05 in the timing chart of FIG. 11, for example, a ground potential, a low-level potential, or a potential supplied through the wiring VR is retained in the node NMB so that the transistor Tr12 of the memory cell AMB can be in off state. During the period from Time T05 to Time T09 in the timing chart of FIG. 11, a potential $V_{BIAS}$ is retained in the node NMB so that an arbitrary current $I_{BIAS}$ can flow between the source and the drain of the transistor Tr12 of the memory cell AMB. $I_{BIAS}$ at this time is expressed by the following formula.

[Formula 23]

$$I_{BIAS} = k(V_{PR} - V_{BIAS} - V_{th})^2 \tag{E19}$$

Formula (E16) and Formula (E18) can be rewritten to the following formulae.

[Formula 22]

$$\Delta I_\alpha = I_{\alpha,0} - I_{\alpha,3} = 2k(V_{W[1]}V_{X[1]} + V_{W[2]}V_{X[2]}) - I_{BIAS} \tag{E20}$$

[Formula 22]

$$\Delta I_\alpha = 2k \sum_i V_{W[i]} V_X[i] - I_{BIAS} \tag{E21}$$

Formula (E20) and Formula (E21) correspond to an arithmetic operation of further applying arbitrary bias to the product-sum operation result. That is, an arithmetic operation shown in Formula (D3) can be performed by using the arithmetic circuit MAC1 in FIG. 12. It should be noted that $I_{BIAS}$ is determined by not the potential of the node NMB but the potential supplied through the wiring CLB supplies. Therefore, for example, in the timing chart in FIG. 11, the ground potential may be supplied to the wiring CLB during the period from Time T01 to Time T05 so that the transistor Tr12 of the memory cell AMB can be in off state, and the potential of the wiring CLB is changed from the ground potential to an arbitrary potential during the period from Time T05 to Time T09 so that an arbitrary current $I_{BIAS}$ can flow between the source and the drain of the transistor Tr12 of the memory cell AMB.

Figure 13:
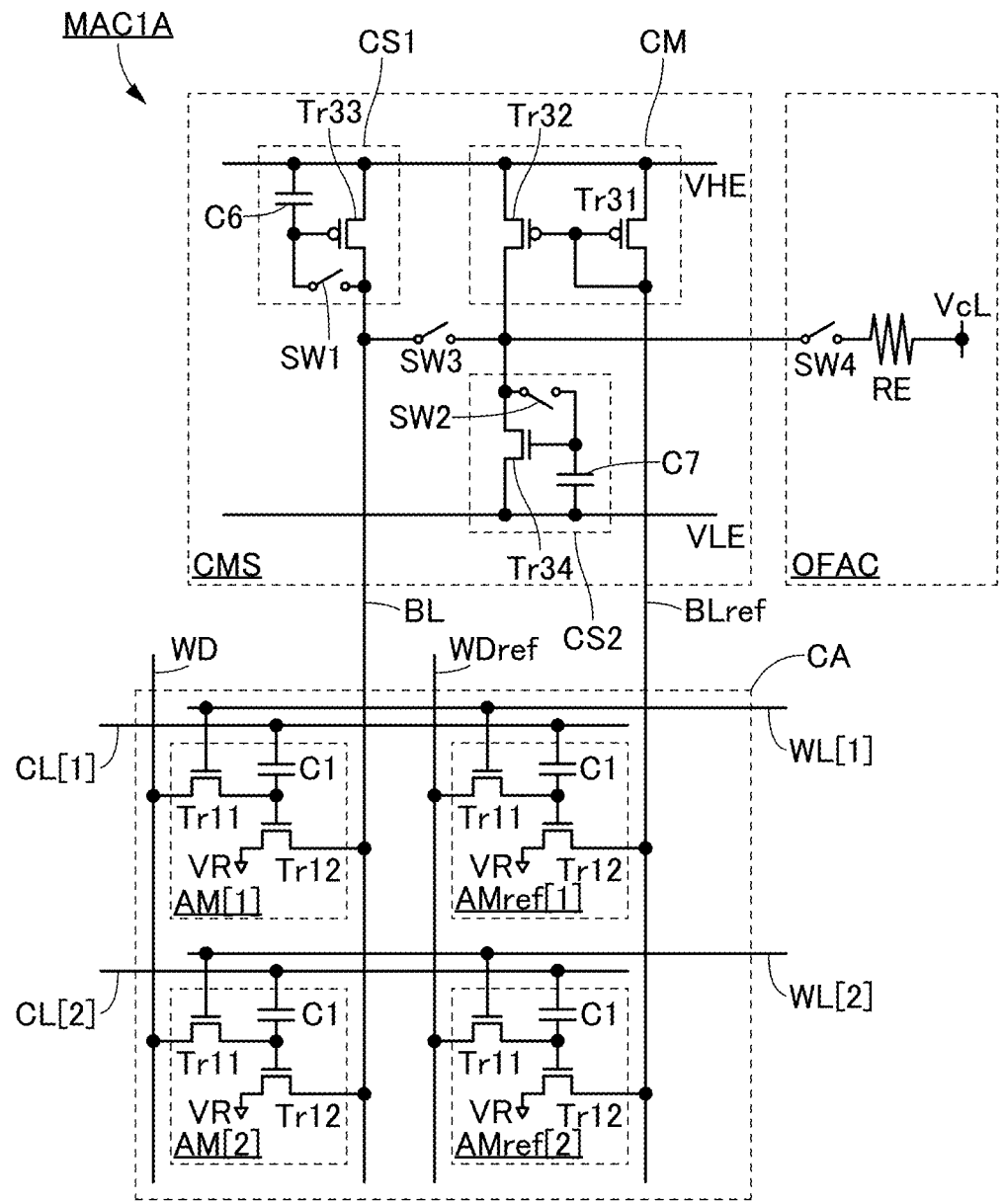
FIG. 13 is a circuit diagram illustrating a structure example of an arithmetic circuit.

Furthermore, for example, the arithmetic circuit MAC1 illustrated in FIG. 9 may be changed to an arithmetic circuit MAC1A illustrated in FIG. 13. The arithmetic circuit MAC1A in FIG. 13 includes a circuit CMS, which is a combination of the current supply circuit CS and the current mirror circuit CM of the arithmetic circuit MAC1 in FIG. 9, a circuit OFAC, which is a combination of the circuit OFST and the activation function circuit ACTV of the arithmetic circuit MAC1 in FIG. 9, and the memory cell array CA.

The circuit CMS includes the current mirror circuit CM, a current supply circuit CS1, a current supply circuit CS2, and a switch SW3, for example.

The current mirror circuit CM includes a transistor Tr31 and a transistor Tr32, for example. The current supply circuit CS1 includes a transistor Tr33, a capacitor C6, and a switch SW1, for example. The current supply circuit CS2 includes a transistor Tr34, a capacitor C7, and a switch SW2, for example.

The circuit OFAC includes a switch SW4 and a resistor RE, for example.

As illustrated in FIG. 13, the transistor Tr31 to the transistor Tr33 are each preferably a p-channel transistor. The transistor Tr34 is preferably an n-channel transistor as illustrated in FIG. 13. As each of the transistor Tr31 to the transistor Tr34, a Si transistor can be used, for example.

Unless otherwise specified, the transistor Tr31 to the transistor Tr34 may operate in a saturation region when being in on state. In other words, the gate voltage, the source voltage, and the drain voltage of each of the above-described transistors may be appropriately biased to voltages in the range where the transistors operate in a saturation region.

As each of the switch SW1 to the switch SW4, an electrical switch, a mechanical switch, or the like can be used, for example. In particular, in the case where an electrical switch is used as each of the switch SW1 to the switch SW4, an OS transistor, a Si transistor, or the like can be used as the electrical switch.

For the memory cell array CA, the description of the memory cell array CA of the arithmetic circuit MAC1 in FIG. 9 is referred to. In FIG. 13, the circuit CLD, the circuit WDD, and the circuit WLD are not illustrated.

In the current mirror circuit CM, a first terminal of the transistor Tr31 is electrically connected to a wiring VHE, and a second terminal of the transistor Tr31 is electrically connected to a gate of the transistor Tr31 and the wiring BLref. A first terminal of the transistor Tr32 is electrically connected to the wiring VHE, and a second terminal of the transistor Tr32 is electrically connected to a first terminal of the switch SW3 and a first terminal of the switch SW4 in the circuit OFAC.

In the current supply circuit CS1, a first terminal of the transistor Tr33 is electrically connected to the wiring VHE; a second terminal of the transistor Tr33 is electrically connected to a first terminal of the switch SW1, a second terminal of the switch SW3, and the wiring BL; and a gate of the transistor Tr33 is electrically connected to a second terminal of the switch SW1 and a first terminal of the capacitor C6. A second terminal of the capacitor C6 is electrically connected to the wiring VHE.

In the current supply circuit CS2, a first terminal of the transistor Tr34 is electrically connected to a wiring VLE; a second terminal of the transistor Tr34 is electrically connected to a first terminal of the switch SW2, the first terminal of the switch SW3, and the first terminal of the switch SW4 in the circuit OFAC; and a gate of the transistor Tr34 is electrically connected to a second terminal of the switch SW2 and a first terminal of the capacitor C7. A second terminal of the capacitor C7 is electrically connected to the wiring VLE.

In the circuit OFAC, a second terminal of the switch SW4 is electrically connected to a first terminal of the resistor RE, and a second terminal of the resistor RE is electrically connected to a wiring VcL.

The wiring VHE functions as a wiring which supplies a constant voltage. The constant voltage can be a high-level potential or the like, for example. The wiring VLE functions as a wiring which supplies a constant voltage. The constant voltage can be, for example, a low-level potential, a ground potential, or the like. The wiring VcL functions as a wiring which supplies a constant voltage. The constant voltage can be, for example, a high-level potential, a low-level potential, a ground potential, or the like.

The current mirror circuit CM has a function of supplying a current that corresponds to the potential of the second terminal of the transistor Tr31, from the wiring VHE to the second terminal of the transistor Tr31 and from the wiring VHE to the second terminal of the transistor Tr32. At this time, the amount of current flowing between the source and the drain of the transistor Tr31 and the amount of current flowing between the source and the drain of the transistor Tr32 are preferably equal to each other.

The resistor RE included in the circuit OFAC has a function of converting a current input to the first terminal of the resistor RE to a voltage through the switch SW4. That is, the circuit OFAC functions as a current-voltage conversion circuit, for example.

Next, a specific operation example of the arithmetic circuit MAC1A is described.

First, assume that the retention nodes in the memory cell AM[1] and the memory cell AM[2] included in the memory cell array CA retain $V_{PR}-V_{W[1]}$ and $V_{PR}-V_{W[2]}$, respectively. Assume that the retention nodes in the memory cell AMref[1] and the memory cell AMref[2] included in the memory cell array CA both retain $V_{PR}$. Assume that the potential REFP is input to each of the wiring CL[1] and the wiring CL[2].

At this time, currents flowing through the transistors Tr12 in the memory cell AM[1], the memory cell AM[2], the memory cell AMref[1], and the memory cell AMref[2] are expressed by Formula (E1), Formula (E3), Formula (E2), and Formula (E4), respectively.

Figure 14:
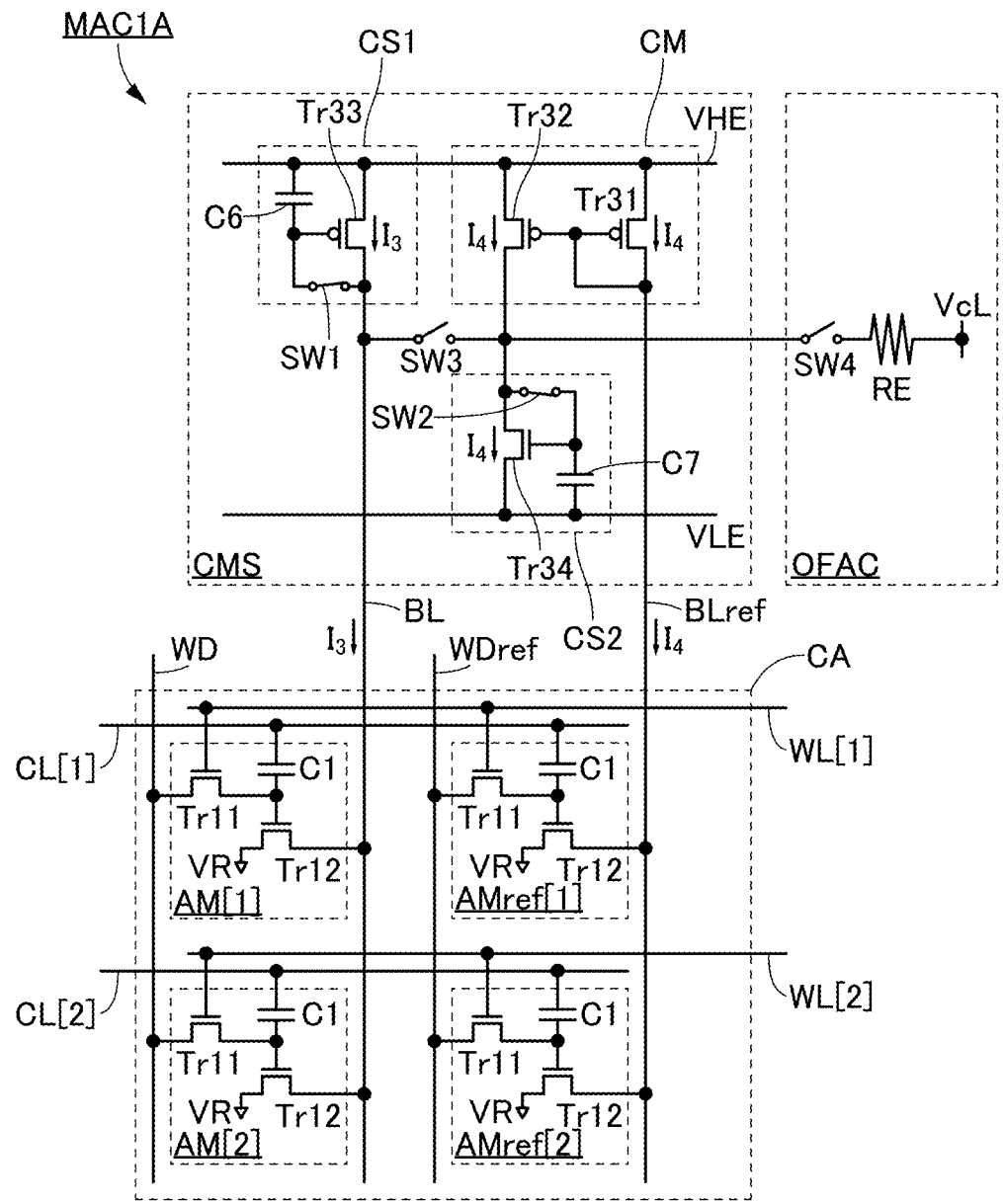
FIG. 14 is a circuit diagram illustrating a structure example of an arithmetic circuit.

Next, as illustrated in FIG. 14, the switch SW1 and the switch SW2 are each brought into on state, and the switch SW3 and the switch SW4 are each brought into off state.

Here, when a current flowing through the wiring BL is $I_3$, the current $I_3$ is a sum of the current flowing between the source and the drain of the transistor Tr12 of the memory cell AM[1] and the current flowing between the source and the drain of the transistor Tr12 of the memory cell AM[2]; thus, $I_3 = I_{AM[1],0} + I_{AM[2],0}$ is satisfied according to Formula (E1) and Formula (E3).

Since the switch SW1 is in on state in the current supply circuit CS1, the transistor Tr33 has a diode-connection structure. Thus, the gate of the transistor Tr33 has a potential corresponding to the current $I_3$, and the current $I_3$ flows between the source and the drain of the transistor Tr33.

By bringing the switch SW1 into off state at this time, the potential corresponding to the current $I_3$ at the gate of the transistor Tr33 is retained by the capacitor C6 in the current supply circuit CS1. Thus, the amount of current output by the current supply circuit CS1 to the wiring BL can be fixed at $I_3$.

Furthermore, when a current flowing through the wiring BLref is $I_4$, the current $I_4$ is a sum of the current flowing between the source and the drain of the transistor Tr12 of the memory cell AMref[1] and the current flowing between the source and the drain of the transistor Tr12 of the memory cell AMref[2]; thus, $I_4 = I_{AMref[1],0} + I_{AMref[2],0}$ is satisfied according to Formula (E2) and Formula (E4).

Thus, the current $I_4$ flows between the source and the drain of the transistor Tr31 in the current mirror circuit CM. Accordingly, the current $I_4$ also flows between the source and the drain of the transistor Tr32.

The current $I_4$ flowing between the source and the drain of the transistor Tr32 flows to the current supply circuit CS2. Since the switch SW2 is in on state, the transistor Tr34 has a diode-connection structure. Thus, the gate of the transistor Tr34 has a potential corresponding to the current $I_4$, and the current $I_4$ flows between the source and the drain of the transistor Tr34.

By bringing the switch SW2 into off state here, the potential corresponding to the current $I_4$ at the gate of the transistor Tr34 is retained by the capacitor C7 in the current supply circuit CS2. Thus, the amount of current output by the current supply circuit CS2 to the wiring VLE can be fixed at $I_4$.

Figure 15:
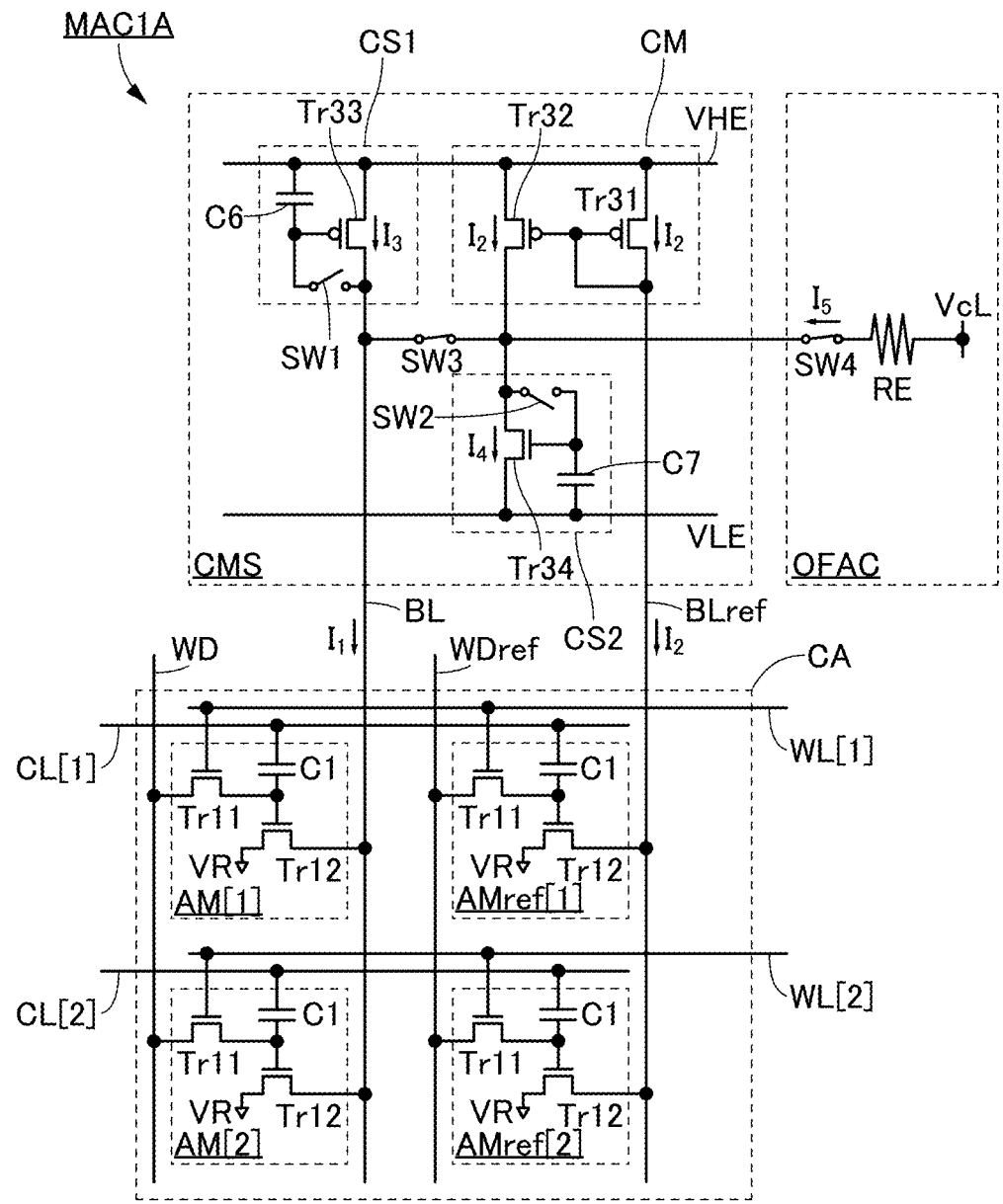
FIG. 15 is a circuit diagram illustrating a structure example of an arithmetic circuit.

Next, assume that the potential of the wiring CL[1] changes to $V_{X[1]}+\text{REFP}$ and the potential of the wiring CL[2] changes to $V_{X[2]}+\text{REFP}$ when the operation changes from FIG. 14 to FIG. 15 in the arithmetic circuit MAC1A.

At this time, currents flowing through the transistors Tr12 in the memory cell AM[1], the memory cell AM[2], the memory cell AMref[1], and the memory cell AMref[2] are changed to those expressed by Formula (E7), Formula (E12), Formula (E8), and Formula (E13), respectively.

As illustrated in FIG. 15, the switch SW3 and the switch SW4 are each brought into on state.

Here, when a current flowing through the wiring BL is $I_1$, the current $I_1$ is a sum of the current flowing between the source and the drain of the transistor Tr12 of the memory cell AM[1] and the current flowing between the source and the drain of the transistor Tr12 of the memory cell AM[2]; thus, $I_1 = I_{AM[1],1} + I_{AMref[2],1}$ is satisfied according to Formula (E7) and Formula (E12).

Furthermore, when a current flowing through the wiring BLref is $I_2$, the current $I_2$ is a sum of the current flowing between the source and the drain of the transistor Tr12 of the memory cell AMref[1] and the current flowing between the source and the drain of the transistor Tr12 of the memory cell AMref[2]; thus, $I_2 = I_{AMref[1],1} + I_{AMref[2],1}$ is satisfied according to Formula (E8) and Formula (E13).

Thus, the current $I_2$ flows between the source and the drain of the transistor Tr31 in the current mirror circuit CM. Accordingly, the current $I_2$ also flows between the source and the drain of the transistor Tr32.

Here, since the switch SW4 in the circuit OFAC is in on state, a current flows between the circuit OFAC and the circuit CMS. When a current flowing between the first terminal and the second terminal of the switch SW4 is $I_5$, the sum of products can be calculated in a manner similar to that of Formula (E16) as follow: $I_5 = I_1 - I_2 - I_3 + I_4 = 2k(V_{W[1]}V_{X[1]} + V_{W[2]}V_{X[2]})$.

Figure 16:
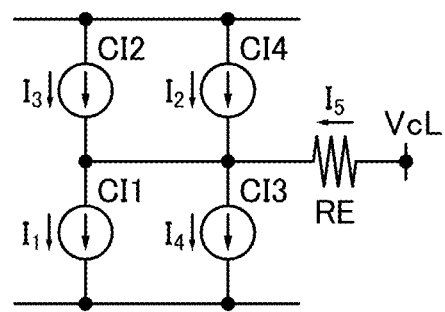
FIG. 16 is a circuit diagram illustrating an example of an equivalent circuit of the arithmetic circuit of FIG. 15.

A circuit equivalent to the arithmetic circuit MAC1A of FIG. 15 is illustrated in FIG. 16. A current source CI1 illustrated in FIG. 16 corresponds to the memory cell AM[1] and the memory cell AM[2] in FIG. 15, a current source CI2 illustrated in FIG. 16 corresponds to the current supply circuit CS1, a current source CI3 illustrated in FIG. 16 corresponds to the current supply circuit CS2, and a current source CI4 illustrated in FIG. 16 corresponds to the current mirror circuit CM2.

Although the memory cell array including memory cells arranged in a matrix of two rows and two columns is used as the memory cell array CA of the arithmetic circuit MAC1A in FIG. 13, a product-sum operation can be similarly performed in a memory cell array of one row and two or more columns and a memory cell array of three or more rows and three or more columns. In a product-sum operation circuit of such a case, memory cells in one of the plurality of columns are used for retaining reference data (potential $V_{PR}$), whereby product-sum operations, the number of which corresponds to the number of the rest of columns among the plurality of columns, can be executed concurrently. Furthermore, increasing the number of rows allows an increase in the number of terms to be added to each other in the product-sum operation; in this case, the current $I_5$ can be expressed by $I_5 = 2k\Sigma V_{W[i]} V_{X[i]}$ in a manner similar to that of Formula (E18).

Here, in the circuit OFAC, the current $I_5$ is converted to a voltage by the resistor RE. Although not illustrated in FIG. 13, the circuit OFAC can be a circuit which performs an arithmetic operation according to the predefined activation function in accordance with the voltage, so that a hierarchical neural network operation can be performed in a manner similar to that of the arithmetic circuit MAC1 in FIG. 9.

<Structure Example 2 of Arithmetic Circuit>

Next, an example of a circuit that performs a product-sum operation and an activation function operation in the above-described neural network 100 and has a different circuit structure from the arithmetic circuit MAC1 is described.

Figure 17:
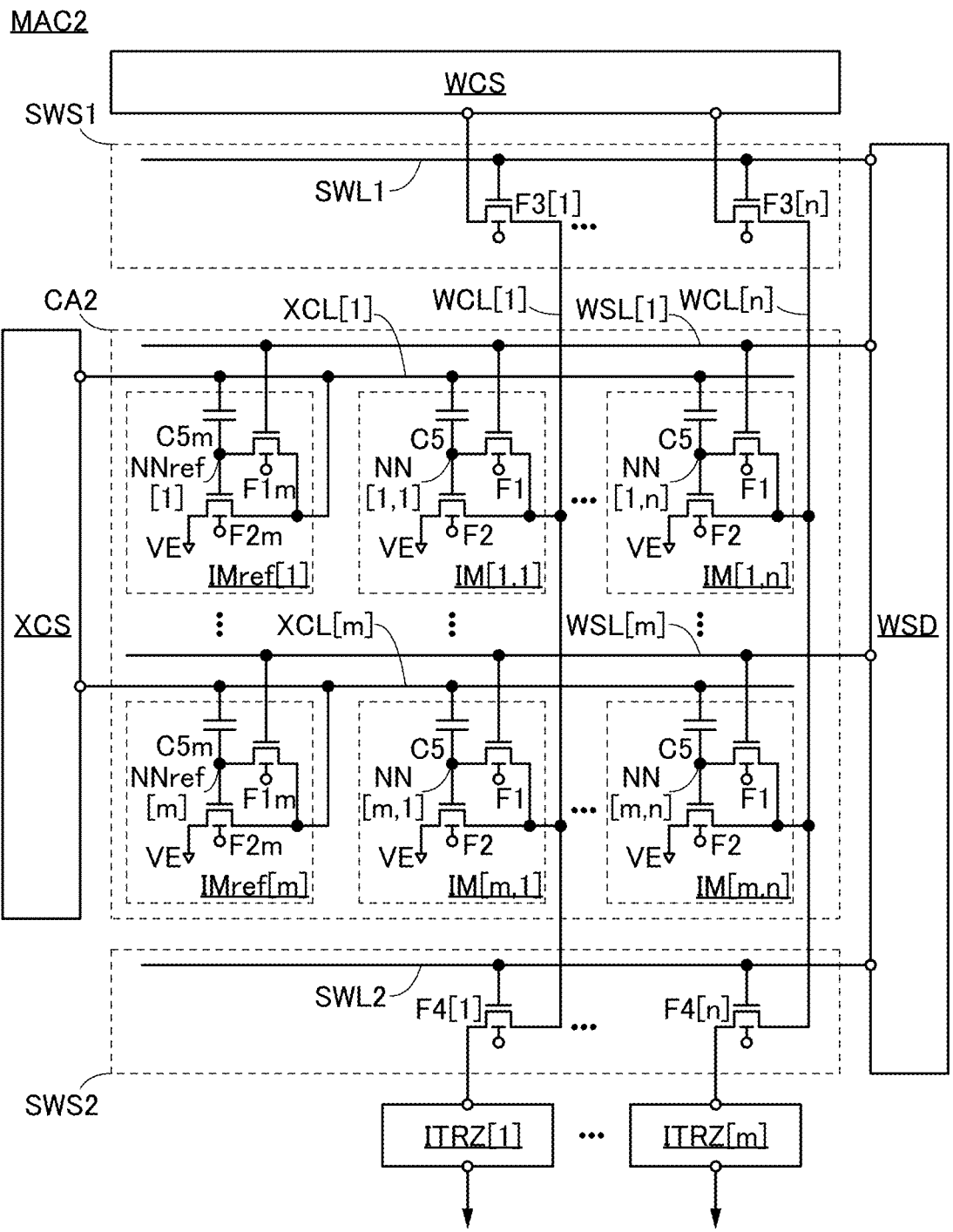
FIG. 17 is a block diagram illustrating a structure example of an arithmetic circuit.

FIG. 17 illustrates a structure example of an arithmetic circuit MAC2. The arithmetic circuit MAC2 illustrated in FIG. 17 is a circuit that performs a product-sum operation using first data corresponding to the voltage retained in each cell and input second data and performs an activation function operation using the product-sum operation result. Note that the first data and the second data can be analog data or multilevel data (discrete data), for example.

The arithmetic circuit MAC2 includes a circuit WCS, a circuit XCS, a circuit WSD, a circuit SWS1, a circuit SWS2, a cell array CA2, and a conversion circuit ITRZ[1] to a conversion circuit ITRZ[m].

The cell array CA2 includes a cell IM[1,1] to a cell IM[m,n] (here, m is an integer greater than or equal to 1 and n is an integer greater than or equal to 1) and a cell IMref[1] to a cell IMref[m]. The cell IM[1,1] to the cell IM[m,n] have a function of retaining a potential corresponding to the amount of current corresponding to the first data, and the cell IMref[1] to the cell IMref[m] have a function of supplying a voltage corresponding to the second data necessary for performing a product-sum operation with the retained potential to signal lines XCL[1] to XCL[m].

In the cell array CA2 in FIG. 17, cells are arranged in a matrix of n+1 rows and m columns; however, the cell array CA2 may have a structure in which cells are arranged in a matrix of two or more rows and one or more columns.

The cell IM[1,1] to the cell IM[m,n] include a transistor F1, a transistor F2, and a capacitor C5, and the cell IMref[1] to the cell IMref[m] each include a transistor F1m, a transistor F2m, and a capacitor C5m.

Unless otherwise specified, the transistor F1 and the transistor F1m in an on state may operate in a linear region in the end. In other words, the gate voltage, the source voltage, and the drain voltage of each of the above-described transistors may be appropriately biased to voltages in the range where the transistors operate in a linear region. However, one embodiment of the present invention is not limited thereto. For example, the transistor F1 and the transistor F1m may operate in a saturation region when in on state. Furthermore, a case where the transistors operate in a linear region and a case where the transistors operate in a saturation region may coexist.

Unless otherwise specified, the transistor F2 and the transistor F2m may operate in a subthreshold region (that is, the gate-source voltage may be lower than the threshold voltage in the transistor F2 or the transistor F2m). In other words, the gate voltage, the source voltage, and the drain voltage of each of the above-described transistors may be appropriately biased to voltages in the range where the transistors operate in a subthreshold region. Thus, the transistor F2 and the transistor F2m may operate so that the off-state current flows between the source and the drain.

Like the transistor Tr11, the transistor F1 and/or the transistor F1m are preferably OS transistors. In addition, it is further preferable that channel formation regions of the transistor F1 and/or the transistor F1m be an oxide containing at least one of indium, the element M (as the element M, one or more kinds selected from aluminum, gallium, yttrium, copper, vanadium, beryllium, boron, titanium, iron, nickel, germanium, zirconium, molybdenum, lanthanum, cerium, neodymium, hafnium, tantalum, tungsten, magnesium, and the like can be given for example), and zinc. It is further preferable that the transistor F1 and/or the transistor F1m have a structure of the transistor described in Embodiment 3, in particular.

With the use of OS transistors as the transistor F1 and/or the transistor F1m, the leakage current of the transistor F1 and/or the transistor F1m can be suppressed, so that a product-sum operation circuit with high computation accuracy can be obtained in some cases. Furthermore, with the use of OS transistors as the transistor F1 and/or the transistor F1m, the amount of leakage current from a retention node to a writing word line can be extremely small when the transistor F1 and/or the transistor F1m are in a non-conduction state. In other words, the frequency of operation for refreshing the potential at the retention node can be reduced; thus, power consumption of the product-sum operation circuit can be reduced.

Furthermore, when using OS transistors also as the transistor F2 and/or the transistor F2m, the transistor F2 and/or the transistor F2m can operate in a current range with a wide subthreshold region, whereby current consumption can be reduced. The use of OS transistors also as the transistor F2 and/or the transistor F2m allows the transistor F2 and/or the transistor F2m to be formed concurrently with the transistor Tr11, leading to a reduction in the number of manufacturing steps for the product-sum operation circuit, in some cases. The transistor F2 and/or the transistor F2m may be transistors including silicon in their channel formation regions. As the silicon, amorphous silicon (referred to as hydrogenated amorphous silicon in some cases), microcrystalline silicon, polycrystalline silicon, single crystal silicon, or the like can be used, for example.

In each of the cell IM[1,1] to the cell IM[m,n], a first terminal of the transistor F1 is electrically connected to a gate of the transistor F2. A first terminal of the transistor F2 is electrically connected to a wiring VE. A first terminal of the capacitor C5 is electrically connected to the gate of the transistor F2.

One embodiment of the present invention does not depend on the connection structure of a back gate of a transistor. In FIG. 17, back gates are illustrated in the transistors F1 and the transistors F2 and a structure including the back gates is illustrated. Although the connection structure of the back gates is not illustrated in FIG. 17, a portion to which the back gates are electrically connected can be determined at the design stage. For example, in a transistor including a back gate, a gate and the back gate may be electrically connected to each other to increase the on-state current of the transistor. In other words, the gate and the back gate of the transistor M2 may be electrically connected to each other, for example. Alternatively, for example, in a transistor including a back gate, a wiring electrically connected to an external circuit or the like may be provided and a potential may be supplied to the back gate of the transistor by the external circuit or the like to change the threshold voltage of the transistor or to reduce the off-state current of the transistor. This can apply to the transistor F1$m$, the transistor F2$m$, a transistor F3[1] to a transistor F3[$n$] and a transistor F4[1] to a transistor F4[$n$], which are described later, transistors described in the other part of the specification, and transistors illustrated in the drawings other than the circuit diagram of FIG. 17.

The semiconductor device of one embodiment of the present invention does not depend on the structure of a transistor included in the semiconductor device. For example, the transistors F1 and the transistors F2 illustrated in FIG. 17 may be transistors having a structure not including a back gate, that is, a single-gate structure as illustrated in FIG. 17. It is also possible that some transistors have a structure including a back gate and the other transistors have a structure not including a back gate. This can apply to the transistor F1$m$, the transistor F2$m$, the transistor F3[1] to the transistor F3[$n$] and the transistor F4[1] to the transistor F4[$n$], which are described later, transistors described in the other part of the specification, and transistors illustrated in the drawings other than the circuit diagram of FIG. 17.

The wiring VE is a wiring for feeding a current between the first terminal and the second terminal of the transistor F2 in each of the cell IM[1,1], a cell IM[m,1], a cell IM[1,$n$], and the cell IM[m,n] and functions as a wiring for feeding a current between the first terminal and the second terminal of the transistor F2 in each of the cell IMref[1] and the cell IMref[m]. The wiring VE functions as a wiring which supplies a constant voltage, for example. The constant voltage can be, for example, a low-level potential, a ground potential, or the like.

In the cell IM[1,1], a second terminal of the transistor F1 is electrically connected to a wiring WCL[1], and a gate of the transistor F1 is electrically connected to a wiring WSL[1]. A second terminal of the transistor F2 is electrically connected to the wiring WCL[1], and a second terminal of the capacitor C5 is electrically connected to the wiring XCL[1]. In FIG. 17, in the cell IM[1,1], a connection portion of the first terminal of the transistor F1, the gate of the transistor F2, and the first terminal of the capacitor C5 is a node NN[1,1].

In the cell IM[m,1], a second terminal of the transistor F1 is electrically connected to the wiring WCL[1], and a gate of the transistor F1 is electrically connected to a wiring WSL[m]. A second terminal of the transistor F2 is electrically connected to the wiring WCL[1], and a second terminal of the capacitor C5 is electrically connected to the wiring XCL[m]. In FIG. 17, in the cell IM[m,1], a connection portion of the first terminal of the transistor F1, the gate of the transistor F2, and the first terminal of the capacitor C5 is a node NN[m,1].

In the cell IM[1,$n$], a second terminal of the transistor F1 is electrically connected to the wiring WCL[n], and a gate of the transistor F1 is electrically connected to the wiring WSL[1]. A second terminal of the transistor F2 is electrically connected to the wiring WCL[n], and a second terminal of the capacitor C5 is electrically connected to the wiring XCL[1]. In FIG. 17, in the cell IM[1,$n$], a connection portion of the first terminal of the transistor F1, the gate of the transistor F2, and the first terminal of the capacitor C5 is a node NN[1,$n$].

In the cell IM[m,n], a second terminal of the transistor F1 is electrically connected to the wiring WCL[n], and a gate of the transistor F1 is electrically connected to the wiring WSL[m]. A second terminal of the transistor F2 is electrically connected to the wiring WCL[n], and a second terminal of the capacitor C5 is electrically connected to the wiring XCL[m]. In FIG. 17, in the cell IM[m,n], a connection portion of the first terminal of the transistor F1, the gate of the transistor F2, and the first terminal of the capacitor C5 is a node NN[m,n].

In the cell IMref[1], a second terminal of the transistor F1$m$ is electrically connected to the wiring XCL[1], and a gate of the transistor F1$m$ is electrically connected to the wiring WSL[1]. A second terminal of the transistor F2$m$ is electrically connected to the wiring XCL[1], and a second terminal of the capacitor C5 is electrically connected to the wiring XCL[1]. In FIG. 17, in the cell IMref[1], a connection portion of the first terminal of the transistor F1$m$, the gate of the transistor F2$m$, and the first terminal of the capacitor C5 is a node NNref[1].

In the cell IMref[m], a second terminal of the transistor F1$m$ is electrically connected to the wiring XCL[m], and a gate of the transistor F1$m$ is electrically connected to the wiring WSL[m]. A second terminal of the transistor F2$m$ is electrically connected to the wiring XCL[m], and a second terminal of the capacitor C5 is electrically connected to the wiring XCL[m]. In FIG. 17, in the cell IMref[m], a connection portion of the first terminal of the transistor F1$m$, the gate of the transistor F2$m$, and the first terminal of the capacitor C5 is a node NNref[m].

The node NN[1,1], the node NN[m,1], the node NN[1,$n$], the node NN[m,n], the node NNref[1], and the node NMref[m] described above function as retention nodes in the cells.

The circuit SWS1 includes the transistor F3[1] to the transistor F3[$n$]. A first terminal of the transistor F3[1] is electrically connected to the wiring WCL[1], a second terminal of the transistor F3[1] is electrically connected to the circuit WCS, and a gate of the transistor F3[1] is electrically connected to a wiring SWL1. A first terminal of a transistor F3[$m$] is electrically connected to a wiring WCL[$m$], a second terminal of the transistor F3[$m$] is electrically connected to the circuit WCS, and a gate of the transistor F3[$m$] is electrically connected to the wiring SWL1.

Like the transistor Tr11, the transistor F3[1] to the transistor F3[$n$] are preferably OS transistors. In addition, it is further preferable that channel formation regions of the transistor F1 and/or the transistor F1$m$ be an oxide containing at least one of indium, the element M (as the element M, one or more kinds selected from aluminum, gallium, yttrium, copper, vanadium, beryllium, boron, titanium, iron, nickel, germanium, zirconium, molybdenum, lanthanum, cerium, neodymium, hafnium, tantalum, tungsten, magnesium, and the like can be given for example), and zinc. It is further preferable that the transistor F3[1] to the transistor F3[$n$] have a structure of the transistor described in Embodiment 3, in particular.

The circuit SWS1 functions as a circuit that performs switching between the conduction state and the non-conduction state between the circuit WCS and each of the wiring WCL[1] to the wiring WCL[n].

The circuit SWS2 includes the transistor F4[1] to the transistor F4[$n$]. A first terminal of the transistor F4[1] is electrically connected to the wiring WCL[1], a second terminal of the transistor F4[1] is electrically connected to the conversion circuit ITRZ[1], and a gate of the transistor F4[1] is electrically connected to a wiring SWL2. A first terminal of a transistor F4[m] is electrically connected to the wiring WCL[m], a second terminal of the transistor F4[m] is electrically connected to the conversion circuit ITRZ[1], and a gate of the transistor F4[m] is electrically connected to the wiring SWL2.

Like the transistor Tr11, the transistor F4[1] to the transistor F4[n] are preferably OS transistors. In addition, it is further preferable that channel formation regions of the transistor F1 and/or the transistor F1m be an oxide containing at least one of indium, the element M (as the element M, one or more kinds selected from aluminum, gallium, yttrium, copper, vanadium, beryllium, boron, titanium, iron, nickel, germanium, zirconium, molybdenum, lanthanum, cerium, neodymium, hafnium, tantalum, tungsten, magnesium, and the like can be given for example), and zinc. It is further preferable that the transistor F4[1] to the transistor F4[n] have a structure of the transistor described in Embodiment 3, in particular.

The circuit SWS2 functions as a circuit that performs switching between the conduction state and the non-conduction state between the wiring WCL[1] and the circuit ITRZ[1] and between the wiring WCL[n] and the circuit ITRZ[n].

The circuit WCS has a function of transmitting data that is to be stored in each cell included in the cell array CA2.

The circuit XCS is electrically connected to the wiring XCL[1] to the wiring XCL[m]. The circuit XCS has a function of feeding a current corresponding to the reference data or a current corresponding to the second data to each of the cells IMref[1] to IMref[m] included in the cell array CA2.

The circuit WSD is electrically connected to the wiring WSL[1] to the wiring WSL[m]. The circuit WSD has a function of selecting a memory cell to which data writing is to be performed by transmitting a predetermined signal to the wiring WSL[1] to the wiring WSL[m] when the first data is written to a cell included in the cell array CA2.

The circuit WSD is electrically connected to the wiring SWL1 and the wiring SWL2. The circuit WSD has a function of creating the conduction state or the non-conduction state between the circuit WCS and the cell array CA2 by transmitting a predetermined signal to the wiring SWL1 and a function of creating the conduction state or the non-conduction state between the conversion circuit ITRZ [1] to the conversion circuit ITRZ[m] and the cell array CA2 by transmitting a predetermined signal to the wiring SWL2.

Each of the conversion circuit ITRZ[1] to the conversion circuit ITRZ[m] includes an input terminal and an output terminal. The conversion circuit ITRZ[1] to the conversion circuit ITRZ[m] each have a function of converting a current input to the input terminal to a voltage corresponding to the input current and outputting the voltage from the output terminal. The circuit OFST can be used as each of the conversion circuits ITRZ[1] to ITRZ[m], for example. Furthermore, the conversion circuit ITRZ[1] to the conversion circuit ITRZ[m] may each include the activation function circuit ACTV so that they can perform an activation function operation using the voltage obtained by conversion and output the operation result to the output terminal.

<Operation Example 2 of Arithmetic Circuit>

Next, an operation example of the arithmetic circuit MAC2 is described.

Figure 18:
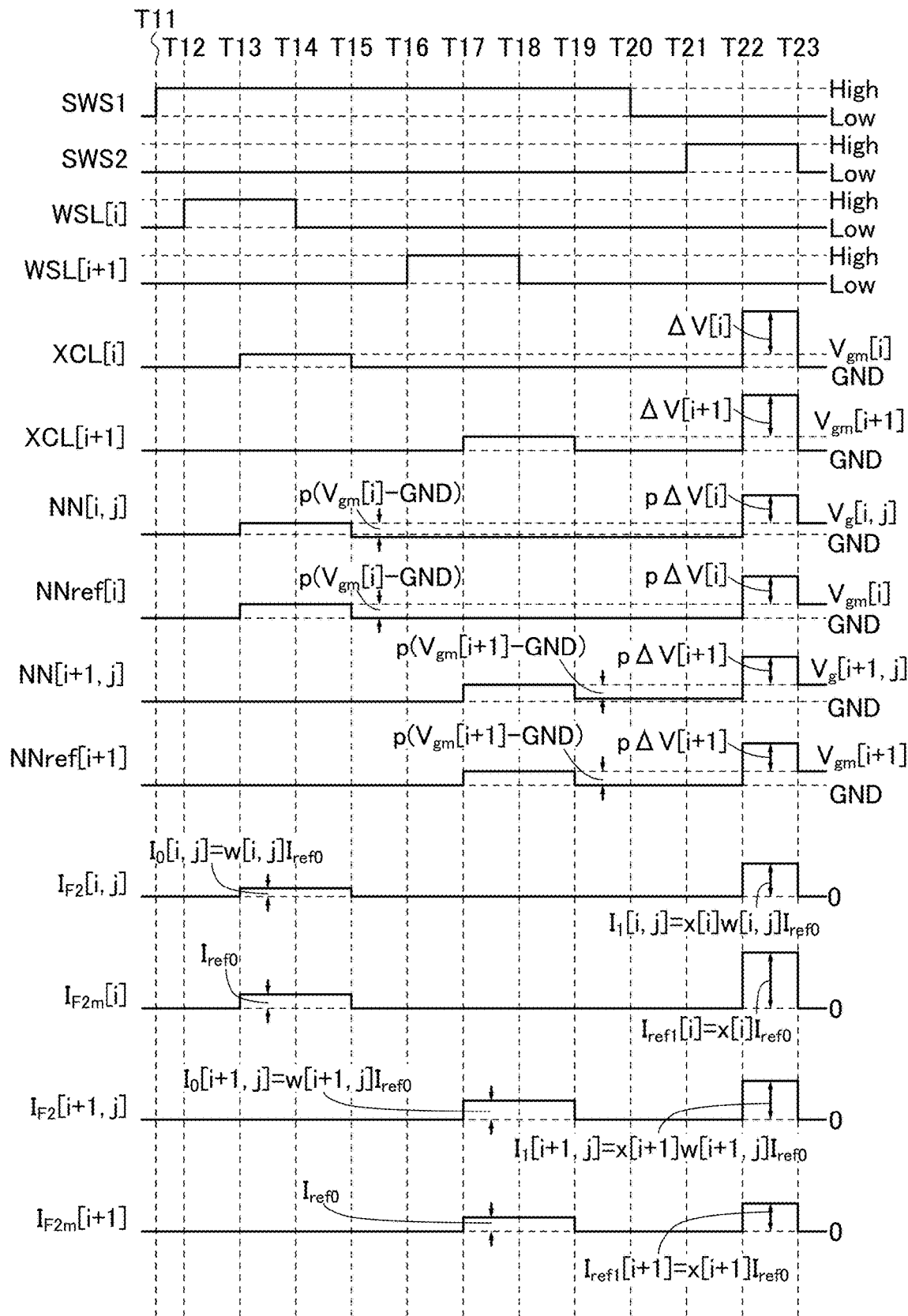
FIG. 18 is a timing chart illustrating an operation example of an arithmetic circuit.

FIG. 18 shows a timing chart of the operation example of the arithmetic circuit MAC2. The timing chart of FIG. 18 shows changes in the potentials of the wiring SWL1, the wiring SWL2, a wiring WSL[i] (i is an integer greater than or equal to 1 and less than or equal to m−1), a wiring WSL[i+1], a wiring XCL[i], a wiring XCL[i+1], a node NN[i,j], a node NNref[i], a node NN[i+1,j], and a node NNref[i+1] from Time T11 to Time T23 and in the vicinity thereof. Furthermore, the timing chart of FIG. 18 also shows changes in the amount of current $I_{F2}[i,j]$ flowing between a first terminal and a second terminal of the transistor F2 included in a cell IM[i,j], the amount of current $I_{F2m}[i]$ flowing between a first terminal and a second terminal of the transistor F2m included in a cell IMref[i], the amount of current $I_{F2}[i+1,j]$ flowing between a first terminal and a second terminal of the transistor F2 included in a cell IM[i+1,j], and the amount of current $I_{F2m}[i+1]$ flowing between a first terminal and a second terminal of the transistor F2m included in a cell IMref[i+1].

In this operation example, the potential of the wiring VE is set at a ground potential GND. Before Time T11, each of the transistors F1 included in the cell IM[i,j] and the cell IM[i+1,j] and the transistors F1m included in the cell IMref[i] and the cell IMref[i+1] are brought into on state so that the potentials at the node NN[i,j], the node NNref[i], the node NN[i+1,j], and the node NNref[i+1] each become the ground potential GND.

As initial settings, each of the transistors F1 included in the cell IM[1,1] to the cell IM[m,n] and the transistors F1m included in the cell IMref[1] to the cell IMref[m] are brought into on state so that the potentials at the node NN[1,1] to the node NN[m,n] and the node NNref[1] to the node NNref[m] become the ground potential GND.

<<From Time T11 to Time T12>>

During a period from Time T11 to Time T12, a high-level potential (denoted by High in FIG. 18) is applied to the wiring SWL1, and a low-level potential (denoted by Low in FIG. 18) is applied to the wiring SWL2. Accordingly, a high-level potential is applied to each of the gates of the transistor F3[1] to the transistor F3[n] to bring each of the transistors F3[1] to F3[n] into on state, and a low-level potential is applied to each of the gates of the transistor F4[1] to the transistor F4[n] to bring each of the transistors F4[1] to F4[n] into off state.

During the period from Time T11 to Time T12, a low-level potential is applied to the wiring WSL[i] and the wiring WSL[i+1]. Accordingly, the low-level potential is applied to the gates of the transistors F1 included in a cell IM[i,1] to a cell IM[i,n] and the gate of the transistor F1m included in the cell IMref[i] in the i-th row in the cell array CA2, so that the transistors F1 and the transistor F1m are brought into off state. In addition, the low-level potential is applied to the gates of the transistors F1 included in a cell IM[i+1,1] to a cell IM[i+1,n] and the gate of the transistor F1m included in the cell IMref[i+1] in the i+1-th row in the cell array CA2, so that the transistors F1 and the transistor F1m are brought into off state.

During the period from Time T11 to Time T12, the ground potential GND is applied to the wiring XCL[i] and the wiring XCL[i+1].

During the period from Time T11 to Time T12, a current does not flow through a wiring WCL[j], the wiring XCL[i], and the wiring XCL[i+1]; thus, $I_{F2}[i,j]$, $I_{F2m}[i]$ $I_{F2}[i+1,j]$, and $I_{F2m}[i+1]$ are 0.

<<From Time T12 to Time T13>>

During a period from Time T12 to Time T13, a high-level potential is applied to the wiring WSL[i]. Accordingly, the high-level potential is applied to the gates of the transistors F1 included in the cell IM[i,1] to the cell IM[i,n] and the gate of the transistor F1m included in the cell IMref[i] in the i-th row in the cell array CA2, so that the transistors F1 and the transistor F1m are brought into on state. During the period from Time T12 to Time T13, a low-level potential is applied to the wiring WSL[1] to the wiring WSL[m] except the wiring WSL[i], and the transistors F1 included in the cell IM[1,1] to the cell IM[m,n] in the rows except the i-th row and the transistors F1m included in the cell IMref[1] to the cell IMref[m] in the rows except the i-th row in the cell array CA2 are in off state.

Furthermore, a low-level potential is applied to the wiring XCL[1] to the wiring XCL[m].

<<From Time T13 to Time T14>>

During a period from Time T13 to Time T14, a current with a current amount $I_0[i,j]$ flows from the circuit WCS through a transistor F3[j] to the cell array CA2. At this time, a conduction state is made between the wiring WCL[j] and the first terminal of the transistor F1 included in the cell IM[i,j] in the i-th row of the cell array CA2, and a non-conduction state is made between the wiring WCL[j] and the first terminals of the transistors F1 included in a cell IM[1,j] to a cell IM[m,j] in the rows except the i-th row of the cell array CA2; accordingly, a current with a current amount $I_0[i,j]$ flows from the wiring WCL[j] to the cell IM[i,j].

Note that when the transistor F1 included in the cell IM[i,j] is in on state, the transistor F2 included in the cell IM[i,j] has a diode-connection structure. Therefore, when a current flows from the wiring WCL[j] to the cell IM[i,j], the gate of the transistor F2 and the second terminal of the transistor F2 have a substantially equal potential. The potential is determined by the amount of current flowing from the wiring WCL[j] to the cell IM[i,j], the potential of the first terminal of the transistor F2 (here, GND), and the like. In this operation example, the flow of the current with the current amount $I_0[i,j]$ from the wiring WCL[j] to the cell IM[i,j] causes the potential of the gate of the transistor F2 (the node NN[i,j]) to become $V_g[i,j]$. That is, in the transistor F2, the gate-source voltage becomes $V_g[i,j]$–GND, and a current with the current amount $I_0[i,j]$ flows between the first terminal and the second terminal of the transistor F2.

Here, when the threshold voltage of the transistor F2 is $V_{th}$, the current amount $I_0[i,j]$ in the case where the transistor F2 operates in a subthreshold region can be expressed by the following formula.

[Formula 26]

$$I_0[i,j]=I_a \exp\{K(V_g[i,j]-V_{th}[i,j])\} \quad (F1)$$

Note that $I_a$ is a drain current for the case where $V_g$ is $V_{th}[i,j]$, and K is a correction coefficient determined by the temperature, the device structure, and the like.

During the period from Time T13 to Time T14, a current with a current amount $I_{ref0}$ flows from the circuit XCS to the wiring XCL[i]. At this time, since a conduction state is made between the first terminal of the transistor F1m included in the cell IMref[i] and the wiring XCL[i], a current with the current amount $I_{ref0}$ flows from the wiring XCL[i] to the cell IMref[i].

As in the cell IM[i,j], when the transistor F1m included in the cell IMref[i] is in on state, the transistor F2m included in the cell IMref[i,j] has a diode-connection structure. Therefore, when a current flows from the wiring XCL[i] to the cell IMref[i], the gate of the transistor F2m and the second terminal of the transistor F2m have a substantially equal potential. The potential is determined by the amount of current flowing from the wiring XCL[i] to the cell IMref[i], the potential of the first terminal of the transistor F2m (here, GND), and the like. In this operation example, the flow of the current with the current amount $I_{ref0}$ from the wiring XCL[i] to the cell IMref[i] causes the gate of the transistor F2 (the node NNref[i]) to have $V_{gm}[i]$; at this time, the potential of the wiring XCL[i] is $V_{gm}[i]$. That is, in the transistor F2m, the gate-source voltage becomes $V_{gm}[i]$–GND, and a current with the current amount $I_{ref0}$ flows between the first terminal and the second terminal of the transistor F2m.

Here, when the threshold voltage of the transistor F2m is $V_{thm}[i]$, the current amount $I_{ref0}$ in the case where the transistor F2m operates in a subthreshold region can be expressed by the following formula. Note that the correction coefficient K is the same as that for the transistor F2 included in the cell IM[i,j]. For example, the same device structure and the same size (channel length, channel width) are used for the transistors. Furthermore, although variations in manufacturing cause variations in the correction coefficient K among the transistors, the variations in the correction coefficient K are suppressed to the extent that the argument described later can be made with sufficient precision for practical purposes.

[Formula 27]

$$I_{ref0}=I_a \exp\{K(V_{gm}[i]-V_{thm}[i])\} \quad (F2)$$

Here, a weight coefficient w[i,j], which is the first data, is defined as follows.

[Formula 28]

$$w[i,j]=\exp\{K(V_g[i,j]-V_{th}[i,j]-V_{gm}[i]+V_{thm}[i])\} \quad (F3)$$

Accordingly, Formula (F1) can be rewritten to the following formula.

[Formula 29]

$$I_0[i,j]=w[i,j]I_{ref0} \quad (F4)$$

<<From Time T14 to Time T15>>

During a period from Time T14 to Time T15, a low-level potential is applied to the wiring WSL[i]. Accordingly, the low-level potential is applied to the gates of the transistors F1 included in the cell IM[i,1] to the cell IM[i,n] and the gate of the transistor F1m included in the cell IMref[i] in the i-th row in the cell array CA2, so that the transistors F1 and the transistor F1m are brought into off state.

When the transistor F1 included in the cell IM[i,j] is brought into off state, $V_g[i,j]$–$V_{gm}[i]$, which is a difference between the potential of the gate of the transistor F2 (the node NN[i,j]) and the potential of the wiring XCL[i], is retained in the capacitor C5. When the transistor F1 included in the cell IMref[i] is brought into off state, 0, which is a difference between the potential of the gate of the transistor F2m (the node NNref[i]) and the potential of the wiring XCL[i], is retained in the capacitor C5m. Note that in the operation from Time T13 to Time T14, the potential retained in the capacitor C5m might be a potential that is not 0 (here, Δ) depending on transistor characteristics of the transistor F1m and the transistor F2m and the like. However, the following argument is made assuming that the potential of the node NNref[i] becomes a sum of the potential of the wiring XCL[i] and Δ.

<<From Time T15 to Time T16>>

During a period from Time T15 to Time T16, GND is applied to the wiring XCL[i]. Thus, the potentials of a node NN[i,1] to a node NN[i,n] change owing to the capacitive coupling by the capacitor C5 included in each of the cell IM[i,1] to the cell IM[i,n] in the i-th row, and the potential of the node NNref[i] changes owing to the capacitive coupling by the capacitor C5 included in the cell IMref[i].

The amount of change in the potentials of the node NN[i,1] to the node NN[i,n] is a potential that is the amount of change in the potential of the wiring XCL[i] multiplied by the capacitive coupling coefficient determined by a structure of each of the cells IM[i,1] to IM[i,n] included in the cell array CA2. The capacitive coupling coefficient is calculated using the capacitance of the capacitor C5, the gate capacitance of the transistor F2, the parasitic capacitance, and the like. When the coefficient of capacitive coupling due to the capacitor C5 is p in each of the cells IM[i,1] to IM[i,n], the potential of the node NN[i,j] in the cell IM[i,j] decreases by $p(V_{gm}[i]-GND)$ from the potential of the period from Time T14 to Time T15.

Similarly, when the potential of the wiring XCL[i] changes, the potential of the node NNref[i] also changes owing to the capacitive coupling by the capacitor C5m included in the cell IMref[i]. When the coefficient of capacitive coupling due to the capacitor C5m is p similar to the coefficient of capacitive coupling due to the capacitor C5, the potential of the node NNref[i] in the cell IMref[i] decreases by $p(V_{gm}[i]-GND)$ from the potential of the period from Time T14 to Time T15.

This causes a decrease in the potential of the node NN[i,j] in the cell IM[i,j] and brings the transistor F2 into off state, and also causes a decrease in the potential of the node NNref[i] in the cell IMref[i] and brings the transistor F2m into off state. Therefore, during the period from Time T15 to Time T16, $I_{F2}[i,j]$ and $I_{F2m}[i]$ are each 0.

<<From Time T16 to Time T17>>

During a period from Time T16 to Time T17, a high-level potential is applied to the wiring WSL[i+1]. Accordingly, the high-level potential is applied to the gates of the transistors F1 included in the cell IM[i+1,1] to the cell IM[i+1,n] and the gate of the transistor F1m included in the cell IMref[i+1] in the i+1-th row in the cell array CA2, so that the transistors F1 and the transistor F1m are brought into on state. During the period from Time T16 to Time T17, a low-level potential is applied to the wiring WSL[1] to the wiring WSL[m] except the wiring WSL[i+1], and the transistors F1 included in the cell IM[1,1] to the cell IM[m,n] in the rows except the i+1-th row and the transistors F1m included in the cell IMref[1] to the cell IMref[m] in the rows except the i+1-th row in the cell array CA2 are in off state.

Furthermore, a low-level potential is applied to the wiring XCL[1] to the wiring XCL[m].

<<From Time T17 to Time T18>>

During a period from Time T17 to Time T18, a current with a current amount $I_0[i+1,j]$ flows from the circuit WCS through the transistor F3[j] to the cell array CA2. At this time, a conduction state is made between the wiring WCL[j] and the first terminal of the transistor F1 included in the cell IM[i+1,j] in the i+1-th row of the cell array CA2, and a non-conduction state is made between the wiring WCL[j] and the first terminals of the transistors F1 included in the cell IM[1,j] to the cell IM[m,j] in the rows except the i+1-th row of the cell array CA2; accordingly, a current with the current amount $I_0[i+1,j]$ flows from the wiring WCL[j] to the cell IM[i+1,j].

Note that when the transistor F1 included in the cell IM[i+1,j] is in on state, the transistor F2 included in the cell IM[i+1,j] has a diode-connection structure. Therefore, when a current flows from the wiring WCL[j] to the cell IM[i+1,j], the gate of the transistor F2 and the second terminal of the transistor F2 have a substantially equal potential. The potential is determined by the amount of current flowing from the wiring WCL[j] to the cell IM[i+1,j], the potential of the first terminal of the transistor F2 (here, GND), and the like. In this operation example, the flow of the current with the current amount to $I_0[i+1,j]$ from the wiring WCL[j] to the cell IM[i+1,j] causes the potential of the gate of the transistor F2 (the node NN[i+1,j]) to become $V_g[i+1,j]$. That is, in the transistor F2, the gate-source voltage becomes $V_g[i+1,j]-GND$, and a current with the current amount $I_0[i+1,j]$ flows between the first terminal and the second terminal of the transistor F2.

Here, when the threshold voltage of the transistor F2 is $V_{th}[i+1,j]$, the current amount $I_0[i+1,j]$ in the case where the transistor F2 operates in a subthreshold region can be expressed by the following formula. Note that the correction coefficient is K similar to that of the transistor F2 included in the cell IM[i,j] and the transistor F2m included in the cell IMref[i].

[Formula 30]

$$I_0[i+1,j]=I_a \exp\{K(V_g[i+1,j]-V_{th}[i+1,j])\} \tag{F5}$$

During the period from Time T17 to Time T18, a current with a current amount Lao flows from the circuit XCS to the wiring XCL[i+1]. At this time, since a conduction state is made between the first terminal of the transistor F1m included in the cell IMref[i+1] and the wiring XCL[i+1], a current with the current amount $I_{ref0}$ flows from the wiring XCL[i+1] to the cell IMref[i+1].

As in the cell IM[i+1,j], when the transistor F1m included in the cell IMref[i+1] is in on state, the transistor F2m included in the cell IMref[i+1,j] has a diode-connection structure. Therefore, when a current flows from the wiring XCL[i+1] to the cell IMref[i+1], the gate of the transistor F2m and the second terminal of the transistor F2m have a substantially equal potential. The potential is determined by the amount of current flowing from the wiring XCL[i+1] to the cell IMref[i+1], the potential of the first terminal of the transistor F2m (here, GND), and the like. In this operation example, the flow of the current with the current amount $I_{ref0}$ from the wiring XCL[i+1] to the cell IMref[i+1] causes the gate of the transistor F2 (the node NNref[i+1]) to have $V_{gm}[i+1]$; at this time, the potential of the wiring XCL[i+1] is $V_{gm}[i+1]$. That is, in the transistor F2m, the gate-source voltage becomes $V_{gm}[i+1]-GND$, and a current with the current amount $I_{ref0}$ flows between the first terminal and the second terminal of the transistor F2m.

Here, when the threshold voltage of the transistor F2m is $V_{thm}[i+1,j]$, the current amount $I_{ref0}$ in the case where the transistor F2m operates in a subthreshold region can be expressed by the following formula. Note that the correction coefficient K is the same as that for the transistor F2 included in the cell IM[i+1,j].

[Formula 31]

$$I_{ref0}=I_a \exp\{K(V_{gm}[i+1]-V_{thm}[i+1])\} \tag{F6}$$

Here, the weight coefficient w[i+1,j], which is the first data, is defined as follows.

[Formula 32]

$$w[i+1,j]=\exp\{K(V_g[i+1,j]-V_{th}[i+1,j]-V_{gm}[i+1]+V_{thm}[i+1])\} \tag{F7}$$

Accordingly, Formula (F5) can be rewritten to the following formula.

[Formula 33]

$$I_0[i+1,j]=w[i+1,j]I_{ref0} \tag{F8}$$

<<From Time T18 to Time T19>>

During a period from Time T18 to Time T19, a low-level potential is applied to the wiring WSL[i+1]. Accordingly, the low-level potential is applied to the gates of the transistors F1 included in the cell IM[i+1,1] to the cell IM[i+1,n] and the gate of the transistor F1m included in the cell IMref[i+1] in the i-th row in the cell array CA2, so that the transistors F1 and the transistor F1m are brought into off state.

When the transistor F1 included in the cell IM[i+1,j] is brought into off state, $V_g[i+1,j]-V_{gm}[i+1]$, which is a difference between the potential of the gate of the transistor F2 (the node NN[i+1,j]) and the potential of the wiring XCL[i+1], is retained in the capacitor C5. When the transistor F1 included in the cell IMref[i+1] is brought into off state, 0, which is a difference between the potential of the gate of the transistor F2m (the node NNref[i+1]) and the potential of the wiring XCL[i+1], is retained in the capacitor C5m. Note that in the operation from Time T18 to Time T19, the potential retained in the capacitor C5m might be a potential that is not 0 (here, $\Delta$) depending on transistor characteristics of the transistor F1m and the transistor F2m and the like. However, the following argument is made assuming that the potential of the node NNref[i] becomes a sum of the potential of the wiring XCL[i] and $\Delta$.

<<From Time T19 to Time T20>>

During a period from Time T19 to Time T20, GND is applied to the wiring XCL[i+1]. Thus, the potentials of a node NN[i,1] to a node NN[i+1,n] change owing to the capacitive coupling by the capacitor C5 included in each of the cell IM[i+1,1] to the cell IM[i+1,n] in the i+1-th row, and the potential of the node NNref[i+1] changes owing to the capacitive coupling by the capacitor C5 included in the cell IMref[i+1].

The amount of change in the potentials of the node NN[i+1,1] to the node NN[i+1,n] is a potential that is the amount of change in the potential of the wiring XCL[i+1] multiplied by the capacitive coupling coefficient determined by a structure of each of the cells IM[i+1,1] to IM[i+1,n] included in the cell array CA2. The capacitive coupling coefficient is calculated using the capacitance of the capacitor C5, the gate capacitance of the transistor F2, the parasitic capacitance, and the like. When the coefficient of capacitive coupling due to the capacitor C5 is pin each of the cell IM[i+1,1] to the cell IM[i+1,n] similar to the coefficient of capacitive coupling due to the capacitor C5 in each of the cell IM[i,1] to the cell IM[i,n], the potential of the node NN[i+1,j] in the cell IM[i+1,j] decreases by $p(V_{gm}[i+1]-$GND) from the potential of the period from Time T18 to Time T19.

Similarly, when the potential of the wiring XCL[i+1] changes, the potential of the node NNref[i+1] also changes owing to the capacitive coupling by the capacitor C5m included in the cell IMref[i+1]. When the coefficient of capacitive coupling due to the capacitor C5m is p similar to the coefficient of capacitive coupling due to the capacitor C5, the potential of the node NNref[i+1] in the cell IMref[i+1] decreases by $p(V_gm[i+1]-$GND) from the potential of the period from Time T18 to Time T19.

This causes a decrease in the potential of the node NN[i+1,j] in the cell IM[i+1,j] and brings the transistor F2 into off state, and also causes a decrease in the potential of the node NNref[i] in the cell IMref[i+1] and brings the transistor F2m into off state. Therefore, during the period from Time T19 to Time T20, $I_{F2}[i+1,j]$ and $I_{F2m}[i+1]$ are each 0.

<<From Time T20 to Time T21>>

During a period from Time T20 to Time T21, a low-level potential is applied to the wiring SWL1. Thus, the low-level potential is applied to each of the gates of the transistor F3[1] to the transistor F3[n]; accordingly, the transistor F3[1] to the transistor F3[n] are each brought into off state.

<<From Time T21 to Time T22>>

During a period from Time T21 to Time T22, a high-level potential is applied to the wiring SWL2. Thus, the high-level potential is applied to each of the gates of the transistor F4[1] to the transistor F4[n]; accordingly, the transistor F4[1] to the transistor F4[n] are each brought into off state.

<<From Time T22 to Time T23>>

During a period from Time T22 to Time T23, a current with a current amount $x[i]I_{ref0}$, which is x[i] times $I_{ref0}$, flows from the circuit XCS to the wiring XCL[i]. In this operation example, x corresponds to the signal value of a neuron, which is the second data. At this time, the potential of the wiring XCL[i] changes from 0 to $V_{gm}[i]+\Delta V[i]$.

When the potential of the wiring XCL[i] changes, the potentials of the node NN[i,1] to the node NN[i,n] also change owing to the capacitive coupling by the capacitor C5 included in each of the cell IM[i,1] to the cell IM[i,n] in the i-th row of the cell array CA2. Therefore, the potential of the node NN[i,j] in the cell IM[i,j] becomes $V_g[i,j]+p\Delta V[i]$.

Similarly, when the potential of the wiring XCL[i] changes, the potential of the node NNref[i] also changes owing to the capacitive coupling by the capacitor C5m included in the cell IMref[i]. Therefore, the potential of the node NNref[i] in the cell IMref[i] becomes $V_{gm}[i]+p\Delta V[i]$.

Thus, in the period from Time T22 to Time T23, a current $I_1[i,j]$ flowing between the first terminal and the second terminal of the transistor F2 and a current $I_{ref1}[i,j]$ flowing between the first terminal and the second terminal of the transistor F2m can be expressed as follows.

[Formula 22]

$$I_1[i,j] = I_a \exp\{K(V_g[i,j] + p\Delta V[i] - V_{th}[i,j])\} \quad (F9)$$
$$= I_0[i,j]\exp(Kp\Delta V[i])$$

[Formula 22]

$$I_{ref1}[i] = I_a \exp\{K(V_{gm}[i] + p\Delta V[i] - V_{thm}[i])\} \quad (F10)$$
$$= x[i]I_{ref0}$$

From Formula (F9) and Formula (F10), x[i] can be expressed by the following formula.

[Formula 36]

$$x[i] = \exp(Kp\Delta V[i]) \quad (F11)$$

Accordingly, Formula (F9) can be rewritten to the following formula.

[Formula 37]

$$I_1[i,j] = x[i]w[i,j]I_{ref0} \quad (F12)$$

That is, the current flowing between the first terminal and the second terminal of the transistor F2 included in the cell IM[i,j] is proportional to the product of the weight coefficient w[i,j], which is the first data, and the signal value x[i] of a neuron, which is the second data.

Furthermore, during the period from Time T22 to Time T23, a current with a current amount $x[i+1]I_{ref0}$, which is x[i+1] times $I_{ref0}$, flows from the circuit XCS to the wiring XCL[i+1]. In this operation example, x corresponds to the signal value of a neuron, which is the second data. At this time, the potential of the wiring XCL[i+1] changes from 0 to $V_{gm}[i+1]+\Delta V[i+1]$.

When the potential of the wiring XCL[i+1] changes, the potentials of the node NN[i+1,1] to the node NN[i+1,n] also change owing to the capacitive coupling by the capacitor C5 included in each of the cell IM[i+1,1] to the cell IM[i+1,n] in the i+1-th row of the cell array CA2. Therefore, the potential of the node NN[i+1,j] in the cell IM[i+1,j] becomes $V_g[i+1,j]+p\Delta V[i+1]$.

Similarly, when the potential of the wiring XCL[i+1] changes, the potential of the node NNref[i+1] also changes owing to the capacitive coupling by the capacitor C5m included in the cell IMref[i+1]. Therefore, the potential of the node NNref[i+1] in the cell IMref[i+1] becomes $V_{gm}[i+1]+p\Delta V[i+1]$.

Thus, in the period from Time T22 to Time T23, a current $I_1[i+1,j]$ flowing between the first terminal and the second terminal of the transistor F2 and a current $I_{ref1}[i+1,j]$ flowing between the first terminal and the second terminal of the transistor F2m can be expressed as follows.

[Formula 38]

$$I_1[i+1, j] = I_a \exp\{K(V_g[i+1, j] + p\Delta V[i+1] - V_{th}[i+1, j])\} \quad (F13)$$
$$= I_0[i+1, j]\exp(Kp\Delta V[i+1])$$

[Formula 39]

$$I_{ref1}[i+1] = I_a \exp\{K(V_{gm}[i+1] + p\Delta V[i+1] - V_{thm}[i+1])\} \quad (F14)$$
$$= x[i+1]I_{ref0}$$

From Formula (F13) and Formula (F14), x[i+1] can be expressed by the following formula.

[Formula 40]

$$x[i+1]=\exp(Kp\Delta V[i+1]) \quad (F15)$$

Accordingly, Formula (F13) can be rewritten to the following formula.

[Formula 41]

$$I_1[i+1,j]=x[i+1]w[i+1,j]I_{ref0} \quad (F16)$$

That is, the current flowing between the first terminal and the second terminal of the transistor F2 included in the cell IM[i+1,j] is proportional to the product of the weight coefficient w[i+1,j], which is the first data, and the signal value x[i+1] of a neuron, which is the second data.

Here, the sum total of currents flowing from a conversion circuit ITRZ[j] through a transistor F4[j] and the wiring WCL[j] to the cell IM[i,j] and the cell IM[i+1,j] is considered. When the sum total of currents is $I_S[j]$, $I_S[j]$ can be expressed by the following formula according to Formula (F12) and Formula (F16).

[Formula 42]

$$I_S[j] = I_1[i, j] + I_1[i+1, j] \quad (F17)$$
$$= I_{ref0}(x[i]w[i, j] + x[i+1]w[i+1, j])$$

Thus, the current output from the conversion circuit ITRZ[j] is proportional to the sum of products of weight coefficients w[i,j] and w[i+1,j], which are the first data, and the signal values x[i] and x[i+1] of neurons, which are the second data.

Although the sum total of currents flowing to the cell IM[i,j] and the cell IM[i+1,j] is handled in the above-described operation example, the sum total of currents flowing to each of the cells IM[i,j] to IM[m,j], which are a plurality of cells, may also be handled. In this case, Formula (F17) can be rewritten to the following formula.

[Formula 43]

$$I_S[j] = I_{ref0}\sum_{i=1}^{m} x[i]w[i, j] \quad (F18)$$

Therefore, even in the case of the arithmetic circuit MAC2 including the cell array CA2 of three or more rows and two or more columns, a product-sum operation can be performed in the above-described manner. In a product-sum operation circuit of such a case, cells in one of the plurality of columns are used for retaining the current amount $I_{ref0}$ and the current amount $xI_{ref0}$, whereby product-sum operations, the number of which corresponds to the number of the rest of columns among the plurality of columns, can be executed concurrently. That is, when the number of columns in a memory cell array is increased, a semiconductor device that achieves a high-speed product-sum operation can be provided.

In the case where the product-sum operation circuit described in this embodiment is used as the above-described hidden layers, the weight coefficient $w_{s[k]s[k-1]}^{(k)}$ serves as the first data and the current amount corresponding to the first data is sequentially stored in each of the cells IM in the same column; and the output signal $z_{s[k-1]}^{(k-1)}$ from the s[k-1]-th neuron in the (k-1)-th layer serves as the second data and the current corresponding to the second data is made to flow from the circuit XCS to the wiring XCL in each row, whereby the sum of products of the first data and the second data can be obtained from the current $I_s$ output from the circuit ITRZ. In addition, the value of the activation function can be obtained using the value of the sum of products, so that the value of the activation function can be, as a signal, the output signal $z_{s[k]}^{(k)}$ of the s[k]-th neuron in the k-th layer.

Furthermore, in the case where the product-sum operation circuit described in this embodiment is used as the above-described output layer, the weight coefficient $w_{s[L]s[L-1]}^{(L)}$ serves as the first data and the current amount corresponding to the first data is sequentially stored in each of the cells IM in the same column; and the output signal $z_{s[L-1]}^{(L-1)}$ from the s[L-1]-th neuron in the (L-1)-th layer serves as the second data and the current corresponding to the second data is made to flow from the circuit XCS to the wiring XCL in each row, whereby the sum of products of the first data and the second data can be obtained from the current $I_s$ output from the circuit ITRZ. In addition, the value of the activation function can be obtained using the value of the sum of products, so that the value of the activation function can be, as a signal, the output signal $z_{s[L]}^{(L)}$ of the s[L]-th neuron in the L-th layer.

Note that the input layer described in this embodiment may function as a buffer circuit that outputs an input signal to the second layer.

Although the cases where the transistors included in the arithmetic circuit MAC1 and the arithmetic circuit MAC2 are OS transistors or Si transistors have been described in this embodiment, one embodiment of the present invention is not limited thereto. As the transistors included in the arithmetic circuit MAC1 and the arithmetic circuit MAC2, it is possible to use, for example, a transistor containing a semiconductor such as Ge in an active layer; a transistor containing a compound semiconductor such as ZnSe, CdS, GaAs, InP, GaN, or SiGe in an active layer; a transistor containing a carbon nanotube in an active layer; and a transistor containing an organic semiconductor in an active layer.

Note that this embodiment can be combined with the other embodiments in this specification as appropriate.

Embodiment 3

In this embodiment, structure examples of the arithmetic circuit described in the above embodiment and structure examples of a transistor that can be used in the arithmetic circuit will be described.

<Structure Example of Semiconductor>

Figure 19:
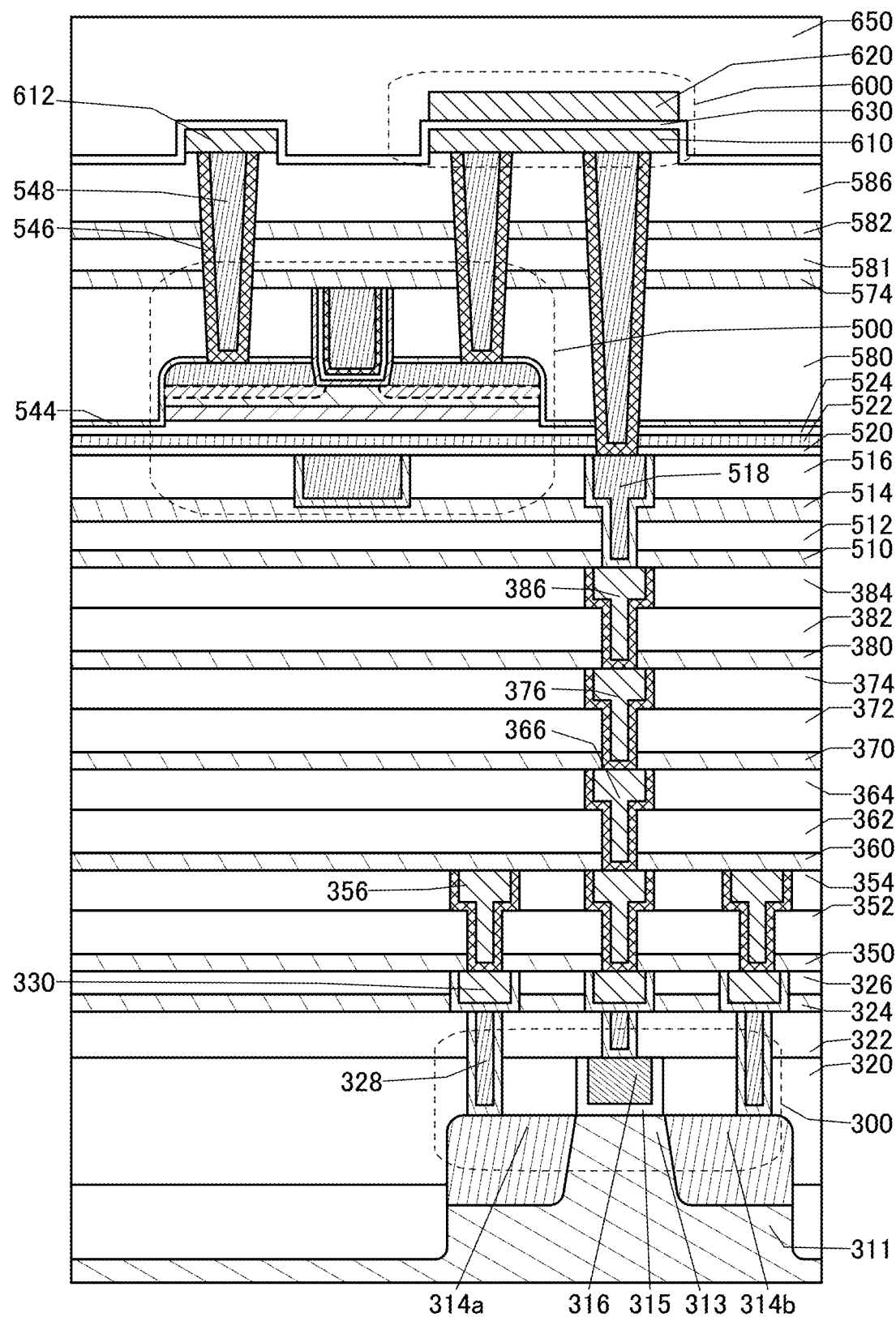
FIG. 19 is a schematic cross-sectional view illustrating a structure of a semiconductor device.
Figure 21A:
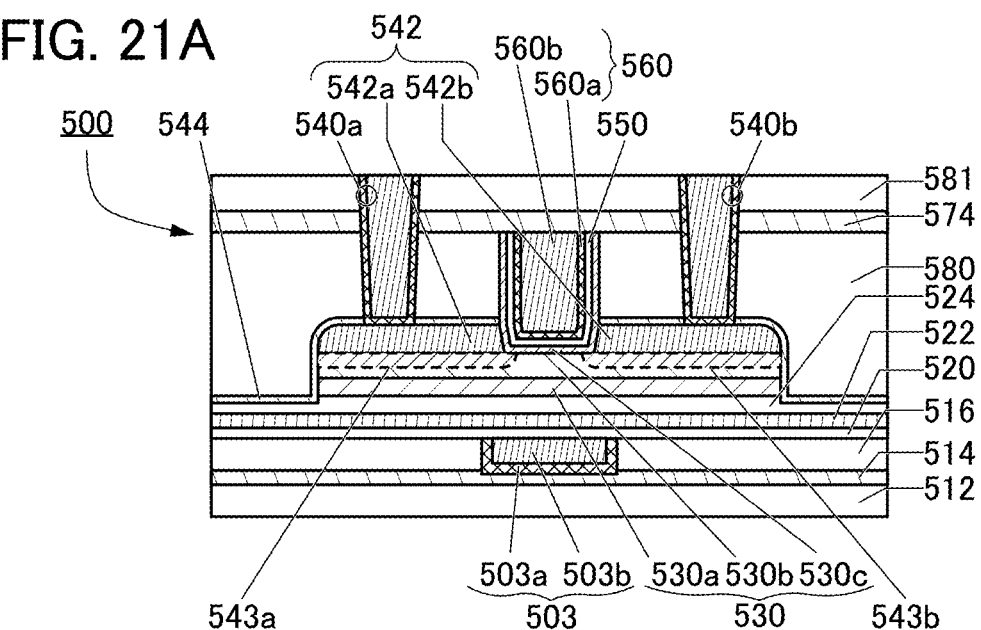
FIG. 21A to FIG. 21C are schematic cross-sectional views illustrating structures in a semiconductor device.
Figure 21B:
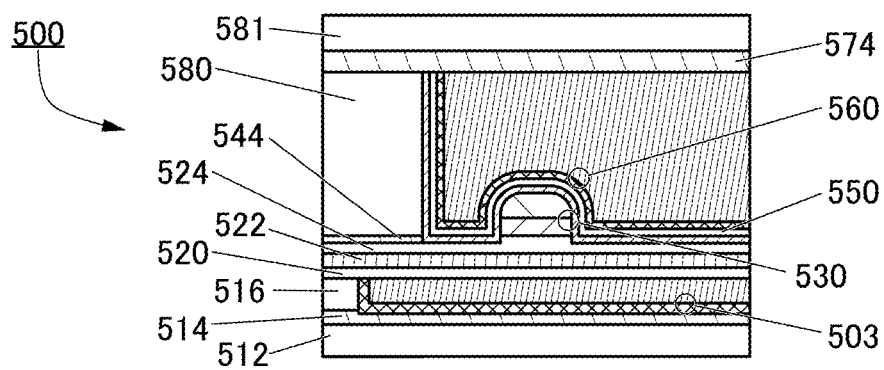
Figure 21C:
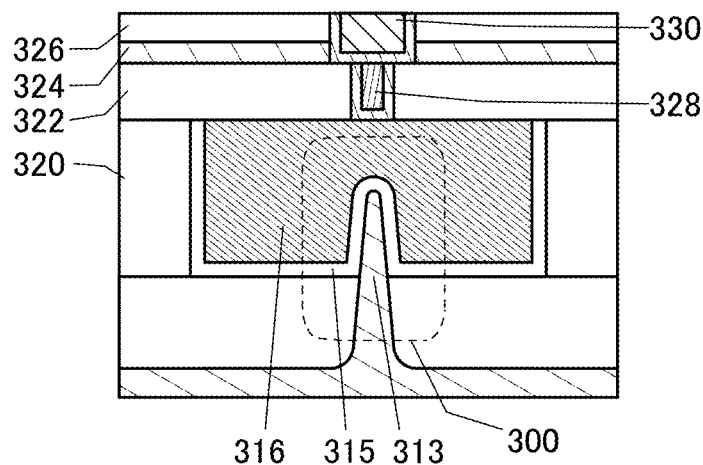

A semiconductor device illustrated in FIG. 19 includes a transistor 300, a transistor 500, and a capacitor 600. FIG. 21A is a cross-sectional view of the transistor 500 in the channel length direction, FIG. 21B is a cross-sectional view of the transistor 500 in the channel width direction, and FIG. 21C is a cross-sectional view of the transistor 300 in the channel width direction.

The transistor 500 is a transistor including a metal oxide in its channel formation region (an OS transistor). The transistor 500 has a small off-state current, and thus enables long-term retention of written data when used as the transistor Tr11 or the like of the memory cell array CA included in a semiconductor device such as the arithmetic circuit MAC1. In other words, the frequency of refresh operation is low or refresh operation is not required; thus, power consumption of the semiconductor device can be reduced.

The semiconductor device described in this embodiment includes the transistor 300, the transistor 500, and the capacitor 600 as illustrated in FIG. 19. The transistor 500 is provided above the transistor 300, and the capacitor 600 is provided above the transistor 300 and the transistor 500. Note that the capacitor 600 can be the capacitor C1 in the memory cell array CA, the capacitor C2 in the circuit OFST, or the like included in the arithmetic circuit MAC1 or the like described in the above embodiment.

The transistor 300 is provided on a substrate 311 and includes a conductor 316, an insulator 315, a semiconductor region 313 that is part of the substrate 311, and a low-resistance region 314a and a low-resistance region 314b functioning as a source region and a drain region. Note that the transistor 300 can be used as, for example, the transistor Tr12 or the like of the memory cell array CA included in the arithmetic circuit MAC1 or the like described in the above embodiment.

A semiconductor substrate (e.g., a single crystal substrate or a silicon substrate) is preferably used as the substrate 311.

In the transistor 300, a top surface and a side surface in the channel width direction of the semiconductor region 313 are covered with the conductor 316 with the insulator 315 therebetween, as illustrated in FIG. 21C. Such a Fin-type transistor 300 can have an increased effective channel width, and thus the transistor 300 can have improved on-state characteristics. In addition, since contribution of an electric field of a gate electrode can be increased, the off-state characteristics of the transistor 300 can be improved.

Note that the transistor 300 can be either a p-channel transistor or an n-channel transistor.

A region of the semiconductor region 313 where a channel is formed, a region in the vicinity thereof, the low-resistance region 314a and the low-resistance region 314b functioning as the source region and the drain region, and the like preferably contain a semiconductor such as a silicon-based semiconductor, further preferably contain single crystal silicon. Alternatively, the regions may be formed using a material containing Ge (germanium), SiGe (silicon germanium), GaAs (gallium arsenide), GaAlAs (gallium aluminum arsenide), or the like. A structure may be employed in which silicon whose effective mass is controlled by applying stress to the crystal lattice and changing the lattice spacing is used. Alternatively, the transistor 300 may be an HEMT (High Electron Mobility Transistor) with GaAs and GaAlAs, or the like.

The low-resistance region 314a and the low-resistance region 314b contain an element that imparts n-type conductivity, such as arsenic or phosphorus, or an element that imparts p-type conductivity, such as boron, in addition to a semiconductor material used for the semiconductor region 313.

For the conductor 316 functioning as a gate electrode, a semiconductor material such as silicon containing an element that imparts n-type conductivity, such as arsenic or phosphorus, or an element that imparts p-type conductivity, such as boron, or a conductive material such as a metal material, an alloy material, or a metal oxide material can be used.

Note that since the work function of a conductor depends on the material of the conductor, the threshold voltage of the transistor can be adjusted by selecting the material of the conductor. Specifically, it is preferable to use a material such as titanium nitride or tantalum nitride for the conductor. Moreover, in order to ensure both conductivity and embeddability, it is preferable to use stacked layers of metal materials such as tungsten and aluminum for the conductor, and it is particularly preferable to use tungsten in terms of heat resistance.

Figure 20:
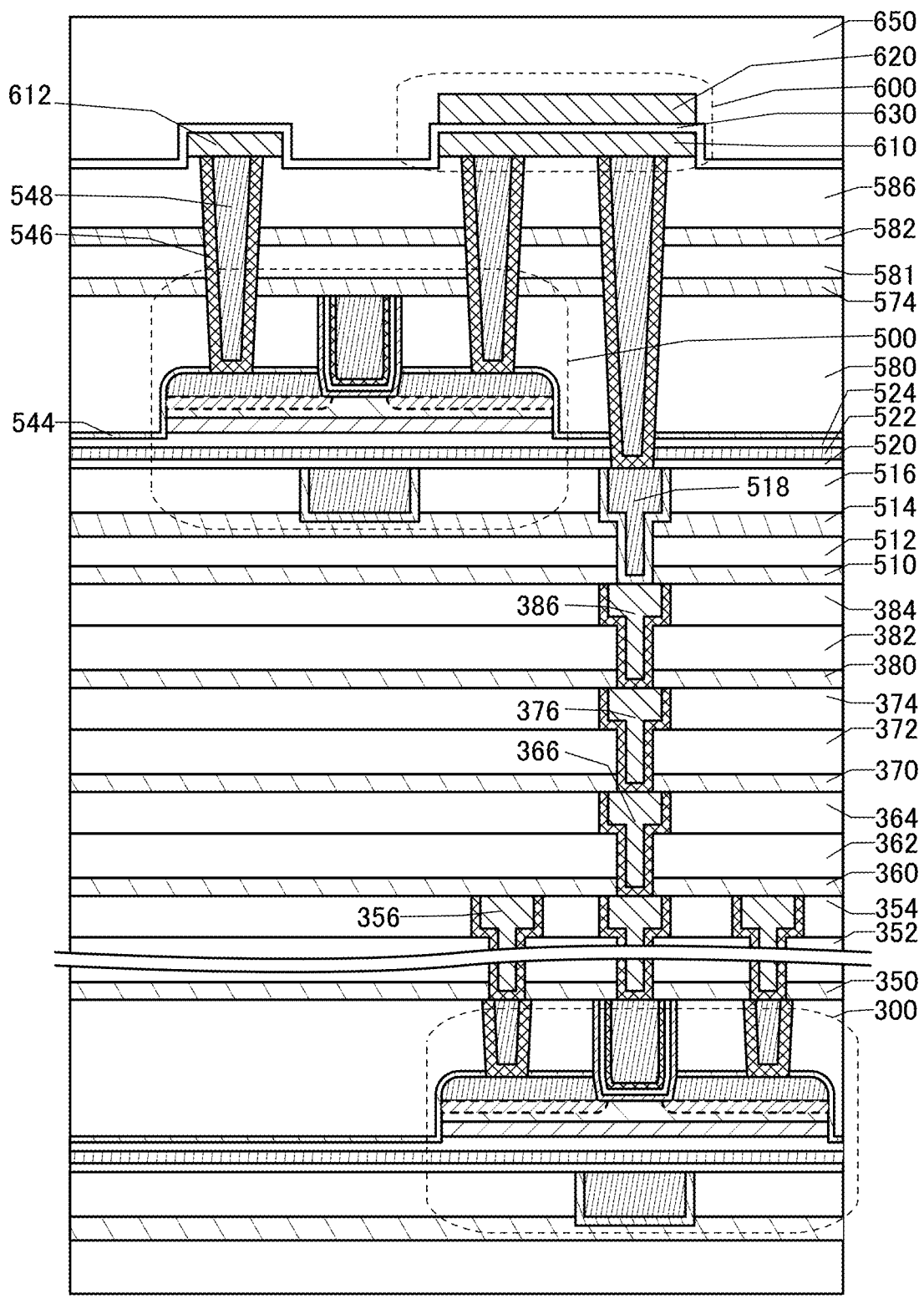
FIG. 20 is a schematic cross-sectional view illustrating a structure of a semiconductor device.

Note that the transistor 300 illustrated in FIG. 19 is only an example and the structure is not limited thereto; an appropriate transistor can be used in accordance with a circuit configuration or a driving method. For example, when a semiconductor device is a single-polarity circuit using only OS transistors, the transistor 300 has a structure similar to that of the transistor 500 using an oxide semiconductor, as illustrated in FIG. 20. Note that the details of the transistor 500 are described later.

An insulator 320, an insulator 322, an insulator 324, and an insulator 326 are provided to be stacked in this order to cover the transistor 300.

For the insulator 320, the insulator 322, the insulator 324, and the insulator 326, silicon oxide, silicon oxynitride, silicon nitride oxide, silicon nitride, aluminum oxide, aluminum oxynitride, aluminum nitride oxide, or aluminum nitride can be used, for example.

Note that in this specification, silicon oxynitride refers to a material that has a higher oxygen content than a nitrogen content, and silicon nitride oxide refers to a material that has a higher nitrogen content than an oxygen content. Moreover, in this specification, aluminum oxynitride refers to a material that has a higher oxygen content than a nitrogen content, and aluminum nitride oxide refers to a material that has a higher nitrogen content than an oxygen content.

The insulator 322 may have a function of a planarization film for planarizing a level difference caused by the transistor 300 or the like provided below the insulator 322. For example, a top surface of the insulator 322 may be planarized by planarization treatment using a chemical mechanical polishing (CMP) method or the like to improve planarity.

As the insulator 324, it is preferable to use a film having a barrier property that prevents diffusion of hydrogen or impurities from the substrate 311, the transistor 300, or the like into a region where the transistor 500 is provided.

For the film having a barrier property against hydrogen, silicon nitride formed by a CVD method can be used, for example. Here, diffusion of hydrogen into a semiconductor element including an oxide semiconductor, such as the transistor 500, degrades the characteristics of the semiconductor element in some cases. Therefore, a film that inhibits hydrogen diffusion is preferably used between the transistor 500 and the transistor 300. The film that inhibits hydrogen diffusion is specifically a film from which a small amount of hydrogen is released.

The amount of released hydrogen can be analyzed by thermal desorption spectroscopy (TDS), for example. The amount of hydrogen released from the insulator 324 that is converted into hydrogen atoms per area of the insulator 324 is less than or equal to $10 \times 10^{15}$ atoms/cm$^2$, preferably less than or equal to $5 \times 10^{15}$ atoms/cm$^2$, in the TDS analysis in a film-surface temperature range of 50° C. to 500° C., for example.

Note that the permittivity of the insulator 326 is preferably lower than that of the insulator 324. For example, the dielectric constant of the insulator 326 is preferably lower than 4, further preferably lower than 3. The dielectric constant of the insulator 326 is, for example, preferably 0.7 times or less, further preferably 0.6 times or less the dielectric constant of the insulator 324. When a material with a low permittivity is used for the interlayer film, the parasitic capacitance generated between wirings can be reduced.

A conductor 328, a conductor 330, and the like that are connected to the capacitor 600 or the transistor 500 are embedded in the insulator 320, the insulator 322, the insulator 324, and the insulator 326. Note that the conductor 328 and the conductor 330 have a function of a plug or a wiring. A plurality of conductors having a function of a plug or a wiring are collectively denoted by the same reference numeral in some cases. Moreover, in this specification and the like, a wiring and a plug connected to the wiring may be a single component. That is, in some cases, part of a conductor functions as a wiring or part of a conductor functions as a plug.

As a material of each of plugs and wirings (e.g., the conductor 328 and the conductor 330), a single layer or a stacked layer of a conductive material such as a metal material, an alloy material, a metal nitride material, or a metal oxide material can be used. It is preferable to use a high-melting-point material that has both heat resistance and conductivity, such as tungsten or molybdenum, and it is preferable to use tungsten. Alternatively, a low-resistance conductive material such as aluminum or copper is preferably used. The use of a low-resistance conductive material can reduce wiring resistance.

A wiring layer may be provided over the insulator 326 and the conductor 330. For example, in FIG. 19, an insulator 350, an insulator 352, and an insulator 354 are provided to be stacked in this order. Furthermore, a conductor 356 is formed in the insulator 350, the insulator 352, and the insulator 354. The conductor 356 has a function of a plug or a wiring that is connected to the transistor 300. Note that the conductor 356 can be provided using a material similar to those for the conductor 328 and the conductor 330.

As the insulator 350, it is preferable to use, for example, an insulator having a barrier property against hydrogen, like the insulator 324. The conductor 356 preferably includes a conductor having a barrier property against hydrogen. In particular, the conductor having a barrier property against hydrogen is formed in an opening portion included in the insulator 350 having a barrier property against hydrogen. With this structure, the transistor 300 and the transistor 500 can be separated by the barrier layer, so that diffusion of hydrogen from the transistor 300 into the transistor 500 can be inhibited.

For the conductor having a barrier property against hydrogen, tantalum nitride is preferably used, for example. In addition, the use of a stack including tantalum nitride and tungsten, which has high conductivity, can inhibit diffusion of hydrogen from the transistor 300 while the conductivity of a wiring is kept. In that case, a structure is preferable in which a tantalum nitride layer having a barrier property against hydrogen is in contact with the insulator 350 having a barrier property against hydrogen.

A wiring layer may be provided over the insulator 354 and the conductor 356. For example, in FIG. 19, an insulator 360, an insulator 362, and an insulator 364 are provided to be stacked in this order. Furthermore, a conductor 366 is formed in the insulator 360, the insulator 362, and the insulator 364. The conductor 366 has a function of a plug or a wiring. Note that the conductor 366 can be provided using a material similar to those for the conductor 328 and the conductor 330.

As the insulator 360, it is preferable to use, for example, an insulator having a barrier property against hydrogen, like the insulator 324. Furthermore, the conductor 366 preferably includes a conductor having a barrier property against hydrogen. In particular, the conductor having a barrier property against hydrogen is formed in an opening portion included in the insulator 360 having a barrier property against hydrogen. With this structure, the transistor 300 and the transistor 500 can be separated by the barrier layer, so that diffusion of hydrogen from the transistor 300 into the transistor 500 can be inhibited.

A wiring layer may be provided over the insulator 364 and the conductor 366. For example, in FIG. 19, an insulator 370, an insulator 372, and an insulator 374 are provided to be stacked in this order. Furthermore, a conductor 376 is formed in the insulator 370, the insulator 372, and the insulator 374. The conductor 376 has a function of a plug or a wiring. Note that the conductor 376 can be provided using a material similar to those for the conductor 328 and the conductor 330.

As the insulator 370, it is preferable to use, for example, an insulator having a barrier property against hydrogen, like the insulator 324. Furthermore, the conductor 376 preferably includes a conductor having a barrier property against hydrogen. In particular, the conductor having a barrier property against hydrogen is formed in an opening portion included in the insulator 370 having a barrier property against hydrogen. With this structure, the transistor 300 and the transistor 500 can be separated by the barrier layer, so that diffusion of hydrogen from the transistor 300 into the transistor 500 can be inhibited.

A wiring layer may be provided over the insulator 374 and the conductor 376. For example, in FIG. 19, an insulator 380, an insulator 382, and an insulator 384 are provided to be stacked in this order. Furthermore, a conductor 386 is formed in the insulator 380, the insulator 382, and the insulator 384. The conductor 386 has a function of a plug or a wiring. Note that the conductor 386 can be provided using a material similar to those for the conductor 328 and the conductor 330.

As the insulator 380, it is preferable to use, for example, an insulator having a barrier property against hydrogen, like the insulator 324. Furthermore, the conductor 386 preferably includes a conductor having a barrier property against hydrogen. In particular, the conductor having a barrier property against hydrogen is formed in an opening portion included in the insulator 380 having a barrier property against hydrogen. With this structure, the transistor 300 and the transistor 500 can be separated by the barrier layer, so that diffusion of hydrogen from the transistor 300 into the transistor 500 can be inhibited.

Although the wiring layer including the conductor 356, the wiring layer including the conductor 366, the wiring layer including the conductor 376, and the wiring layer including the conductor 386 are described above, the semiconductor device of this embodiment is not limited thereto. Three or less wiring layers that are similar to the wiring layer including the conductor 356 may be provided, or five or more wiring layers that are similar to the wiring layer including the conductor 356 may be provided.

An insulator 510, an insulator 512, an insulator 514, and an insulator 516 are provided to be stacked in this order over the insulator 384. A substance with a barrier property against oxygen or hydrogen is preferably used for any of the insulator 510, the insulator 512, the insulator 514, and the insulator 516.

For example, as the insulator 510 and the insulator 514, it is preferable to use a film having a barrier property that prevents diffusion of hydrogen or impurities from the substrate 311, a region where the transistor 300 is provided, or the like into the region where the transistor 500 is provided. Thus, a material similar to that for the insulator 324 can be used.

For the film having a barrier property against hydrogen, silicon nitride formed by a CVD method can be used, for example. Here, diffusion of hydrogen into a semiconductor element including an oxide semiconductor, such as the transistor 500, degrades the characteristics of the semiconductor element in some cases. Therefore, a film that inhibits hydrogen diffusion is preferably used between the transistor 500 and the transistor 300. The film that inhibits hydrogen diffusion is specifically a film from which a small amount of hydrogen is released.

For the film having a barrier property against hydrogen used for the insulator 510 and the insulator 514, a metal oxide such as aluminum oxide, hafnium oxide, or tantalum oxide is preferably used, for example.

In particular, aluminum oxide has an excellent blocking effect that prevents transmission of oxygen and impurities such as hydrogen and moisture which would cause a change in the electrical characteristics of the transistor. Accordingly, aluminum oxide can prevent entry of impurities such as hydrogen and moisture into the transistor 500 in and after the manufacturing process of the transistor. In addition, release of oxygen from the oxide included in the transistor 500 can be inhibited. Therefore, aluminum oxide is suitably used for a protective film of the transistor 500.

For the insulator 512 and the insulator 516, a material similar to that for the insulator 320 can be used, for example. Furthermore, when a material with a comparatively low permittivity is used for these insulators, parasitic capacitance generated between wirings can be reduced. A silicon oxide film or a silicon oxynitride film can be used for the insulator 512 and the insulator 516, for example.

A conductor 518, a conductor included in the transistor 500 (e.g., a conductor 503), and the like are embedded in the insulator 510, the insulator 512, the insulator 514, and the insulator 516. Note that the conductor 518 has a function of a plug or a wiring that is connected to the capacitor 600 or the transistor 300. The conductor 518 can be provided using a material similar to those for the conductor 328 and the conductor 330.

In particular, a region of the conductor 518 that is in contact with the insulator 510 and the insulator 514 is preferably a conductor having a barrier property against oxygen, hydrogen, and water. With this structure, the transistor 300 and the transistor 500 can be separated by the layer having a barrier property against oxygen, hydrogen, and water; hence, the diffusion of hydrogen from the transistor 300 into the transistor 500 can be inhibited.

The transistor 500 is provided above the insulator 516.

As illustrated in FIG. 21A and FIG. 21B, the transistor 500 includes the conductor 503 positioned to be embedded in the insulator 514 and the insulator 516, an insulator 520 positioned over the insulator 516 and the conductor 503, an insulator 522 positioned over the insulator 520, an insulator 524 positioned over the insulator 522, an oxide 530a positioned over the insulator 524, an oxide 530b positioned over the oxide 530a, a conductor 542a and a conductor 542b positioned apart from each other over the oxide 530b, an insulator 580 that is positioned over the conductor 542a and the conductor 542b and is provided with an opening formed to overlap with a region between the conductor 542a and the conductor 542b, an oxide 530c positioned on a bottom and a side surface of the opening, an insulator 550 positioned on a formation surface of the oxide 530c, and a conductor 560 positioned on a formation surface of the insulator 550.

As illustrated in FIG. 21A and FIG. 21B, an insulator 544 is preferably positioned between the insulator 580 and the oxide 530a, the oxide 530b, the conductor 542a, and the conductor 542b. In addition, as illustrated in FIG. 21A and FIG. 21B, the conductor 560 preferably includes a conductor 560a provided inside the insulator 550 and a conductor 560b provided to be embedded inside the conductor 560a. As illustrated in FIG. 21A and FIG. 21B, an insulator 574 is preferably positioned over the insulator 580, the conductor 560, and the insulator 550.

Hereinafter, the oxide 530a, the oxide 530b, and the oxide 530c may be collectively referred to as an oxide 530.

The transistor 500 having a structure in which the three layers of the oxide 530a, the oxide 530b, and the oxide 530c are stacked in the region where the channel is formed and its vicinity is shown; however, one embodiment of the present invention is not limited to this. For example, the transistor may have a single-layer structure of the oxide 530b, a two-layer structure of the oxide 530b and the oxide 530a, a two-layer structure of the oxide 530b and the oxide 530c, or a stacked-layer structure of four or more layers. Furthermore, although the conductor 560 is shown to have a stacked-layer structure of two layers in the transistor 500, one embodiment of the present invention is not limited thereto. For example, the conductor 560 may have a single-layer structure or a stacked-layer structure of three or more layers. Moreover, the transistor 500 illustrated in FIG. 19 and FIG. 21A is an example and the structure is not limited thereto; an appropriate transistor is used in accordance with a circuit configuration or a driving method.

Here, the conductor 560 functions as a gate electrode of the transistor, and the conductor 542a and the conductor 542b function as a source electrode and a drain electrode. As described above, the conductor 560 is formed to be embedded in an opening in the insulator 580 and the region sandwiched between the conductor 542a and the conductor 542b. The positions of the conductor 560, the conductor 542a, and the conductor 542b are selected in a self-aligned manner with respect to the opening in the insulator 580. That is, in the transistor 500, the gate electrode can be positioned between the source electrode and the drain electrode in a self-aligned manner. Thus, the conductor 560 can be formed without an alignment margin, resulting in a reduction in the area occupied by the transistor 500. Accordingly, miniaturization and high integration of the semiconductor device can be achieved.

Since the conductor 560 is formed in the region between the conductor 542a and the conductor 542b in a self-aligned manner, the conductor 560 includes neither a region overlapping with the conductor 542a nor the region overlapping with the conductor 542b. Thus, parasitic capacitance formed between the conductor 560 and each of the conductor 542a and the conductor 542b can be reduced. As a result, the transistor 500 can have increased switching speed and excellent frequency characteristics.

The conductor 560 sometimes functions as a first gate (also referred to as top gate) electrode. In addition, the conductor 503 sometimes functions as a second gate (also referred to as bottom gate) electrode. In that case, the threshold voltage of the transistor 500 can be controlled by changing a potential applied to the conductor 503 independently of a potential applied to the conductor 560. In particular, the threshold voltage of the transistor 500 can be higher than 0 V and the off-state current can be reduced by applying a negative potential to the conductor 503. Thus, a drain current at the time when a potential applied to the conductor 560 is 0 V can be lower in the case where a negative potential is applied to the conductor 503 than in the case where a negative potential is not applied to the conductor 503.

The conductor 503 is positioned to overlap with the oxide 530 and the conductor 560. Thus, when potentials are applied to the conductor 560 and the conductor 503, an electric field generated from the conductor 560 and an electric field generated from the conductor 503 are connected and can cover the channel formation region formed in the oxide 530. In this specification and the like, a transistor structure in which a channel formation region is electrically surrounded by electric fields of a first gate electrode and a second gate electrode is referred to as a surrounded channel (S-channel) structure.

The conductor 503 has a structure similar to that of the conductor 518; a conductor 503a is formed in contact with an inner wall of the opening in the insulator 514 and the insulator 516, and a conductor 503b is formed on the inner side. Although the transistor 500 having a structure in which the conductor 503a and the conductor 503b are stacked is illustrated, one embodiment of the present invention is not limited thereto. For example, the conductor 503 may be provided as a single layer or to have a stacked-layer structure of three or more layers.

Here, for the conductor 503a, a conductive material that has a function of inhibiting diffusion of impurities such as a hydrogen atom, a hydrogen molecule, a water molecule, and a copper atom (through which the above impurities are less likely to pass) is preferably used. Alternatively, it is preferable to use a conductive material that has a function of inhibiting diffusion of oxygen (e.g., at least one of an oxygen atom, an oxygen molecule, and the like) (through which the above oxygen is less likely to pass). Note that in this specification, a function of inhibiting diffusion of impurities or oxygen means a function of inhibiting diffusion of any one or all of the above impurities and the above oxygen.

For example, when the conductor 503a has a function of inhibiting diffusion of oxygen, a reduction in conductivity of the conductor 503b due to oxidation can be inhibited.

When the conductor 503 also functions as a wiring, for the conductor 503b, it is preferable to use a conductive material that has high conductivity and contains tungsten, copper, or aluminum as its main component. In that case, the conductor 503a is not necessarily provided. Note that the conductor 503b is shown as a single layer but may have a stacked-layer structure, for example, a stack of any of the above conductive materials and titanium or titanium nitride.

The insulator 520, the insulator 522, and the insulator 524 have a function of a second gate insulating film.

Here, as the insulator 524 in contact with the oxide 530, an insulator that contains oxygen more than oxygen in the stoichiometric composition is preferably used. That is, an excess-oxygen region is preferably formed in the insulator 524. When such an insulator containing excess oxygen is provided in contact with the oxide 530, oxygen vacancies in the oxide 530 can be reduced and the reliability of the transistor 500 can be improved.

As the insulator including an excess-oxygen region, specifically, an oxide material that releases part of oxygen by heating is preferably used. An oxide that releases oxygen by heating is an oxide film in which the amount of released oxygen converted into oxygen atoms is greater than or equal to $1.0 \times 10^{18}$ atoms/cm$^3$, preferably greater than or equal to $1.0 \times 10^{19}$ atoms/cm$^3$, further preferably greater than or equal to $2.0 \times 10^{19}$ atoms/cm$^3$ or greater than or equal to $3.0 \times 10^{20}$ atoms/cm$^3$ in TDS (Thermal Desorption Spectroscopy) analysis. Note that the temperature of the film surface in the TDS analysis is preferably in the range of 100° C. to 700° C. or 100° C. to 400° C.

One or more of heat treatment, microwave treatment, and RF treatment may be performed in a state in which the insulator including the excess-oxygen region and the oxide 530 are in contact with each other. By the treatment, water or hydrogen in the oxide 530 can be removed. For example, in the oxide 530, dehydrogenation can be performed when a reaction in which a bond of V$_O$H is cut occurs, i.e., a reaction of "V$_O$H→V$_O$+H" occurs. Part of hydrogen generated at this time is bonded to oxygen to be H$_2$O, and removed from the oxide 530 or an insulator near the oxide 530 in some cases. Part of hydrogen is diffused into or gettered (also referred to as gettering) by the conductor 542a and the conductor 542b in some cases.

For the microwave treatment, for example, an apparatus including a power supply that generates high-density plasma or an apparatus including a power supply that applies RF to the substrate side is suitably used. For example, the use of an oxygen-containing gas and high-density plasma enables high-density oxygen radicals to be generated, and application of the RF to the substrate side allows the oxygen radicals generated by the high-density plasma to be efficiently introduced into the oxide 530 or an insulator in the vicinity of the oxide 530. The pressure in the microwave treatment is higher than or equal to 133 Pa, preferably higher than or equal to 200 Pa, further preferably higher than or equal to 400 Pa. As a gas introduced into an apparatus for performing the microwave treatment, for example, oxygen and argon are used and the oxygen flow rate (O$_2$/(O$_2$+Ar)) is lower than or equal to 50%, preferably higher than or equal to 10% and lower than or equal to 30%.

In a manufacturing process of the transistor 500, heat treatment is preferably performed with the surface of the oxide 530 exposed. The heat treatment is performed at higher than or equal to 100° C. and lower than or equal to 450° C., preferably higher than or equal to 350° C. and lower than or equal to 400° C., for example. Note that the heat treatment is performed in a nitrogen gas or inert gas atmosphere, or an atmosphere containing an oxidizing gas at 10 ppm or more, 1% or more, or 10% or more. For example, the heat treatment is preferably performed in an oxygen atmosphere. Accordingly, oxygen can be supplied to the oxide 530 to reduce oxygen vacancies ($V_O$). The heat treatment may be performed under reduced pressure. Alternatively, the heat treatment may be performed in such a manner that heat treatment is performed in a nitrogen gas or inert gas atmosphere, and then another heat treatment is performed in an atmosphere containing an oxidizing gas at 10 ppm or more, 1% or more, or 10% or more in order to compensate for released oxygen. Alternatively, the heat treatment may be performed in such a manner that heat treatment is performed in an atmosphere containing an oxidizing gas at 10 ppm or more, 1% or more, or 10% or more, and then another heat treatment is successively performed in a nitrogen gas or inert gas atmosphere.

Note that the oxygen adding treatment performed on the oxide 530 can promote a reaction in which oxygen vacancies in the oxide 530 are filled with supplied oxygen, i.e., a reaction of "$V_O+O \rightarrow null$". Furthermore, hydrogen remaining in the oxide 530 reacts with supplied oxygen, so that the hydrogen can be removed as $H_2O$ (dehydration). This can inhibit recombination of hydrogen remaining in the oxide 530 with oxygen vacancies and formation of $V_OH$.

In the case where the insulator 524 includes an excess-oxygen region, it is preferable that the insulator 522 have a function of inhibiting diffusion of oxygen (e.g., an oxygen atom and an oxygen molecule) (or the insulator 522 be less likely to transmit the above oxygen).

When the insulator 522 has a function of inhibiting diffusion of oxygen or impurities, oxygen contained in the oxide 530 is not diffused to the insulator 520 side, which is preferable. Furthermore, the conductor 503 can be inhibited from reacting with oxygen contained in the insulator 524 or the oxide 530.

The insulator 522 is preferably a single layer or stacked layers using an insulator containing a high-k material such as aluminum oxide, hafnium oxide, an oxide containing aluminum and hafnium (hafnium aluminate), tantalum oxide, zirconium oxide, lead zirconate titanate (PZT), strontium titanate ($SrTiO_3$), or $(Ba,Sr)TiO_3$ (BST). As miniaturization and high integration of transistors progress, a problem such as leakage current may arise because of a thinner gate insulating film. When a high-k material is used for the insulator functioning as the gate insulating film, a gate potential at the time when the transistor operates can be reduced while the physical thickness is maintained.

It is particularly preferable to use an insulator containing an oxide of one or both of aluminum and hafnium, which is an insulating material having a function of inhibiting diffusion of impurities, oxygen, and the like (through which the above oxygen is less likely to pass). As the insulator containing an oxide of one or both of aluminum and hafnium, aluminum oxide, hafnium oxide, an oxide containing aluminum and hafnium (hafnium aluminate), or the like is preferably used. In the case where the insulator 522 is formed using such a material, the insulator 522 functions as a layer that inhibits release of oxygen from the oxide 530 and mixing of impurities such as hydrogen from the periphery of the transistor 500 into the oxide 530.

Alternatively, aluminum oxide, bismuth oxide, germanium oxide, niobium oxide, silicon oxide, titanium oxide, tungsten oxide, yttrium oxide, or zirconium oxide may be added to these insulators, for example. Alternatively, these insulators may be subjected to nitriding treatment. Silicon oxide, silicon oxynitride, or silicon nitride may be stacked over the above insulator.

It is preferable that the insulator 520 be thermally stable. For example, silicon oxide and silicon oxynitride, which have thermal stability, are suitable. Furthermore, when an insulator that is a high-k material is combined with silicon oxide or silicon oxynitride, the insulator 520 having a stacked-layer structure that has thermal stability and a high relative permittivity can be obtained.

Note that in the transistor 500 in FIG. 21A and FIG. 21B, the insulator 520, the insulator 522, and the insulator 524 are shown as the second gate insulating film having a stacked-layer structure of three layers; however, the second gate insulating film may be a single layer or may have a stacked-layer structure of two layers or four or more layers. In such cases, without limitation to a stacked-layer structure formed of the same material, a stacked-layer structure formed of different materials may be employed.

In the transistor 500, a metal oxide functioning as an oxide semiconductor is preferably used as the oxide 530 including the channel formation region. For example, as the oxide 530, a metal oxide such as an In-M-Zn oxide (the element M is one or more selected from aluminum, gallium, yttrium, copper, vanadium, beryllium, boron, titanium, iron, nickel, germanium, zirconium, molybdenum, lanthanum, cerium, neodymium, hafnium, tantalum, tungsten, magnesium, and the like) is used. In particular, the In-M-Zn oxide which can be used for the oxide 530 is preferably a CAAC-OS (C-Axis Aligned Crystalline Oxide Semiconductor) or a CAC-OS (Cloud-Aligned Composite Oxide Semiconductor). Furthermore, an In—Ga oxide, an In—Zn oxide, an In oxide, or the like may be used as the oxide 530.

Furthermore, a metal oxide with a low carrier concentration is preferably used in the transistor 500. In order to reduce the carrier concentration of the metal oxide, the concentration of impurities in the metal oxide is reduced so that the density of defect states can be reduced. In this specification and the like, a state with a low impurity concentration and a low density of defect states is referred to as a highly purified intrinsic or substantially highly purified intrinsic state. Examples of impurities in a metal oxide include hydrogen, nitrogen, alkali metal, alkaline earth metal, iron, nickel, and silicon.

In particular, hydrogen contained in a metal oxide reacts with oxygen bonded to a metal atom to be water, and thus forms oxygen vacancies in the metal oxide in some cases. In the case where hydrogen enters an oxygen vacancy in the oxide 530, the oxygen vacancy and the hydrogen are bonded to each other to form $V_OH$ in some cases. The $V_OH$ serves as a donor and an electron that is a carrier is generated in some cases. In other cases, bonding of part of hydrogen to oxygen bonded to a metal atom generates an electron serving as a carrier. Thus, a transistor using a metal oxide containing a large amount of hydrogen is likely to have normally-on characteristics. Moreover, hydrogen in a metal oxide is easily transferred by a stress such as heat or an electric field; thus, a large amount of hydrogen contained in a metal oxide might reduce the reliability of the transistor. In one embodiment of the present invention, $V_OH$ in the oxide 530 is preferably reduced as much as possible so that the oxide 530 becomes a highly purified intrinsic or substantially highly purified intrinsic oxide. It is important to remove impurities such as moisture and hydrogen in a metal oxide (sometimes described as dehydration or dehydrogenation treatment) and to compensate for oxygen vacancies by supplying oxygen to the metal oxide (sometimes described as oxygen supplying treatment) to obtain a metal oxide whose $V_O H$ is reduced enough. When a metal oxide in which impurities such as $V_O H$ are sufficiently reduced is used for a channel formation region of a transistor, stable electrical characteristics can be given.

A defect that is an oxygen vacancy into which hydrogen has entered can function as a donor of a metal oxide. However, it is difficult to evaluate the defects quantitatively. Thus, the metal oxide is sometimes evaluated by not its donor concentration but its carrier concentration. Therefore, in this specification and the like, the carrier concentration assuming the state where an electric field is not applied is sometimes used, instead of the donor concentration, as the parameter of the metal oxide. That is, "carrier concentration" in this specification and the like can be replaced with "donor concentration" in some cases.

Consequently, when a metal oxide is used for the oxide 530, hydrogen in the metal oxide is preferably reduced as much as possible. Specifically, the hydrogen concentration of the metal oxide, which is measured by secondary ion mass spectrometry (SIMS), is lower than $1 \times 10^{20}$ atoms/cm$^3$, preferably lower than $1 \times 10^{19}$ atoms/cm$^3$, further preferably lower than $5 \times 10^{18}$ atoms/cm$^3$, still further preferably lower than $1 \times 10^{18}$ atoms/cm$^3$. When a metal oxide with a sufficiently low concentration of impurities such as hydrogen is used for a channel formation region of a transistor, stable electrical characteristics can be given.

In the case where a metal oxide is used as the oxide 530, the metal oxide is an intrinsic (also referred to as i-type) or substantially intrinsic semiconductor that has a large band gap, and the carrier concentration of the metal oxide in the channel formation region is preferably lower than $1 \times 10^{18}$ cm$^{-3}$, further preferably lower than $1 \times 10^{17}$ cm$^{-3}$, still further preferably lower than $1 \times 10^{16}$ cm$^{-3}$, yet further preferably lower than $1 \times 10^{13}$ cm$^{-3}$, yet still further preferably lower than $1 \times 10^{12}$ cm$^{-3}$. Note that the lower limit of the carrier concentration of the metal oxide in the channel formation region is not particularly limited and can be, for example, $1 \times 10^{-9}$ cm$^{-3}$.

In the case where a metal oxide is used as the oxide 530, contact between the oxide 530 and each of the conductor 542a and the conductor 542b may diffuse oxygen in the oxide 530 into the conductor 542a and the conductor 542b, resulting in oxidation of the conductor 542a and the conductor 542b. It is highly possible that oxidation of the conductor 542a and the conductor 542b lowers the conductivity of the conductor 542a and the conductor 542b. Note that diffusion of oxygen from the oxide 530 into the conductor 542a and the conductor 542b can be rephrased as absorption of oxygen in the oxide 530 by the conductor 542a and the conductor 542b.

When oxygen in the oxide 530 is diffused into the conductor 542a and the conductor 542b, a layer is sometimes formed between the conductor 542a and the oxide 530b and between the conductor 542b and the oxide 530b. The layer contains a larger amount of oxygen than the conductor 542a and the conductor 542b and thus presumably has an insulating property. In this case, a three-layer structure of the conductor 542a or the conductor 542b, the layer, and the oxide 530b can be regarded as a three-layer structure of a metal, an insulator, and a semiconductor and is sometimes referred to as a MIS (Metal-Insulator-Semiconductor) structure or referred to as a diode-connected structure mainly formed of the MIS structure.

Note that the layer is not necessarily formed between the oxide 530b and each of the conductor 542a and the conductor 542b; for example, the layer may be formed between the oxide 530c and each of the conductor 542a and the conductor 542b, between the oxide 530b and each of the conductor 542a and the conductor 542b, or between the oxide 530c and each of the conductor 542a and the conductor 542b.

The metal oxide functioning as the channel formation region in the oxide 530 has a band gap of preferably 2 eV or more, further preferably 2.5 eV or more. With the use of a metal oxide having such a wide bandgap, the off-state current of the transistor can be reduced.

When the oxide 530 includes the oxide 530a under the oxide 530b, it is possible to inhibit diffusion of impurities into the oxide 530b from the components formed below the oxide 530a. Moreover, including the oxide 530c over the oxide 530b makes it possible to inhibit diffusion of impurities into the oxide 530b from the components formed above the oxide 530c.

Note that the oxide 530 preferably has a stacked-layer structure of a plurality of oxide layers that differ in the atomic ratio of metal atoms. Specifically, the atomic proportion of the element M in the constituent elements in the metal oxide used as the oxide 530a is preferably higher than the atomic proportion of the element M in the constituent elements in the metal oxide used as the oxide 530b. In addition, the atomic ratio of the element M to In in the metal oxide used as the oxide 530a is preferably higher than the atomic ratio of the element M to In in the metal oxide used as the oxide 530b. Furthermore, the atomic ratio of In to the element M in the metal oxide used as the oxide 530b is preferably higher than the atomic ratio of In to the element M in the metal oxide used as the oxide 530a. As the oxide 530c, it is possible to use a metal oxide that can be used as the oxide 530a or the oxide 530b.

Specifically, as the oxide 530a, a metal oxide in which an atomic ratio of In to Ga and Zn is In:Ga:Zn=1:3:4 or 1:1:0.5 is used. In addition, as the oxide 530b, a metal oxide in which an atomic ratio of In to Ga and Zn is In:Ga:Zn=4:2:3 or 1:1:1 is used. In addition, as the oxide 530c, a metal oxide in which an atomic ratio of In to Ga and Zn is In:Ga:Zn=1:3:4 or an atomic ratio of Ga to Zn is Ga:Zn=2:1 or Ga:Zn=2:5 is used. Specific examples of the case where the oxide 530c has a stacked-layer structure include a stacked-layer structure of a layer in which an atomic ratio of In to Ga and Zn is In:Ga:Zn=4:2:3 and a layer with In:Ga:Zn=1:3:4; a stacked-layer structure of a layer in which an atomic ratio of Ga to Zn is Ga:Zn=2:1 and a layer in which an atomic ratio of In to Ga and Zn is In:Ga:Zn=4:2:3; a stacked-layer structure of a layer in which an atomic ratio of Ga to Zn is Ga:Zn=2:5 and a layer in which an atomic ratio of In to Ga and Zn is In:Ga:Zn=4:2:3; and a stacked-layer structure of gallium oxide and a layer in which an atomic ratio of In to Ga and Zn is In:Ga:Zn=4:2:3.

For example, in the case where the atomic ratio of In to the element M in the metal oxide used as the oxide 530a is lower than the atomic ratio of In to the element M in the metal oxide used as the oxide 530b, an In—Ga—Zn oxide having a composition with an atomic ratio of In:Ga:Zn=5:1:6 or a neighborhood thereof, In:Ga:Zn=5:1:3 or a neighborhood thereof, In:Ga:Zn=10:1:3 or a neighborhood thereof, or the like can be used as the oxide 530b.

As the oxide 530b, it is also possible to use a metal oxide having a composition of In:Zn=2:1, a composition of In:Zn=5:1, a composition of In:Zn=10:1, or a composition in the neighborhood of any one of these compositions, other than the above-described compositions.

These oxide 530a, the oxide 530b, and the oxide 530c are preferably combined to satisfy the above relation of the atomic ratios. For example, it is preferable that the oxide 530a and the oxide 530c each be a metal oxide having a composition of In:Ga:Zn=1:3:4 or a composition in the neighborhood thereof and the oxide 530b be a metal oxide having a composition of In:Ga:Zn=4:2:3 to 4:2:4.1 or a composition in the neighborhood thereof. Note that the above composition represents the atomic ratio of an oxide formed over a base or the atomic ratio of a sputtering target. Moreover, the proportion of In is preferably increased in the composition of the oxide 530b because the transistor can have a higher on-state current, higher field effect mobility, or the like.

The energy of the conduction band minimum of the oxide 530a and the oxide 530c is preferably higher than the energy of the conduction band minimum of the oxide 530b. In other words, the electron affinity of the oxide 530a and the oxide 530c is preferably smaller than the electron affinity of the oxide 530b.

Here, the energy level of the conduction band minimum gradually changes at junction portions of the oxide 530a, the oxide 530b, and the oxide 530c. In other words, the energy level of the conduction band minimum at the junction portions of the oxide 530a, the oxide 530b, and the oxide 530c continuously changes or is continuously connected. To change the energy level gradually, the density of defect states in a mixed layer formed at the interface between the oxide 530a and the oxide 530b and the interface between the oxide 530b and the oxide 530c is decreased.

Specifically, when the oxide 530a and the oxide 530b or the oxide 530b and the oxide 530c contain a common element (as a main component) in addition to oxygen, a mixed layer with a low density of defect states can be formed. For example, in the case where the oxide 530b is an In—Ga—Zn oxide, it is preferable to use an In—Ga—Zn oxide, a Ga—Zn oxide, gallium oxide, or the like as the oxide 530a and the oxide 530c.

At this time, the oxide 530b serves as a main carrier path. When the oxide 530a and the oxide 530c have the above structure, the density of defect states at the interface between the oxide 530a and the oxide 530b and the interface between the oxide 530b and the oxide 530c can be made low. Thus, the influence of interface scattering on carrier conduction is small, and the transistor 500 can have a high on-state current.

The conductor 542a and the conductor 542b functioning as the source electrode and the drain electrode are provided over the oxide 530b. For the conductor 542a and the conductor 542b, it is preferable to use a metal element selected from aluminum, chromium, copper, silver, gold, platinum, tantalum, nickel, titanium, molybdenum, tungsten, hafnium, vanadium, niobium, manganese, magnesium, zirconium, beryllium, indium, ruthenium, iridium, strontium, and lanthanum; an alloy containing any of the above metal elements; an alloy containing a combination of the above metal elements; or the like. For example, it is preferable to use tantalum nitride, titanium nitride, tungsten, a nitride containing titanium and aluminum, a nitride containing tantalum and aluminum, ruthenium oxide, ruthenium nitride, an oxide containing strontium and ruthenium, an oxide containing lanthanum and nickel, or the like. Tantalum nitride, titanium nitride, a nitride containing titanium and aluminum, a nitride containing tantalum and aluminum, ruthenium oxide, ruthenium nitride, an oxide containing strontium and ruthenium, and an oxide containing lanthanum and nickel are preferable because they are oxidation-resistant conductive materials or materials that maintain their conductivity even after absorbing oxygen. Furthermore, a metal nitride film of tantalum nitride or the like is preferable because it has a barrier property against hydrogen or oxygen.

The conductor 542a and the conductor 542b are shown to have a single-layer structure in FIG. 21A and FIG. 21B, but may have a stacked-layer structure of two or more layers. For example, it is preferable to stack a tantalum nitride film and a tungsten film. Alternatively, a titanium film and an aluminum film may be stacked. Alternatively, a two-layer structure in which an aluminum film is stacked over a tungsten film, a two-layer structure in which a copper film is stacked over a copper-magnesium-aluminum alloy film, a two-layer structure in which a copper film is stacked over a titanium film, or a two-layer structure in which a copper film is stacked over a tungsten film may be employed.

Other examples include a three-layer structure in which a titanium film or a titanium nitride film is formed, an aluminum film or a copper film is stacked over the titanium film or the titanium nitride film, and a titanium film or a titanium nitride film is formed over the aluminum film or the copper film; and a three-layer structure in which a molybdenum film or a molybdenum nitride film is formed, an aluminum film or a copper film is stacked over the molybdenum film or the molybdenum nitride film, and a molybdenum film or a molybdenum nitride film is formed over the aluminum film or the copper film. Note that a transparent conductive material containing indium oxide, tin oxide, or zinc oxide may be used.

As illustrated in FIG. 21A, a region 543a and a region 543b are sometimes formed as low-resistance regions in the oxide 530 at and near the interface with the conductor 542a (the conductor 542b). In this case, the region 543a functions as one of a source region and a drain region, and the region 543b functions as the other of the source region and the drain region. Furthermore, the channel formation region is formed in a region sandwiched between the region 543a and the region 543b.

When the conductor 542a (the conductor 542b) is provided to be in contact with the oxide 530, the oxygen concentration in the region 543a (the region 543b) sometimes decreases. In addition, a metal compound layer that contains the metal contained in the conductor 542a (the conductor 542b) and the component of the oxide 530 is sometimes formed in the region 543a (the region 543b). In such a case, the carrier concentration of the region 543a (the region 543b) increases, and the region 543a (the region 543b) becomes a low-resistance region.

The insulator 544 is provided to cover the conductor 542a and the conductor 542b and inhibits oxidation of the conductor 542a and the conductor 542b. At this time, the insulator 544 may be provided to cover a side surface of the oxide 530 and to be in contact with the insulator 524.

A metal oxide containing one or more selected from hafnium, aluminum, gallium, yttrium, zirconium, tungsten, titanium, tantalum, nickel, germanium, neodymium, lanthanum, magnesium, and the like can be used as the insulator 544. Moreover, silicon nitride oxide, silicon nitride, or the like can be used as the insulator 544.

It is particularly preferable to use an insulator containing an oxide of one or both of aluminum and hafnium, such as aluminum oxide, hafnium oxide, or an oxide containing aluminum and hafnium (hafnium aluminate), as the insulator 544. In particular, hafnium aluminate has higher heat resistance than a hafnium oxide film. Therefore, hafnium aluminate is preferable because it is less likely to be crystallized by heat treatment in a later step. Note that the insulator 544 is not an essential component when the conductor 542a and the conductor 542b are oxidation-resistant materials or do not significantly lose the conductivity even after absorbing oxygen. Design is appropriately determined in consideration of required transistor characteristics.

With the insulator 544, diffusion of impurities such as water and hydrogen contained in the insulator 580 into the oxide 530b through the oxide 530c and the insulator 550 can be inhibited. Furthermore, oxidation of the conductor 560 due to excess oxygen contained in the insulator 580 can be inhibited.

The insulator 550 functions as a first gate insulating film. The insulator 550 is preferably positioned in contact with the inner side (the top surface and the side surface) of the oxide 530c. Like the insulator 524 described above, the insulator 550 is preferably formed using an insulator that contains excess oxygen and releases oxygen by heating.

Specifically, it is possible to use any of silicon oxide, silicon oxynitride, silicon nitride oxide, silicon nitride, silicon oxide to which fluorine is added, silicon oxide to which carbon is added, silicon oxide to which carbon and nitrogen are added, and porous silicon oxide, each of which contains excess oxygen. In particular, silicon oxide and silicon oxynitride, which have thermal stability, are preferable.

When an insulator that releases oxygen by heating is provided as the insulator 550 in contact with the top surface of the oxide 530c, oxygen can be effectively supplied from the insulator 550 to the channel formation region of the oxide 530b through the oxide 530c. Furthermore, as in the insulator 524, the concentration of impurities such as water or hydrogen in the insulator 550 is preferably lowered. The thickness of the insulator 550 is preferably greater than or equal to 1 nm and less than or equal to 20 nm.

To efficiently supply excess oxygen contained in the insulator 550 to the oxide 530, a metal oxide may be provided between the insulator 550 and the conductor 560. The metal oxide preferably inhibits diffusion of oxygen from the insulator 550 to the conductor 560. Providing the metal oxide that inhibits diffusion of oxygen inhibits diffusion of excess oxygen from the insulator 550 to the conductor 560. That is, a reduction in the amount of excess oxygen supplied to the oxide 530 can be inhibited. Moreover, oxidation of the conductor 560 due to excess oxygen can be inhibited. For the metal oxide, a material that can be used for the insulator 544 is used.

Note that the insulator 550 may have a stacked-layer structure like the second gate insulating film. As miniaturization and high integration of transistors progress, a problem such as leakage current may arise because of a thinner gate insulating film; for that reason, when the insulator functioning as a gate insulating film has a stacked-layer structure of a high-k material and a thermally stable material, a gate potential at the time when the transistor operates can be lowered while the physical thickness of the gate insulating film is maintained. Furthermore, the stacked-layer structure can be thermally stable and have a high dielectric constant.

The conductor 560 functioning as the first gate electrode is shown to have a two-layer structure in FIG. 21A and FIG. 21B, but may have a single-layer structure or a stacked-layer structure of three or more layers.

For the conductor 560a, it is preferable to use a conductive material having a function of inhibiting diffusion of impurities such as a hydrogen atom, a hydrogen molecule, a water molecule, a nitrogen atom, a nitrogen molecule, a nitrogen oxide molecule ($N_2O$, $NO$, $NO_2$, and the like), and a copper atom. Alternatively, it is preferable to use a conductive material having a function of inhibiting diffusion of oxygen (e.g., at least one of an oxygen atom, an oxygen molecule, and the like). When the conductor 560a has a function of inhibiting diffusion of oxygen, it is possible to inhibit a reduction in conductivity of the conductor 560b due to oxidation caused by oxygen contained in the insulator 550. As a conductive material having a function of inhibiting oxygen diffusion, tantalum, tantalum nitride, ruthenium, or ruthenium oxide is preferably used, for example. For the conductor 560a, the oxide semiconductor that can be used as the oxide 530 can be used. In that case, when the conductor 560b is deposited by a sputtering method, the conductor 560a can have a reduced electrical resistance value to be a conductor. This can be referred to as an OC (Oxide Conductor) electrode.

For the conductor 560b, it is preferable to use a conductive material containing tungsten, copper, or aluminum as its main component. Furthermore, the conductor 560b also functions as a wiring and thus a conductor having high conductivity is preferably used for the conductor 560b. For example, a conductive material containing tungsten, copper, or aluminum as its main component can be used. Moreover, the conductor 560b may have a stacked-layer structure, for example, a stacked-layer structure of any of the above conductive materials and titanium or titanium nitride.

The insulator 580 is provided over the conductor 542a and the conductor 542b with the insulator 544 therebetween. The insulator 580 preferably includes an excess-oxygen region. For example, the insulator 580 preferably contains silicon oxide, silicon oxynitride, silicon nitride oxide, silicon nitride, silicon oxide to which fluorine is added, silicon oxide to which carbon is added, silicon oxide to which carbon and nitrogen are added, porous silicon oxide, a resin, or the like. Silicon oxide and silicon oxynitride, which have thermal stability, are particularly preferable. In particular, silicon oxide and porous silicon oxide are preferable because an excess-oxygen region can be easily formed in a later step.

The insulator 580 preferably includes an excess-oxygen region. When the insulator 580 that releases oxygen by heating is provided in contact with the oxide 530c, oxygen in the insulator 580 can be efficiently supplied to the oxide 530 through the oxide 530c. The concentration of impurities such as water or hydrogen in the insulator 580 is preferably lowered.

The opening in the insulator 580 is formed to overlap with the region between the conductor 542a and the conductor 542b. Accordingly, the conductor 560 is formed to be embedded in the opening in the insulator 580 and the region sandwiched between the conductor 542a and the conductor 542b.

The gate length needs to be short for miniaturization of the semiconductor device, but it is necessary to prevent a reduction in conductivity of the conductor 560. When the conductor 560 is made thick to achieve this, the conductor 560 might have a shape with a high aspect ratio. In this embodiment, the conductor 560 is provided to be embedded in the opening in the insulator 580; thus, even when the conductor 560 has a shape with a high aspect ratio, the conductor 560 can be formed without collapsing during the process.

The insulator 574 is preferably provided in contact with a top surface of the insulator 580, a top surface of the conductor 560, and a top surface of the insulator 550. When the insulator 574 is deposited by a sputtering method, an excess-oxygen region can be provided in the insulator 550 and the insulator 580. Thus, oxygen can be supplied from the excess-oxygen regions to the oxide 530.

For example, a metal oxide containing one or more selected from hafnium, aluminum, gallium, yttrium, zirconium, tungsten, titanium, tantalum, nickel, germanium, magnesium, and the like can be used as the insulator 574.

In particular, aluminum oxide has a high barrier property, and even a thin aluminum oxide film having a thickness of greater than or equal to 0.5 nm and less than or equal to 3.0 nm can inhibit diffusion of hydrogen and nitrogen. Thus, aluminum oxide deposited by a sputtering method serves as an oxygen supply source and can also have a function of a barrier film against impurities such as hydrogen.

An insulator 581 functioning as an interlayer film is preferably provided over the insulator 574. As in the insulator 524 and the like, the concentration of impurities such as water or hydrogen in the insulator 581 is preferably lowered.

A conductor 540a and a conductor 540b are positioned in openings formed in the insulator 581, the insulator 574, the insulator 580, and the insulator 544. The conductor 540a and the conductor 540b are provided to face each other with the conductor 560 sandwiched therebetween. The conductor 540a and the conductor 540b each have a structure similar to that of a conductor 546 and a conductor 548 that will be described later.

An insulator 582 is provided over the insulator 581. A substance having a barrier property against oxygen or hydrogen is preferably used for the insulator 582. Therefore, a material similar to that for the insulator 514 can be used for the insulator 582. For example, a metal oxide such as aluminum oxide, hafnium oxide, or tantalum oxide is preferably used for the insulator 582.

In particular, aluminum oxide has an excellent blocking effect that prevents transmission of oxygen and impurities such as hydrogen and moisture which would cause a change in the electrical characteristics of the transistor. Accordingly, the use of aluminum oxide can prevent entry of impurities such as hydrogen and moisture into the transistor 500 in and after the manufacturing process of the transistor. In addition, release of oxygen from the oxide included in the transistor 500 can be inhibited. Therefore, aluminum oxide is suitably used for a protective film of the transistor 500.

An insulator 586 is provided over the insulator 582. For the insulator 586, a material similar to that for the insulator 320 can be used. Furthermore, when a material with a comparatively low permittivity is used for these insulators, parasitic capacitance generated between wirings can be reduced. A silicon oxide film, a silicon oxynitride film, or the like can be used for the insulator 586, for example.

The conductor 546, the conductor 548, and the like are embedded in the insulator 520, the insulator 522, the insulator 524, the insulator 544, the insulator 580, the insulator 574, the insulator 581, the insulator 582, and the insulator 586.

The conductor 546 and the conductor 548 function as plugs or wirings that are connected to the capacitor 600, the transistor 500, or the transistor 300. The conductor 546 and the conductor 548 can be provided using a material similar to those for the conductor 328 and the conductor 330.

Note that after the transistor 500 is formed, an opening may be formed to surround the transistor 500 and an insulator having a high barrier property against hydrogen or water may be formed to cover the opening. Surrounding the transistor 500 by the insulator having a high barrier property can prevent entry of moisture and hydrogen from the outside. Alternatively, a plurality of transistors 500 may be collectively surrounded by the insulator having a high barrier property against hydrogen or water. In the case where an opening is formed to surround the transistor 500, for example, the formation of an opening reaching the insulator 514 or the insulator 522 and the formation of the insulator having a high barrier property in contact with the insulator 514 or the insulator 522 are suitable because these formation steps can also serve as some of the manufacturing steps of the transistor 500. For the insulator having a high barrier property against hydrogen or water, a material similar to that for the insulator 522 is used, for example.

The capacitor 600 is provided above the transistor 500. The capacitor 600 includes a conductor 610, a conductor 620, and an insulator 630.

A conductor 612 may be provided over the conductor 546 and the conductor 548. The conductor 612 has a function of a plug or a wiring that is connected to the transistor 500. The conductor 610 has a function of an electrode of the capacitor 600. The conductor 612 and the conductor 610 can be formed at the same time.

As the conductor 612 and the conductor 610, it is possible to use a metal film containing an element selected from molybdenum, titanium, tantalum, tungsten, aluminum, copper, chromium, neodymium, and scandium; a metal nitride film containing any of the above elements as its component (a tantalum nitride film, a titanium nitride film, a molybdenum nitride film, or a tungsten nitride film); or the like. Alternatively, it is possible to use a conductive material such as indium tin oxide, indium oxide containing tungsten oxide, indium zinc oxide containing tungsten oxide, indium oxide containing titanium oxide, indium tin oxide containing titanium oxide, indium zinc oxide, or indium tin oxide to which silicon oxide is added.

The conductor 612 and the conductor 610 are each shown to have a single-layer structure in FIG. 19; however, the structure is not limited thereto, and a stacked-layer structure of two or more layers may be employed. For example, between a conductor having a barrier property and a conductor having high conductivity, a conductor that is highly adhesive to the conductor having a barrier property and the conductor having high conductivity may be formed.

The conductor 620 is provided to overlap with the conductor 610 with the insulator 630 therebetween. For the conductor 620, a conductive material such as a metal material, an alloy material, or a metal oxide material can be used. It is preferable to use a high-melting-point material that has both heat resistance and conductivity, such as tungsten or molybdenum, and it is particularly preferable to use tungsten. In addition, in the case where the conductor 620 is formed concurrently with another component such as a conductor, Cu (copper), Al (aluminum), or the like, which is a low-resistance metal material, is used.

An insulator 650 is provided over the conductor 620 and the insulator 630. The insulator 650 can be provided using a material similar to that for the insulator 320. The insulator 650 may function as a planarization film that covers an uneven shape thereunder.

With the use of this structure, a change in electrical characteristics can be inhibited and reliability can be improved in a semiconductor device using a transistor including an oxide semiconductor. Alternatively, a semiconductor device using a transistor including an oxide semiconductor can be miniaturized or highly integrated.

Figure 22A:
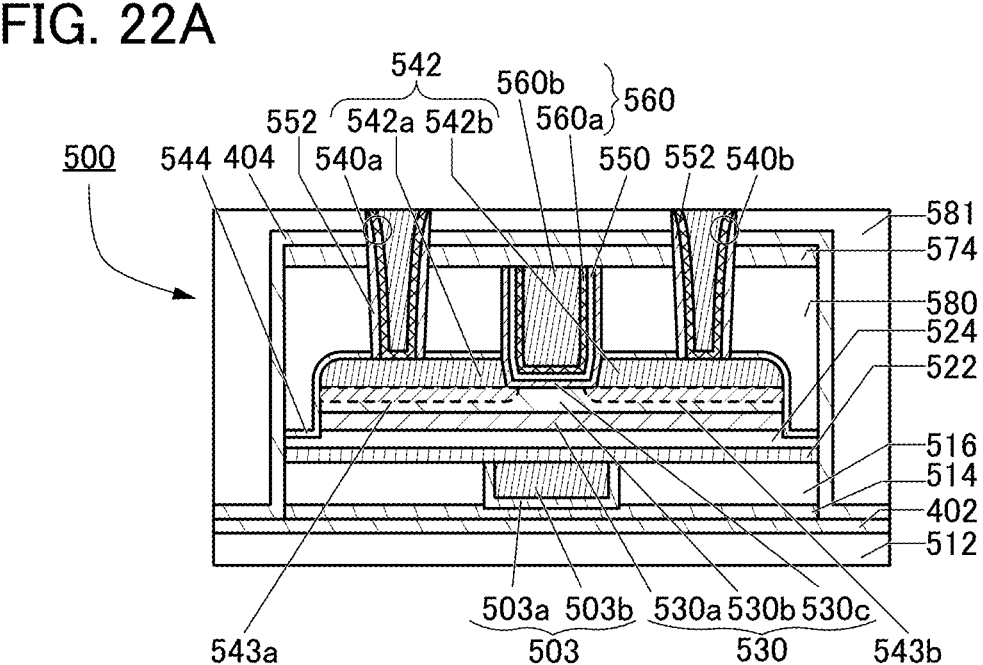
FIG. 22A and FIG. 22B are schematic cross-sectional views illustrating a structure example of a transistor.
Figure 22B:
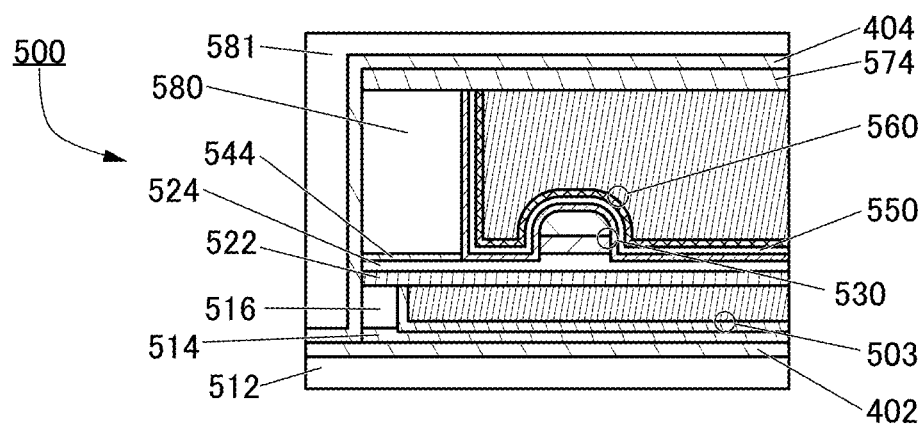

Next, other structure examples of the OS transistors illustrated in FIG. 19 and FIG. 20 are described. FIG. 22A and FIG. 22B show a modification example of the transistor 500 illustrated in FIG. 21A and FIG. 21B; FIG. 22A is a cross-sectional view of the transistor 500 in the channel length direction and FIG. 22B is a cross-sectional view of the transistor 500 in the channel width direction. Note that the structure illustrated in FIG. 22A and FIG. 22B can also be employed for other transistors, such as the transistor 300, included in the semiconductor device of one embodiment of the present invention.

The transistor 500 having the structure illustrated in FIG. 22A and FIG. 22B is different from the transistor 500 having the structure illustrated in FIG. 21A and FIG. 21B in including an insulator 402 and an insulator 404. Another difference from the transistor 500 having the structure illustrated in FIG. 21A and FIG. 21B is that an insulator 552 is provided in contact with a side surface of the conductor 540a and the insulator 552 is provided in contact with a side surface of the conductor 540b. Another difference from the transistor 500 having the structure illustrated in FIG. 21A and FIG. 21B is that the insulator 520 is not included.

In the transistor 500 having the structure illustrated in FIG. 22A and FIG. 22B, the insulator 402 is provided over the insulator 512. In addition, the insulator 404 is provided over the insulator 574 and the insulator 402.

In the transistor 500 having the structure illustrated in FIG. 22A and FIG. 22B, the insulator 514, the insulator 516, the insulator 522, the insulator 524, the insulator 544, the insulator 580, and the insulator 574 are provided and covered with the insulator 404. That is, the insulator 404 is in contact with a top surface of the insulator 574, a side surface of the insulator 574, a side surface of the insulator 580, a side surface of the insulator 544, a side surface of the insulator 524, a side surface of the insulator 522, a side surface of the insulator 516, a side surface of the insulator 514, and a top surface of the insulator 402. Thus, the oxide 530 and the like are isolated from the outside by the insulator 404 and the insulator 402.

The insulator 402 and the insulator 404 preferably have high capability of inhibiting diffusion of hydrogen (e.g., at least one of a hydrogen atom, a hydrogen molecule, and the like) or a water molecule. For example, for the insulator 402 and the insulator 404, silicon nitride or silicon nitride oxide that is a material having a high hydrogen barrier property is preferably used. This can inhibit diffusion of hydrogen or the like into the oxide 530, thereby suppressing the degradation of the characteristics of the transistor 500. Consequently, the reliability of the semiconductor device of one embodiment of the present invention can be increased.

The insulator 552 is provided in contact with the insulator 581, the insulator 404, the insulator 574, the insulator 580, and the insulator 544. The insulator 552 preferably has a function of inhibiting diffusion of hydrogen or water molecules. For example, as the insulator 552, an insulator such as silicon nitride, aluminum oxide, or silicon nitride oxide that is a material having a high hydrogen barrier property is preferably used. In particular, silicon nitride is suitably used for the insulator 552 because it is a material having high hydrogen barrier property. The use of a material having a high hydrogen barrier property for the insulator 552 can inhibit diffusion of impurities such as water and hydrogen from the insulator 580 and the like into the oxide 530 through the conductor 540a and the conductor 540b. Furthermore, oxygen contained in the insulator 580 can be inhibited from being absorbed by the conductor 540a and the conductor 540b. As described above, the reliability of the semiconductor device of one embodiment of the present invention can be increased.

Figure 23:
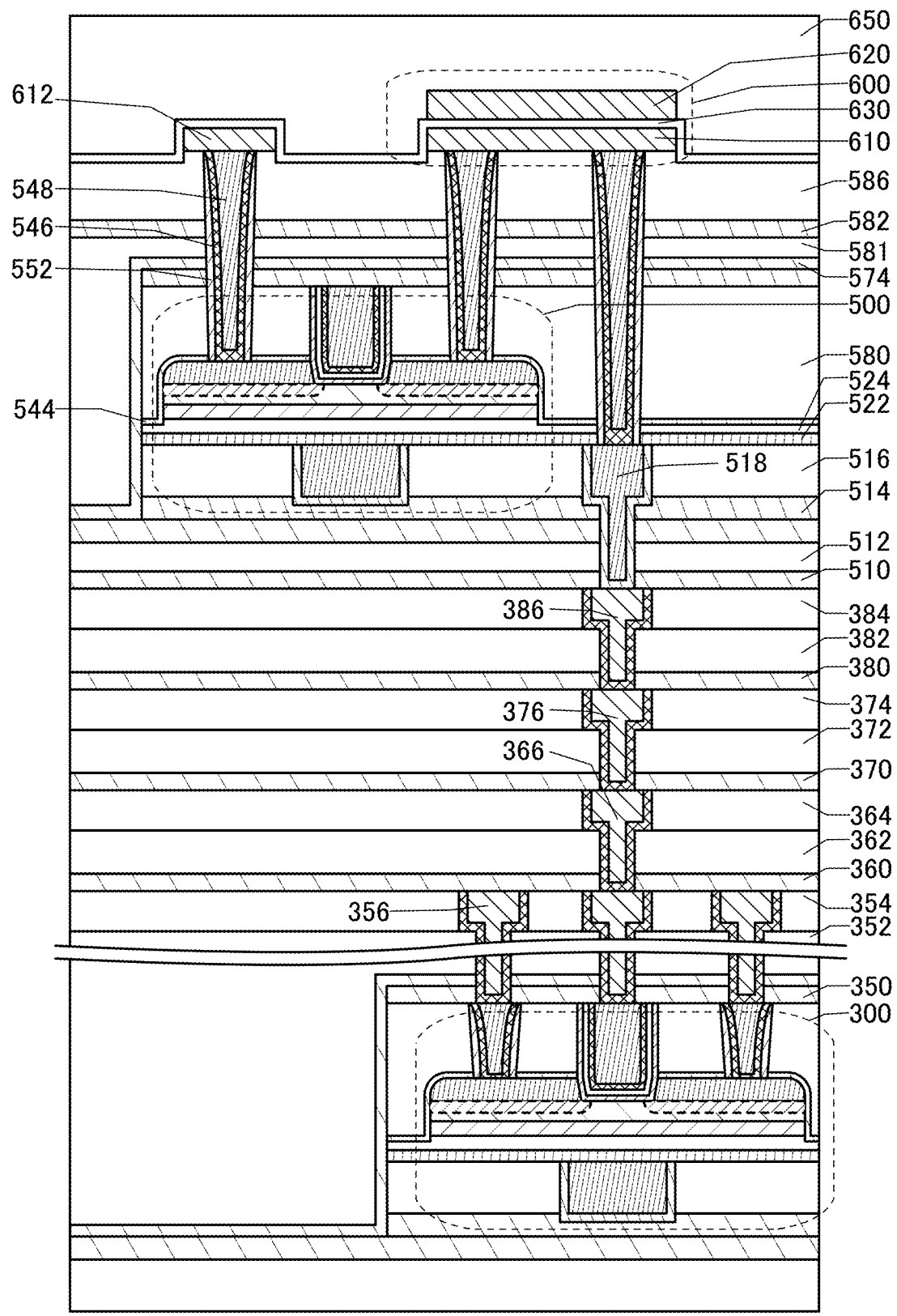
FIG. 23 is a schematic cross-sectional view illustrating a structure example of a semiconductor device.

FIG. 23 is a cross-sectional view showing a structure example of a semiconductor device in the case where the transistor 500 and the transistor 300 each have the structure illustrated in FIG. 22A and FIG. 22B. The insulator 552 is provided on a side surface of the conductor 546.

Figure 24A:
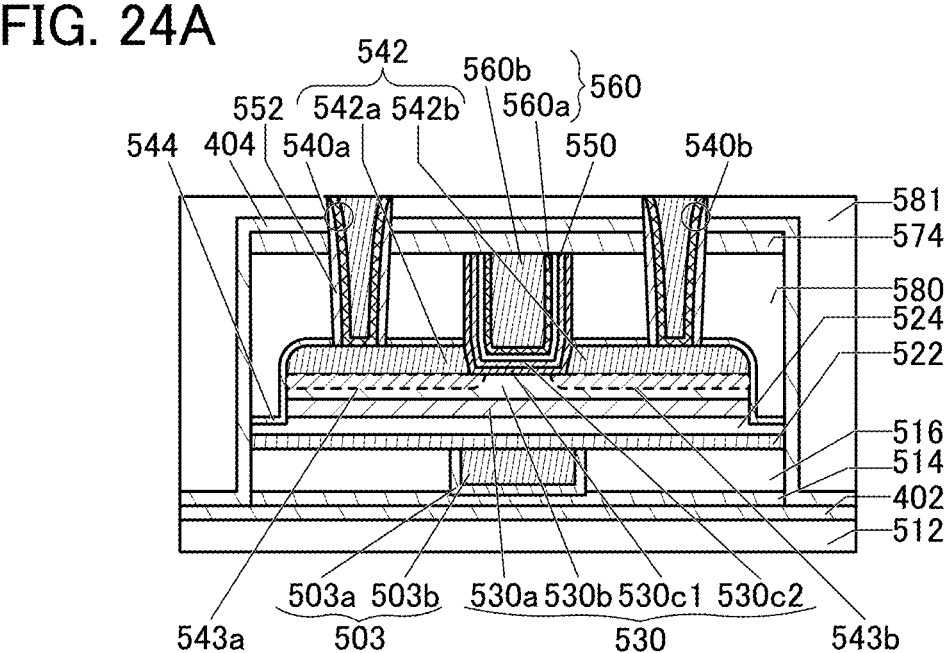
FIG. 24A and FIG. 24B are schematic cross-sectional views illustrating a structure example of a transistor.
Figure 24B:
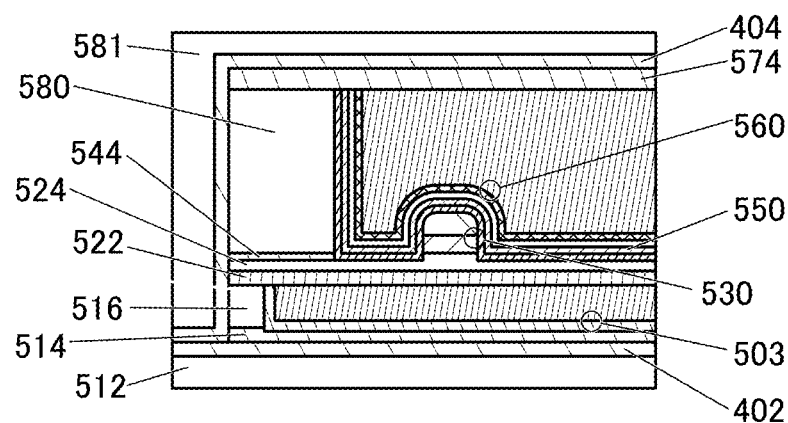

The transistor structure of the transistor 500 illustrated in FIG. 22A and FIG. 22B may be changed according to circumstances. As the modification example of the transistor 500 illustrated in FIG. 22A and FIG. 22B, a transistor illustrated in FIG. 24 can be employed, for example. FIG. 24A is a cross-sectional view of the transistor in the channel length direction and FIG. 24B is a cross-sectional view of the transistor in the channel width direction. The transistor illustrated in FIG. 24A and FIG. 24B is different from the transistor illustrated in FIG. 22A and FIG. 22B in that the oxide 530c has a two-layer structure of an oxide 530c1 and an oxide 530c2.

The oxide 530c1 is in contact with a top surface of the insulator 524, a side surface of the oxide 530a, a top surface and a side surface of the oxide 530b, side surfaces of the conductor 542a and the conductor 542b, a side surface of the insulator 544, and a side surface of the insulator 580. The oxide 530c2 is in contact with the insulator 550.

An In—Zn oxide can be used as the oxide 530c1, for example. As the oxide 530c2, it is possible to use a material similar to a material that can be used for the oxide 530c when the oxide 530c has a single-layer structure. As the oxide 530c2, a metal oxide with n:Ga:Zn=1:3:4 [atomic ratio], Ga:Zn=2:1 [atomic ratio], or Ga:Zn=2:5 [atomic ratio] can be used, for example.

When the oxide 530c has a two-layer structure of the oxide 530c1 and the oxide 530c2, the on-state current of the transistor can be increased as compared with the case where the oxide 530c has a single-layer structure. Thus, the transistor can be used as a power MOS transistor, for example. Note that the oxide 530c included in the transistor having the structure illustrated in FIG. 21A and FIG. 21B can also have a two-layer structure of the oxide 530c1 and the oxide 530c2.

The transistor having the structure illustrated in FIG. 24A and FIG. 24B can be used as, for example, the transistor 300 illustrated in FIG. 19 and FIG. 20. As described above, the transistor 300 can be used as the transistor Tr12 or the like in the memory cell array CA included in the arithmetic circuit MAC1 or the like described in the above embodiment, for example. Note that the transistor illustrated in FIG. 24A and FIG. 24B can be used as a transistor included in the semiconductor device of one embodiment of the present invention, other than the transistors 300 and 500.

Figure 25:
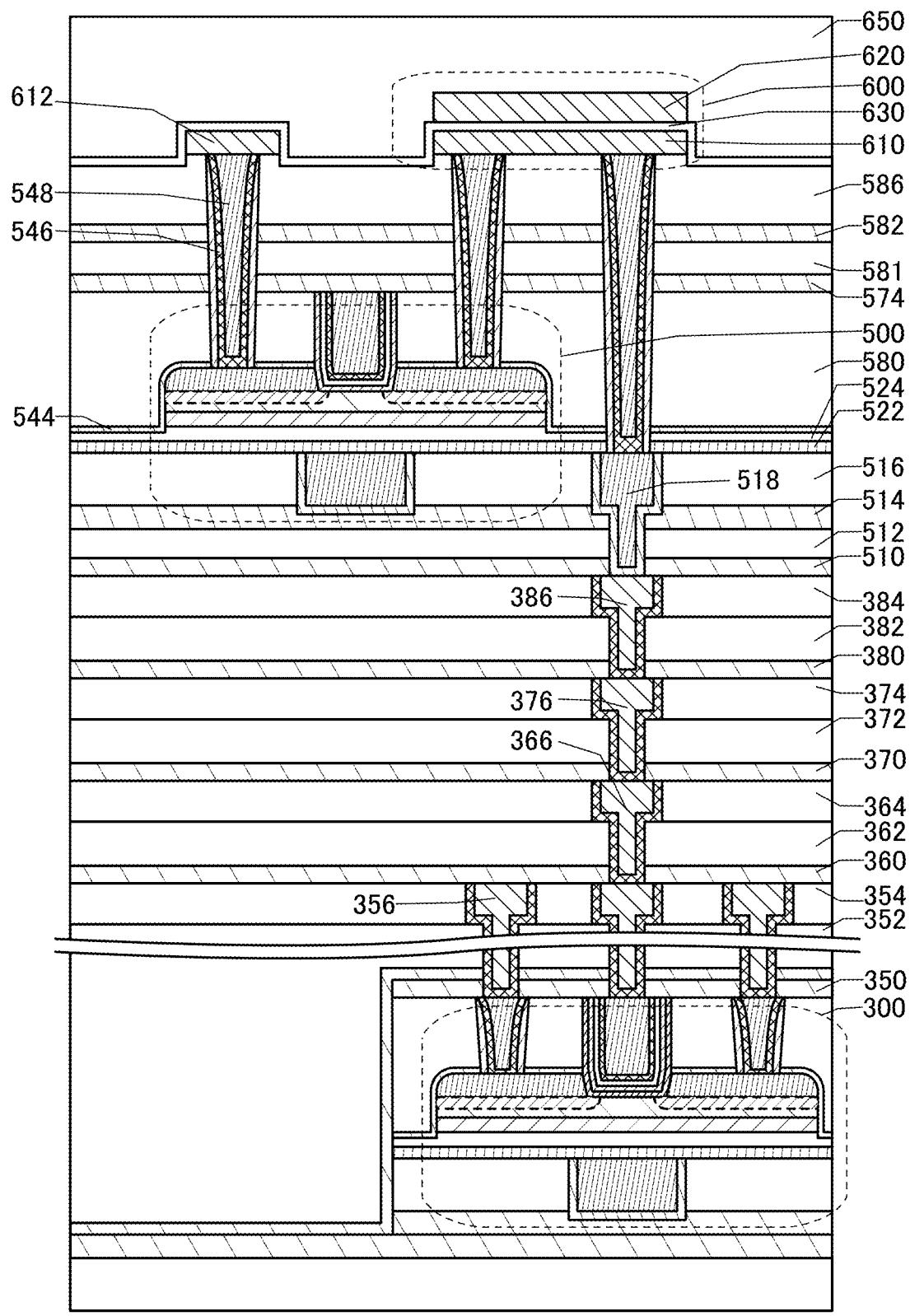
FIG. 25 is a schematic cross-sectional view illustrating a structure example of a semiconductor device.

FIG. 25 is a cross-sectional view showing a structure example of a semiconductor device in the case where the transistor 500 has the transistor structure illustrated in FIG. 21A and the transistor 300 has the transistor structure illustrated in FIG. 24A. Note that as in FIG. 23, the structure is employed in which the insulator 552 is provided on the side surface of the conductor 546. As illustrated in FIG. 25, in the semiconductor device of one embodiment of the present invention, the transistor 300 and the transistor 500 can have different structures while the transistor 300 and the transistor 500 are both OS transistors.

Next, a capacitor that can be used in the semiconductor devices in FIG. 19 and FIG. 20 is described.

Figure 26A:
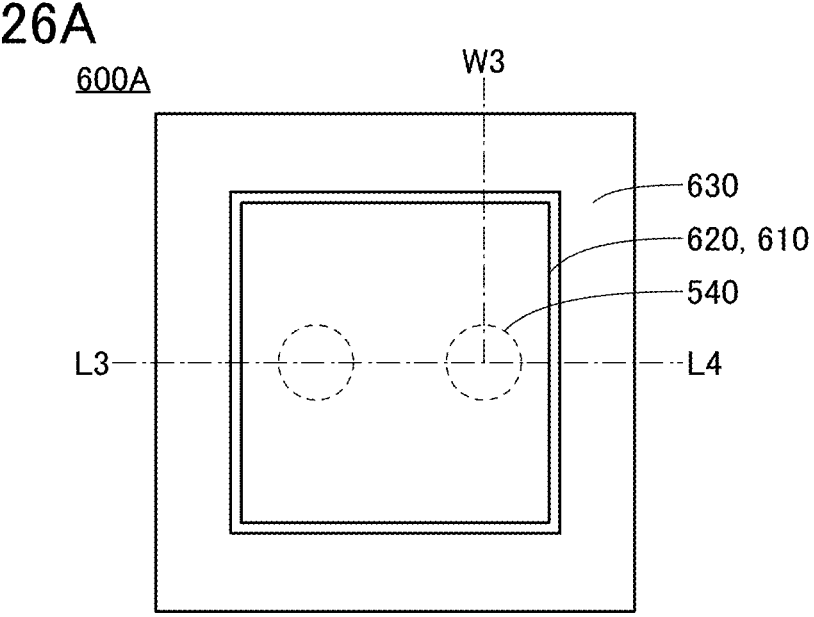
FIG. 26A is a top view illustrating a structure example of a capacitor.
Figure 26B:
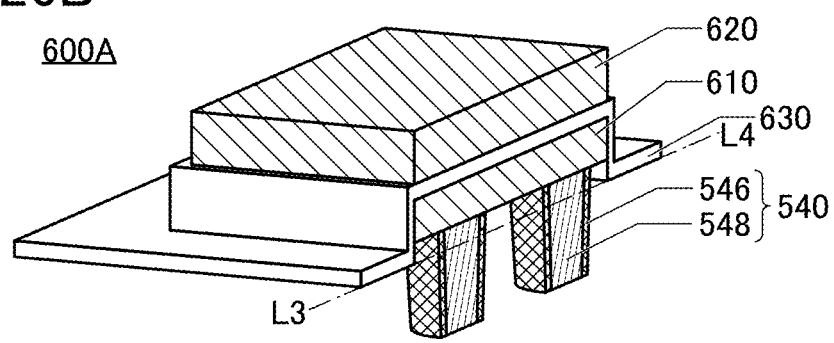
FIG. 26B and FIG. 26C are cross-sectional perspective views illustrating a structure example of the capacitor.
Figure 26C:
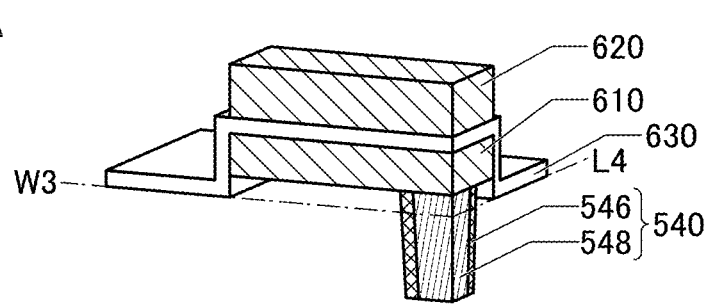

FIG. 26A to FIG. 26C illustrate a capacitor 600A as an example of the capacitor 600 that can be used in the semiconductor device illustrated in FIG. 19. FIG. 26A is a top view of the capacitor 600A, FIG. 26B is a perspective view illustrating a cross section of the capacitor 600A along the dashed-dotted line L3-L4, and FIG. 26C is a perspective view illustrating a cross section of the capacitor 600A along the dashed-dotted line W3-L4.

The conductor 610 functions as one of a pair of electrodes of the capacitor 600A, and the conductor 620 functions as the other of the pair of electrodes of the capacitor 600A. The insulator 630 functions as a dielectric sandwiched between the pair of electrodes.

The insulator 630 can be provided to have a single-layer structure or a stacked-layer structure using, for example, silicon oxide, silicon oxynitride, silicon nitride oxide, silicon nitride, aluminum oxide, aluminum oxynitride, aluminum nitride oxide, aluminum nitride, hafnium oxide, hafnium oxynitride, hafnium nitride oxide, hafnium nitride, or zirconium oxide.

Alternatively, for the insulator 630, a stacked-layer structure using a material with high dielectric strength such as silicon oxynitride and a high permittivity (high-k) material may be used, for example. In the capacitor 600A having such a structure, a sufficient capacitance can be ensured owing to the high permittivity (high-k) insulator, and the dielectric strength can be increased owing to the insulator with high dielectric strength, so that the electrostatic breakdown of the capacitor 600A can be inhibited.

As the insulator of a high permittivity (high-k) material (high dielectric constant material), gallium oxide, hafnium oxide, zirconium oxide, an oxide containing aluminum and hafnium, an oxynitride containing aluminum and hafnium, an oxide containing silicon and hafnium, an oxynitride containing silicon and hafnium, a nitride containing silicon and hafnium, or the like can be given.

Alternatively, for example, a single layer or stacked layers of an insulator containing a high-k material, such as aluminum oxide, hafnium oxide, tantalum oxide, zirconium oxide, lead zirconate titanate (PZT), strontium titanate ($SrTiO_3$), or $(Ba,Sr)TiO_3$ (BST), may be used as the insulator 630. In the case where the insulator 630 has stacked layers, a three-layer structure in which zirconium oxide, aluminum oxide, and zirconium oxide are formed in this order, or a four-layer structure in which zirconium oxide, aluminum oxide, zirconium oxide, and aluminum oxide are formed in this order can be employed, for example. For the insulator 630, a compound containing hafnium and zirconium may be employed. As miniaturization and high integration of a semiconductor device progress, a problem such as leakage current from a transistor and a capacitor may arise because of a thinner gate insulator and a thinner dielectric used for a capacitor. When a high-k material is used as a gate insulator and an insulator functioning as a dielectric used for a capacitor, a gate potential during operation of the transistor can be lowered and capacitance of the capacitor can be ensured while the physical thickness is maintained.

The bottom portion of the conductor 610 in the capacitor 600 is electrically connected to the conductor 546 and the conductor 548. The conductor 546 and the conductor 548 function as plugs or wirings for connection to another circuit element. In FIG. 26A to FIG. 26C, the conductor 546 and the conductor 548 are collectively denoted as a conductor 540.

For clarification of the drawing, the insulator 586 in which the conductor 546 and the conductor 548 are embedded and the insulator 650 that covers the conductor 620 and the insulator 630 are omitted in FIG. 26A to FIG. 26C.

Although the capacitor 600 illustrated in each of FIG. 19, FIG. 20, and FIG. 26A to FIG. 26C is a planar capacitor, the shape of the capacitor is not limited thereto. For example, the capacitor 600 may be a cylindrical capacitor 600B illustrated in FIG. 27A to FIG. 27C.

Figure 27A:
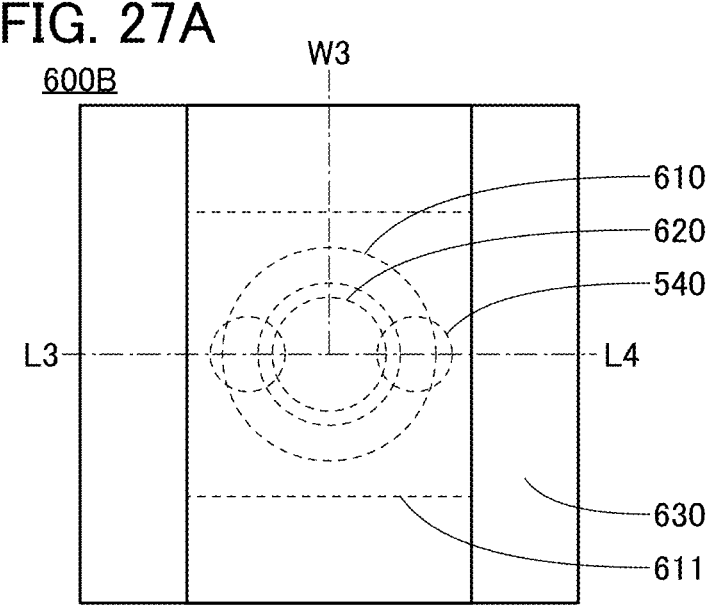
FIG. 27A is a top view illustrating a structure example of a capacitor.
Figure 27B:
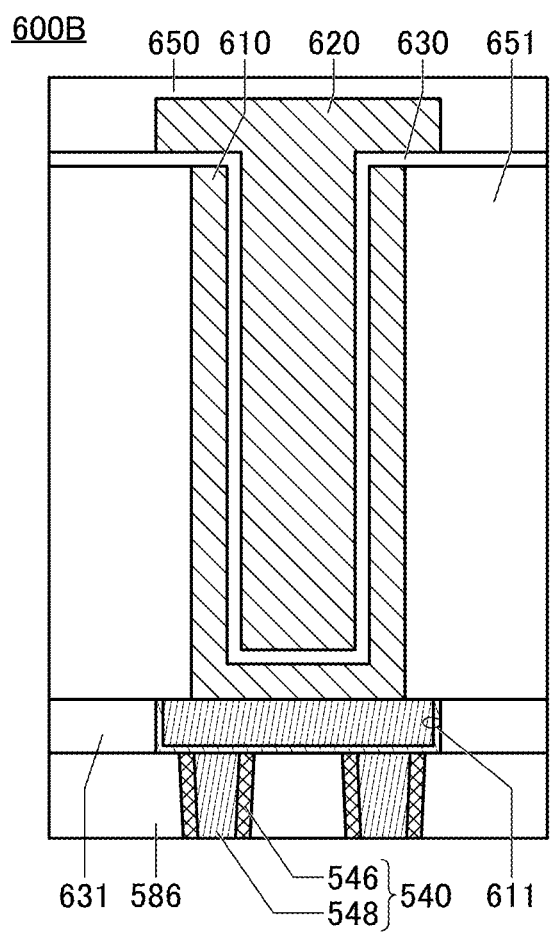
FIG. 27B is a cross-sectional view illustrating a structure example of the capacitor.
Figure 27C:
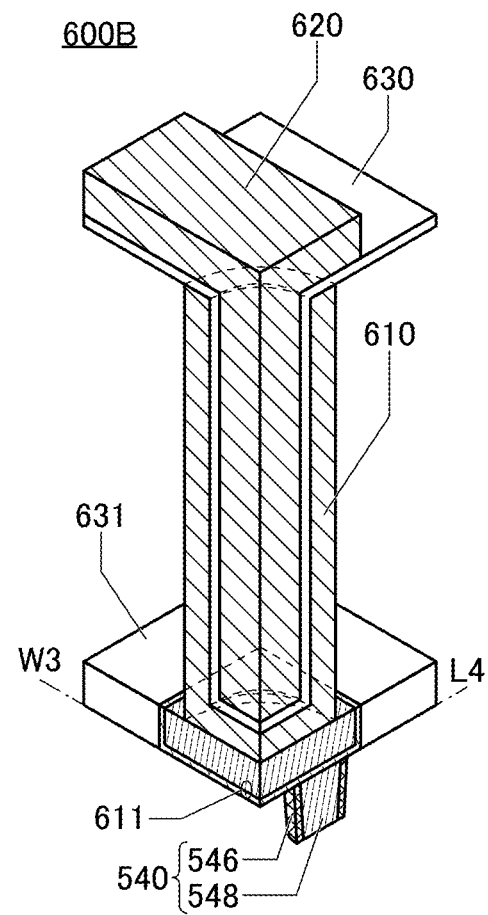
FIG. 27C is a cross-sectional perspective view illustrating a structure example of the capacitor.

FIG. 27A is a top view of the capacitor 600B, FIG. 27B is a perspective view illustrating a cross section of the capacitor 600B along the dashed-dotted line L3-L4, and FIG. 27C is a perspective view illustrating a cross section of the capacitor 600B along the dashed-dotted line W3-L4.

In FIG. 27B, the capacitor 600B includes an insulator 631 over the insulator 586 in which the conductor 540 is embedded, an insulator 651 having an opening, the conductor 610 functioning as one of a pair of electrodes, and the conductor 620 functioning as the other of the pair of electrodes.

For clarification of the drawing, the insulator 586, the insulator 650, and the insulator 651 are omitted in FIG. 27C.

For the insulator 631, a material similar to that for the insulator 586 can be used, for example.

A conductor 611 is embedded in the insulator 631 to be electrically connected to the conductor 540. For the conductor 611, a material similar to those for the conductor 330 and the conductor 518 can be used, for example.

For the insulator 651, a material similar to that for the insulator 586 can be used, for example.

The insulator 651 has an opening as described above, and the opening overlaps with the conductor 611.

The conductor 610 is formed on the bottom portion and the side surface of the opening. In other words, the conductor 610 overlaps with the conductor 611 and is electrically connected to the conductor 611.

The conductor 610 is formed in such a manner that an opening portion is formed in the insulator 651 by an etching method or the like, and then the conductor 610 is deposited by a sputtering method, an ALD method, or the like. After that, the conductor 610 deposited over the insulator 651 is removed by a CMP (Chemical Mechanical Polishing) method or the like while the conductor 610 deposited in the opening portion is left.

The insulator 630 is positioned over the insulator 651 and over the formation surface of the conductor 610. Note that the insulator 630 functions as a dielectric sandwiched between the pair of electrodes in the capacitor.

The conductor 620 is formed over the insulator 630 so as to fill the opening portion of the insulator 651.

The insulator 650 is formed to cover the insulator 630 and the conductor 620.

The capacitance value of the cylindrical capacitor 600B illustrated in FIG. 27A to FIG. 27C can be higher than that of the planar capacitor 600A. Thus, when the capacitor 600B is used as the capacitor C1 and the capacitor C2 described in the above embodiment, for example, a voltage between the terminals of the capacitor can be maintained for a long time.

Note that this embodiment can be combined with the other embodiments in this specification as appropriate.

Embodiment 4

In this embodiment, the compositions of a CAC-OS (Cloud-Aligned Composite Oxide Semiconductor) and a CAAC-OS (c-axis Aligned Crystalline Oxide Semiconductor) which are metal oxides that can be used in the OS transistor described in the above embodiment is described.
<Composition of Metal Oxide>

A CAC-OS or a CAC-metal oxide has a conducting function in part of the material and has an insulating function in another part of the material; as a whole, the CAC-OS or the CAC-metal oxide has a function of a semiconductor. In the case where the CAC-OS or the CAC-metal oxide is used in an active layer of a transistor, the conducting function is a function of allowing electrons (or holes) serving as carriers to flow, and the insulating function is a function of not allowing electrons serving as carriers to flow. By the complementary action of the conducting function and the insulating function, a switching function (On/Off function) can be given to the CAC-OS or the CAC-metal oxide. In the CAC-OS or the CAC-metal oxide, separation of the functions can maximize each function.

The CAC-OS or the CAC-metal oxide includes conductive regions and insulating regions. The conductive regions have the above-described conducting function, and the insulating regions have the above-described insulating function. Furthermore, in some cases, the conductive regions and the insulating regions in the material are separated at the nanoparticle level. Furthermore, in some cases, the conductive regions and the insulating regions are unevenly distributed in the material. Furthermore, in some cases, the conductive regions are observed to be coupled in a cloud-like manner with their boundaries blurred.

In the CAC-OS or the CAC-metal oxide, the conductive regions and the insulating regions each have a size greater than or equal to 0.5 nm and less than or equal to 10 nm, preferably greater than or equal to 0.5 nm and less than or equal to 3 nm and are dispersed in the material in some cases.

The CAC-OS or the CAC-metal oxide includes components having different band gaps. For example, the CAC-OS or the CAC-metal oxide includes a component having a wide gap due to the insulating region and a component having a narrow gap due to the conductive region. In the case of the structure, when carriers flow, carriers mainly flow in the component having a narrow gap. Furthermore, the component having a narrow gap complements the component having a wide gap, and carriers also flow in the component having a wide gap in conjunction with the component having a narrow gap. Therefore, in the case where the above-described CAC-OS or CAC-metal oxide is used in a channel formation region of a transistor, high current drive capability in the on state of the transistor, that is, a high on-state current and high field-effect mobility can be obtained.

In other words, the CAC-OS or the CAC-metal oxide can also be referred to as a matrix composite or a metal matrix composite.

<Structure of Metal Oxide>

Oxide semiconductors can be classified into a single crystal oxide semiconductor and a non-single-crystal oxide semiconductor. Examples of the non-single-crystal oxide semiconductors include a CAAC-OS, a polycrystalline oxide semiconductor, an nc-OS (nanocrystalline oxide semiconductor), an amorphous-like oxide semiconductor (a-like OS), and an amorphous oxide semiconductor.

Oxide semiconductors might be classified in a manner different from the above-described one when classified in terms of the crystal structure. Here, the classification of the crystal structures of an oxide semiconductor is described with reference to FIG. 28A. FIG. 28A is a diagram showing the classification of crystal structures of an oxide semiconductor, typically IGZO (a metal oxide containing In, Ga, and Zn).

As shown in FIG. 28A, IGZO is roughly classified into Amorphous, Crystalline, and Crystal. Amorphous includes completely amorphous. Crystalline includes CAAC (c-axis-aligned crystalline), nc (nanocrystalline), and CAC (Cloud-Aligned Composite). Note that single crystal, poly crystal, and completely amorphous are excluded from the category of "Crystalline". Crystal includes single crystal and poly crystal.

Note that the structures in the thick frame in FIG. 28A are in an intermediate state between Amorphous and Crystal, and belong to a new crystalline phase. This structure is positioned in a boundary region between Amorphous and Crystal. In other words, these structures are completely different from Amorphous, which is energetically unstable, and Crystal.

A crystal structure of a film or a substrate can be analyzed with X-ray diffraction (XRD) images. Here, XRD spectra of quartz glass and IGZO, which has a crystal structure classified into Crystalline (also referred to as Crystalline IGZO), are shown in FIG. 28B and FIG. 28C. FIG. 28B shows an XRD spectrum of quartz glass and FIG. 28C shows an XRD spectrum of Crystalline IGZO. Note that the Crystalline IGZO shown in FIG. 28C has a composition in vicinity of In:Ga:Zn=4:2:3 [atomic ratio]. Furthermore, the Crystalline IGZO shown in FIG. 28C has a thickness of 500 nm.

As indicated by arrows in FIG. 28B, the XRD spectrum of the quartz glass shows a peak with a substantially bilaterally symmetrical shape. In contrast, as indicated by arrows in FIG. 28C, the peak in the XRD spectrum of the Crystalline IGZO has an asymmetrical shape. The asymmetrical peak of the XRD spectrum clearly shows the existence of crystal. In other words, the structure cannot be regarded as Amorphous unless it has a bilaterally symmetrical peak in the XRD spectrum. Note that in FIG. 28C, a crystal phase (IGZO crystal phase) is explicitly denoted at 2θ of 31° or in the vicinity thereof. The asymmetrical peak of the XRD spectrum probably result from the crystal phase (microcrystal).

Specifically, in the XRD spectrum of the Crystalline IGZO shown in FIG. 28C, the peak appears at 2θ of 34° or in the vicinity thereof. Furthermore, the microcrystal has a peak at 2θ of 31° or in the vicinity thereof. In the case of evaluating an oxide semiconductor film with an X-ray diffraction pattern, as shown in FIG. 28C, the spectral width on the low angle side of the peak at 2θ of 34° or in the vicinity thereof is wider. This indicates that the oxide semiconductor film includes a microcrystal having the peak at 2θ of 31° or in the vicinity thereof.

A crystal structure of a film can be evaluated with a diffraction pattern obtained by a nanobeam electron diffraction method (NBED) (such a pattern is also referred to as a nanobeam electron diffraction pattern). FIG. 28D shows a diffraction pattern of an IGZO film formed with the substrate temperature set at room temperature. Note that the IGZO film of FIG. 28D is formed by a sputtering method using an oxide target with In:Ga:Zn=1:1:1 [atomic ratio]. In the nanobeam electron diffraction method, electron diffraction is performed with a probe diameter of 1 nm.

As shown in FIG. 28D, not a halo pattern but a spot-like pattern is observed in the diffraction pattern of the IGZO film formed at room temperature. Thus, it is presumed that the IGZO film formed at room temperature is in an intermediate state, which is neither a crystal state nor an amorphous state, and it cannot be concluded that the IGZO film is in an amorphous state.

The CAAC-OS has c-axis alignment, a plurality of nanocrystals are connected in the a-b plane direction, and its crystal structure has distortion. Note that the distortion refers to a portion where the direction of a lattice arrangement changes between a region with a regular lattice arrangement and another region with a regular lattice arrangement in a region where the plurality of nanocrystals are connected.

The nanocrystal is basically a hexagon but is not always a regular hexagon and is a non-regular hexagon in some cases. Furthermore, a pentagonal or heptagonal lattice arrangement, for example, is included in the distortion in some cases. Note that a clear crystal grain boundary (also referred to as grain boundary) cannot be observed even in the vicinity of distortion in the CAAC-OS. That is, formation of a crystal grain boundary is inhibited by the distortion of lattice arrangement. This is probably because the CAAC-OS can tolerate distortion owing to a low density of arrangement of oxygen atoms in the a-b plane direction, an interatomic bond length changed by substitution of a metal element, and the like.

A crystal structure in which a clear crystal grain boundary (grain boundary) is observed is what is called a polycrystal. It is highly probable that the crystal grain boundary becomes a recombination center and traps carriers and thus decreases the on-state current or field-effect mobility of a transistor. Thus, the CAAC-OS in which no clear crystal grain boundary is observed is one of crystalline oxides having a crystal structure suitable for a semiconductor layer of a transistor. Note that Zn is preferably contained to form the CAAC-OS. For example, an In—Zn oxide and an In—Ga—Zn oxide are suitable because they can inhibit generation of a crystal grain boundary as compared with an In oxide.

The CAAC-OS tends to have a layered crystal structure (also referred to as a layered structure) in which a layer containing indium and oxygen (hereinafter, In layer) and a layer containing the element M, zinc, and oxygen (hereinafter, (M,Zn) layer) are stacked. Note that indium and the element M can be replaced with each other, and when the element M in the (M,Zn) layer is replaced with indium, the layer can also be referred to as an (In,M,Zn) layer. Furthermore, when indium in the In layer is replaced with the element M, the layer can be referred to as an (In,M) layer.

The CAAC-OS is an oxide semiconductor with high crystallinity. Meanwhile, in the CAAC-OS, a reduction in electron mobility due to a crystal grain boundary is unlikely to occur because a clear crystal grain boundary cannot be observed. Moreover, since the crystallinity of an oxide semiconductor might be decreased by entry of impurities, formation of defects, or the like, the CAAC-OS can be regarded as an oxide semiconductor that has small amounts of impurities and defects (e.g., oxygen vacancies). Thus, an oxide semiconductor including the CAAC-OS is physically stable. Therefore, the oxide semiconductor including the CAAC-OS is resistant to heat and has high reliability. In addition, the CAAC-OS is stable with respect to high temperature in the manufacturing process (what is called thermal budget). Accordingly, the use of the CAAC-OS for the OS transistor can extend the degree of freedom of the manufacturing process.

In the nc-OS, a microscopic region (e.g., a region with a size greater than or equal to 1 nm and less than or equal to 10 nm, in particular, a region with a size greater than or equal to 1 nm and less than or equal to 3 nm) has a periodic atomic arrangement. Furthermore, there is no regularity of crystal orientation between different nanocrystals in the nc-OS. Thus, the orientation in the whole film is not observed. Accordingly, the nc-OS cannot be distinguished from an a-like OS or an amorphous oxide semiconductor by some analysis methods.

The a-like OS is an oxide semiconductor having a structure between those of the nc-OS and the amorphous oxide semiconductor. The a-like OS contains a void or a low-density region. That is, the a-like OS has low crystallinity as compared with the nc-OS and the CAAC-OS.

An oxide semiconductor has various structures with different properties. Two or more of the amorphous oxide semiconductor, the polycrystalline oxide semiconductor, the a-like OS, the nc-OS, and the CAAC-OS may be included in an oxide semiconductor of one embodiment of the present invention.

<Transistor Including Oxide Semiconductor>

Next, the case where the above oxide semiconductor is used in a transistor is described.

When the above oxide semiconductor is used in a transistor, a transistor with high field-effect mobility can be achieved. In addition, a transistor having high reliability can be achieved.

An oxide semiconductor with a low carrier concentration is preferably used for the transistor. In the case where the carrier concentration of an oxide semiconductor film is lowered, the impurity concentration in the oxide semiconductor film is lowered to decrease the density of defect states. In this specification and the like, a state with a low impurity concentration and a low density of defect states is sometimes referred to as a highly purified intrinsic or substantially highly purified intrinsic state, or is sometimes referred to as an intrinsic or substantially intrinsic state.

A highly purified intrinsic or substantially highly purified intrinsic oxide semiconductor film has a low density of defect states and thus has a low density of trap states in some cases.

Electric charge trapped by the trap states in the oxide semiconductor takes a long time to disappear and might behave like fixed electric charge. Thus, a transistor whose channel formation region is formed in an oxide semiconductor with a high density of trap states has unstable electrical characteristics in some cases.

Accordingly, in order to obtain stable electrical characteristics of a transistor, reducing the concentration in an oxide semiconductor is effective. In order to reduce the impurity concentration in the oxide semiconductor, it is preferable that the impurity concentration in an adjacent film be also reduced. Examples of impurities include hydrogen, nitrogen, alkali metal, alkaline earth metal, iron, nickel, and silicon.

<Impurity>

Here, the influence of each impurity in the oxide semiconductor is described.

When silicon or carbon, which is one of Group 14 elements, is contained in the oxide semiconductor, defect states are formed in the oxide semiconductor. Thus, the concentration of silicon or carbon in the oxide semiconductor and the concentration of silicon or carbon in the vicinity of an interface with the oxide semiconductor (the concentration obtained by secondary ion mass spectrometry (SIMS)) are set lower than or equal to $2 \times 10^{18}$ atoms/cm$^3$, preferably lower than or equal to $2 \times 10^{17}$ atoms/cm$^3$.

When the oxide semiconductor contains an alkali metal or an alkaline earth metal, defect states are formed and carriers are generated in some cases. Thus, a transistor using an oxide semiconductor that contains an alkali metal or an alkaline earth metal is likely to have normally-on characteristics. Accordingly, it is preferable to reduce the concentration of an alkali metal or an alkaline earth metal in the oxide semiconductor. Specifically, the concentration of an alkali metal or an alkaline earth metal in the oxide semiconductor that is obtained by SIMS is set lower than or equal to $1 \times 10^{18}$ atoms/cm$^3$, preferably lower than or equal to $2 \times 10^{16}$ atoms/cm$^3$.

When the oxide semiconductor contains nitrogen, the oxide semiconductor easily becomes n-type by generation of electrons serving as carriers and an increase in carrier concentration. As a result, a transistor using an oxide semiconductor containing nitrogen as a semiconductor is likely to have normally-on characteristics. Hence, nitrogen in the oxide semiconductor is preferably reduced as much as possible; the nitrogen concentration in the oxide semiconductor that is obtained by SIMS is set, for example, lower than $5\times10^{19}$ atoms/cm$^3$, preferably lower than or equal to $5\times10^{18}$ atoms/cm$^3$, further preferably lower than or equal to $1\times10^{18}$ atoms/cm$^3$, still further preferably lower than or equal to $5\times10^{17}$ atoms/cm$^3$.

Hydrogen contained in the oxide semiconductor reacts with oxygen bonded to a metal atom to be water, and thus forms an oxygen vacancy in some cases. Entry of hydrogen into the oxygen vacancy generates an electron serving as a carrier in some cases. Furthermore, bonding of part of hydrogen to oxygen bonded to a metal atom causes generation of an electron serving as a carrier in some cases. Thus, a transistor using an oxide semiconductor containing hydrogen is likely to have normally-on characteristics. Accordingly, hydrogen in the oxide semiconductor is preferably reduced as much as possible. Specifically, the hydrogen concentration in the oxide semiconductor that is obtained by SIMS is set lower than $1\times10^{20}$ atoms/cm$^3$, preferably lower than $1\times10^{19}$ atoms/cm$^3$, further preferably lower than $5\times10^{18}$ atoms/cm$^3$, still further preferably lower than $1\times10^{18}$ atoms/cm$^3$.

When an oxide semiconductor with sufficiently reduced impurities is used for the channel formation region of the transistor, stable electrical characteristics can be given.

Note that this embodiment can be combined with the other embodiments in this specification as appropriate.

Example 1

In this example, various measurements and various calculations were performed on an actually fabricated circuit to confirm whether the product of the first data and the second data is properly calculated in the memory cell AM of the arithmetic circuit MAC1 described in Embodiment 2.

<Measurement and Calculation>

Figure 29A:
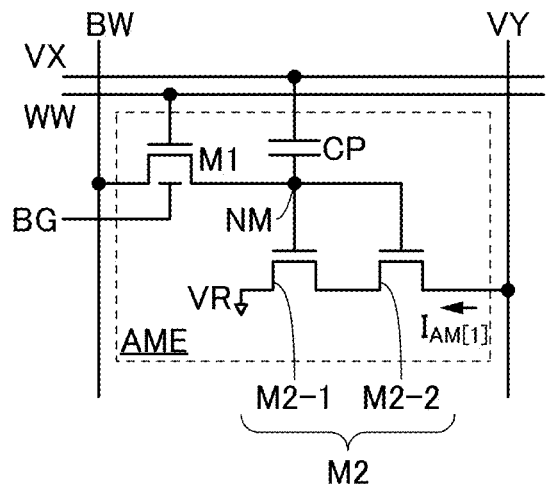
FIG. 29A is a circuit diagram illustrating a structure of a multiplier circuit included in a fabricated semiconductor device.

A multiplier circuit AME illustrated in FIG. 29A is part of the actually fabricated arithmetic circuit and corresponds to the memory cell AM of the arithmetic circuit MAC1 described in Embodiment 2. A transistor M1 and a capacitor CP included in the multiplier circuit AME correspond to the transistor M1 and the capacitor C1, respectively, included in the memory cell AM illustrated in FIG. 9. In particular, a transistor M2-1 and a transistor M2-2 included in the multiplier circuit AME correspond to the transistor M2 included in the memory cell AM illustrated in FIG. 9. That is, the transistor M2-1 and the transistor M2-2 are electrically connected in series and the gates thereof are electrically connected to each other. In this example, the transistor M2-1 and the transistor M2-2 are collectively referred to as the transistor M2. Furthermore, a wiring VY illustrated in FIG. 29A corresponds to the wiring BL in FIG. 9, a wiring BW illustrated in FIG. 29A corresponds to the wiring WD in FIG. 9, a wiring VX illustrated in FIG. 29A corresponds to the wiring CL in FIG. 9, and a wiring WW illustrated in FIG. 29A corresponds to the wiring WL in FIG. 9.

Moreover, the transistor M1 included in the multiplier circuit AME includes a back gate which is electrically connected to a wiring BG.

The transistor M1 is an OS transistor including an In—Ga—Zn oxide in its channel formation region with a channel length (hereinafter referred to as L length) of 0.35 μm and a channel width (hereinafter referred to as W length) of 0.35 μm. The transistor M2 is a Si transistor including single crystal silicon in its channel formation region with the transistor M2-1 and the transistor M2-2 having an L length of 8 μm and a W length of 0.32 μm.

Figure 29B:
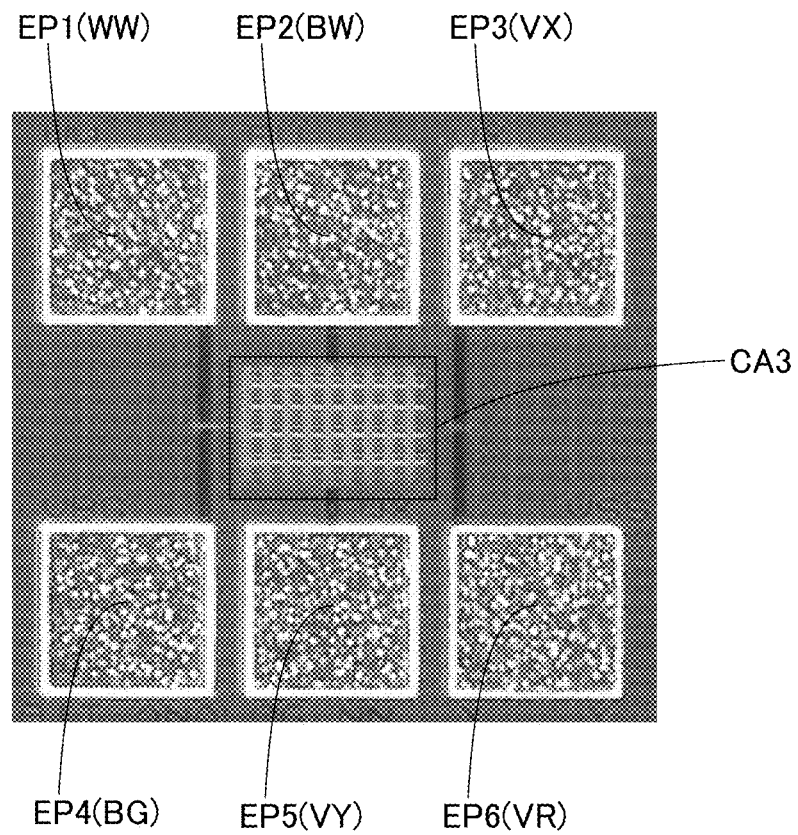
FIG. 29B is an optical micrograph of the fabricated semiconductor device.

FIG. 29B is a photograph of a top surface of a cell array CA3 including the fabricated multiplier circuit AME, taken by an optical microscope. In the cell array CA3, a matrix of 9×16 multiplier circuits AME are arranged. One multiplier circuit AME in the cell array CA3 is electrically connected to each of an electrode pad EP1 to an electrode pad EP6. Note that the electrode pad EP1 is electrically connected to the wiring WW, an electrode pad EP2 is electrically connected to the wiring BW, an electrode pad EP3 is electrically connected to the wiring VX, an electrode pad EP4 is electrically connected to the wiring BG, an electrode pad EP5 is electrically connected to the wiring VY, and the electrode pad EP6 is electrically connected to the wiring VR.

In the multiplier circuit AME, operation for writing of data, retention of data, reading of data was conducted.

In writing data to the multiplier circuit AME, voltages of 5 V, 0 V, −6 V, 3 V, and 0 V were applied to the wiring WW, the wiring VX, the wiring BG, the wiring VY, and the wiring VR, respectively. Furthermore, the data written to the node NM is the potential $V_W$ in the range greater than or equal to 0 V and less than or equal to 2.5 V in 0.1 V increments, and the potential was applied from the wiring BW.

When the data written to the multiplier circuit AME is retained, voltages were applied to the multiplier circuit AME by setting the wiring WW, the wiring BW, the wiring VX, the wiring BG, the wiring VY, and the wiring VR at 0 V, 0 V, 0 V, −6 V, 0 V, and 0 V, respectively.

When the written data is read from the multiplier circuit AME, voltages of 0 V, 0 V, −6 V, 3 V, and 0 V were applied to the wiring WW, the wiring BW, the wiring BG, the wiring VY, and the wiring VR, respectively. Furthermore, the potential applied to the wiring VX was the potential $V_X$ in the range greater than or equal to 0 V and less than or equal to 3.0 V in 0.1 V increments.

The following table lists the potentials applied to the wiring WW, the wiring BW, the wiring VX, the wiring BG, the wiring VY, and the wiring VR at the time of writing operation, data retention, and reading operation in the multiplier circuit AME.

TABLE 2

|  | Writing operation | Data retention | Reading operation |
| --- | --- | --- | --- |
| Wiring WW | 5 V | 0 V | 0 V |
| Wiring BW | $V_W$ (0 V to 2.5 V) | 0 V | 0 V |
| Wiring VX | 0 V | 0 V | $V_X$ (0.0 V to 3.0 V) |
| Wiring BG | −6 V | −6 V | −6 V |
| Wiring VY | 3 V | 0 V | 3 V |
| Wiring VR | 0 V | 0 V | 0 V |

Here, when the data written to the multiplier circuit AME is read, the current flowing from the wiring VY through the source and the drain of the transistor M2 to the wiring VR was measured.

Figure 30A:
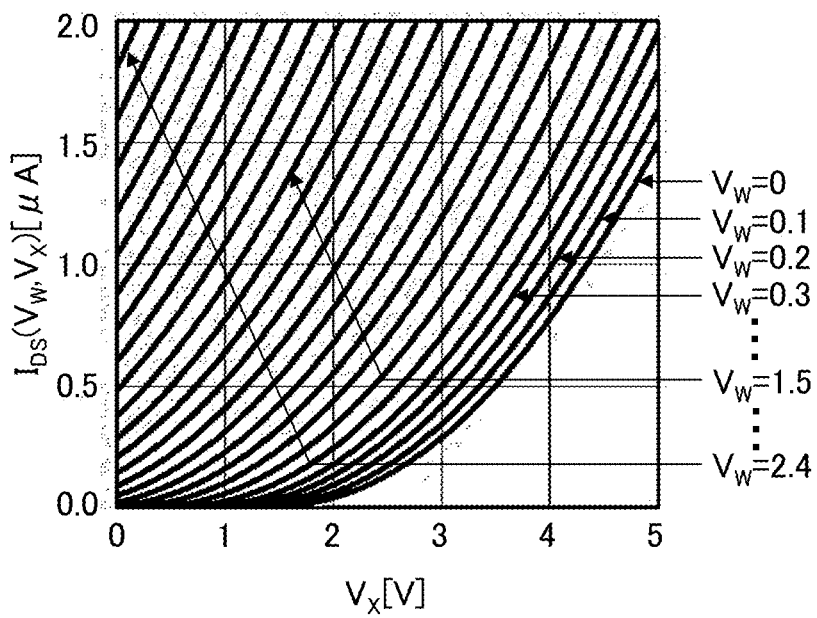
FIG. 30A is a graph illustrating a source-drain current $I_{DS}$ ($V_W$, $V_X$) of a transistor M2 of the multiplier circuit included in the fabricated semiconductor device in the case where data corresponding to $V_W$ was written to the multiplier circuit and a voltage $V_X$ was applied to a wiring VX.

FIG. 30A shows characteristics of the potential $V_W$, the potential $V_X$, and a source-drain current $I_{DS}(V_W, V_X)$. As shown in FIG. 30A, an increase in $V_W$ with $V_X$ fixed at an arbitrary potential resulted in an increase in $I_{DS}(V_W, V_X)$. Note that the increase of $V_W$ corresponds to a negative shift of the threshold of M2. Furthermore, an increase in $V_X$ with $V_W$ fixed at an arbitrary potential resulted in an increase in $I_{DS}(V_W, V_X)$. When $V_W$ was 1.5 V and $V_X$ was 1.5 V, $I_{DS}(V_W, V_X)$ was estimated at approximately 1.3 μA.

Here, when $V_{W0}$ is 1.5 V and $V_{X0}$ is 1.5 V, $I_{DS}(V_{W0}, V_{X0})$=1.3 µA is obtained. Furthermore, $I_{DS}(V_{W0}+\Delta V_W, V_{X0})$ at the time when $\Delta V_W$ is added to $V_{W0}$ as an amount of voltage change, $I_{DS}(V_{W0}, V_{X0}+\Delta V_X)$ at the time when $\Delta V_X$ is added to $V_{X0}$ as an amount of voltage change, and $I_{DS}(V_{W0}+\Delta V_W, V_{X0}+\Delta V_X)$ at the time when $\Delta V_W$ is added to $V_{W0}$ as an amount of voltage change and $\Delta V_X$ is added to $V_{X0}$ as an amount of voltage change are considered. $\Delta I_y$ is defined by the following formula.

[Formula 44]

$$I_y = I_{DS}(V_{W0}+\Delta V_W, V_{X0}+\Delta V_X) - I_{DS}(V_{W0}, V_{X0}+\Delta V_X) - I_{DS}(V_{W0}+\Delta V_W, V_{X0}) + I_{DS}(V_{W0}, V_{X0}) \quad (G1)$$

Note that since $V_{W0}+\Delta V_W$ is a voltage applied from the wiring BW, the voltage range of $\Delta V_W$ is greater than or equal to −1 V and less than or equal to 1 V. Furthermore, since $V_{X0}+\Delta V_X$ is a voltage applied from the wiring BW, the voltage range of $\Delta V_X$ is greater than or equal to −1.5 V and less than or equal to 1.5 V.

The following formula is obtained by calculation of $\Delta I_y$ utilizing Formula (E1), Formula (E2), Formula (E7), and Formula (E8).

[Formula 45]

$$\Delta I_y = 2k\Delta V_W \Delta V_X \quad (G2)$$

Figure 30B:
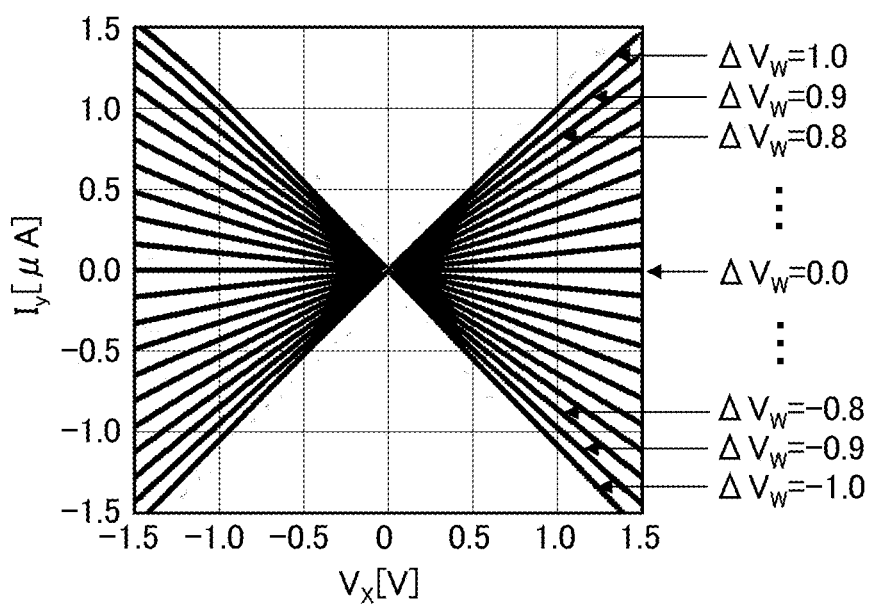
FIG. 30B is a graph illustrating multiplication characteristics of the multiplier circuit included in the fabricated semiconductor device, which were calculated on the basis of FIG. 30A.

When k is ½ (normalization to an appropriate value) here, the relation among $\Delta I_y$, $\Delta V_W$, and $\Delta V_X$ can be shown in FIG. 30B. That is, a differential current $\Delta I_y$ is determined depending on the product of $\Delta V_W$ and $\Delta V_X$. Accordingly, with the multiplier circuit AME, $I_{DS}(V_{W0}, V_{X0})$, $I_{DS}(V_{W0}+\Delta V_W, V_{X0})$, $I_{DS}(V_{W0}, V_{X0}+\Delta V_X)$, and $I_{DS}(V_{W0}+\Delta V_W, V_{X0}+\Delta V_X)$, which are the currents flowing between the source and the drain of the transistor M2, are each measured and the differential current $\Delta I_y$ is calculated from these currents; thus, the product of $\Delta V_W$ and $\Delta V_X$ can be obtained.

Figure 31:
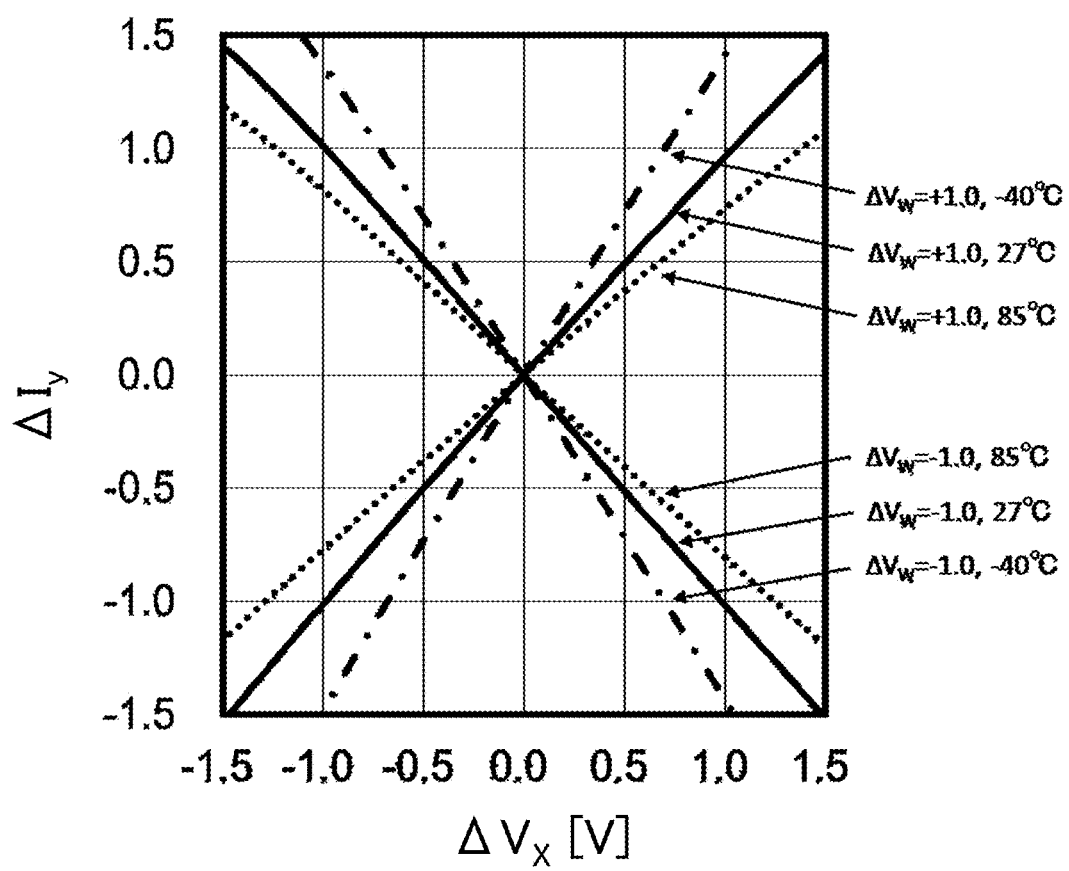
FIG. 31 is a graph illustrating temperature dependence of multiplication characteristics of the multiplier circuit included in the fabricated semiconductor device.

FIG. 31 is a graph showing temperature dependence of the read current which is obtained by writing potentials of 0.5 V ($\Delta V_W$=−1.0 V) and 2.5 V ($\Delta V_W$=1.0 V) to the node NM of the multiplier circuit AME and then performing reading operation under each temperature condition of 85° C., 27° C., and −40° C. The results that the gradient increased by 40% at 85° C. and decreased by 30% at −40° C. compared with the gradient at 27° C. is shown in FIG. 31. The results at 85° C. and −40° C. each show temperature dependence of saturation mobility. Although the gradient differs depending on the temperature, the correlation between $\Delta I_y$ and $\Delta V_X$ for each $\Delta V_W$ is 0.989 or more; accordingly, it is conceivable that the gradient can be easily corrected by an appropriate normalization of the correlation in accordance with the temperature.

Figure 32A:
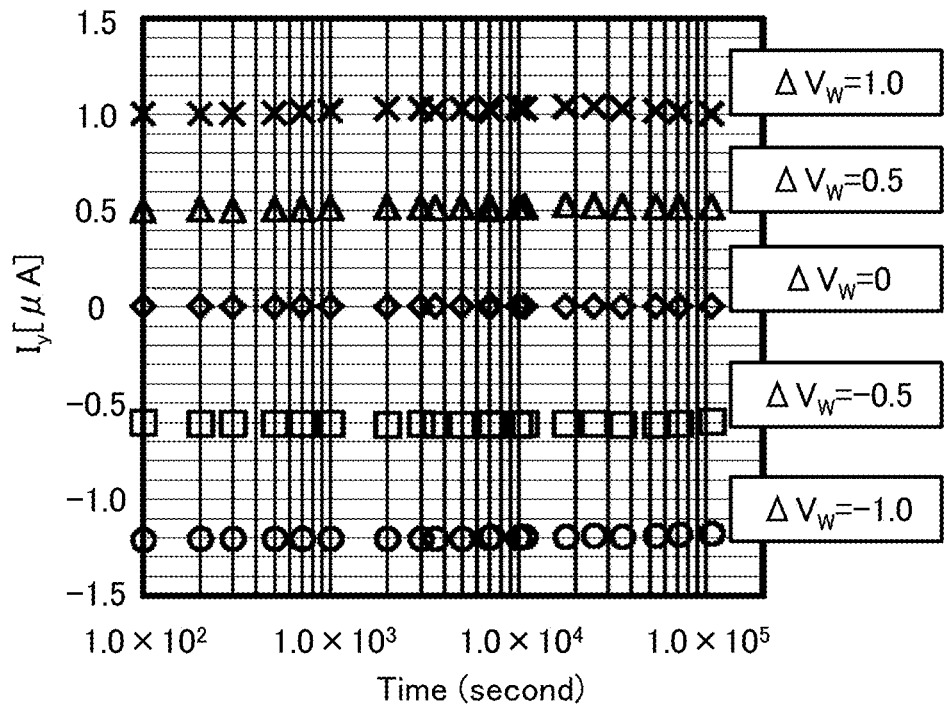
FIG. 32A and FIG. 32B are graphs illustrating time changes of multiplication characteristics of the multiplier circuit included in the fabricated semiconductor device.
Figure 32B:
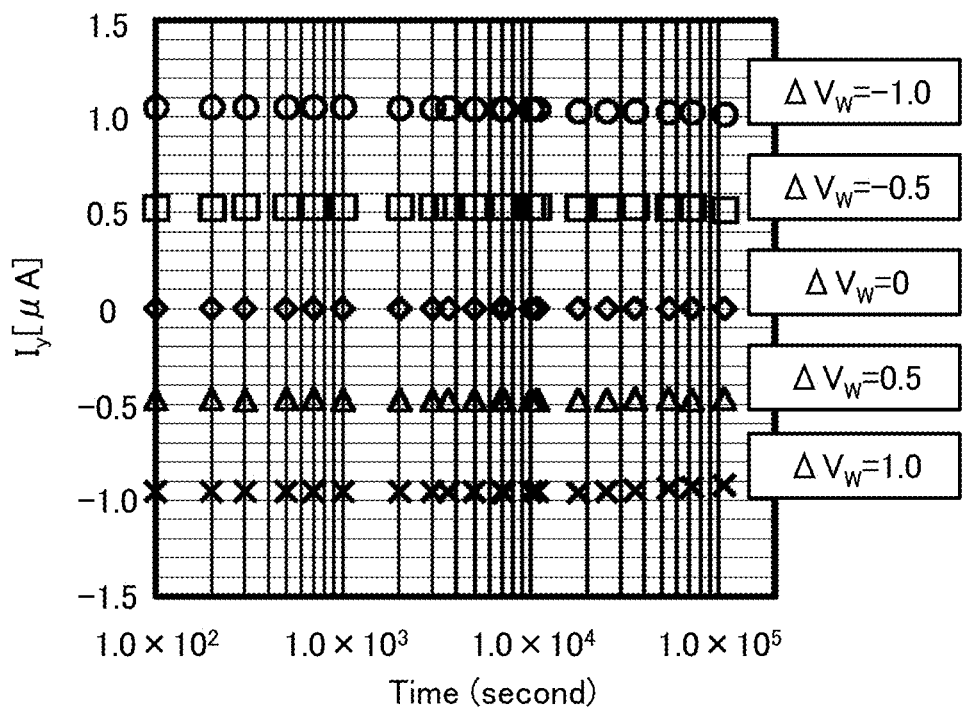

FIG. 32A and FIG. 32B are graphs showing the change over time of the amount of current flowing between the source and the drain of the transistor M2 after the data retention at the node NM. For the measurement conditions of FIG. 32A, $\Delta V_X$ was set at 1.0 V (the potential of the wiring $V_X$ was set at 2.5 V). For the measurement conditions of FIG. 32B, $\Delta V_X$ was set at −1.0 V (the potential of the wiring VX was set at 0.5 V). In each of FIG. 32A and FIG. 32B, the current $I_y$ flowing between the source and the drain of the transistor M2 was measured under four conditions of the potential retained at the node NM: 0.5 V ($\Delta V_W$=−1.0 V), 1.0 V ($\Delta V_W$=−0.5 V), 1.5 V ($\Delta V_W$=0 V), 2.0 V ($\Delta V_W$=0.5 V), and 2.5 V ($\Delta V_W$=1.0 V).

As shown in FIG. 32A and FIG. 32B, the results that the current $I_y$ flowing between the source and the drain of the transistor M2 did not change from $1.0 \times 10^2$ seconds to $1.0 \times 10^5$ seconds under each condition were obtained. In each condition of FIG. 32A, the change rate of the differential current $\Delta_y$ up to $1.0 \times 10^5$ seconds was lower than 4.8%. In each condition of FIG. 32B, the change rate of the differential current $\Delta_y$ up to $1.08 \times 10^5$ seconds was lower than 4%.

Figure 33A:
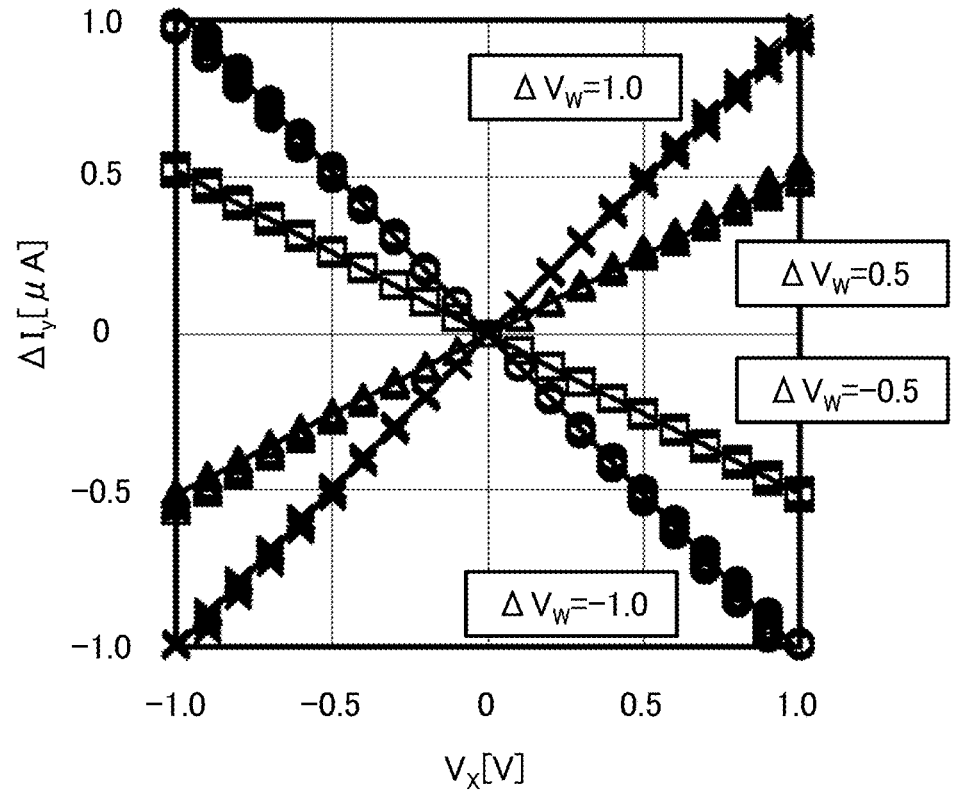
FIG. 33A is a graph illustrating multiplication characteristics of the multiplier circuit included in the fabricated semiconductor device.

FIG. 33A is a graph showing multiplication characteristics in the multiplier circuit AME which were obtained by writing potentials of four conditions, that is, 0.5 V ($\Delta V_W$=−1.0 V), 1.0 V ($\Delta V_W$=−0.5 V), 2.0 V ($\Delta V_W$=0.5 V), and 2.5 V ($\Delta V_W$=1.0 V) to the node NM of the multiplier circuit AME and then reading the differential current $\Delta I_y$. For comparison, straight lines of linear functions $\Delta I_y$=1.0×$V_X$, $\Delta I_y$=−0.5×$V_X$, $\Delta I_y$=−0.5×$V_X$, and $\Delta I_y$=−1.0×$V_X$ are shown in FIG. 33A. As revealed in FIG. 33A, the multiplication characteristic results in the multiplier circuit AME were roughly consistent with the linear functions of $\Delta I_y$=1.0×$V_X$, $\Delta I_y$=0.5×$V_X$, $\Delta I_y$=−0.5×$V_X$, and $\Delta I_y$=−1.0×$V_X$.

Figure 33B:
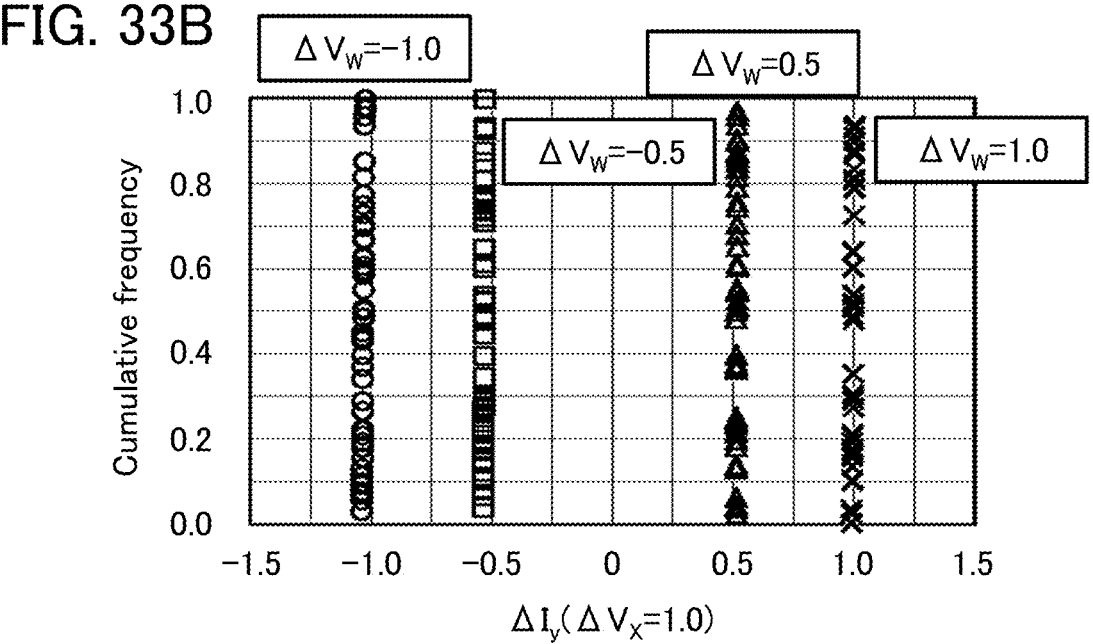
FIG. 33B is a graph illustrating the degree of variations in multiplication characteristics when potentials are written to the multiplier circuit included in the fabricated semiconductor device.

FIG. 33B is a graph showing the degree of data writing variations which were obtained by writing potentials of four conditions, that is, 0.5 V ($\Delta V_W$=−1.0 V), 1.0 V ($\Delta V_W$=−0.5 V), 2.0 V ($\Delta V_W$=0.5 V), and 2.5 V ($\Delta V_W$=1.0 V) to the node NM of the multiplier circuit AME and then performing reading operation. For the measurement conditions of FIG. 33B, $\Delta V_X$ was set at 1.0 V (the potential of the wiring VX was set at 2.5 V). After writing operation, reading operation was performed 50 times repeatedly to calculate the differential current $\Delta I_y$, and the average of 50 calculations was considered as the differential current $\Delta I_y$ at the $\Delta V_W$. Regarding this operation as 1 set, measurements of the differential current $\Delta I_y$ for 50 sets were performed for each $\Delta I_W$.

In FIG. 33B, the horizontal axis represents the differential current $\Delta I_y$, and the vertical axis represents the cumulative frequency. According to FIG. 33B, the data writing variations are roughly within the range of −0.4% to 0.4%.

Figure 34:
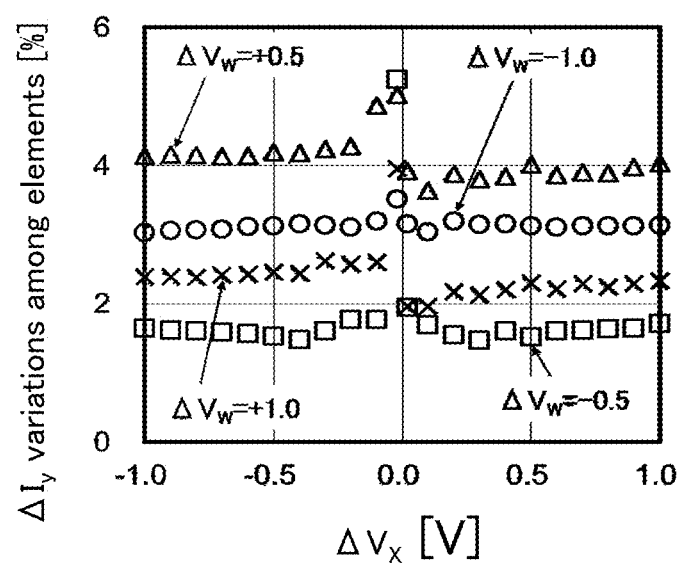
FIG. 34 is a graph illustrating the degree of variations in read current among a plurality of multiplier circuits included in the fabricated semiconductor device.
Figure 35A:
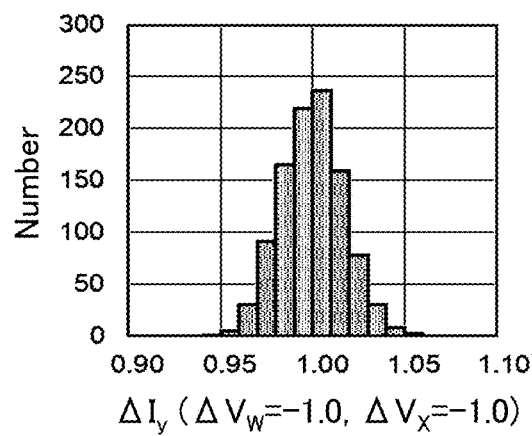
FIG. 35A, FIG. 35B, FIG. 35C, and FIG. 35D are graphs illustrating the degree of variations in read current among structures of the plurality of multiplier circuits, which were obtained by Monte Carlo analysis.
Figure 35B:
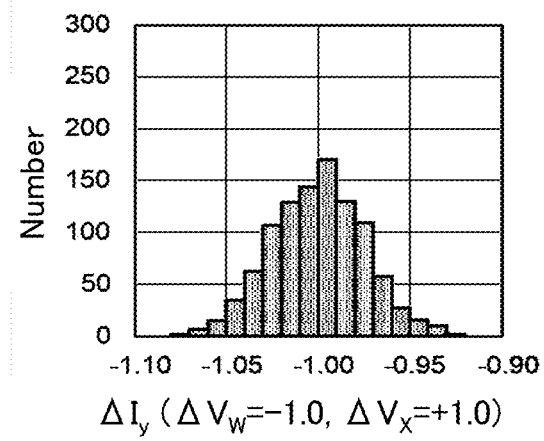
Figure 35C:
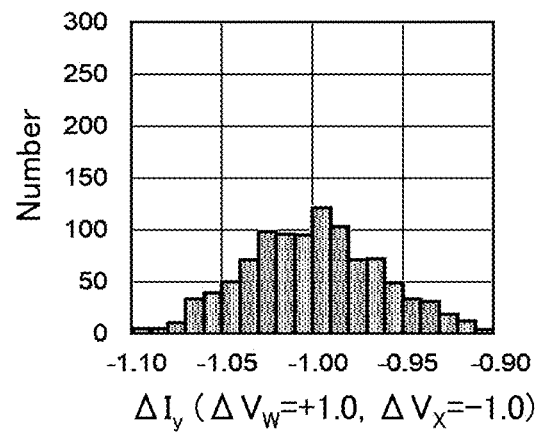
Figure 35D:
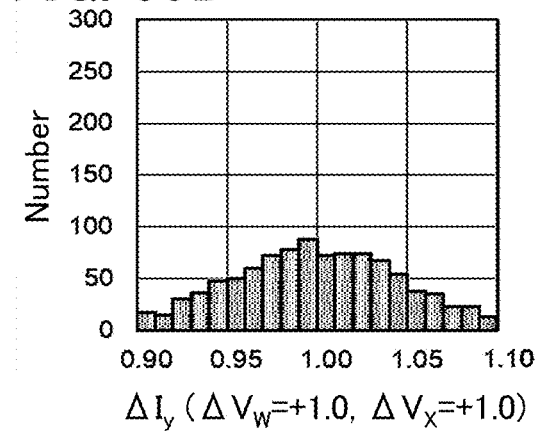

0.5 V ($\Delta V_W$=−1.0 V), 1.0 V ($\Delta V_W$=−0.5 V), 2.0 V ($\Delta V_W$=0.5 V), and 2.5 V ($\Delta V_W$=1.0 V) were written to the nodes NM of 12 multiplier circuits AME, and FIG. 34 shows the degree of variations in $\Delta I_y$ among the elements, which was read from the multiplier circuits AME. FIG. 34 shows $\Delta V_X$ dependence of each $\Delta V_W$. According to FIG. 34, $\Delta I_y$ variations among the elements were less than 5% for each $\Delta V_W$ and $\Delta V_X$ except in the vicinity of $\Delta V_X$=0 (a region more than −0.02 and less than 0.02). The $\Delta I_y$ variations among the elements weakly depend on $\Delta V_X$ and tend not to depend on the absolute value of $\Delta V_W$. As causes of the $\Delta I_y$ variations among the elements, it seems that the contribution of variations in saturation mobility of the Si transistors and deviations of the drain current in a saturation region of the Si transistors from the gradual approximation (the square approximation) are large, for example. The variations $\sigma_{meas}$ among the elements in FIG. 34 were 0.023 when ($\Delta V_W$, $\Delta V_X$)=(+1, +1), 0.025 when ($\Delta V_W$, $\Delta V_X$)=(+1, −1), 0.034 when ($\Delta V_W$, $\Delta V_X$)=(−1, +1), and 0.032 when ($\Delta V_W$, $\Delta V_X$)=(−1, −1).

The results of the Monte Carlo analysis, which was performed to confirm the validity of the causes of the $\Delta I_y$ variations among the elements in FIG. 34, are shown in FIG. 35A to FIG. 35D. FIG. 35A to FIG. 35D show variations among elements obtained by setting local variations and performing simulation for each case of ($\Delta V_W$, $\Delta V_X$)=(+1, +1), (+1, −1), (−1, +1), (−1, −1) in the circuit structure of FIG. 29A. The variations $\sigma_{sim}$ among the elements in FIG. 35A to FIG. 35D were 0.051 when ($\Delta V_W$, $\Delta V_X$)=(+1, +1), 0.038 when ($\Delta V_W$, $\Delta V_X$)=(+1, −1), 0.025 when ($\Delta V_W$, $\Delta V_X$)=(−1, +1), and 0.017 when ($\Delta V_W$, $\Delta V_X$)=(−1, 1). The measured variations meas among the elements were more than or equal to 0.023 and less than or equal to 0.034 according to FIG. 34, which were confirmed to be roughly the same as the variations $\sigma_{sim}$ among the elements obtained by the Monte Carlo analysis, which were more than or equal to 0.017 and less than or equal to 0.051.

Figure 36:
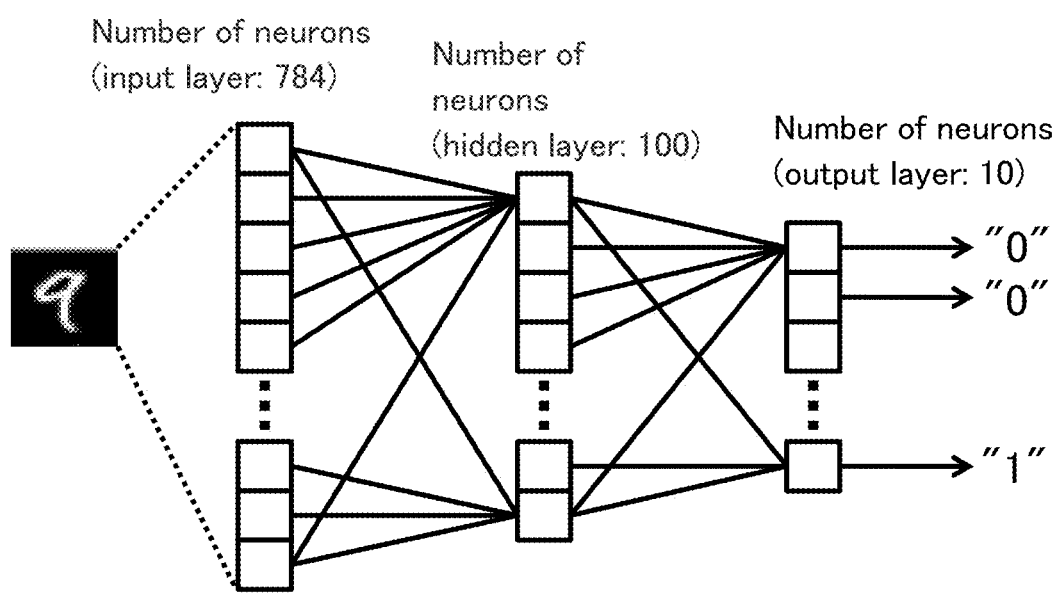
FIG. 36 is a diagram illustrating an example of a model of a hierarchical artificial neural network used for calculating inference accuracy.

Next, the inference accuracy of a fully connected artificial neural network model with three layers in the case of using an arithmetic circuit including the cell array CA3 of FIG. 29B was calculated. The neural network model is illustrated in FIG. 36, and the neural network includes an input layer, an intermediate layer, and an output layer. The input layer includes 784 neurons, the intermediate layer includes 100 neurons, and the output layer includes 10 neurons.

The neural network was mounted on a computer using a program language Python, and the mounted neural network performed learning with MNIST which is a data set of handwritten digits to calculate a weight coefficient. Next, the arithmetic circuit including the cell array CA3 of FIG. 29B was used for multiplication in the model of FIG. 36, and the weight coefficient was held by each multiplier circuit AME in the cell array CA3 to perform inference. Note that the activation function in the intermediate layer was a sigmoid function, and the activation function in the output layer was a softmax function. As a result, the inference accuracy in the arithmetic circuit including the cell array CA3 of FIG. 29B was 97.77%. In the model of FIG. 36, the inference accuracy in the case where the product-sum operation is performed by an ideal multiplication (calculation on a computer with a program language Python) was 97.89%. Thus, in the model of FIG. 36, the results that the inference accuracy in the case of using the arithmetic circuit of this example was almost the same as the inference accuracy in the case where the product-sum operation was performed by an ideal multiplication were obtained.

Example 2

In this example, various calculations were performed with a circuit simulator to confirm whether the sum of products of the first data and the second data was properly calculated in the arithmetic circuit MAC1A described in Embodiment 2.

Figure 37:
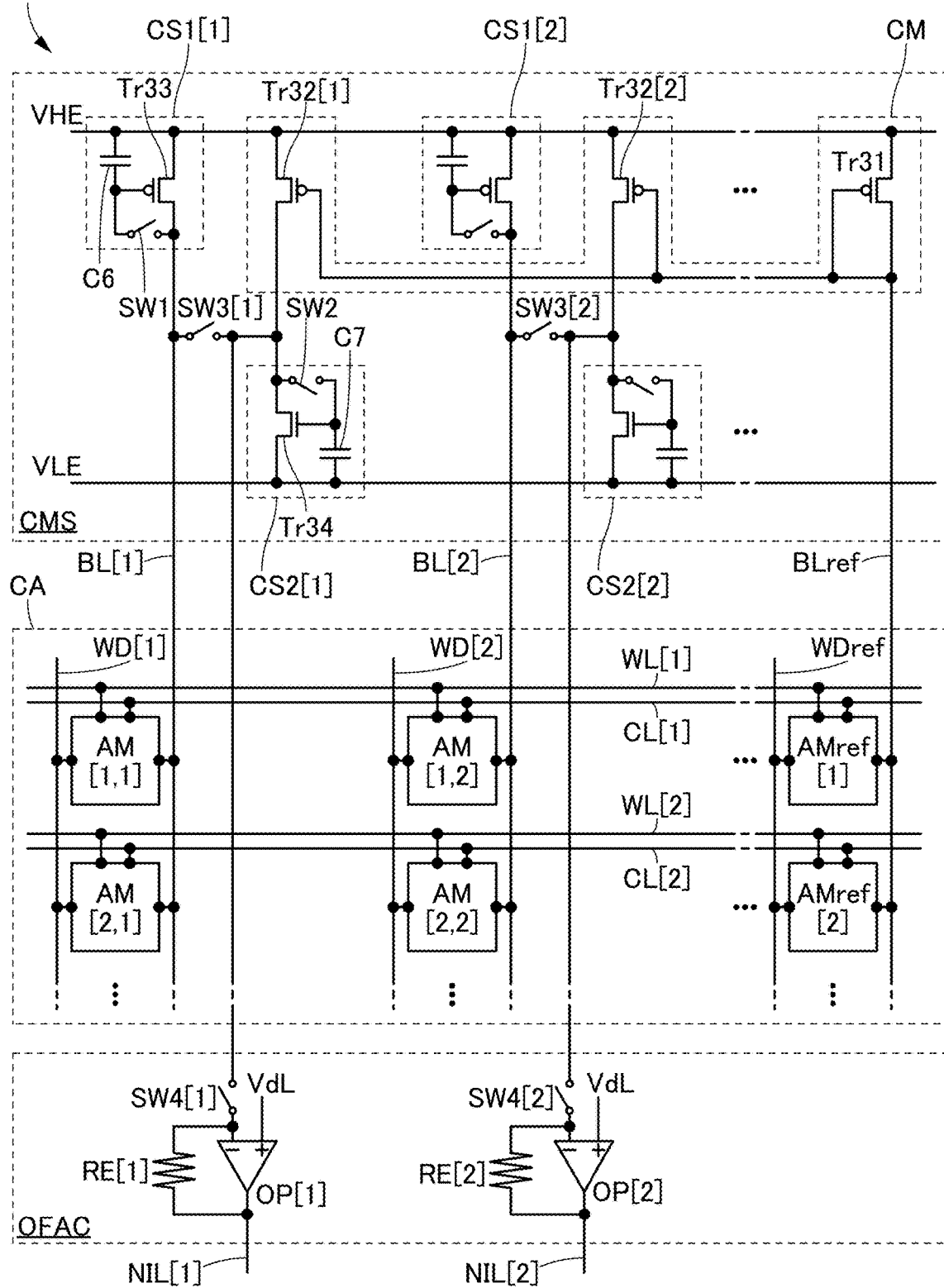
FIG. 37 is a circuit diagram illustrating a structure example of a semiconductor device.

A circuit structure for the various calculations is described first. FIG. 37 is an example of a circuit structure which is changed from the circuit structure of the arithmetic circuit MAC1A illustrated in FIG. 13. Therefore, descriptions of the arithmetic circuit MAC1A illustrated in FIG. 37 are omitted for the parts where the content overlaps with that of the arithmetic circuit MAC1A of FIG. 13.

The arithmetic circuit MAC1A illustrated in FIG. 37 has a structure where a plurality of columns of memory cells AM of the memory cell array CA in FIG. 13 are arranged and the circuit CMS in FIG. 13 and the circuit OFAC in FIG. 13 are changed. The memory cells AM of the memory cell array CA in FIG. 37 may be arranged in a plurality of rows.

The memory cells AM of the memory cell array CA in FIG. 37 are arranged in a plurality of columns; thus, the circuit CMS in FIG. 37 has a structure that is changed from that of the circuit CMS in FIG. 13 in accordance with the memory cells AM arranged in the plurality of columns. For example, the current mirror circuit CM included in the circuit CMS in FIG. 37 includes a transistor Tr32[1] and a transistor Tr32[2] corresponding to the transistor Tr32 in FIG. 13, a current supply circuit CS1[1] and a current supply circuit CS1[2] corresponding to the current supply circuit CS1 in FIG. 13, a current supply circuit CS2[1] and a current supply circuit CS2[2] corresponding to the current supply circuit CS2 in FIG. 13, and a switch SW3[1] and a switch SW3[2] corresponding to the switch SW3 in FIG. 13.

Note that the transistor Tr32[1], the current supply circuit CS1[1], and the current supply circuit CS2[1] in FIG. 30 are a circuit for performing a product-sum operation of the first data retained in a memory cell AM[1,1] and a memory cell AM[2,1] positioned in the first column of the memory cell array CA and the second data input to the memory cell AM[1,1] and the memory cell AM[2,1]. The transistor Tr32[2], the current supply circuit CS1[2], and the current supply circuit CS2[2] in FIG. 30 are a circuit for performing a product-sum operation of the first data retained in a memory cell AM[1,2] and a memory cell AM[2,2] positioned in the first column of the memory cell array CA and the second data input to the memory cell AM[1,2] and the memory cell AM[2,2].

The circuit OFAC includes a switch SW4[1] and a switch SW4[2] corresponding to the switch SW4 in FIG. 13, a resistor RE[1] and a resistor RE[2] corresponding to the resistor RE in FIG. 13, an operational amplifier OP[1], and an operational amplifier OP[2].

A first terminal of the switch SW4[1] is electrically connected to a first terminal of the switch SW3[1], and a second terminal of the switch SW4[1] is electrically connected to a first terminal of the resistor RE[1] and an inverting input terminal of the operational amplifier OP[1]. A non-inverting input terminal of the operational amplifier OP[1] is electrically connected to a wiring VdL, and an output terminal of the operational amplifier OP[1] is electrically connected to a second terminal of the resistor RE[1] and a wiring NIL[1]. In other words, a current-voltage conversion circuit is formed by the resistor RE[1] and the operational amplifier OP[1].

The switch SW4[2], the resistor RE[2], and the operational amplifier OP[2] have an electrical connection structure similar to that of the switch SW4[1], the resistor RE[1], and the operational amplifier OP[1]. Thus, a current-voltage conversion circuit is formed by the resistor RE[2] and the operational amplifier OP[2] as well.

The wiring VdL functions as a wiring for supplying a constant voltage. Specifically, the constant voltage is input as a reference potential of the current-voltage conversion circuit.

The current-voltage conversion circuit formed by the resistor RE[1] and the operational amplifier OP[1] has a function of converting the current $I_s$, which is generated by the memory cells AM in the first column of the memory cell array CA, the current supply circuit CS1[1], the current supply circuit CS2[1], and the transistor Tr32[1], to a voltage. Furthermore, the current-voltage conversion circuit formed by the resistor RE[2] and the operational amplifier OP[2] has a function of converting the current Is, which is generated by the memory cells AM in the second column of the memory cell array CA, the current supply circuit CS1[2], the current supply circuit CS2[2], and the transistor Tr32[2], to a voltage.

Here, a product-sum operation of the first data and the second data in the arithmetic circuit MAC1A was performed with a circuit simulator, assuming the memory cell array CA in FIG. 37 having a structure where the memory cells AM are arranged in a matrix of n rows and one column.

Note that the circuit structure of the memory cells AM and the memory cells AMref are similar to that illustrated in FIG. 13. The transistors Tr12 and the transistors Tr31 to Tr34 were assumed to be Si transistors with an L length of 8 µm and a W length of 0.32 µm. In addition, the transistors Tr11 were assumed to be OS transistors with an L length of 0.35 µm and a W length of 0.35 µm.

The following were input to the circuit simulator: the memory cells AM included in the memory cell array CA of the arithmetic circuit MAC1A were the memory cell AM[1, 1] to a memory cell AM[25,1] and the wirings CL to which the second data was input were the wiring CL[1] to a wiring CL[25] (i.e., n=25). Each of the memory cells AM[1,1] to AM[25,1] was made to retain a potential corresponding to "−1" or a potential corresponding to "+1" as the first data (weight coefficient), and a potential corresponding to "−1", "0", or "+1" was input to the wiring CL[1] to the wiring CL[25] as the second data (signal values of neurons).

Figure 38A:
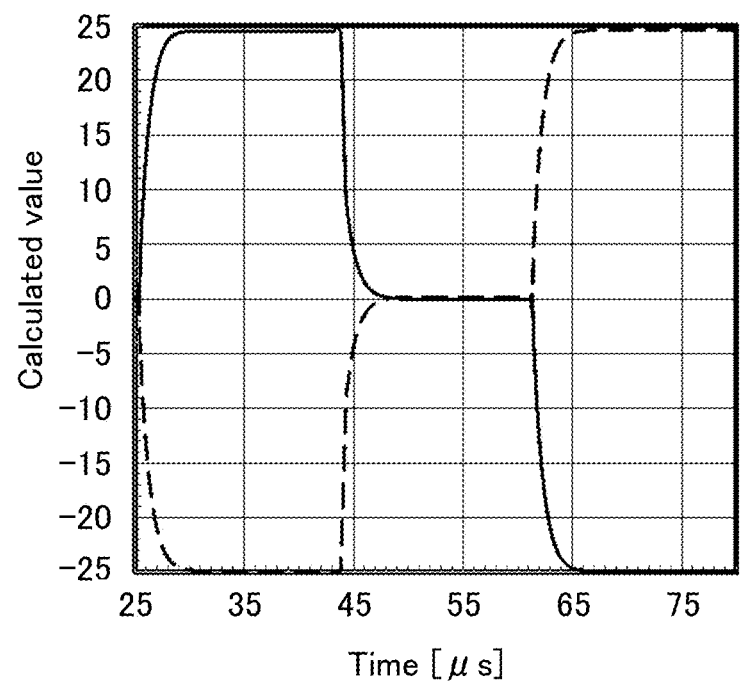
FIG. 38A is a graph illustrating the results of multiplication of first data and second data.

FIG. 38A is a graph showing calculated values of a product-sum operation under a plurality of conditions by the arithmetic circuit MAC1A input to the circuit simulator. In this calculation, "+1" is input to the wiring CL[1] to the wiring CL[25] as the second data (signal values of neurons) in a period from 25 µs to 44 µs. In a period from 44 µs to 62 µs, "0" is input to the wiring CL[1] to the wiring CL[25] as the second data (signal values of neurons). In a period from 62 µs to 80 µs, "−1" is input to the wiring CL[1] to the wiring CL[25] as the second data (signal values of neurons). A solid line in the graph of FIG. 38A indicates calculation results under conditions where the memory cell AM[1,1] to the memory cell AM[25,1] each retain "+1" as the first data (weight coefficient), and a broken line in the graph of FIG. 38A indicates calculation results under conditions where the memory cell AM[1,1] to the memory cell AM[25,1] each retain "−1" as the first data (weight coefficient).

As indicated by the solid line in the graph of FIG. 38A, the sum of products of 25 pieces of first data "+1" (weight coefficients) and 25 pieces of second data "+1" (signal values of neurons) resulted in a value close to 25. Similarly, the sum of products of 25 pieces of first data "+1" (weight coefficients) and 25 pieces of second data "0" (signal values of neurons) resulted in almost 0, and the sum of products of 25 pieces of first data "+1" (weight coefficients) and 25 pieces of second data "−1" (signal values of neurons) resulted in almost −25.

As indicated by the broken line in the graph of FIG. 38A, the sum of products of 25 pieces of first data "−1" (weight coefficients) and 25 pieces of second data "+1" (signal values of neurons) resulted in a value close to −25. Similarly, the sum of products of 25 pieces of first data "−1" (weight coefficients) and 25 pieces of second data "0" (signal values of neurons) resulted in almost 0, and the sum of products of 25 pieces of first data "−1" (weight coefficients) and 25 pieces of second data "−1" (signal values of neurons) resulted in almost 25.

The above-described results prove that the product-sum operation by the arithmetic circuit MAC1A is performed substantially exactly.

Figure 38B:
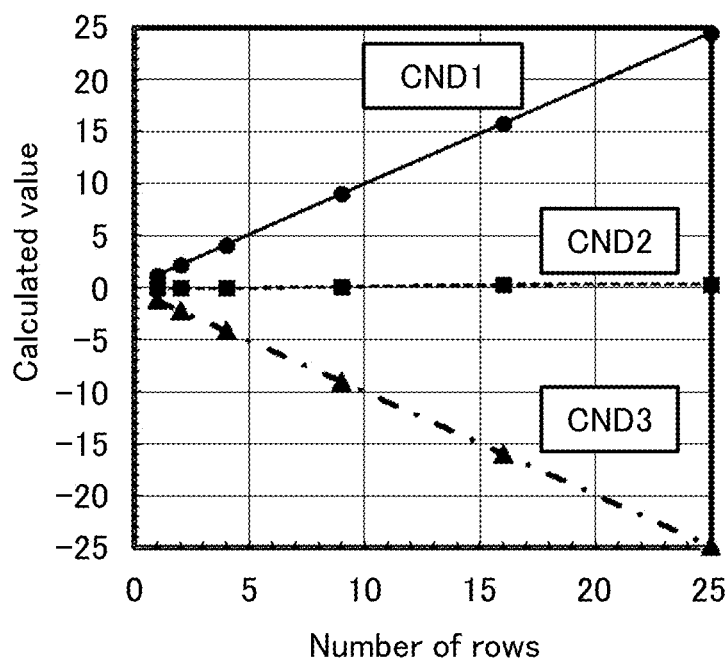
FIG. 38B is a graph illustrating arithmetic values with respect to the number of rows in a memory cell array.

FIG. 38B is a graph showing calculated values of a product-sum operation for each of cases where the number of rows n in the memory cell array CA of the arithmetic circuit MAC1A is 1, 2, 4, 9, 16, and 25. Condition CND1 shows the calculated value results in the case where all the pieces of first data (weight coefficients) are "+1" and all the pieces of second data (signal values of neurons) are "+1". Condition CND2 shows the calculated value results in the case where all the pieces of first data (weight coefficients) are "0" and all the pieces of second data (signal values of neurons) are "0". Condition CND3 shows the calculated value results in the case where all the pieces of first data (weight coefficients) are "−1" and all the pieces of second data (signal values of neurons) are "+1".

The above-described results prove that the product-sum operation by the arithmetic circuit MAC1A is proportional to the number of rows.

Figure 39A:
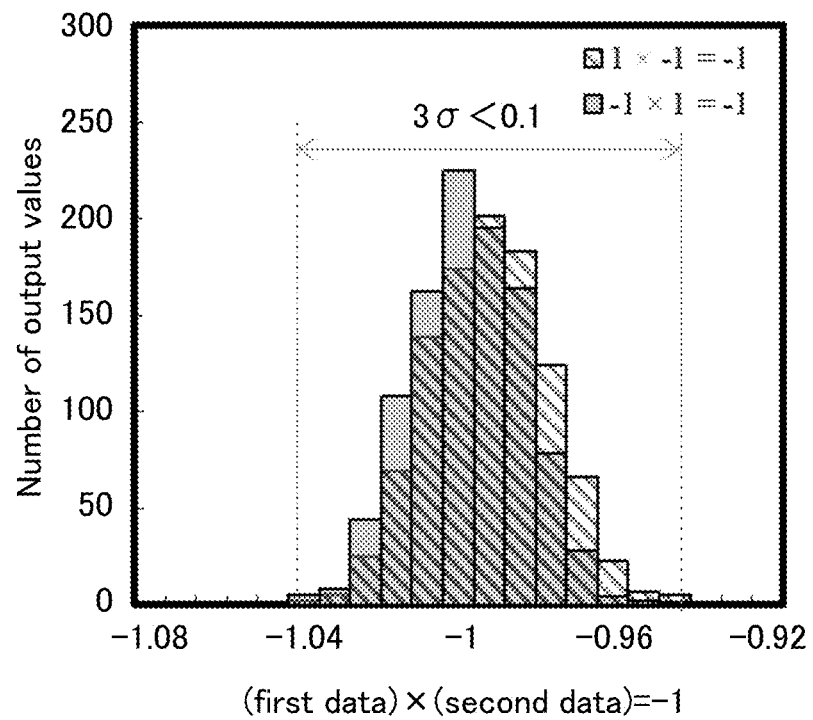
FIG. 39A and FIG. 39B are histograms illustrating variations in the value of the product of first data and second data in the case where variations in transistor's characteristics are taken into consideration.
Figure 39B:
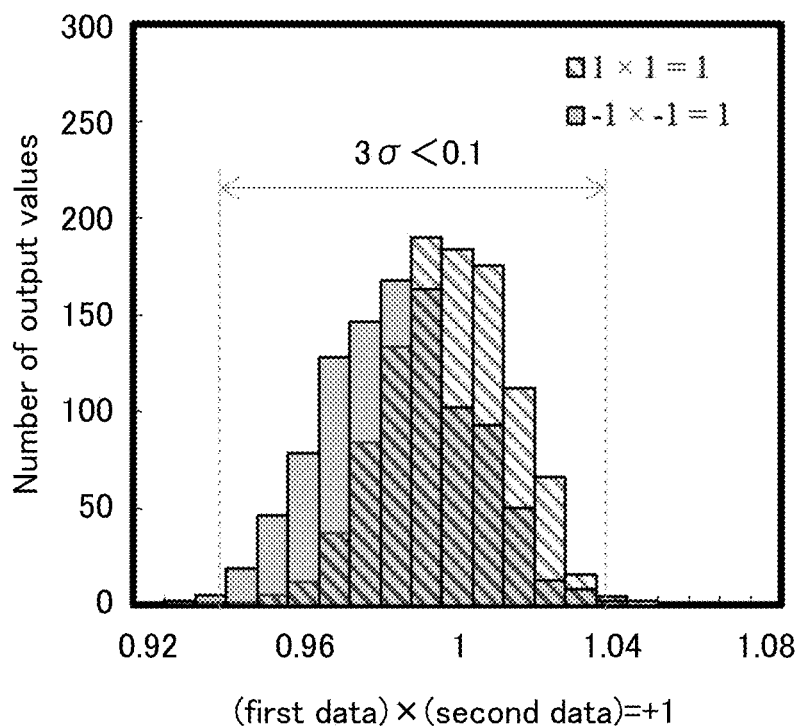

FIG. 39A and FIG. 39B are histograms showing the degree of variations in the value of product when the transistor Tr12 and the transistor Tr31 to the transistor Tr34 included in the arithmetic circuit MAC1A are made to have characteristic variations due to the manufacturing process. Specifically, the memory cell AM of the memory cell array CA in the arithmetic circuit MAC1A is provided in a matrix of one row and one column (i.e., n=1), and the transistor Tr12 and the transistor Tr31 to the transistor Tr34 included in the memory cell AM are made to have characteristic variations. The product of the first data (weight coefficient) and the second data (signal value of a neuron) is calculated for the characteristic variations, and the variations in the value of product are summarized in FIG. 39A and FIG. 39B.

FIG. 39A is a histogram showing the degree of variations in the product of the first data "−1" (weight coefficient) and the second data "+1" (signal value of a neuron) and the degree of variations in the product of the first data "+1" (weight coefficient) and the second data "−1" (signal value of a neuron). FIG. 39B is a histogram showing the degree of variations in the product of the first data "+1" (weight coefficient) and the second data "+1" (signal value of a neuron) and the degree of variations in the product of the first data "−1" (weight coefficient) and the second data "−1" (signal value of a neuron).

When the standard deviation is a, $3a$ was less than 0.1 in each of the histograms illustrated in FIG. 39A and FIG. 39B. That is, even when characteristic variations are generated in the transistor Tr11 due to the manufacturing process, variations in the results of multiplication ±1×±1 are well within the acceptable range by using the arithmetic circuit MAC1A.

Next, the results of comparison in the inference accuracy between the case where all of the operation in a neural network is executed by a computer with the use of a program language (Python) and the case where the arithmetic circuit MAC1A illustrated in FIG. 37 is formed by a circuit simulator and the arithmetic circuit MAC1A is made to operate in simulation to perform an operation in a neural network are described.

The neural network used in this operation was the model of the hierarchical neural network illustrated in FIG. 36 and included 784 neurons in the input layer, 100 neurons in the intermediate layer, and 10 neurons in the output layer. Furthermore, a sigmoid function was used as the activation function applied to results of the product-sum operation of the weight coefficient between the input layer and the intermediate layer and the output signal of a neuron, and a softmax function was used as the activation function applied to results of the product-sum operation of the intermediate layer, the output layer, and the output signal of a neuron.

Furthermore, 60,000 pieces of data in the MNIST data set were used for learning in the neural network. As a test, 10,000 pieces of data were used for inference in the neural network.

Note that the weight coefficient was obtained by pre-mounting the neural network on a computer with the use of a program language (Python) and performing learning of 60,000 pieces of data of the above-described MNIST data set.

In the case where all of the operation in the above-described neural network was executed by a computer with the use of the program language, the inference accuracy was 96.52%. Furthermore, in the case where the arithmetic circuit MAC1A was made to operate in simulation to perform an operation in the above-described neural network, the inference accuracy was 96.25%, which was the result substantially equivalent to the inference accuracy in the neural network operation with the use of the program language.

Figure 40A:
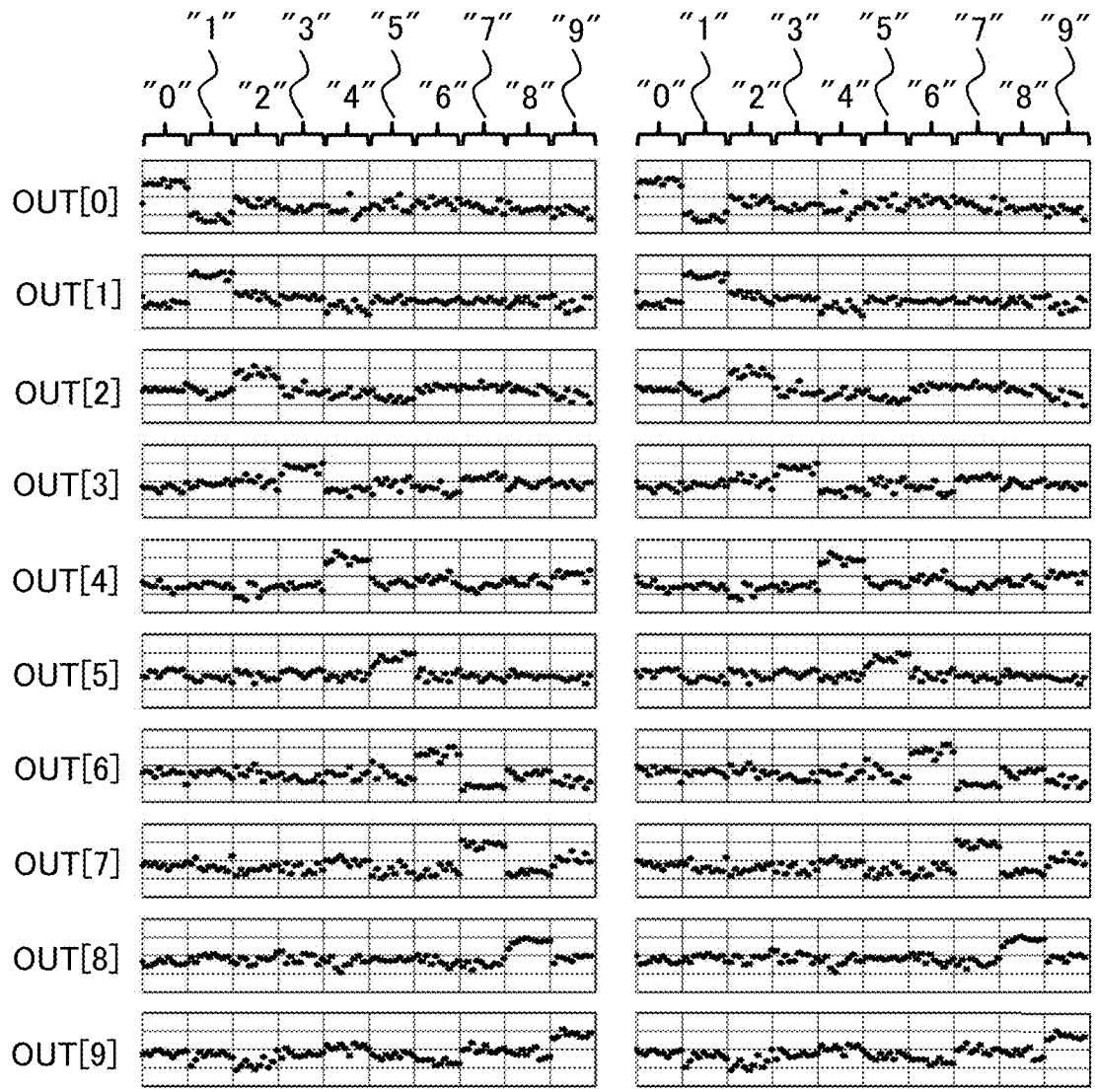
FIG. 40A is a graph illustrating the degree of match of outputs from an output layer of a neural network formed by a circuit simulator and an output layer of a neural network formed using a program language.

FIG. 40A shows the output results of the neural network. The left graph in FIG. 40A shows the results of operations in the neural network formed by the circuit simulator, and the right graph in FIG. 40A shows the results of operations in the neural network formed using the program language (Python). FIG. 40A shows outputs OUT[0] to OUT[9] from neurons of the output layer when 100 handwritten digits (10 handwritten digits each from "0" to "9") as an example, from 10,000 pieces of test data, are provided as input images for each neural network. The horizontal axis of each graph shows the input of handwritten digits "0" to "9", and the vertical axis of the graphs shows the value output from the neurons of the output layer (note that the range of the vertical axis is −20 to 20 in each graph).

FIG. 40A shows that identification of the handwritten digits "0" to "9" with the use of the neural network formed by the circuit simulator was accurately performed. It was also found that the results of the operations by the neural network formed by the circuit simulator were almost similar to those of the operations by the neural network formed using the program language (Python).

Figure 40B:
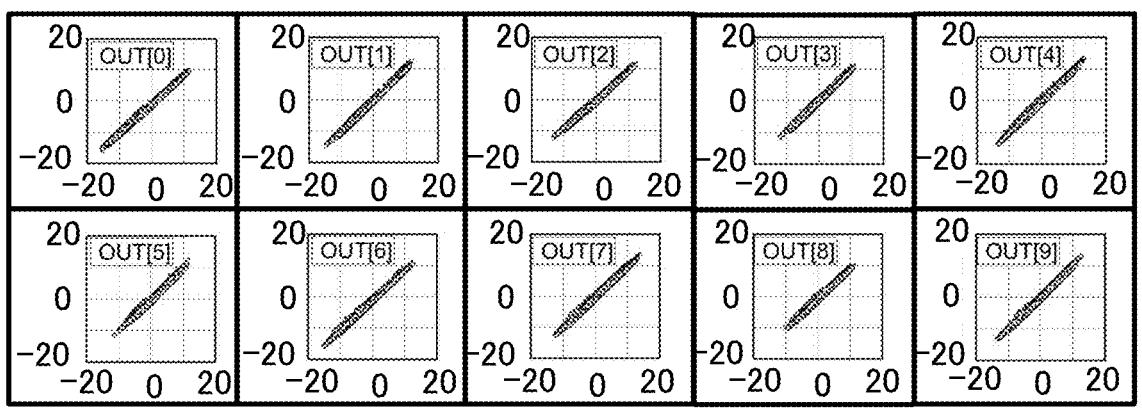
FIG. 40B is a graph illustrating a correlation between values output from the output layers of the neural network formed by the circuit simulator and the neural network formed using the program language.

FIG. 40B shows the correlation between the values of the outputs OUT[0] to OUT[9] from the neurons of the output layer when 10,000 pieces of test data (1000 handwritten digits each from "0" to "9") were input to each of the neural network formed by the circuit simulator and the neural network formed using the program language (Python). In each of the graphs in FIG. 40B, the horizontal axis shows the value output from the neurons of the output layer of the neural network formed using the program language (Python), and the vertical axis shows the value output from the neurons of the output layer of the neural network formed by the circuit simulator.

The correlation coefficients for the graphs shown in FIG. 40B are as in the following table. According to the table, the correlation coefficients for OUT[0] to OUT[9] are each 0.99 or more.

TABLE 3

| OUT[0] | OUT[1] | OUT[2] | OUT[3] | OUT[4] | OUT[5] | OUT[6] | OUT[7] | OUT[8] | OUT[9] |
|---|---|---|---|---|---|---|---|---|---|
| 0.997 | 0.996 | 0.995 | 0.993 | 0.996 | 0.990 | 0.996 | 0.995 | 0.992 | 0.996 |

Figure 41:
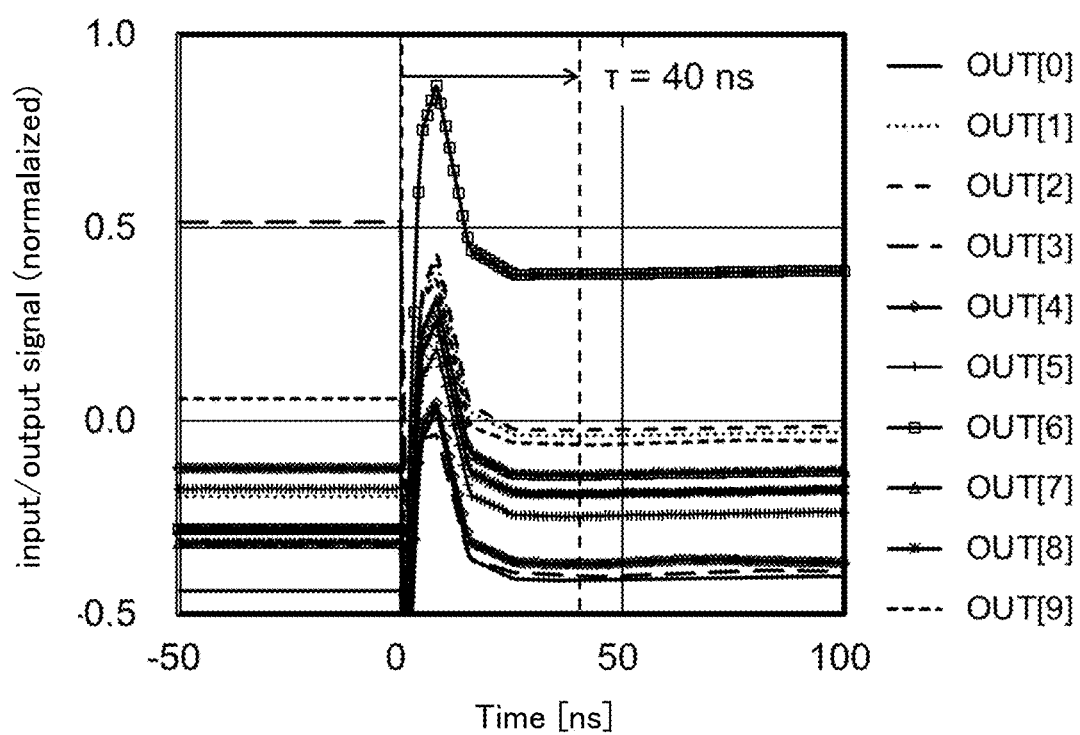
FIG. 41 illustrates an example of output waveforms from an output layer in a neural network formed by a circuit simulator.

FIG. 41 shows an example of output waveforms of the outputs OUT[0] to OUT[9] from the neurons of the output layer in the above-described neural network formed by the circuit simulator. The delays of the output signals in response to the input signals are approximately 40 ns, from which an operation frequency of approximately 25 MHz can be expected. In addition, the power consumption is 15.6 mW. From these, the operation efficiency is estimated at 3.2 TOPS/W.

REFERENCE NUMERALS

SIH: system, ED: electronic device, WSV: electronic device, INTFC: input/output interface, CTL: control portion, PTN: conversion portion, WPTN: conversion portion, DTB1: database, DTB2: database, WDTB1: database, WDTB2: database, MP: memory portion, INF: external interface, STI01: step, STI02: step, STI03: step, STI04: step, STI05: step, STI06: step, STI07: step, STI08: step, PH1: phase, PH2: phase, PH3: phase, PH4: phase, PH5: phase, PH6: phase, PIC: image, DOC: document file, NTL: net list, CSW: name, SPC: space, CNP: name, PKEDN: net list, PKPN: net list, HSCN: net list, HSPN: net list, PKEDD: information, PKPD: information, HSCD: information, HSPD: information, SRC1: first search, SRC2: second search, SRC3: third search, MAC1: arithmetic circuit, MAC1A: arithmetic circuit, MAC2: arithmetic circuit, CS: current supply circuit, CS1: current supply circuit, CS2: current supply circuit, CM: current mirror circuit, CMS: circuit, CA: memory cell array, AM[1]: memory cell, AM[2]: memory cell, AMref[1]: memory cell, AMref[2]: memory cell, AMB: memory cell, WDD: circuit, CLD: circuit, WLD: circuit, OFST: circuit, ACTV: activation function circuit, OFAC: circuit, WCS: circuit, SWS1: circuit, SWS2: circuit, WSD: circuit, XCS: circuit, ITRZ[1]: conversion circuit, ITRZ[m]: conversion circuit, BL: wiring, BLref: wiring, WD: wiring, WDref: wiring, IL: wiring, ILref: wiring, WL[1]: wiring, WL[2]: wiring, WLB: wiring, CL[1]: wiring, CL[2]: wiring, CLB: wiring, OL: wiring, NIL: wiring, VR: wiring, VaL: wiring, VbL: wiring, VcL: wiring, VrefL: wiring, VDDL: wiring, VSSL: wiring, RST: wiring, WCL[1]: wiring, WCL[n]: wiring, WSL[1]: wiring, WSL[m]: wiring, XCL[1]: wiring, XCL[m]: wiring, VE: wiring, SWL1: wiring, SWL2: wiring, BG: wiring, VHE: wiring, VLE: wiring, Tr11: transistor, Tr12: transistor, Tr21: transistor, Tr22: transistor, Tr23: transistor, Tr31: transistor, Tr32: transistor, Tr33: transistor, Tr34: transistor, CA2: cell array, IM[1,1]: cell, IM[m,1]: cell, IM[1,n]: cell, IM[m,n]: cell, C1: capacitor, C2: capacitor, C6: capacitor, C7: capacitor, SW1: conductor, SW2: conductor, SW3: conductor, SW4: conductor, RE: resistor, F1: transistor, F1m: transistor, F2: transistor, F2m: transistor, F3[1]: transistor, F3[n]: transistor, F4[1]: transistor, F4[n]: transistor, C5: capacitor, C5m: capacitor, NP: node, NPref: node, NM[1]: node, NM[2]: node, NMref[1]: node, NMref[2]: node, Na: node, Nb: node, NMB: node, NN[1,1]: node, NN[m,1]: node, NN[1,n]: node, NN[m,n]: node, NNref[1]: node, NNref[m]: node, AME: multiplier circuit, CA3: cell array, EP1: electrode pad, EP2: electrode pad, EP3: electrode pad, EP4: electrode pad, EP5: electrode pad, EP6: electrode pad, M1: transistor, M2: transistor, M2-1: transistor, M2-2: transistor, CP: capacitor, BW: wiring, VX: wiring, VY: wiring, WW: wiring, 300: transistor, 311: substrate, 313: semiconductor region, 314a: low-resistance region, 314b: low-resistance region, 315: insulator, 316: conductor, 320: insulator, 322: insulator, 324: insulator, 326: insulator, 328: conductor, 330: conductor, 350: insulator, 352: insulator, 354: insulator, 356: conductor, 360: insulator, 362: insulator, 364: insulator, 366: conductor, 370: insulator, 372: insulator, 374: insulator, 376: conductor, 380: insulator, 382: insulator, 384: insulator, 386: conductor, 402: insulator, 404: insulator, 500: transistor, 503: conductor, 503a: conductor, 503b: conductor, 510: insulator, 512: insulator, 514: insulator, 516: insulator, 518: conductor, 520: insulator, 522: insulator, 524: insulator, 530: oxide, 530a: oxide, 530b: oxide, 530c: oxide, 530c1: oxide, 530c2: oxide, 540: conductor, 540a: conductor, 540b: conductor, 542a: conductor, 542b: conductor, 543a: region, 543b: region, 544: insulator, 546: conductor, 548: conductor, 550: insulator, 552: insulator, 560: conductor, 560a: conductor, 560b: conductor, 574: insulator, 580: insulator, 581: insulator, 582: insulator, 586: insulator, 600: capacitor, 600A: capacitor, 600B: capacitor, 610: conductor, 611: conductor, 612: conductor, 620: conductor, 630: insulator, 631: insulator, 650: insulator, 651: insulator

The invention claimed is:

1. An AI system comprising:
a first electronic device comprising an external interface; and
a second electronic device comprising a first database and a second database,
wherein the first electronic device comprises an input/output interface, a control portion, and a first conversion portion,
wherein the input/output interface is electrically connected to the control portion,
wherein the first conversion portion is electrically connected to the control portion,
wherein the input/output interface is configured to transmit input data generated by a user's operation to the control portion,
wherein the control portion is configured to transmit the input data to the first conversion portion,
wherein the first conversion portion comprises a neural network comprising a transistor,
wherein the first conversion portion is configured to convert the input data into a first net list with the use of the neural network,
wherein the input data is a circuit diagram illustrating a circuit structure or a document file showing the circuit structure,
wherein each of the first database and the second database is electrically connected to the external interface,
wherein a second net list is stored in the first database,
wherein document data linked with the second net list is stored in the second database,
wherein the control portion is configured to communicate with the second electronic device through the external interface,
wherein the control portion is configured to search the first database for the input data, and
wherein the control portion is configured to read the document data from the second database and to output the document data to the input/output interface in the case where the second net list is found in the first database in searching for the input data.

2. An AI system comprising:
a first electronic device; and
a second electronic device comprising a first database and a second database,
wherein the first electronic device comprises an input/output interface, a control portion, and an external interface,
wherein the second electronic device comprises a first conversion portion,
wherein the input/output interface is electrically connected to the control portion,
wherein the external interface is electrically connected to the control portion and the first conversion portion of the second electronic device,
wherein the input/output interface is configured to transmit input data generated by a user's operation to the control portion,
wherein the control portion is configured to transmit the input data to the first conversion portion of the second electronic device through the external interface,
wherein the first conversion portion comprises a circuit where a neural network comprising a transistor,
wherein the first conversion portion is configured to convert the input data into a first net list with the use of the neural network,
wherein the control portion has a function of obtaining the first net list from the second electronic device through the external interface,
wherein the input data is a circuit diagram illustrating a circuit structure or a document file showing the circuit structure,
wherein each of the first database and the second database is electrically connected to the external interface,
wherein a second net list is stored in the first database,
wherein document data linked with the second net list is stored in the second database,
wherein the control portion is configured to communicate with the second electronic device through the external interface,
wherein the control portion is configured to search the first database for the input data, and
wherein the control portion is configured to read the document data from the second database and to output the document data to the input/output interface in the case where the second net list is found in the first database in searching for the input data.

3. An operation method of an AI system, the AI system comprising:
an input/output interface;
a control portion electrically connected to the input/output interface;
a first database and a second database electrically connected to the control portion; and
a first conversion portion comprising a neural network comprising a transistor, the first conversion portion being electrically connected to the control portion,
wherein the operation method comprises a first step, a second step, a third step, a fourth step, a fifth step, and a sixth step,
wherein the first step comprises a step of inputting input data created by a user to the control portion,
wherein the second step comprises a step of converting the input data into a first net list by the neural network of the first conversion portion,
wherein the third step comprises a step of performing output to the input/output interface through the control portion,
wherein a second net list is stored in the first database,
wherein document data linked with the second net list is stored in the second database,
wherein the fourth step comprises a step of searching the first database for the input data,
wherein the fifth step comprises a step of reading the document data from the second database and outputting the document data to the input/output interface in the case where the second net list is found in the first database in the fourth step, and
wherein the sixth step comprises a step where the control portion outputs information that the first net list is not found in the first database to the input/output interface in the case where the second net list is not found in the first database in the fourth step.

* * * * *